United States Patent
Brooks et al.

(10) Patent No.: US 12,059,006 B2
(45) Date of Patent: Aug. 13, 2024

(54) MICROALGAL FLOUR

(71) Applicant: Corbion Biotech, Inc., South San Francisco, CA (US)

(72) Inventors: Geoffrey Brooks, Reno, NV (US); Scott Franklin, Woodside, CA (US); Jeff Avila, Milbrae, CA (US); Stephen M. Decker, San Francisco, CA (US); Enrique Baliu, San Bruno, CA (US); Walter Rakitsky, San Diego, CA (US); John Piechocki, South San Francisco, CA (US); Dana Zdanis, South San Francisco, CA (US); Leslie M. Norris, San Rafael, CA (US)

(73) Assignee: Corbion Biotech, Inc.

( * ) Notice: Subject to any disclaimer, the term of this patent is extended or adjusted under 35 U.S.C. 154(b) by 814 days.

(21) Appl. No.: 16/289,354

(22) Filed: Feb. 28, 2019

(65) Prior Publication Data

US 2019/0254291 A1   Aug. 22, 2019

Related U.S. Application Data

(63) Continuation of application No. 12/684,884, filed on Jan. 8, 2010, now abandoned, which is a (Continued)

(51) Int. Cl.
*A21D 2/16* (2006.01)
*A21D 2/26* (2006.01)
(Continued)

(52) U.S. Cl.
CPC ............ *A21D 2/165* (2013.01); *A21D 2/267* (2013.01); *A23D 7/001* (2013.01); *A23D 7/003* (2013.01);
(Continued)

(58) Field of Classification Search
USPC ........................................................ 426/541
See application file for complete search history.

(56) References Cited

U.S. PATENT DOCUMENTS

| | | | |
|---|---|---|---|
| 2,506,540 A | 5/1950 | Bryan | |
| 2,967,700 A | 1/1961 | Lee et al. | |

(Continued)

FOREIGN PATENT DOCUMENTS

| | | |
|---|---|---|
| CN | 1094913 | 11/1994 |
| CN | 1168085 A | 12/1997 |

(Continued)

OTHER PUBLICATIONS

Oyler, et al., Comparative Analyses of Three *chlorella* Species in Response to Light and Sugar Reveal Distinctive Lipid Accumulation Patterns in the Microalga *C. sorokiniana*, PLOS, Apr. 2014, vol. 9, Issue 4.*

(Continued)

*Primary Examiner* — Donald R Spamer
*Assistant Examiner* — Philip A Dubois
(74) *Attorney, Agent, or Firm* — Leydig, Voit & Mayer, Ltd.

(57) ABSTRACT

Compositions of microalgae-derived flour are disclosed from multiple genera, species, and strains of edible microalgae. Microalgae used in the invention are free of algal toxins and contain varying levels of primarily monounsaturated triglyceride oil. Flours disclosed herein are formulated as free flowing blendable powders, mixed food ingredients, oxidation stabilized, homogenized and micronized, and combinations therein. Flours disclosed herein also form self stabilizing emulsions in slurries with manageable viscosities. Innovative methods of formulating flours and incorporating them into food compositions are also disclosed. The invention also comprises flours with significant digestible (Continued)

| Strain # | C14:0 | C16:0 | C16:1 | C18:0 | C18:1 | C18:2 | C18:3 | C20:0 | C20:1 |
|---|---|---|---|---|---|---|---|---|---|
| 1 | 0.57 | 10.30 | 0.00 | 3.77 | 70.52 | 14.24 | 1.45 | 0.27 | 0 |
| 2 | 0.61 | 8.70 | 0.30 | 2.42 | 71.98 | 14.21 | 1.15 | 0.20 | 0.24 |
| 4 | 0.68 | 9.82 | 0 | 2.83 | 65.78 | 12.94 | 1.46 | 0 | 0 |
| 5 | 1.47 | 21.96 | 0 | 4.35 | 22.64 | 9.58 | 5.2 | 3.88 | 3.3 |
| 10 | 0 | 12.01 | 0 | 0 | 50.33 | 17.14 | 0 | 0 | 0 |
| 11 | 1.41 | 29.44 | 0.70 | 3.05 | 57.72 | 12.37 | 0.97 | 0.33 | 0 |
| 12 | 1.09 | 25.77 | 0 | 2.75 | 54.01 | 11.90 | 2.44 | 0 | 0 | protein and unique dietary fiber content and associated water binding, texturizing, and healthy oil delivery attributes. Novel methods of oil and fat replacement using flours of the invention are also disclosed. Flours of the invention can be manufactured from edible and inedible heterotrophic fermentation feedstocks, including corn starch, sugar cane, glycerol, and depolymerized cellulose.

25 Claims, 6 Drawing Sheets

Specification includes a Sequence Listing.

Related U.S. Application Data continuation-in-part of application No. 12/579,091, filed on Oct. 14, 2009, now abandoned.

(60) Provisional application No. 61/246,070, filed on Sep. 25, 2009, provisional application No. 61/173,166, filed on Apr. 27, 2009, provisional application No. 61/157,187, filed on Mar. 3, 2009, provisional application No. 61/105,121, filed on Oct. 14, 2008.

(51) Int. Cl.
A23D 7/00       (2006.01)
A23D 7/005      (2006.01)
A23K 10/16      (2016.01)
A23K 20/158     (2016.01)

(52) U.S. Cl.
CPC ......... *A23D 7/0053* (2013.01); *A23D 7/0056* (2013.01); *A23K 10/16* (2016.05); *A23K 20/158* (2016.05)

(56) References Cited

U.S. PATENT DOCUMENTS

| | | |
|---|---|---|
| 3,142,135 A | 7/1964 | Kathrein |
| 3,280,502 A | 10/1966 | Farrow et al. |
| 3,320,693 A | 5/1967 | Shirota et al. |
| 3,957,578 A | 5/1976 | Narita et al. |
| 3,962,466 A | 6/1976 | Nakabayashi |
| 3,983,008 A | 9/1976 | Shinozaki et al. |
| 4,005,062 A | 1/1977 | Schnell |
| 4,103,039 A | 7/1978 | Mandai et al. |
| 4,104,460 A | 8/1978 | Hasebe |
| 4,140,805 A | 2/1979 | Edwards et al. |
| 4,182,777 A | 1/1980 | Saunders et al. |
| 4,273,790 A | 6/1981 | Bosco et al. |
| 4,324,067 A | 4/1982 | Kessler |
| 4,341,038 A | 7/1982 | Bloch et al. |
| 4,373,434 A | 2/1983 | Alexander et al. |
| 4,390,561 A | 6/1983 | Blair et al. |
| 4,519,845 A | 5/1985 | Ou |
| 4,564,526 A | 1/1986 | Takashima |
| 4,627,192 A | 12/1986 | Fick |
| 4,673,490 A | 6/1987 | Subramanian et al. |
| 4,744,996 A | 5/1988 | Rakow et al. |
| 4,756,319 A | 7/1988 | Takanashi |
| 4,901,635 A | 2/1990 | Williams |
| 4,915,961 A | 4/1990 | Tanaka |
| 4,917,915 A | 4/1990 | Cain et al. |
| 4,978,553 A | 12/1990 | Silver |
| 5,001,059 A | 3/1991 | Skatrud et al. |
| 5,130,242 A | 7/1992 | Barclay |
| 5,212,087 A | 5/1993 | Fournier et al. |
| 5,236,721 A | 8/1993 | Yung Chu et al. |
| 5,252,198 A | 10/1993 | Harrison et al. |
| 5,270,177 A | 12/1993 | Ramos Lazcano et al. |
| 5,330,913 A | 7/1994 | Nakayama |
| 5,338,673 A | 8/1994 | Thepenier et al. |
| 5,346,716 A | 9/1994 | Bakal et al. |
| 5,354,878 A | 10/1994 | Connemann et al. |
| 5,436,394 A | 7/1995 | Willmitzer et al. |
| 5,487,916 A | 1/1996 | Christensen |
| 5,492,938 A | 2/1996 | Kyle et al. |
| 5,512,311 A | 4/1996 | Capitani et al. |
| 5,518,918 A | 5/1996 | Barclay et al. |
| 5,547,699 A | 8/1996 | Iizuka et al. |
| 5,567,732 A | 10/1996 | Kyle et al. |
| 5,595,965 A | 1/1997 | Wiggins |
| 5,643,585 A | 7/1997 | Arad et al. |
| 5,656,310 A | 8/1997 | Santillo, Jr. |
| 5,680,812 A | 10/1997 | Linsgeseder |
| 5,685,218 A | 11/1997 | Kemper |
| 5,693,357 A | 12/1997 | Wong |
| 5,711,983 A | 1/1998 | Kyle et al. |
| 5,756,135 A | 5/1998 | Seeley |
| 5,792,631 A | 8/1998 | Running |
| 5,826,500 A | 10/1998 | Kemper |
| 5,888,947 A | 3/1999 | Lambert et al. |
| 5,900,370 A | 5/1999 | Running |
| 5,945,585 A | 8/1999 | Hitz et al. |
| 5,968,791 A | 10/1999 | Davis et al. |
| 6,139,897 A | 10/2000 | Goto et al. |
| 6,166,231 A | 12/2000 | Hoeksema |
| 6,255,505 B1 | 7/2001 | Bijl et al. |
| 6,294,207 B1 | 9/2001 | Christian sen et al. |
| 6,338,866 B1 | 1/2002 | Criggall et al. |
| 6,344,231 B1 | 2/2002 | Nakajo et al. |
| 6,372,460 B1 | 4/2002 | Gladue et al. |
| 6,441,208 B2 | 8/2002 | Bijl et al. |
| 6,620,427 B2 | 9/2003 | Lasekan et al. |
| 6,727,373 B2 | 4/2004 | Bijl et al. |
| 6,750,048 B2 | 6/2004 | Ruecker et al. |
| 6,824,800 B1 * | 11/2004 | Mitsuya ................. A23L 15/20 426/302 |
| 6,867,308 B2 | 3/2005 | Bartok et al. |
| 7,053,267 B2 | 5/2006 | Knauf et al. |
| 7,063,957 B2 | 6/2006 | Chen |
| 7,214,297 B2 | 5/2007 | Wang et al. |
| 7,351,558 B2 | 4/2008 | Ruecker et al. |
| 7,468,267 B2 | 12/2008 | Monod et al. |
| 7,504,259 B2 | 3/2009 | Yadav et al. |
| 7,588,931 B2 | 9/2009 | Damude et al. |
| 7,662,598 B2 | 2/2010 | Ruecker et al. |
| 7,678,931 B2 | 3/2010 | Fichtali et al. |
| 7,781,193 B2 | 8/2010 | Ruecker et al. |
| 7,879,591 B2 | 2/2011 | Damude et al. |
| 7,883,882 B2 | 2/2011 | Franklin et al. |
| 7,914,832 B2 | 3/2011 | Uchino |
| 7,935,515 B2 | 5/2011 | Franklin et al. |
| 7,939,710 B1 | 5/2011 | Apt et al. |
| 8,029,579 B2 | 10/2011 | Knuth et al. |
| 8,043,496 B1 | 10/2011 | Schuh et al. |
| 8,119,583 B2 | 2/2012 | Day et al. |
| 8,187,860 B2 | 5/2012 | Franklin et al. |
| 8,222,010 B2 | 7/2012 | Franklin et al. |
| 8,268,610 B2 | 9/2012 | Franklin et al. |
| 8,278,261 B2 | 10/2012 | Day et al. |
| 8,283,483 B2 | 10/2012 | Williams et al. |
| 8,435,767 B2 | 5/2013 | Franklin et al. |
| 8,450,083 B2 | 5/2013 | Day et al. |
| 8,476,059 B2 | 7/2013 | Trimbur et al. |
| 8,497,116 B2 | 7/2013 | Trimbur et al. |
| 8,512,999 B2 | 8/2013 | Trimbur et al. |
| 8,518,689 B2 | 8/2013 | Trimbur et al. |
| 8,530,207 B2 | 9/2013 | Watts et al. |
| 8,592,188 B2 | 11/2013 | Franklin et al. |
| 8,633,012 B2 | 1/2014 | Franklin et al. |
| 8,647,397 B2 | 2/2014 | Trimbur et al. |
| 8,674,180 B2 | 3/2014 | Franklin et al. |
| 8,697,402 B2 | 4/2014 | Trimbur et al. |
| 8,697,427 B2 | 4/2014 | Franklin et al. |
| 8,747,834 B2 | 6/2014 | Brinkmann et al. |
| 8,765,424 B2 | 7/2014 | Franklin et al. |
| 8,772,575 B2 | 7/2014 | Franklin et al. |
| 8,790,914 B2 | 7/2014 | Trimbur et al. |
| 8,802,422 B2 | 8/2014 | Trimbur et al. |
| 8,822,176 B2 | 9/2014 | Day et al. |

(56) References Cited

U.S. PATENT DOCUMENTS

| | | |
|---|---|---|
| 8,822,177 B2 | 9/2014 | Day et al. |
| 8,846,352 B2 | 9/2014 | Chua et al. |
| 8,846,375 B2 | 9/2014 | Franklin et al. |
| 8,852,885 B2 | 10/2014 | Franklin et al. |
| 8,889,401 B2 | 11/2014 | Trimbur et al. |
| 8,889,402 B2 | 11/2014 | Trimbur et al. |
| 8,945,908 B2 | 2/2015 | Franklin et al. |
| 8,951,777 B2 | 2/2015 | Franklin et al. |
| 9,062,294 B2 | 6/2015 | Franklin et al. |
| 9,066,527 B2 | 6/2015 | Franklin et al. |
| 9,068,213 B2 | 6/2015 | Franklin et al. |
| 9,102,973 B2 | 8/2015 | Franklin et al. |
| 9,109,239 B2 | 8/2015 | Franklin et al. |
| 9,345,730 B2 | 5/2016 | Brinkmann et al. |
| 2002/0068110 A1 | 6/2002 | Liu et al. |
| 2002/0122868 A1 | 9/2002 | Floeter et al. |
| 2003/0097686 A1 | 5/2003 | Knauf et al. |
| 2003/0138477 A1 | 7/2003 | Barclay |
| 2003/0229237 A1 | 12/2003 | Haas et al. |
| 2004/0162266 A1 | 8/2004 | Myatt et al. |
| 2004/0230085 A1 | 11/2004 | Jakkula et al. |
| 2005/0005333 A1 | 1/2005 | Ruezinsky et al. |
| 2005/0008656 A1 | 1/2005 | Meredith et al. |
| 2005/0153002 A1 | 7/2005 | Socla Rosales et al. |
| 2005/0170479 A1 | 8/2005 | Weaver et al. |
| 2005/0262588 A1 | 11/2005 | Dehesh et al. |
| 2005/0266537 A1 | 12/2005 | Chen |
| 2006/0094088 A1 | 5/2006 | Picataggio et al. |
| 2006/0094089 A1 | 5/2006 | Barclay |
| 2006/0122410 A1 | 6/2006 | Fichtali et al. |
| 2006/0286205 A1 | 12/2006 | Fichtali et al. |
| 2007/0009988 A1 | 1/2007 | Monod et al. |
| 2007/0099280 A1 | 5/2007 | Barclay |
| 2007/0118916 A1 | 5/2007 | Puzio et al. |
| 2007/0160728 A1 | 7/2007 | Rudie et al. |
| 2007/0166266 A1 | 7/2007 | Dillon et al. |
| 2007/0167396 A1 | 7/2007 | Dillon et al. |
| 2007/0218183 A1 | 9/2007 | Nakhasi et al. |
| 2007/0261138 A1 | 11/2007 | Graham et al. |
| 2008/0019997 A1 | 1/2008 | Shaish et al. |
| 2008/0107776 A1 | 5/2008 | Prakash et al. |
| 2008/0160593 A1 | 7/2008 | Oyler |
| 2008/0206379 A1 | 8/2008 | Fabritius et al. |
| 2008/0283803 A1 | 11/2008 | Rapp et al. |
| 2009/0004715 A1 | 1/2009 | Trimbur et al. |
| 2009/0011480 A1 | 1/2009 | Trimbur et al. |
| 2009/0035842 A1 | 2/2009 | Trimbur et al. |
| 2009/0047721 A1 | 2/2009 | Trimbur et al. |
| 2009/0061493 A1 | 3/2009 | Trimbur et al. |
| 2009/0064567 A1 | 3/2009 | Lippmeier et al. |
| 2009/0068315 A1 | 3/2009 | Hundscheid et al. |
| 2009/0099260 A1 | 4/2009 | Namal Senanayake et al. |
| 2009/0142322 A1 | 6/2009 | Ye |
| 2009/0148918 A1 | 6/2009 | Trimbur et al. |
| 2009/0211150 A1 | 8/2009 | Wu et al. |
| 2009/0234146 A1 | 9/2009 | Cooney et al. |
| 2009/0274736 A1 | 11/2009 | Dillon et al. |
| 2009/0298159 A1 | 12/2009 | Wu et al. |
| 2010/0010088 A1 | 1/2010 | Chilton et al. |
| 2010/0021912 A1 | 1/2010 | Farese et al. |
| 2010/0028488 A1 | 2/2010 | Lo et al. |
| 2010/0058651 A1 | 3/2010 | Knuth et al. |
| 2010/0120643 A1 | 5/2010 | Brown et al. |
| 2010/0151112 A1 | 6/2010 | Franklin et al. |
| 2010/0151538 A1 | 6/2010 | Franklin et al. |
| 2010/0151567 A1 | 6/2010 | Franklin et al. |
| 2010/0170144 A1 | 7/2010 | Day et al. |
| 2010/0186117 A1 | 7/2010 | Fabijanski et al. |
| 2010/0196575 A1 | 8/2010 | Sanchez et al. |
| 2010/0239712 A1* | 9/2010 | Brooks ............... A23D 7/0053 426/61 |
| 2010/0297292 A1 | 11/2010 | Brooks et al. |
| 2010/0297295 A1 | 11/2010 | Brooks et al. |
| 2010/0297296 A1 | 11/2010 | Brooks et al. |
| 2010/0297323 A1 | 11/2010 | Brooks et al. |
| 2010/0297325 A1 | 11/2010 | Brooks et al. |
| 2010/0297331 A1 | 11/2010 | Brooks et al. |
| 2010/0303957 A1 | 12/2010 | Brooks et al. |
| 2010/0303961 A1 | 12/2010 | Brooks et al. |
| 2010/0303990 A1 | 12/2010 | Brooks et al. |
| 2010/0323413 A1 | 12/2010 | Trimbur et al. |
| 2010/0323414 A1 | 12/2010 | Trimbur et al. |
| 2011/0014665 A1 | 1/2011 | Trimbur et al. |
| 2011/0015417 A1 | 1/2011 | Trimbur et al. |
| 2011/0044915 A1 | 2/2011 | Ribadeau-Dumas |
| 2011/0047863 A1 | 3/2011 | Trimbur et al. |
| 2011/0072714 A1 | 3/2011 | Gaertner et al. |
| 2011/0190522 A1 | 8/2011 | Trimbur et al. |
| 2011/0203168 A1 | 8/2011 | Franklin et al. |
| 2011/0252696 A1 | 10/2011 | Franklin et al. |
| 2011/0256268 A1 | 10/2011 | Franklin et al. |
| 2011/0256282 A1 | 10/2011 | Piechocki et al. |
| 2011/0293785 A1 | 12/2011 | Franklin et al. |
| 2011/0294174 A1 | 12/2011 | Franklin et al. |
| 2011/0305740 A1 | 12/2011 | Boursier |
| 2011/0311599 A1 | 12/2011 | Boursier et al. |
| 2012/0027724 A1 | 2/2012 | Brinkmann et al. |
| 2012/0028319 A1 | 2/2012 | Trimbur et al. |
| 2012/0034662 A1 | 2/2012 | Hu et al. |
| 2012/0122192 A1 | 5/2012 | Trimbur et al. |
| 2012/0128851 A1 | 5/2012 | Brooks et al. |
| 2012/0149075 A1 | 6/2012 | Day et al. |
| 2012/0164701 A1 | 6/2012 | Trimbur et al. |
| 2012/0203018 A1 | 8/2012 | Franklin et al. |
| 2012/0269949 A1 | 10/2012 | Nakajima et al. |
| 2012/0277452 A1 | 11/2012 | Franklin et al. |
| 2012/0277453 A1 | 11/2012 | Franklin et al. |
| 2012/0283460 A1 | 11/2012 | Franklin et al. |
| 2012/0288930 A1 | 11/2012 | Trimbur et al. |
| 2012/0324784 A1 | 12/2012 | Franklin et al. |
| 2012/0329109 A1 | 12/2012 | Chua et al. |
| 2013/0004646 A1 | 1/2013 | Franklin et al. |
| 2013/0005005 A1 | 1/2013 | Day et al. |
| 2013/0006006 A1 | 1/2013 | Day et al. |
| 2013/0031678 A1 | 1/2013 | Zheng et al. |
| 2013/0034887 A1 | 2/2013 | Franklin et al. |
| 2013/0078709 A1 | 3/2013 | Franklin et al. |
| 2013/0089916 A1 | 4/2013 | Franklin et al. |
| 2013/0096211 A1 | 4/2013 | Franklin et al. |
| 2013/0102039 A1 | 4/2013 | Franklin et al. |
| 2013/0122180 A1 | 5/2013 | Brooks et al. |
| 2013/0165677 A1 | 6/2013 | Franklin et al. |
| 2013/0197247 A1 | 8/2013 | Franklin et al. |
| 2013/0273621 A1 | 10/2013 | Franklin et al. |
| 2013/0295268 A1 | 11/2013 | Day et al. |
| 2013/0296591 A1 | 11/2013 | Day et al. |
| 2013/0309358 A1 | 11/2013 | Norris |
| 2013/0323382 A1 | 12/2013 | Franklin et al. |
| 2013/0330790 A1 | 12/2013 | Trimbur et al. |
| 2013/0338385 A1 | 12/2013 | Franklin et al. |
| 2014/0106051 A1 | 4/2014 | Lefevre et al. |
| 2014/0170716 A1 | 6/2014 | Trimbur et al. |
| 2014/0212570 A1 | 7/2014 | Norris et al. |
| 2014/0234479 A1 | 8/2014 | Norris et al. |
| 2014/0249342 A1 | 9/2014 | Franklin et al. |
| 2014/0256024 A1 | 9/2014 | Franklin et al. |
| 2014/0256600 A1 | 9/2014 | Dillon et al. |
| 2014/0287114 A1 | 9/2014 | Finely et al. |
| 2014/0305031 A1 | 10/2014 | Day et al. |
| 2014/0315267 A1 | 10/2014 | Franklin et al. |
| 2014/0328906 A1 | 11/2014 | Brinkmann et al. |
| 2014/0336100 A1 | 11/2014 | Day et al. |
| 2014/0357746 A1 | 12/2014 | Ngantung et al. |
| 2014/0377847 A1 | 12/2014 | Franklin et al. |
| 2015/0073163 A1 | 3/2015 | Chua et al. |
| 2015/0125914 A1 | 5/2015 | Franklin et al. |
| 2015/0218604 A1 | 8/2015 | Franklin et al. |
| 2015/0275149 A1 | 10/2015 | Dummer et al. |
| 2015/0344917 A1 | 12/2015 | Franklin et al. |
| 2015/0374012 A1 | 12/2015 | Klamczynska et al. |
| 2016/0021923 A1 | 1/2016 | Paulsen et al. |

(56) References Cited

U.S. PATENT DOCUMENTS

| | | |
|---|---|---|
| 2016/0324167 A1 | 11/2016 | Brooks et al. |
| 2017/0119005 A1 | 5/2017 | Piechocki et al. |

FOREIGN PATENT DOCUMENTS

| | | |
|---|---|---|
| CN | 1 322 493 A | 11/2001 |
| CN | 1596694 A | 3/2005 |
| CN | 176082 | 5/2006 |
| CN | 1837352 A | 9/2006 |
| CN | 1940021 A | 4/2007 |
| CN | 101037639 A | 9/2007 |
| CN | 101130513 A | 2/2008 |
| CN | 101999567 | 4/2011 |
| CN | 102076859 A | 5/2011 |
| CN | 102271525 A | 12/2011 |
| CN | 102340995 A | 2/2012 |
| CN | 102643714 A | 8/2012 |
| DE | 10 2006 056454 A1 | 5/2008 |
| EP | 0528466 A1 | 7/1992 |
| EP | 0562504 B1 | 11/1995 |
| EP | 1178118 A1 | 2/2002 |
| EP | 1681337 | 7/2006 |
| EP | 1741767 | 1/2007 |
| EP | 1545229 B1 | 6/2008 |
| EP | 1853124 B1 | 9/2008 |
| FR | 2924126 A1 | 5/2009 |
| GB | 824151 A | 11/1959 |
| GB | 1312355 | 4/1973 |
| JP | 45-17146 | 6/1970 |
| JP | S51-7138 A | 1/1976 |
| JP | 57-150379 A | 9/1982 |
| JP | 57-150379 A | 9/1982 |
| JP | 58-184264 | 10/1983 |
| JP | 360075244 | 10/1983 |
| JP | S60-75244 A | 4/1985 |
| JP | 60-221037 | 11/1985 |
| JP | 62-061568 | 3/1987 |
| JP | 04-108374 | 4/1992 |
| JP | 04-077189 | 10/1993 |
| JP | 05-276963 | 10/1993 |
| JP | 06-253872 A | 9/1994 |
| JP | 07-008217 | 1/1995 |
| JP | 07-012466 | 1/1995 |
| JP | 07-075557 | 3/1995 |
| JP | 09-012466 | 1/1997 |
| JP | H0956324 A | 3/1997 |
| JP | 09-252707 | 9/1997 |
| JP | 409252707 A | 9/1997 |
| JP | 2000-175680 | 6/2000 |
| JP | 2000-175696 A | 6/2000 |
| JP | 2001-292751 A | 10/2001 |
| JP | 2002-125601 | 5/2002 |
| JP | 2003-023966 A | 1/2003 |
| JP | 2004-049079 A | 2/2004 |
| JP | 2004-275173 A | 10/2004 |
| JP | 2006-014700 A | 1/2006 |
| JP | 2008-148663 | 7/2008 |
| JP | 2008-253146 | 10/2008 |
| JP | 2009-060807 A | 3/2009 |
| JP | 2016-198117 | 12/2016 |
| WO | WO 91/014427 A1 | 10/1991 |
| WO | WO 91/018105 A1 | 11/1991 |
| WO | WO 94/010288 A2 | 5/1994 |
| WO | WO 97/040698 A1 | 11/1997 |
| WO | WO 99/037166 A1 | 7/1999 |
| WO | WO 00/011682 A1 | 3/2000 |
| WO | WO 00/61740 A1 | 10/2000 |
| WO | WO 00/066750 A2 | 11/2000 |
| WO | WO 00/74471 A1 | 12/2000 |
| WO | WO 02/008403 A2 | 1/2002 |
| WO | WO 04/016094 | 2/2004 |
| WO | WO 06/122299 A2 | 11/2006 |
| WO | WO 07/027669 | 3/2007 |
| WO | WO 07/094498 A1 | 8/2007 |
| WO | WO07/117511 A2 | 10/2007 |
| WO | WO 07/121100 | 10/2007 |
| WO | WO 07/134294 A2 | 11/2007 |
| WO | WO 08/002643 A2 | 1/2008 |
| WO | WO 08/060571 A2 | 5/2008 |
| WO | WO 08/083352 A1 | 7/2008 |
| WO | WO 08/130372 A2 | 10/2008 |
| WO | WO 08/134836 A2 | 11/2008 |
| WO | WO 08/151149 A2 | 12/2008 |
| WO | WO 09/000535 A1 | 12/2008 |
| WO | WO2009/058799 A1 | 5/2009 |
| WO | WO 09/076559 | 6/2009 |
| WO | WO09/105620 A1 | 8/2009 |
| WO | WO 09/126843 A2 | 10/2009 |
| WO | WO 09/147340 A1 | 12/2009 |
| WO | WO 10/007331 A2 | 1/2010 |
| WO | WO 10/007332 A2 | 1/2010 |
| WO | WO 10/019813 A2 | 2/2010 |
| WO | WO10/045368 A2 | 4/2010 |
| WO | WO 10/063031 A2 | 6/2010 |
| WO | WO 10/063032 A2 | 6/2010 |
| WO | WO 10/102056 A1 | 9/2010 |
| WO | WO 10/111698 A2 | 9/2010 |
| WO | WO 10/120923 A1 | 10/2010 |
| WO | WO 10/120939 A2 | 10/2010 |
| WO | WO 11/026008 A1 | 3/2011 |
| WO | WO 11/090730 A1 | 7/2011 |
| WO | WO 11/130573 A1 | 10/2011 |
| WO | WO 11/130576 A1 | 10/2011 |
| WO | WO 11/130578 A2 | 10/2011 |
| WO | WO 11/150410 A2 | 12/2011 |
| WO | WO 11/150411 | 12/2011 |
| WO | WO 12/061647 A2 | 5/2012 |
| WO | WO 12/095121 A1 | 7/2012 |
| WO | WO 12/106560 A1 | 8/2012 |
| WO | WO 12/154626 A1 | 11/2012 |
| WO | WO 2013/059023 A1 | 4/2013 |
| WO | WO 13/082186 A2 | 6/2013 |
| WO | WO 13/158938 | 10/2013 |
| WO | WO 14/176515 A2 | 10/2014 |
| WO | WO 15/051319 A2 | 4/2015 |

OTHER PUBLICATIONS

Johns et al, Effect of C/N ratio and aeration on the fatty acid composition of heterotrophic Chlorella sorokiniana, Journal of Applied Phycology 3: 203-209, 1991 (Johns).*
Troung, Stickiness in Foods: a Review of Mechanisms and Test Methods, International Journal of Food Properties, vol. 4, 2001 (Truong).*
U.S. Appl. No. 12/960,388, filed Dec. 3, 2010.
U.S. Appl. No. 13/087,305, filed Apr. 14, 2011.
U.S. Appl. No. 13/087,330, filed Apr. 14, 2011.
U.S. Appl. No. 13/118,369, filed May 27, 2011.
U.S. Appl. No. 13/527,480, filed Jun. 19, 2012.
U.S. Appl. No. 13/865,974, filed Apr. 18, 2013.
U.S. Appl. No. 13/889,214, filed May 7, 2013.
U.S. Appl. No. 13/941,342, filed Jul. 12, 2013.
U.S. Appl. No. 13/941,357, filed Jul. 12, 2013.
U.S. Appl. No. 14/506,491, filed Oct. 3, 2014.
U.S. Appl. No. 14/693,853, filed Apr. 22, 2015.
U.S. Appl. No. 14/752,770, filed Jun. 26, 2015.
U.S. Appl. No. 14/808,175, filed Jul. 24, 2015.
"Auxenochlorella," accessed online at <en.wikipedia.org/w/index.php?title=Auxenochlorella&oldid=711518993>, last modified on Mar. 23, 2016.
Katayama et al., "Alpha-Linolenate and Photosynthetic Activity in Chlorella Protothecoides," Plant Physiol., 42:308-313, (1967).
Bonaventure et al., "Disruption of the FATB Gene in *Arabidopsis* Dethonstrates an Essential Role of Saturated Fatty Acids in Plant Growth," The Plant Cell 15:1020-1033, (2003).
Dehesh et al., "KAS IV: a 3-ketoacyl-ACP synthase from *Cuphea* sp. is a medium chain specific condensing enzyme," The Plant Journal, 15:383-390, (1998).
Dehesh et al., "Production of high levels of 8:0 and 10:0 fatty acids in transgenic canola by overexpression of Ch FatB2, a thioesterase cDNA from Cuphea hookeriana," The Plant Journal, 9(2):167-172, (1996).

(56) References Cited

OTHER PUBLICATIONS

Dunahay et al., "Genetic Engineering of Microalgae for Fuel Production," Applied Biochemistry and Biotechnology, 34/35:331-339 (1992).
Evans et al., "A comparison of the oleaginous yeast, *Candida curvata*, grown on different carbon sources in continuous and batch culture," Lipids, 18(09):623-629, (1983).
Gul et al., "Sterols and the Phytosterol Content in Oilseed Rape (*Brassica napus* L.)," Journal of Cell and Molecular Biology, 5:71-79 (2006).
Heise et al., "Factors Controlling Medium-Chain Fatty Acid Synthesis In Plastids From Cuphea Embryos," Prog. Lipid Res., 33(1/2):87-95, (1994).
Meesters et al., "High-cell-density cultivation of the lipid accumulating yeast *Cryptococcus curvatus* using glycerol as a carbon source," Applied Microbiology and Biotechnology, 45:575-579, (1996).
Meng et al., "Biodiesel production from oleaginous microorganisms," Renewable Energy, 34:1-5, (2009).
Morris, "Effect of Growth Temperature on the Cryopreservation of Prototheca," Journal of General Microbiology, 94:395-399, (1976).
Murakami et al., "Lipid Composition of Commercial Bakers' Yeasts Having Different Freeze-tolerance in Frozen Dough," Biosci. Biotechnol. Biochem., 60(11)1874-1876, (1996).
Sud et al., "Lipid Composition and Sensitivity of Prototheca wickerhamil to Membrane-Active Antimicrobial Agents," Antimicrobial Agents and Chemotherapy, 16:486-490, (1979).
Suh et al., "What limits production of unusual monoenoic fatty acids in transgenic plants?," Planta, 215:584-595, (2002).
Tornabene et al., "Lipid composition of the nitrogen starved green alga *Neochloris oleoabundans*," Enzyme Microb. Technol., 5:435-440, (1983).
U.S. Appl. No. 12/579,091, Requirement for Restriction/Election mailed Oct. 18, 2012.
U.S. Appl. No. 12/684,885, Requirement for Restriction/Election mailed Oct. 5, 2012.
U.S. Appl. No. 12/684,886, Requirement for Restriction/Election mailed Nov. 2, 2012.
U.S. Appl. No. 12/684,887, Requirement for Restriction/Election mailed Oct. 12, 2012.
U.S. Appl. No. 12/684,888, Requirement for Restriction/Election mailed Oct. 29, 2012.
U.S. Appl. No. 12/684,889, Requirement for Restriction/Election mailed Oct. 23, 2012.
U.S. Appl. No. 12/684,891, Requirement for Restriction/Election mailed Oct. 23, 2012.
U.S. Appl. No. 12/684,892, Requirement for Restriction/Election mailed Oct. 9, 2012.
U.S. Appl. No. 12/684,893, Requirement for Restriction/Election mailed Oct. 10, 2012.
U.S. Appl. No. 12/684,894, Requirement for Restriction/Election mailed Oct. 9, 2012.
Warner et al., "Analysis of Tocopherols and Phytosterols in Vegetable Oils by HPLC with Evaporative Light-Scattering Detection," JAOCS, 67(11):827-831 (1990).
Wiberg et al., "The distribution of caprylate, caprate and laurate in lipids from developing and mature seeds of transgenic *Brassica napus* L.," Planta, 212:33-40, (2000).
Beale et al., "Chlorophyll Synthesis in Chlorella: Regulation by Degree of Light Limitation of Growth," Plant Physiol., 47:230-235, (1971).
Black et al., "P700 Activity and Chlorophyll Content of Plants with Different Photosynthetic Carbon Dioxide Fixation Cycles," Plant Physiol., 45:738-741, (1970).
Cohen et al., "The Heterotrophic Connection in a Photoautotrophic Chlorella Vulgaris Dominant in W Astew Ater Oxidation Ponds," War. Sci. Tech., 27(7-8):151-155, (1993).
Cordy et al., "Chlorellasis in a Lamb," Vet. Path., 10:171-176, (1973).

Demirbas et al., "Importance of algae oil as a source of biodiesel," Energy Conversion and Management, 52:163-170, (2011).
Fleischer et al., "The Relation Between Chlorophyll Content and Rate of Photosynthesis," The Journal of General Physiology, pp. 573-597, (1934).
Kidmose et al., "Chromatographic Determination of Changes in Pigments in Spinach (*Spinacia oleracea* L.) During Processing," Journal of Chromatographic Science, 43:466-472, (2005).
Leema et al., "Heterotrophic Production of Lutein And Biomass by Chlorella Vulgaris with Different Nitrogen Sources," Algae Biofuel, Studium Press (India) Pvt. Ltd., pp. 91-101, (2011).
Papanikolaou et al., "Single cell oil production by Yarrowia lipolytica growing on an industrial derivative of animal fat in batch cultures," Appl. Microbiol. Biotechnol., 58:308-312, (2002).
PCT Invitation to Pay Additional Fees from the International Searching Authority for application PCT/US2014/035476 mailed Dec. 1, 2014.
Shi et al., "Production and rapid extraction of lutein and the other lipid-soluble pigments from Chlorella protothecoides grown under heterotrophic and mixotrophic conditions," Nahrung, 43:109-113, (1999).
U.S. Appl. No. 12/684,886, Final Office Action mailed Jan. 16, 2015.
U.S. Appl. No. 12/684,891, Non-Final Office Action mailed Jan. 2, 2015.
U.S. Appl. No. 13/263,724, Non-Final Office Action mailed Nov. 20, 2014.
U.S. Appl. No. 13/667,784, Final Office Action mailed Dec. 22, 2014.
Ueno et al., "Optimization of heterotrophic culture conditions for n-alkane utilization and phylogenetic position based on the 18S rDNA sequence of a thermotolerant Prototheca zopfii strain," J Biosci Bioeng, 94(2):160-165, (2002). Abstract. [Retrieved from the Internet Dec. 1, 2014: <URL: http://www.ncbi.nlm.nih.gov/pubmed/16233286>].
Yamauchi et al., "Regulated Chlorophyll Degradation in Spinach Leaves during Storage," J. Amer. Soc. Hort. Sci., 116(1):58-62, (1991).
"Bristol Medium Directions," UTEX The Culture Collection of Algae, The University of Texas at Austin, 1 page, (2014). [Retrieved from the Internet Aug. 19, 2014; <URL: http://web.biosci.utexas.edu/utex/mediaDetail.aspx?mediaID=29>].
"Omega-3 Fatty Acids and Health—Fact Sheet for Health Professionals," NIH Office of Dietary Supplements, 6 pages, (2005). [Retrieved from the Internet Aug. 19, 2014: <URL: http://ods.od.nih.gov/factsheets/Omega3FattyAcidsandHealth-HealthProfessional/?print=1>].
Amaro et al., "Advances and perspectives in using microalgae to produce biodiesel," Applied Energy, 88:3102-3410, (2011).
Batista et al., "Microalgae bioactive components for innovative food products development," 37th WEFTA Meeting Book of Abstracts, INRB/IPIMAR, Abstract S3.14, p. 134, (2007).
Champagne et al., "Interaction between pH, autolysis promoters and bacterial contamination on the production of yeast extracts," Food Research International, 32:272-583, (1999).
Cook et al., "Photo-Assimilation of Acetate by an Obligate Phototrophic Strain of Euglena gracilis," Publication, J. Protozool., 14(3):382-384, (1967).
Dugar et al., "Relative potential of biosynthetic pathways for biofuels and bio-based products," Nature Biotechnology, 29(12):1074-1078, (2011).
Fradique et al., "Microalgae biomass incorporation in pasta products," 5th Pigments in Food congress—for quality and health, ISBN 978-952-10-4846-3, p. 182, (Aug. 2008). Abstract.
Gouveia et al., "Chlorella vulgaris and Haematococcus pluvialis biomass as colouring and antioxidant in food emulsions," Eur Food Res Technol, 222:362-367, (2006).
Gouveia et al., "Microalgae in Novel Food Products," Food Chemistry Research Developments, Chapter 2, Nova Science Publishers, Inc., ISBN 978-1-60456-262-0, 37 pages, (May 2008).
Heredia-Arroyo et al., "Oil Accumulation via Heterotrophic/Mixotrophic Chlorella protothecoides," Appl Biochem Biotechnol, 162:1978-1995, (2010).

(56) References Cited

OTHER PUBLICATIONS

Knothe, "'Designer' Biodiesel: Optimizing Fatty Ester Composition to Improve Fuel Properties," Energy & Fuels, 22:1358-1364, (2008).
Meguro et al., "Original Communication Solubilization of phytosterols in diacylglycerol versus triacylglycerol improves the serum cholesterol-lowering effect," European Journal of Clinical Nutrition, 55:513-517, (2001).
Milic et al., "Utilization of baker's yeast (*Saccharamyces cerevisiae*) for the production of yeast extract: effects of different enzymatic treatments on solid, protein and carbohydrate recovery," J. Serb. Chem. Soc., 72(5):451-457, (2007).
Moon et al., "Mixotrophic growth with acetate or volatile fatty acids maximizes growth and lipid production in *Chlamydomonas reinhardtii*," Algal Research, 2:235-357, (2013).
O'Grady et al., "Heterotrophic growth and lipid production of Chiorella protothecoides on glycerol," Bioprocess Biosyst Eng, 34:121-125, (2011).
PCT International Search Report and Written Opinion of the International Searching Authority for application PCT/US2013/037261 mailed Aug. 23, 2013.
Pratoomyot et al., "Fatty acids composition of 10 microalgal species," Songklanakarin J. Sci. Technol., 27(6):1179-1187, (2005).
Raymundo et al., "Fat mimetic capacity of Chlorella vulgaris biomass in oil-in-water food emulsions stabilized by pea protein," Food Research International, 38:961-965, (2005).
Rizos et al., "Association Between Omega-3 Fatty Acid Supplementation and Risk of Major Cardiovascular Disease Events," JAMA, 308(10):1024-1033, (2012).
Scorletti et al., "Omega-3 Fatty Acids, Hepatic Lipid Metabolism, and Nonalcoholic Fatty Liver Diseas," Annu. Rev. Nutr., 33:231-248., (2013).
Shetty et al., "TEffect of Thiol Reagents on Extractability of Protein from Yeast," Biotechnology and Bloengineering, John Wiley & Sons, Inc., XX:755-766, (1978).
Shi et al., "Heterotrophic production of biomass and lutein by Chlorella protothecoldes on various nitrogen sources," Enzyme and Microbial Technology, 27:312-318, (2000).
Shi et al., "High Yield Production Of Lutein By Heterotrophic Chlorella Protothecoides In Fed-Batch Systems," Algae and their Biotechnological Potential, Kluwer Academic Publishers, pp. 107-119, (2001).
Shi, et al., "Production of biomass and lutein by Chlorella protothecoides at various glucose concentrations in heterotrophic cultures ," Process Biochemistry, 34:341-347, (1999).
Takeno et al., "Establishment of an overall transformation system for an oil-producing filamentous fungus, *Mortierella alpina* 1S-4," Appl Microbiol Biotechnol, 65:419-425, (2004).
Talebi et al., "Genetic manipulation, a feasible tool to enhance unique characteristic of Chlarella vulgaris as a feedstock for biodiesel production," Mol Biol Rep, 40:4421-4428, (2013).
U.S. Appl. No. 12/684,886, Non-Final Office Action mailed Aug. 27, 2014.
U.S. Appl. No. 13/889,214, Notice of Allowance mailed Apr. 28, 2014.
Wei et al., "Enhanced production of lutein in heterotrophic Chlorella protothecoldes by oxidative stress," Sci China Ser C-Life Sci, 51(12):1088-1093, (2008).
Zaidul et al., "Supercritical carbon dioxide (SC-OO2) extraction and fractionation of palm kernel oil from palm kernel as cocoa butter replacers blend," Journal of Food Engineering, 73:210-216, (2006).
Izhang et al., "A kinetic model for lutein production by the green microalga *Chlorella protothecoldes* in heterotrophic culture," Journal of Industrial Microbiology & Biotechnology, 23:503-507, (1999).
U.S. Appl. No. 13/118,369, Final Office Action mailed Mar. 28, 2014.
U.S. Appl. No. 13/667,784, Non-Final Office Action mailed Mar. 27, 2014.
"Lutein from Tagetetes Erecta," FNP52 Add 12, 63rd JECFA, Section B, pp. 35-37, ISBN 92-5-105246-8 (2004).
Aguirre et al., "Engineering challenges in biodiesel production from microalgae," Critical Reviews in Biotechnology, 33(3): 293-308, (2013).
Andersen, "Biology and Systematics of Heterokont and Haptophyte Algae," American Journal of Botany, 91(10):1508-1522, (2004).
Bhunia et al., "Algal Biodiesel Production: Challenges and Opportunities," Bioenergy and Biofuel from Biowastes and Biomass, American Society of Civil Engineers, pp. 313-345, (2010).
Bigogno et al., "Lipid and fatty acid composition of the green oleaginous alga *Parietochloris incisa*, the richest plant source of arachidonic acid," Pytochemistry, 60:497-503, (2002).
Broun et al., "Accumulation of Ricinoleic, Lesquerolic, and Densipolic Acids in Seeds of Transgenic *Arabidopsis* Plants That Express a Fatty Acyl Hydroxylase cDNA from Castor Bean," Plant Physiol., 113:933-942, (1997).
Burgal et al., "Metabolic engineering of hydroxy fatty acid production in plants: RcDGAT2 drives dramatic increases in ricinoleate levels in seed oil," Plant Biotechnol J., 6(8):819-831, (2008).
Day, AL. et al., "Safety evaluation of a high-lipid algal biomass from Chlorella protorhecoides," Rego !. Toxicol. Pharmacol., doi:10.1016/j.yrtph.2009.06.014, 15 pages, (2009).
Hunter et al., "Acute Oral Toxicity to Rats of Green Chlorella and Yellow Chlorella Powders," Huntingdon Research Centre, Huntingdon, England, 5 pages, (1972).
Karabuluta et al., "Determination of changes in some physical and chemical properties of soybean oil during hydrogenation," Food Chemistry, 81:453-456, (2003).
Kihlberg et al., "Nutritive Value, Effect," The Microbe as a Source of Food, Department of Applied Microbiology, Karolinska Institutet, Stockholm, Sweden, p. 440, (1972).
Krüger, "Kurze Charakteristik einiger niedrerer Organismen im Saftfluss der Laubbäume," Hedwigia, 33: 241-266, (1894). Machine Translation.
Lu, "Biosynthesis and Gene Engineering of Plant Fatty Acids," Chinese Bulletin of Botany, 17(6):481-491, (2000). Abstract only.
Mitsuda et al., "Properties of Chlorella cells grown under various photo-heterotrophic conditions," Plant & Cell Physiol, 11:281-292 , (1970).
Mitsuda et al., "Protein Isolates From Chlorella Algae, Torula Yeasts, And Hydrocarbon-Assimilating Microorganisms," Nutr. Sci. Vitaminol., 19:1-13, (1973).
Murakami et al., "Lipids and Fatty Acid Custipvsi lions of Chlorella," Nihon Yuka gakkai-shi, 46(4):423-427, (1997).
Napier et al., "Tailoring plant lipid composition: designer oilseeds come of age," Current Opinion in Plant Biology, 13:330-337, (2010).
Roessler et al., "Genetic Engineering Approaches for Enhanced Production of Biodiesel Fuel from Microalgae," Enzymatic Conversion of Biomass for Fuels Production, Chapter 13, American Chemical Society, doi: 10.1021/bk-1994-0566.ch013, pp. 255-270, (1994).
Sanchez et al., "Mixotrophic culture of Chlorella pyrenoidosa with olive-mill wastewater as the nutrient medium," Journal of Applied Phycology, 13:443-449, (2001).
Shi et al., "High-Yield Production of Lutein by the Green Microalga *Chlorella protothecoides* in Heterotrophic Fed-Batch Culture," Biotechnol. Prog., 18(4):723-727 (2002).
Sung et al., "The research on the lipid content and composition of microalgae and their impact factors," Marine Science, 12(33)122-128, (2009). (English translation of first two pages).
Tasaki et al., "Digestibility of Yellow Chlorella in Suckling Goat Kids,"The Japanese Journal of Zootechnical Science, 48(11):661-663, (1977).
U.S. Appl. No. 12/684,886, Final Office Action mailed Jan. 3, 2014.
U.S. Appl. No. 12/684,891, Final Office Action mailed Jan. 7, 2014.
U.S. Appl. No. 13/263,724, Non-Final Office Action mailed Oct. 23, 2013.
U.S. Appl. No. 13/865,974, Requirement for Restriction/Election mailed Jan. 29, 2014.
Xiong et al., "High-density fermentation of microalga *Chlorella protothecoides* in bioreactor for microbio-diesel production," Appl. Microbiol. Biotechnol., 78:29-36, (2008).

(56) References Cited

OTHER PUBLICATIONS

"Algae in More Bread, The Algae in Lake BreadTM," www.meerbrood.com, 3 pages, (2012). [Retrieved from the Internet May 20, 2013: <URL: http://www.meerbrood.com/algen/>]. (machine translation).
"Codex Standard for Named Vegetable Oils," Codex Alimentarius, Codex Stan 210-1999, pp. 1-16, (1999).
"Soybean Oil Innovations, 3rd Edition," United Soybean Board, www.soyconnection.com, 8 pages, (2009). [Available from the Internet on Jan. 15, 2009: <URL: http://www.soyconnection.com/sites/default/files/soy-oil-solutions.pdf>].
Adams, "Safe Gluten-Free Food Guide," www.celiac.com, 14 pages, (1995). [Retrieved from the Internet Apr. 4, 2013: <URL: http://www.celiac.com/articles/181/1/Safe-Gluten-Free-Food-List-Safe-Ingredients/Page1.html>].
Barnes et al., "Contribution of 5'- and 3'-untranslated regions of plastid mRNAs to the expression of Chlamydomonas reinhardtii chloroplast genes," Mol Genet Genomics, 274(6):625-636, (2005).
Becker et al., "Micro-algae as a source of protein," Biotechnology Advances, 25:207-210, (2007).
Belasco, "Algae Burgers for a Hungry World? The Rise and Fall of Chlorella Cuisine," Technology and Culture, 38(3):608-634, (1997).
Blowers et al., "Studies on Chlamydomonas chloroplast transformation: foreign DNA can be stably maintained in the chromosome," Plant Cell, 1(1):123-132, (1989).
Bognar et al., "Comparative Study of Frying to Other Cooking Techniques Influence on the Nutritive Value," Grasas y Aceites, 49(Fasc. 3-4 ):250-260, (1998).
Bohacenko et al., "Detection of Olive Oils Authenticity by Determination of their Sterol (Content using LC/GC," Czech J. Food Sci., 19(3):97-103, (2001).
Bornscheuer et al. (ed), "Enzymes in Lipid Modification," Wiley-VCH Verlag Gmbh & Co. KGaA, 1st Edition, ISBN: 3-527-30176-3, Sections 1-11, 231 pages, (2000). (part 1 of 2 of book).
Bornscheuer et al. (ed), "Enzymes in Lipid Modification," Wiley-VCH Verlag Gmbh & Co. KGaA, 1st Edition, ISBN: 3-527-30176-3, Sections 12-18, 133 pages, (2000). (part 2 of 2 of book).
Butzen et al., "High Oleic Soybean," Crop Insights, 17(17):1-3, (2008). [Retrieved from the Internet Dec. 3, 2008: <URL: http://www.McCormickcompany.net>.
Chen et al., "Heterotrophic Growth of Chlamydomonas reinhardtii on Acetate in Chemostat Culture," Process Biochemistry, 31(6):601-604, (1996).
Ciferri, "Thiamine-deficiency of Prototheca, a Yeast-like Achloric Alga," Nature, 178:1475-1476, (1956).
Davies et al., "Expression of the Arylsulfatase Gene from the Beta 2-Tubulin Promoter in Chlamydomonas reinhardtii," Nucleic Acids Research, 20(12):2959-2965, (1992).
Idebuchy et al., "The argininosuccinate lyase gene of Chlamydomonas reinhardtii: an important tool for nuclear transformation and for correlating the genetic and molecular maps of the ARG7 locus," Embo J., 8(10):2803-2809, (1989).
Deshnium et al., "Transformation of Synechococcus with a gene for choline oxidase (enhances tolerance to salt stress," Plant Mol Biol, 29(5):897-907, (1995).
Desmond et al., "Phylogenomics of Sterol Synthesis: Insights into the Origin, Evolution, and Diversity of a Key Eukaryotic Feature," Genome. Biol. Evol., 1:364-381, (2009).
Erhan, "Vegetable Oils as Lubricants, Hydraulic Fluids, and Inks," Bailey's Industrial Oil and Fat Products, 6:259-278, (2005).
Franzen et al., "Chloroplast transit peptides from the green alga Chlamydomonas reinhardtii share features with both mitochondrial and higher plant chloroplast presequences," FEBS Letters, 260(2):165-168, (1990).
Frenz et al., "Hydrocarbon recovery by extraction with a biocompatible solvent from free and immobilized cultures of Botryococcus braunii," Enzyme Microb Technol, 11(11):717-724, (1989).
Frohns et al., "Potassium ion channels of Chlorella viruses cause rapid depolarization of host cells during infection," J Virol, 80(5):2437-2444, (2006).
Funes et al., "The typically mitochondrial DNA-encoded ATP6 subunit of the F1F0-ATPase is encoded by a nuclear gene in Chlamydomonas reinhardtii," J Biol Chem, 277(8):6051-6058, (2002).
Gabay et al., "Stigmasterol: a phytosterol with potential anti-osteoarthritic properties," Osteoarthritis and Cartilage, 18:106-116, (2010).
Gonzalez et al., "Optimization of Fatty Add Extraction from Phaeodactylum tricornutum UTEX 640 Biomass," JAOCS, 75(12):1735-1740, (1998).
Graves et al., "Hyaluronan synthesis in virus PBCV-1-infected chlorella-like green algae," Virology, 257(1):15-23, (1999).
Gunstone, "Enzymes as biocatalysts in the modification of natural lipids," Journal of the Science of Food and Agriculture, 79:1535-1549, (1999).
Guschina et al., "Lipids and lipid metabolism in eukaryotic algae," Progress in Lipid Research, 45:160-186, (2006).
Hall et al., "Expression of a foreign gene in Chlamydomonas reinhardtii," Gene, 124(1):75-81, (1993).
Hillen et al., "Hydrocracking of the Oils of Botryococcus braunil to Transport Fuels," Biotechnology and Bioengineering, 24(1):193-205, (1982).
Hiramatsu et al., "Expression of a chitinase gene and lysis of the host cell wall during Chlorella virus CVK2 infection," Virology, 260(2):308-315, (1999).
Hitz et al., "Cloning of a Higher-Plant Plastid Omega-6 Fatty Acid Desaturase cDNA and Its Expression in a Cyanobacterium," Plant Physiology, 105(2):635-641, (1994).
Hu et al., "Microalgal Triacylglycerols as Feedstocks for Biofuel Production: Perspectives and Advances," The Plant Journal 54:621-639, (2008).
Huang et al., "Sterols as ecological indicators," Geochimica et Cosmochimica Acta, 43:739-745, (1979).
Huang et al., "Expression of Mercuric Reductase From Bacillus Megaterium MB1 in Eukaryotic Microalga *Chlorella* sp. DT: An Approach For Mercury Phytoremediation," Appl. Microbiol. Biotechnol., 72:197-205, (2006).
Inoue et al., "Analysis of oil derived from liquefaction of Botryococcus Braunii," Biomass and Bioenergy, 6(4):269-274, (1994).
Itoh et al., "Sterol Compositoin of 19 Vegetable Oils," Journal of The American Oil Chmists' Society, 50:122-125, (1973).
Jacobsen et al., "Applications of Natural Antioxidants in Omega-3 Enriched Foods,"EJEAFChe, 7(8):3288-3295, (2008).
Jakobiak et al., "The Bacterial Paromomycin Resistance Gene, aphH, as a Dominant Selectable Marker in Volvox carteri," Protist, 55: 381-393, (2004).
Jiang et al., "The actin gene promoter-driven bar as a dominant selectable marker for nuclear transformation of Dunaliella salina," Yi Chuan Xue Bao, 32(4):424-433, (2005).
Kamiya, "Effects of Blue Light and Ammonia on Nitrogen Metabolism in a Colorless Mutant of Chlorella," Plant Celll Physiol., 30(4):513-521, (1989).
Kang et al., "Genetic diversity in chlorella viruses flanking kcv, a gene that encodes a potassium ion channel protein," Virology, 326(1):150-159, (2004).
Kang et al., "The regulation activity of Chlorella virus gene 5' upstream sequence in *Escherichia coli* and eucaryotic alage," Institute of Microbiology, Chinese Academy of Sciences, Beijing, 16(4):443-6, (2000). Abstract only.
Kawasaki et al., "Characterization of Immediate Early Genes Expressed in Chlorovirus Infections," Nucleic Acids Symp Ser, 44:161-162, (2000).
Kawasaki et al., "Immediate Early Genes Expressed in Chlorovirus Infections," Virology, 318(1):214-223, (2004).
Kindle, "High-Frequency Nuclear Transformation of Chlamydomonas reinhardtii," Proc Natl Acad Sci, 87(3):1228-1232, (1990).
Klosty et al., "Sterols of Algae. The Occurrence of Ergosterol in Chiorelia pyrarwidosa," J. Am. Chem. Soc., Notes, 74(6):1601-1601, (1952).
Knothe, "Analyzing Biodiesel: Standards and Other Methods," JAOCS, 83(10):823-833, (2006).
La Scala et al., "The effect of fatty acid composition on the acrylation kinetics of epoxidized triacylglycerols," Journal of the American Oil Chemists' Society, 79(1):59-63, (2002).

(56) References Cited

OTHER PUBLICATIONS

Lapidot et al., "Stable Chloroplast Transformation of the Unicellular Red Alga *porphyridium* Species," Plant Physiol, 129:7-12, (2002).
Li et al., "Isolation and Purification of Lutein from the Microalga *Chlorella vulgaris* by Extraction after Saponification," J. Agric. Food Chem., 50(5):1070-1072, (2002).
Lindley, "The Impact of food processing antioxidants in vegetable oils, fruits, and vegetables," Trends in Food Science & Technology. 9:336-340, (1998).
List et al., "Melting properties of some structured lipids native to high stearic acid soybean oil," Grasas y Aceites, 55(Fasc. 2):135-137, (2004).
Manuell et al., "Robust expression of a bioactive mammalian protein in Chlamydomonas chloroplast," Plant Biotech J, 5(3):402-412, (2007).
Matsuka et al., "The Role of Respiration & Photosynthesis in the Chloroplast Regeneration in the Glucose-Bleached Cells of Chlorella Protothecoides," Plant and Cell Physiol., 7:149-162 (1966).
Mayfield et al., "Expression and Assembly of a Fully Active Antibody in Algae," Proc Natl Acad Sci, 100(2):438-442, (2003).
Mendes et al., "Supercritical Carbon Dioxide Extraction of Compounds With Pharmaceutical Importance from Microalgae," Inorganica Chimica Acta, 356:328-334, (2003).
Metzger et al., "Botryococcus braunii: A Rich Source for Hydrocarbons and Related Ether Lipids," Applied Microbiology and Biotechnology, 66(5):486-496, (2005).
Minowa et al., "Oil Production from Algal Cells of Dunaliella tertiolecta By Direct Thermochemical Liquefaction," Fuel, 74(12):1735-1738, (1995).
Mitra et al., "A Chlorella Virus Gene Promoter Functions as a Strong Promoter Both in Plants and Bacteria," Biochemical and Biophysical Research Communications, 204(1):189-194, (1994).
Mitra et al., "The Chlorella Virus Adenine Methyltransferase Gene Promoter is a Strong Promoter in Plants," Plant Molecular Biology, 26(1):85-93, (1994).
Norton et al., "Identification of Ergosta-6(7),8(14),25(27)-trien-3β-ol and Ergosta-5(6),7(8),25(27)-trien-3β-ol, Two New Steroidal Trienes Synthesized by Prototheca wickerhamli," Lipids, 26: 247-249, (1991).
Orthoefer et al., "Performance of trans-free vegetable oils in shortenings and deep-fat frying," Lipid Technology , 17(5):101-106, (2005).
Patil et al., "Fatty acid composition of 12 microalgae for possible use in aquaculture feed," Aquacult Int , 15:1-9, (2007).
Patterson et al., "Sterols of Chlorella. II. The Occurrence of an Unusual Sterol Mixture in Chlorella vulgaris," Plant Physiol., 42:1457-1459, (1967).
Patterson et al., "Sterols of Chlorella—III. Species Containing Ergosterol," Comp. Biochem. Physiol., 31:391-394, (1969).
Proschold et al., "Portrait of a Species: *Chlamydomonas reinhardtii*," Genetics, 170(4):1601-1610, (2005).
Puglia et al., "In viva spectrophotometric evaluation of skin barrier recovery after topical application of soybean phytosterols," J. Cosmet. Sci., 59:217-224, (2008).
Qingyu et al., "Fine Cell Structure and Biochemical Compositions of Chlorella Protothecoides after Transferring from Autotrophic to Heterotrophic Metabolism," Journal of Nanjing University, Natural Sciences Edition, 29(4):622-630, (1993). Abstract.
Radakovits et al., "Genetic Engineering of Algae for Enhanced Biofuel Production," Eukaryotic Cell, 9(04): 486-501, (2010).
Randolph-Anderson et al., "Further characterization of the respiratory deficient dum-1 mutation of Chlamydomonas reinhardtii and its use as a recipient for mitochondrial transformation," Mol Gen Genet, 236(2-3):235-244, (1993).
Running et al., "Extracellular production of L-ascorbic acid by Chlorella protothecoides, *prototheca* species, and mutants of P. moriformis during aerobic culturing at low pH," Journal of Industrial Microbiology & Biotechnology, 29:93-98, (2002).
Sakuradani, "Studies of Metabolic Engineering of Useful Lipid-producing Microorganisms," NISR Research Grant, (2004).
Sansawa et al., "Production of Intracellular Phytochemicals in Chlorella under Heterotrophic Conditions," Journal of Bioscience and Bioengineering, 98(6):437-444, (2004).
Sawayama et al., "Possibility of renewable energy production and CO2 mitigation by thermochemical liquefaction of microalgae," Biomass and Bioenergy, 17(1):33-39, (1999).
Schreier et al., "The use of nuclear-encoded sequences to direct the light-regulated synthesis and transport of a foreign protein into plant chloroplasts," EMBO J, 4(1):25-32, (1985).
Shao et al., "Cloning and expression of metallothionein mutant α-KKS-α in *Anabaena* sp. PCC 7120," Marine Pollution Bulletin, 45(1012):163-167, (2002).
Smith et al., "Production of hydroxy fatty acids in the seeds of *Arabidopsis thaliana*," Biochemical Society Transactions, 28(6):947-950, (2000).
Sorger et al., "Triacylglycerol biosynthesis In yeast," AppL Microbiol Biotechnol, 61:289-299, (2003).
Suda, et al., "Evidence for a novel Chlorella virus-encoded alginate lyase," FEMS Microbiology Letters, 180(1):45-53, (1999).
Sun et al., "Characterization of two chitinase genes and one chitosanase gene encoded by Chlorella virus PBCV-1," Virology, 263(2):376-387, (1999).
Swern et al. "Fractionation of tallow fatty acids:Preparation of purified oleic acid and an inedible olive oil substitute," Oil & Soap, 22(11):302-304 (1945).
Takaku et al., "Isolation of an Antitumor Compound from Agaricus blazei Murill and Its Mechanism of Action," J. Nutr., 131:1409-1413, (2001). [Retrieved from the Internet May 14, 2013: <URL: http://jn.nutrition.org>].
Talbot et al., "Formulation and Production of Confectionery Fats," OFI Middle East 2007 Conference and Exhibition, 378 pages, (2007).
Tang et al., "Insertion mutagenesis of Chlamydomonas reinhardtii by electroporation and heterologous DNA," Biochem Mol Biol Int, 36(5):1025-1035, (1995).
U.S. Appl. No. 12/684,886, Non-Final Office Action mailed Jun. 6, 2013.
U.S. Appl. No. 12/684,891, Non-Final Office Action mailed Apr. 2, 2013.
U.S. Appl. No. 12/960,388, Requirement for Restriction/Election mailed Apr. 1, 2013.
U.S. Appl. No. 13/087,305, Final Office Action malled Mar. 18, 2013.
U.S. Appl. No. 13/087,330, Requirement for Restriction/Election mailed Dec. 21, 2012.
U.S. Appl. No. 13/118,369, Non-Final Office Action mailed Mar. 28, 2013.
U.S. Appl. No. 13/118,369, Requirement for Restriction/Election mailed Dec. 13, 2012.
U.S. Appl. No. 13/263,724, Non-Final Office Action mailed Feb. 28, 2013.
U.S. Appl. No. 13/527,480, Requirement for Restriction/Election mailed May 3, 2013.
Urano, et al., "Effect of Osmotic Stabilizers on Protoplast Generation of Chlorella ellipsoidea Yellow/White Color Mutants," Journal of Bioscience and Bioengineering, 90(5):567-569, (2000).
Van Etten et al., "Giant viruses infecting algae," Annu Rev Microbiol, 53:447-494, (1999).
Vazquez-Bermudez et al., "Carbon Supply and 2-Oxoglutarate Effects on Expression of Nitrate Reductase and Nitrogen-Regulated Genes in *Synechococcus* sp. strain PCC 7942," FEMS Microbiology Letters, 221(2):155-159, (2003).
Vazquez-Bermudez et al., "Uptake of 2-Oxoglutarate in Synechococcus Strains Transformed with the *Escherichia coli* kgtP Gene," Journal of Bacteriology, 182(1):211-215, (2000).
Volkman et al., "Sterols in microorganisms," Appl Microbial Biotechnol, 60:495-506, (2003).
Walker et al., "Characterization of the Dunaliella tertiolecta RbcS Genes and Their Promoter Activity in Chlamydomonas reinhardtii," Plant Cell Rep, 23(10-11):727-735, (2005).
Ward et al., "Effects of Processing and Storage on Chlorophyll Derivatives in Commercially Extracted Canola Oil," JAOCS, 71(8):811-815, (1994).

(56) References Cited

OTHER PUBLICATIONS

Westphal, et al., "Vipp1 Deletion Mutant of Synechocystis: A Connection Between Bacterial Phage Shock and Thylakoid Biogenesis," Proc Natl Acad Sci U S A., 98(7):4243-4248, (2001).

Wu et al., "Comparative study on Liposoluble Compounds in Autotrophic and Heterotrophic Chlorella Protothecoides," Acta Botanica Sinica, 35(11):849-858, (1992).

Yamada et al., "Alternative expression of a chitosanase gene produces two different proteins in cells infected with Chlorella virus CVK2," Virology, 230(2):361-368, (1997).

Yamada et al., "Chlorella viruses," Adv Virus Res, 66:293-336, (2006).

Zhang et al., "Malic enzyme: the controlling activity for lipid production? Overexpression of malic enzyme in Mucor circinelloides leads to a 2.5-fold increase in lipid accumulation," Microbiology, 153(7):2013-2025, (2007).

Zurawski et al., "Nucleotide sequence of the gene for the Mr 32,000 thylakoid membrane protein from Spinacia oleracea and Nicotiana debneyi predicts a totally conserved primary translation product of Mr 38,950," Proc Natl Acad Sci, 79(24):7699-7703, (1982).

Jaggelis et al., "Enhancement of single cell oil production by Yarrowia lipolytica growing in the presence of Teucrium polium L. aqueous extract," Biotechnology Letters, 21:747-749, (1999).

Borza et al., "Multiple Metabolic Roles for the Nonphotosynthetic Plastid of the Green Alga *Prototheca wickerhamii*," Eukaryotic Cell, 4(2):253-261, (2005).

Chen et al., "High cell density culture of microalgae in heterotrophic growth," Trends In Biotechnology, 14:421-426, (1996).

Courchesne et al., "Enhancement of Lipid Production Using Biochemical, Genetic and Transcription Factor Engineering Approaches," J Biotechnol. Epub, 141(1-2):31-41, (2009).

Dunahay et al., "Manipulation of Microalgal Lipid Production Using Genetic Engineering," Applied Biochemistry and Biotechnology, 57/58:223-231, (1996).

El-Fadaly et al., "Single Cell Oil Production by an Oleaginous Yeast Strain in a Low Cost Cultivation Medium," Research Journal of Microbiology, 4(8):301-313, (2009).

El-Sheekh et al., "Variation of Some Nutritional Constituents and Fatty Acid Profiles of Chlorella vulgaris Beijerinck Grown under Auto and Heterotrophic Conditions," International Journal of Botany, 5(2):153-159, (2009).

European Search Report and European Search Opinion for application EP08769988 mailed Jul. 1, 2011.

European Search Report and European Search Opinion for application EP11158642 mailed Jul. 1, 2011.

Fall et al., "Bioconversion of Xylan to Triglycerides by Oil-Rich Yeasts," Applied and Environmental Microbiology, 47(5):1130-1134, (1984).

Ferrentino, "Microalgal oil extraction and in situ transesterification," University of New Hampshire, Pub. No. MT 1447885, 93 pages, (2007).

Ferrentino, et al., "Microalgal Oil Extraction and In-situ Transesterification," AIChE Annual Mtg, San Francisco, CA, Nov. 11-13, 2006. Abstract.

Gill et al., "Lipid Accumulation in an Oleaginous Yeast (*Candida 107*) Growing on Glucose in Single-Stage Continuous Culture," Applied and Environmental Microbiology, 33(02):231-239, (1977).

Hall et al., "Lipid Accumulation in an Oleaginous Yeast (*Candida 107*) Growing on Glucose Under Various Conditions in a One- and Two-Stage Continuous Culture," Applied and Environmental Microbiology, 33(3):577-584, (1977).

Heredia et al., "Simultaneous utilization of glucose and xylose by Candida curvata D in continuous culture," Biotechnology Letters, 10(01):25-30, (1988).

Jaworski et al., "Industrial oils from transgenic plants," Current Opinion in Plant Biology, 6:178-184, (2003).

Kessler et al., "Physiological and Biochemical Contributions to the Taxonomy of the Genus *Prototheca* III. Utilization of Organic Carbon and Nitrogen Compounds," Arch Microbiol, 132:103-106, (1982).

Kong et al., "Microbial production of lipids by cofermentation of glucose and xylose with Lipomyces starkeyi 2#," Chinese Journal Of Bioprocess Engineering, 05(02):36, (2007). Abstract.

Leon-Banares et al., "Transgenic microalgae as green cell-factories," Trends in Biotechnology, 22(1):45-52, (2004).

Li et al., "Large-scale biodiesel production from microalga *Chlorella protothecoides* through heterotrophic cultivation in bioreactors," Biotechnology and Bioengineering, 98(04):764-771, (2007).

Li et al., "High-density cultivation of oleaginous yeast *Rhodosporidium toruloides* Y4 in fed-batch culture," Enzyme And Microbial Technology, 41:312-317, (2007).

Li et al., "Screening of oleaginous yeasts for broad-spectrum carbohydrates assimilating capacity," China Biotechnology, 25(12):39-44 (2005), and machine translation.

Miao et al., "Biodiesel Production From Heterotrophic Microalgal Oil," Biosource Technology, 97(06):841-846, (2006).

Miao et al., "High Yield Bio-Oil Production from Fast Pyrolysis by Metabolic Controlling of Chlorella Protothecoides," J. Biotech., 110:85-93, (2004).

Otles et al., "Fatty Acid Composition of *chlorella* and *spirulina* Microalgae Species," Journal of AOAC International, 84(6):1708-1714, (2001).

Papanikolaou et al., "Lipid production by Yarrowia lipolytica growing on industrial glycerol in a single-stage continuous culture," Bioresource Technology, 82:43-49, (2002).

PCT International Preliminary Report on Patentability (Chapter I) of Dec. 7, 2009 for application PCT/US08/65563.

PCT International Preliminary Report on Patentability for application PCT/US10/31088 mailed Oct. 27, 2011.

PCT International Search Report of Nov. 6, 2008 for application PCT/US08/65563.

PCT Search Report for application PCT/US2011/038464 mailed Nov. 3, 2011.

PCT Written Opinion of the International Searching Authority for application PCT/US2011/038464 mailed Nov. 3, 2011.

PCT Written Opinion of the International Searching Authority of Nov. 6, 2008 for application PCT/US08/65563.

Ratledge, "Regulation of lipid accumulation in oleaginous microorganisms," Biochem Soc Trans., 30(Pt 6):1047-1050, 2002.

Ritsema et al., "Engineering fructan metabolism in plants," J. Plant Physiol., 160:811-820, (2003).

Rosenberg et al., "A Green Light for Engineered Algae: Redirecting Metabolism to Fuel a Biotechnology Revolution," Current Opinion in Biotechnology. Tissue, Cell and Pathyway Engineering, E-Pub 19:430-436, (2008).

Roy et al., "Production of Intracellular Fat by the Yeast *Lipomyces starkeyi*," Indian Journal of Experimental Biology, 16(4):511-512, (1978).

U.S. Appl. No. 13/087,305, Non-Final Office Action mailed Aug. 15, 2012.

Wu et al., "A Comparative Study of Gases Generated from Simvlant Thermal Degradation of Autotrophic and Heterotrophic Chlorella," Progress in Natural Science, 2(4):311-318, (1992).

Wu et al., "New Discoveries in Study on Hydrocarbons From Thermal Degradation of Heterotrophically Yellowing Algae," Science In China, 37(3):326-35, (1994).

Zhao et al., "Medium optimization for lipid production through co-fermentation of glucose and xylose by the oleaginous yeast *Lipomyces starkeyi*," Eur. J. Lipid Sci, Technol., 110:405-412, (2008).

Application No. PCT/US11/32586, International Search Report mailed Jun. 20, 2011.

Application No. PCT/US11/32586, Written Opinion of the International Searching Authority mailed Jun. 20, 2011.

Application No. PCT/US11/32588, International Search Report mailed Jun. 27, 2011.

Application No. PCT/US11/32588, Written Opinion of the International Searching Authority mailed Jun. 27, 2011.

Liang et al., "Current microalgal health food R&D activities in China", Hydrobiologia 512:45-48, (2004).

Petkov et al., "Which are fatty acids of the green alga *Chlorella?*," Biochemical Systematics and Ecology, 35:281-285, (2007).

(56) References Cited

OTHER PUBLICATIONS

Powell et al., "Algae Feeding in Humans," *J. Nutrition*, 75:7-12, (1961).
Bigogno et al., "Biosynthesis of arachidonic acid in the oleaginous microalga *Parietochloris incisa* (Cholorphyceae): Radiolabeling studies," *Lipids* 37(2):209-216 (2002).
Brown et al., "The amino-acid and sugar composition of 16 species of micralgae used in mariculture," *J. Exp. Mar. Biol. Ecol.* 145:79-99 abstract (1991).
Curtain, "Plant Biotechnology—The growth of Australia's algal b-carotene industry," *Australasian Biotech.* 10(3):19-23 (2000). [Retrieved from the Internet Apr. 5, 2010:<http://www.bioline.org.br/request?au00032>].
GenBank Direct submission L42851, "Prototheca wickerhamii large subunit ribosomal RNA (rrnL) gene, partial sequence; chloroplast gene for chloroplast product," Nov. 21, 2002 [retrieved from the Internet Dec. 23, 2009:<http://www.ncbi.nlm.nih.gov/nuccore/17028073>].
Hase et al., "Nutritional Control of Cell Pigmentation In Chlorella Protothecoides With Special Reference to The Degeneration of Chloroplast Induced by Glucose," Plant and Cell Physiology, 5(2):227-240 (1964), [online abstract], Retrieved on Jun. 3, 2010 from http://pcp.oxfordjounals.org/cgi/content /abstract/5/2/227.
Henderson et al., "Lipid Composition and Biosynthesis in the Marine Dinoflagellate Crypthecodznzum Cohnii," Phytochem. 27(6):1679-1683 (1988).
Kenyon, "Fatty Acid Composition of Unicellular Strains of Blue-Green Algae," J. Bacteriology 109(2):827-834 (1972).
Krinsky et al., "The Appearance of Neoxanthin during the Regreening of Dark-grown Euglena," *Plant Physiol.* 39(3):441-445 (1964).
Lahaye, "Marine Algae as Sources of Fibres: Determination of Soluble and Incoluble Dietary Fibre Contents in Some 'Sea Vegetables'," *J. Sci. Food Agric.* 54:587-594 (1991).
Lord, "Taurine is essential for cats," Jan. 27, 2008 [retrieved from the Internet Apr. 6, 2010:<http://www.vetlord.org/taurine-is-essential-for-cats/>].
Lubitz, "The Protein Quality, Digestibility, and Composition of Algae, *Chlorella* 71105," *J. Food Sci.* 28(2):229-232 (1963).
Spolaore et al., "Commercial Applications of Microalgae," *J. Biosci. Bioeng.* 101(2):87-96 (2006).
Takeda, "Sugar Composition of the Cell Wall and the Taxonomy of Chlorella (Chlorophyceae)," Journal of Psychology, 27(2):224-232, (1991), [online abstract], Retrieved on Jun. 4, 210 from http://www3.interscience.wiley.com/journal/119345932/abstract.
Xu et al., "High Quality Biodiesel Production From a Microalga *Chlorella protothecoides* By Heterotrophic Growth In Fermenters," Journal of Biotechnology, 126(4):499-507 (Dec. 1, 2006).
Application No. PCT/US09/060692, International Search Report mailed Apr. 22, 2010.
Application No. PCT/US09/060692, Written Opinion of the International Searching Authority mailed Apr. 22, 2010.
Application No. PCT/US10/31088, International Search Report mailed Jun. 28, 2010.
Application No. PCT/US10/31088, Written Opinion Searching Authority mailed Jun. 28, 2010.
Day, Anthony G. et al., "Safety evaluation of high-lipid algal biomass from Chorella protothesoides", (Nov. 2009), vol. 55, Issue 2, pp. 166-180.
Gao, Chunfang et al., "Rapid quantitation of lipid in microalgae by time-domain nuclear magnetic resonance", (Dec. 2008), vol. 75, Issue 3, Dec. 2008, pp. 437-440.
*Journal of Nanjing University*, Natural Sciences Edition, (Oct. 29, 1993), vol. 29, No. 4, (with Engiish translatian), 16 pages.
Meng, Xin et al., "Biodiesel production from oleaginous microorganisms", *Renewable Energy*, (Jan. 2009), vol. 34, Issue 1, pp. 105.
Pandey A., Lee, D.J., Chisti, Y., Soccol, C.R., (editors), *Biofuels from algae*, Newnes; Aug. 8, 2013, 11 pages.
Ötleş, S. et al., Fatty Acid Composition of *chlorella* and *spirulina* Microalgae Species, Journal of AOAC International, (Nov. 2001), vol. 84, No. 6, pp. 1708-1714 (7).

Peide, N.I., "Grease Processing Technology", Chemical Industry Press, 2007, cover page, copyright page, catalog, and pp. 206-213.
Xiong, Wei et al., "$^{13}$C-Tracer and Gas Chromatography-Mass Spectrometry Analyses Reveal Metabolic Flux Distribution in the Oleaginous Microalga *Chlorella protothecoides*", *Plant physiology*, (Oct. 2010), 1;154(2):1001-11., (Downloaded from www.plantphysiol.org on Nov. 18, 2015).
Xiong, Wei Et al., "High-density fermentation of microalga *Chlorella protothecoides* in bioreactor for microbio-diesel production", *Appl Microbiol Biotechnol.*, (Feb. 2008), 78(1):29-36. Epub Dec. 6, 2007.
Xu, Han et al., "High quality biodiesel production from a microalga *Chlorella protothecoides* by heterotrophic growth in fermenters", *Journal of Biotechnology*, (Dec. 1, 2006), vol. 126, Issue 4, pp. 499-507.
Zhang et al., "Medicinal and Edible Resources and Biological Active Ingredients", Lianfu Chemical Industry Press, 2005, cover page, copyright page, catalog, and pp. 256-262.
Final Office Action, dated Feb. 2, 2016, for U.S. Appl. No. 13/667,784, filed Nov. 2, 2012, 12 pages.
Office Action, dated Feb. 26, 2016, for Canadian Application No. 2,740.415, filed Oct. 14, 2009, 5 pages.
U.S. Appl. No. 15/782,708, filed Oct. 12, 2017.
U.S. Appl. No. 15/698,579, filed Sep. 7, 2017.
U.S. Appl. No. 15/142,894, filed Apr. 29, 2016.
U.S. Appl. No. 15/157,294, filed May 17, 2016.
U.S. Appl. No. 13/941,342, Requirement for Restriction/Election mailed Apr. 13, 2015.
U.S. Appl. No. 13/667,784, Non-Final Office Action mailed Jul. 21, 2015.
U.S. Appl. No. 13/263,724, Final Office Action mailed Jul. 17, 2015.
U.S. Appl. No. 12/684,891, Final Office Action mailed Jul. 29, 2015.
U.S. Appl. No. 13/254,035, Request for Restriction Requirement, mailed Jul. 19, 2013.
U.S. Appl. No. 13/254,035, Non-Final Office Action, mailed Sep. 24, 2013.
U.S. Appl. No. 13/254,035, Notice of Allowance, mailed Jan. 31, 2014.
U.S. Appl. No. 13/087,330, Non-Final Office Action mailed Apr. 9, 2014.
U.S. Appl. No. 13/837,514, Non-Final Office Action, mailed May 20, 2014.
U.S. Appl. No. 13/886,690, Request for Restriction Requirement, mailed Sep. 3, 2014.
U.S. Appl. No. 13/886,690, Non-Final Office Action, mailed Dec. 2, 2014.
U.S. Appl. No. 13/087,330, Final Office Action mailed Jan. 12, 2015.
U.S. Appl. No. 14/166,382, Non-Final Office Action, mailed Jan. 15, 2015.
U.S. Appl. No. 13/837,514, Final Office Action, mailed Jan. 28, 2015.
U.S. Appl. No. 13/886,690, Final Office Action, mailed May 18, 2015.
U.S. Appl. No. 14/266,715, Request for Restriction Requirement, mailed Sep. 10, 2015.
U.S. Appl. No. 13/087,330, Non-Final Office Action mailed Oct. 16, 2015.
U.S. Appl. No. 14/166,382, Notice of Allowance, Oct. 23, 2015.
U.S. Appl. No. 14/808,175, Request for Restriction Requirement, mailed Jan. 10, 2016.
U.S. Appl. No. 14/266,715, Notice of Allowance, mailed Jan. 29, 2016.
U.S. Appl. No. 13/886,690, Non-Final Office Action, mailed May 5, 2016.
U.S. Appl. No. 13/087,330, Final Office Action mailed Jun. 9, 2016.
U.S. Appl. No. 14/353,176, Non-Final Office Action, mailed Jun. 30, 2016.
U.S. Appl. No. 13/837,514, Non-Final Office Action, mailed Aug. 5, 2016.

(56) References Cited

OTHER PUBLICATIONS

U.S. Appl. No. 14/166,382, Non-Final Office Action, mailed Aug. 10, 2016.
U.S. Appl. No. 14/056,100, Request for Restriction Requirement, mailed Sep. 21, 2016.
U.S. Appl. No. 12/684,891, Non-Final Office Action mailed Oct. 20, 2016.
U.S. Appl. No. 13/886,690, Final Office Action, mailed Nov. 18, 2016.
U.S. Appl. No. 13/667,784, Non-Final Office Action mailed Mar. 10, 2017.
U.S. Appl. No. 14/056,100, Non-Final Office Action, mailed Apr. 4, 2017.
U.S. Appl. No. 12/684,891, Non-Final Office Action mailed Jun. 15, 2017.
U.S. Appl. No. 14/166,382, Non-Final Office Action, mailed Jun. 15, 2017.
U.S. Appl. No. 14/752,770, Requirement for Restriction/Election mailed Jun. 16, 2017.
U.S. Appl. No. 14/353,176, Final Office Action, mailed Jul. 3, 2017.
U.S. Appl. No. 13/837,514, Non-Final Office Action, mailed Aug. 10, 2017.
U.S. Appl. No. 14/808,175, Non-Final Office Action, mailed Aug. 11, 2017.
European Search Report and European Search Opinion for application EP09821204.6 mailed Mar. 27, 2015.
European Search Report and European Search Opinion for application EP10765119.2 mailed Apr. 28, 2015.
PCT International Search Report and Written Opinion of the International Searching Authority for application PCT/US2015/027179 mailed Jul. 9, 2015.
PCT International Search Report and Written Opinion of the International Searching Authority for application PCT/US2015/038172 mailed Aug. 18, 2015.
PCT Invitation to Pay Additional Fees for application PCT/US2014/059161 mailed Mar. 9, 2015.
International Search Report and Written Opinion of the International Searching Authority for Application No. PCT/US2015/041927, mailed Oct. 23, 2015.
International Search Report, mailed May 27, 2010, for International Patent Application No. PCT/US2010/026117.
Written Opinion of the International Searching Authority, mailed May 27, 2010, for International Patent Application No. PCT/US2010/026117.
International Preliminary Report on Patentability, mailed Sep. 6, 2011, for International Patent Application No. PCT/US2010/026117.
International Preliminary Examination Report, mailed May 4, 2012, for International Patent Application No. PCT/US2013/039446.
International Preliminary Examination Report, mailed Oct. 16, 2012, for International Patent Application No. PCT/US2011/032588.
International Search Report, mailed Dec. 11, 2012, for International Patent Application No. PCT/US2012/059338.
Written Opinion of the International Searching Authority, mailed Dec. 11, 2012, for International Patent Application No. PCT/US2012/059338.
Notification of Transmittal of the International Search Report and the Written Opinion of the International Searching Authority, or the Declaration, International Application No. PCT/US2013/039446, mailed on Oct. 18, 2013 with the International Search Report and the Written Opinion.
International Search Report, mailed Feb. 21, 2014, for International Patent Application No. PCT/US2013/65369.
Written Opinion of the International Searching Authority, mailed Feb. 21, 2014, for International Patent Application No. PCT/US2013/65369.
International Preliminary Examination Report, mailed Apr. 22, 2014, for International Patent Application No. PCT/US2012/059338.
International Search Report, mailed May 12, 2014, for International Patent Application No. PCT/US2014/13405.
Written Opinion of the International Searching Authority, mailed May 12, 2014, for International Patent Application No. PCT/US2014/13405.
International Preliminary Examination Report, mailed Apr. 21, 2015, for International Patent Application No. PCT/US2013/65369.
Supplementary European Search Report, for application EP 12 84 1563, mailed Jul. 1, 2015.
International Preliminary Examination Report, mailed Jul. 28, 2015, for International Patent Application No. PCT/US2014/13405.
Australian Application No. 2012326540, Examination Report No. 1, dated Sep. 24, 2015.
Supplementary European Search Report, for application EP 13 78 4638, mailed Oct. 7, 2015.
International Search Report, mailed Oct. 23, 2015, for International Patent Application No. PCT/US2015/041927.
Written Opinion of the International Searching Authority, mailed Oct. 23, 2015, for International Patent Application No. PCT/US2015/041927.
International Preliminary Report on Patentability, mailed Oct. 23, 2015, for International Patent Application No. PCT/US2015/041927.
Mexican Patent Application No. MX/a/2012/011827, Official Action dated Dec. 17, 2015.
Supplementary European Search Report, for application EP 11 76 9630, mailed Jan. 11, 2016.
Examination Search Report, dated Feb. 26, 2016, for Canadian Patent Application No. CA 2,740,415, 5 pages.
Supplementary European Search Report, for application EP 13 84 7337, mailed Apr. 25, 2016.
Australian Application No. 2012326540, Notice of Acceptance, dated May 12, 2016.
Australian Patent Application No. 2013331243, Patent Examination Report No. 1, dated May 30, 2016.
Mexican Patent Application No. MX/a/2012/011827, Official Action dated Sep. 6, 2016.
European Search Report and European Search Opinion for application EP14742729.8 mailed Sep. 13, 2016.
Japanese Patent Application No. 2015-256215, Notice for Reasons for Rejection, mailed Sep. 30, 2016.
Chinese Patent Application No. 201380054255.X, Notification of First Office Action, dated Nov. 28, 2016.
Mexican Patent Application No. MX/a/2016/007229, Official Action dated Nov. 29, 2016.
Australian Application No. 2014209015, Examination Report No. 1, dated Dec. 7, 2016.
International Preliminary Report on Patentability, mailed Dec. 27, 2016, for International Patent Application No. PCT/US2015/038172.
Australian Application No. 2016210626, Examination Report No. 1, dated Mar. 1, 2017.
Indian Patent Application No. 3610/DELNP/2011, Examination Report No. 1, dated May 22, 2017.
Japanese Patent Application No. 2016-1452125, Official Action, mailed Jun. 21, 2017. No Translation.
Chinese Patent Application No. 201380054255.X, Notification of Second Office Action, dated Aug. 8, 2017.
Australian Application No. 2014209015, Examination Report No. 2, dated Aug. 10, 2017.
Examination Report, for application EP 13 78 4638, mailed Sep. 6, 2017.
Japanese Patent Application No. 2015-510475 Notice for Reasons for Rejection, mailed Oct. 2, 2017.
Australian Application No. 2014209015, Examination Report No. 3, dated Dec. 4, 2017.
Memorandum Order, *Roquette Frères, S.A. v. Solazyme, Inc.*, C.A. No. 14-1442-SLR, District Court for the District of Delaware, Jan. 12, 2016.
Plaintiff and Counter-Defendant Roquette Frères, S.A.'s Reply Brief in Support of Its Motion for Stay Pending Appeal, *Roquette Frères, S.A. v. Solazyme, Inc.*, C.A. No. 14-1442-SLR, District Court for the District of Delaware, Jan. 8, 2016.

(56) References Cited

OTHER PUBLICATIONS

Defendant and Counterclaimant Solazyme, Inc.'s Brief in Opposition to Plaintiff and Counter-Defendant Roquette Freres, S.A.'s Motion to Stay Pending Appeal, *Roquette Frères, S.A.* v. *Solazyme, Inc.*, C.A. No. 14-1442-SLR, District Court for the District of Delaware, Jan. 6, 2016.
Declaration of Jonathan Wolfson in Support of Defendant and Counterclaimant Solazyme, Inc.'s Opposition to Plaintiff and Counterclaimant Roquette Freres, S.A.'s Motion to Stay Pending Appeal, *Roquette Frères, S.A.* v. *Solazyme, Inc.*, C.A. No. 14-1442-SLR, District Court for the District of Delaware, Jan. 6, 2016, Redacted Public Version.
Declaration of Jeffrey M. Goehring in Support of Plaintiff and Counter-Defendant Roquette Frères, S.A.'s Brief Motion for Stay Pending Appeal, *Roquette Frères, S.A.* v. *Solazyme, Inc.*, C.A. No. 14-1442-SLR, District Court for the District of Delaware, Dec. 28, 2015, Redacted Version • Exhibit 1, BASF and Solazyme Launch the First Commercial Microalgae-Derived Betaine Surfactant, Solazyme, Inc., Jul. 28, 2015 • Exhibit 2, Solazyme Bunge Renewable Oils Completes Key Redundant Power and Steam Supplies, Solazyme Bunge Renewable Oils, Jun. 30, 2015 • Exhibit 3, Solazyme Receives FDA GRAS No Questions Letter for High Oleic Algae Oil, Solazyme, Inc., Feb. 24, 2015 • Exhibit 4, Solazyme's (SZYM) CEO Jonathan Wolfson on Q1 2015 Results—Earnings Call Transcript, Solazyme, Inc., May 6, 2015 • Exhibit 5, Solazyme's (SZYM) CEO Jonathan Wolfson on Q2 2015 Results—Earnings Call Transcript, Solazyme, Inc., Jul. 30, 2015 • Exhibit 6, Solazyme's (SZYM) CEO Jonathan Wolfson on Q4 2014 Results—Earnings Call Transcript, Solazyme, Feb. 26, 2015 • Exhibit 7, Redacted In Its Entirety.
Motion to Stay Pending Appeal and Order Granting Motion to Stay Pending Appeal, *Roquette Frères, S.A.* v. *Solazyme, Inc.*, C.A. No. 14-1442-SLR. District Court for the District of Delaware, Dec. 28. 2015.
Memorandum of Law in Support of Motion by Roquette Frères, S.A. for a Stay Pending Appeal, *Roquette Frères, S.A.* v. *Solazyme, Inc.*, C.A. No. 14-1442-SLR, District Court for the District of Delaware, Dec. 28, 2015.
Email dated Nov. 3, 2015, from Gerald Suh of Solazyme, Inc., to Jeffrey M. Goehring of Young & Thompson International Patent & Trademark Law (counsel for Roquette Frères, S.A.).
Letter dated Oct. 6, 2015, from Jeffrey M. Goehring of Young & Thompson International Patent & Trademark Law (counsel for Roquette Frères, S.A.) to Gerald Suh of Solazyme, Inc., and R. James Balls and William E. McShane of Novak Druce Connolly Bove + Quigg LLP (counsel for Solazyme Roquette Nutritionals, LLC) which included the following enclosures: • Exhibits 1, 9-12, and 14-15 to the Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A.* v. *Solazyme, Inc.*, C.A. No. 14-01442, District Court for the District of Delaware, D.I. 141, Jun. 22, 2015, Redacted Version • Exhibits 2-8 to the Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A.* v. *Solazyme, Inc.*, C.A. No. 14-01442, District Court for the District of Delaware, D.I. 112-1, Jun. 22, 2015 • Exhibit 13 to the Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A.* v. *Solazyme, Inc.*, C.A. No. 14-01442, District Court for the District of Delaware, D.I. 112-2, Jun. 22, 2015 • Declaration of Jeffrey M. Goehring in Support of Roquette Frères, S.A.'s Brief in Support of Its Motion for Summary Judgment of Solazyme, Inc.'s Claim for Misappropriation of Trade Secrets, *Roquette Frères, S.A.* v. *Solazyme, Inc.*, C.A. No. 14-01442, District Court for the District of Delaware, D.I. 112, Jun. 22, 2015 • Roquette Frères, S.A.'s Opening Brief in Support of Its Motion for Summary Judgment of Solazyme, Inc.'s Claim for Misappropriation of Trade Secrets, *Roquette Frères, S.A.* v. *Solazyme,*

*Inc.*, C.A. No. 14-01442, District Court for the District of Delaware, D.I. 140, Jun. 22, 2015, Redacted Version.
Letter dated Nov. 2, 2015, from Jeffrey M. Goehring of Young & Thompson International Patent & Trademark Law (counsel for Roquette Frères, S.A.) to Gerald Suh of Solazyme, Inc., and R. James Balls and William E. McShane of Novak Druce Connolly Bove + Quigg LLP (counsel for Solazyme Roquette Nutritionals, LLC), which included the same enclosures included with the letter dated Oct. 6, 2015 of Cite No. CB.
Email dated Nov. 4, 2015, from Jeffrey M. Gochring of Young & Thompson International Patent & Trademark Law (counsel for Roquette Frères, S.A.) to Gerald Suh of Solazyme, Inc., and R. James Balls and William E. McShane of Novak Druce Connolly Bove + Quigg LLP (counsel for Solazyme Roquette Nutritionals, LLC).
Opinion dated Dec. 21, 2015 in *Roquette Frères, S.A.*, v. *Solazyme, Inc.*, Case No. 1:14-cv-01442 (D. Del. 2015) granting Solazyme's motion for an order confirming the arbitration award rendered by CPR International Institute for Conflict Prevention & Resolution on Feb. 19, 2015, in favor of Solazyme, Inc.
Youzhi Jiagong, (Jun. 8, 2007), "Oil Processing Technology (2nd edition)", Chemical Undustry Press, Title page, Publication Page, Table of Contents, pp. 206-213, (in Chinese).
"Linoleic acid and α-linolenic acid are real essential fatty acids", (Mar. 1998), Title page, Publication Page, Table of Contents, Chapter 2: Essential Fatty Acids (pp. 12-13) and Chapter 15: Selection of the most suitable fatty acids (pp. 89-91), with English translation.
Bowman, Barbara A. and Robert M. Russell (eds.), "Present Knowledge in Nutrition" (1st Edition), (Oct. 2004), Title page, Publication Page, Table of Contents, p. 231 (in Chinese).
"Auxenochlorella", article from Wikipedia, Retrieved from the Internet on Mar. 23, 2016, "https://en.wikipedia.org/w/index.php?title=Auxenochlorella&oldid=711518993".
Clore, G.M. and E.M. Chance, A computer analysis of cyanide stimulated oxygen uptake in *Chlorella protothecoides*. (Jul. 1977) FEBS Lett. 79 (2):353-356.
"Algen—Nudein ais Altmark Spezialitat (Algae noodles: a speciality from Altmark region)" in German language, and other *Chlorella* Food products, (Oct. 9, 2007), 3 pages.
Imai, Ichiro, et al. "Advanced research on Shellfish poisonings: Current Status and overview", Table of Contents, Chapters 1 and Chapter 4, 11 pages.
"Aoko's toxin". Aichi Prefectural Institute of Public Health, 6 pages. [Retrieved from the Internet Oct. 13, 2016: <URL: http://www.pref.aichi.jp/eiseiken/5f/bloom_t.html].
Lee, Yuan-Kun, "Commercial Production of microalgae in the Asia-Pacific rim", Journal of Applied Phycology, 9:403-411, (Oct. 29, 1997).
KAY, Robert A., "Microalgae as Food and Supplement", Critical Reviews in Food Sciense and Nutrition, 30(6):555-573 (Feb. 1991).
Usuki, Riichiro and Luniko Kamata, "Experimental Trials on the Role of Lipids in Good Taste and Good Body of Foods", Research reports of Shokei Gakuin College 53, May 2006, p. 85-90 (in Japanese with English Abstract).
"Chlorella Photosynthesis—Disctionary", last modified Mar. 23. 2015, Retrevied from the Internet: <URL: (http://photosyn.jp/pwiki/index.php?%E3%82%AF%E3%83%AD%E3%83%AC%E3%83%A9) with English Machine Translation.
Hirashima, Ryuta, "Framework of evaluation on inventive step requirement and significance of 'technical problem'", Patent 2010, 63(5): 34-49 (in Japanese; no translation).
Ullmann, Jorg, "The Difference between *Chlorella vulgaris* and *Chlorella pyrenoidosa*", (2006) (http://www.algomed.de/index.php?op=algenfarm_geschichte).
"History of the algae farm: Chlorella Algae—Roquette Klötze GmbH", [Retrieved from the Internet Nov. 25, 2016: <URL: (http://www.algomed.de/index.php?op=algenfarm_geschichte)].
Kirk, J. et al., "Mastitis Control Program for Prototheca Mastitis in Dairy Cows", 6 pages. <<URL: milkquality.wisc.edu/wp-content/uploads/2011/09/mastitis-control-program_prototheca-mastitis.pdf>>.

(56) References Cited

OTHER PUBLICATIONS

Oral Summary, dated Nov. 7, 2016, for Invalidation Hearing for Japanese Patent No. 5731982 (in Chinese).
Oral Summary by the Patentee, dated Nov. 29, 2016, for Invalidation Hearing for Japanese Patent No. 5731982 (in Chinese).
USDA National Nutriet Database (https://ndb.nal.usda.gov/ndb/).
Environmental Stresses in Non Mammalian Organisms, p. 29. with English translation.
Letter from Ray Matulka to Paulette Gaynor and Sylvester Mosley, dated Apr. 18, 2013, re: Request to Cease Evaluation of GRN 000450, Letter from Ray Matulka to Paulette Gaynor, dated Apr. 18, 2013, re: High Lipid Chlorella protothecoides S106 Flour GRAS Notification and GRAS Exemption Claim (dated Apr. 18, 2013).
Solazyme Market and Products, (2005).
Letter from Susan Cho to Susan Carlson, dated Jul. 25, 2011 and "RFI's Chlorella vulgaris GRAS Self affirmation (dated Jul. 16, 2010)."
[Retrieved from the Internet Oct. 13, 2016: <URL: http://hfnet.nih.go.jp/contents/detail105.htm] (in Chinese).
"Roquestte Freres, S.A. and Solazyme, Inc. Agree to Dissolve Microalgae Join Venture". (Jun. 24, 2013) Press Release, Lestrem, France.
*Standard Tables of Food Composition in Japan 2015* (*Seventh Revised Edition*), Table of Fatty Acid Composition, Edited by The Council for Science and Technology, the Ministry of Education, Culture, Sports, Science and Technology, (available from http://www.mext.go.jp/a_menu/syokuhinseibun/1365295.htm) [Retrieved from the Internet Oct. 12, 2016: <URL: (http://www.algomed.de/index.php?op=algenfarm_geschichte)] http://www.geocities.jp/jr2bvb/syokuhin/sibousan/oil_s.htm].
"'Taste' of Lipids?" [Retrieved from the Internet Oct. 12, 2016: <URL: (https://sites.google.com/site/coffeetambe/coffeescience/physiology/taste/fat] with English Machine Translation.
Japanese Laid-Open Publication No. 2000-175680 (translator's note: an English language member of the same patent family: EP 1142985 (A1)).
Japanese Laid-Open Publication No. 2002-223787 (translator's note: no English language counterpart could be located).
http://mcc.nies.go.jp/strainList.do?strainId=2555&condition=Auxenochlorella+protothecoides.
http://mcc.nies.go.jp/strainList.do?strainId=2568&condition=Auxenochlorella+protothecoides.
*Roquette Freres S.A. v. Solazyme Inc.*, Delaware District Court, Case No. 1:14-cv-01442 District Judge Sue L. Robinson, presiding, Solazyme, Inc.'s Answer to Plantiff Roquette Freres, S.A.'s Complaint, Petition to Confirm Arbitration Award and Counterclaims, filed Feb. 26, 2015, 29 pages.
Joint Venture and Operating agreement of Solazyme Roquette Nutritionals, LLC., dated Nov. 7, 2015.
*Solazyme, Inc.* vs. *Roquette Freres, S.A.*, Arbitration Award, dated Feb. 19, 2015.
Request for Invalidation, dated Jan. 7, 2015, for Chinese Patent Application No. 200980149978.1, 21 pages (in Chinese).
Supplemental Statement for Request for Invalidation, dated Dec. 2, 2015, for Chinese Patent Application No. 200980149978.1, 35 pages (in Chinese), including the list of submitted Counter Evidences on p. 1-2.
Notification of Acceptance of Request for Invalidation, dated Jan. 28, 2016, for Chinese Patent Application No. 200980149978.1, 4 pages (in Chinese).
Documents filed by the Petitioner—Part II, dated Apr. 29, 2015, for Chinese Patent Application No. 200980149978.1, 21 pages (in Chinese), including : • Jia, Xuan, et al., "Removal of Total nitrogen form wastewater dischrage from a chemical pertilizer plant by Chlorella protothecoides USTB-01", Chinese Journal of Environmental Engineering, (Apr. 2010), 4(4):737-740 (in Chinese).
Documents filed by the Petitioner—Part III, dated May 5, 2015, for Chinese Patent Application No. 200980149978.1, 21 pages (in Chinese), including : , including: • Singelton Paul and Diana Sainsbury, "Dictionary of Microbiological and Molecular Biology, (3rd Ed. 2006)", pp. 155 (and Chinese translation thereof) • Singelton Paul and Diana Sainsbury, "Dictionary of Microbiological and Molecular Biology, (2nd Ed. 1987)", pp. 178-179 (and Chinese translation therof).
Statement of Grounds & Particulars of Opposition, Grounds for Opposition, In the matter of Australian Patent Application No. 2009303354 in the name of Solazyme, Inc. and Opposition by *Roquette Frères, S.A.* v. *Solazyme, Inc.*, Commonwealth of Australia, Mar. 3, 2016, (21 pages).
Declaration of Michael Armin Borowitzka In the matter of Australian Patent Application No. 2009303354 in the name of Solazyme, Inc. and Opposition by *Roquette Frères, S.A.* v. *Solazyme, Inc.*, Commonweath of Ausralia, Jun. 2, 2016, (32 pages).
• Exhibit MB-1, Federal Court of Australia, Practice Note CM7, Expert Witnesses in Proceedings on the Federal Court of Australia, commenes Jun. 4, 2013 • Exhibit MB-2, Michael Armin Borowitzka Curriculum Vitae • Exhibit MB-3, J. M. Hundley, R. B. Ing and R. W. Krauss, "Algae as Sources of Lysine and Threonine in Supplementing Wheat and Bread Diets", Science, New Series, vol. 124, No. 3221 (Sep. 21, 1956), pp. 536-537. • Exhibit MB-4, Krauss, Robert W., "Mass Culture of Algae for Food and Other Organic Compounds," American Journal of Botany, vol. 49, No. 4 (Apr., 1962), pp. 425-435. • Exhibit MB-5, Lee, Yuan-Kun, "Commercial Production of microalgae in the Asia-Pacific rim", Journal of Applied Phycology, 9:403-411, (Oct. 29, 1997) • Exhibit MB-6, Soong, Pinnan, "Productions and Development of *Chlorella* and *Spirulina* in Taiwan", *Algae Biomass: Production and Use*, Gedaliah Shelef and Carl J. Soeder (eds.), North-Holland Biomedical Press, (Dec. 1980), pp. 97-113 and title and copyright page. • Exhibit MB-7, Kawaguchi, Kotaro, "Microalgae Production Systems in Asia", *Algae Biomass: Production and Use*, Gedaliah Shelef and Carl J. Soeder (eds.), North-Holland Biomedical Press, (Dec. 1980), pp. 25-33 and title and copyright page. • Exhibit MB-8, Kay, Robert A., "Microalgae as Food and Supplement", Critical Reviews in Food Sciense and Nutrition, 30(6):555-573 (Feb. 1991). • Exhibit MB-9, Raymundo et al., "Fat mimetic capacity of Chlorella vulgaris biomass in oil-in-water food emulsions stabilized by pea protein," Food Research International, 38:961-965, (Feb. 25, 2005). • Exhibit MB-10, Samejima, H. and J Myers, "On the Heterotrophic Growth of Chlorella pyrenoidosa", J. Gen Microbiol, (1958), 18:107-117.
• Exhibit MB-11, Aoki, Shigeji and Eiji Hase, "De- and Re-Generation of Chloroplasts in the Cells of Chlorella Protothecoides", Plant & Cell Physiol, (Sep. 5, 1964), vol. 5, pp. 473-484 [Retrieved from the internet on Jun. 7, 2013 from http://pcp.oxfordjournals.org/ by Reprints Desk ]. • Exhibit MB-12, Becker, E.W., "Micro-algae as a source of protein," Biotechnology Advances, 25:207-201, (Mar.-Apr. 2007). • Exhibit MB-13, Iwamoto, Hiroaki, "Industrial Production of Microalgal Cell-mass and Secondary Products— Major Industrial Species *Chlorella*", Chapter 11, Handbook of Microalgal Culture: Biotechnology and Applied Phycology, Amos Richmond (eds), (Dec. 1, 2003), pp. 255-263.• Exhibit MB-14, Petkov et al., "Which are fatty acids of the green alga *Chlorella*?," Biochemical Systematics and Ecology, 35:281-285, (2007). • Exhibit MB-15, Gladu, Patricia K., et al. "Sterol, Fatty Acid and Pigment Characteristics of UTEX 2341, a Marine Eustigmatophyte Identified Preivously as Chlorella Minutissuma (Chlorophyceae)" J. Phycol., (Jun. 21, 1995), 31:774-777. • Exhibit MB-16, Xu et al., "High Quality Biodiesel Production From a Microalga *Chlorella protothecoides* by Heterotrophic Growth In Fermenters," Journal of Biotechnology, 126(4):499-507, (May 2006). • Exhibit MB-17, Matsuka et al., "Changes in Contents of Carbohydrate and Fatty Acid in the Cells of Chlorella Protothecoidesduring the process of De- and Re-Generation of Chloroplasts," Plant and Cell Physiol., 7:651-662 (Sep. 24, 1966). • Exhibit MB-18, Xuan, J. et al., "Removal of total nitrogen from wastewater discharge from a chemical fertilizer plant by Chlorela protothecoides USTB-01", Chinese Journal of Environmental Engineering, (Apr. 2010), vol. 4, No. 4, pp. 737-740.
• Exhibit MB-19, Australian Application No. 2009303354B2 from International Patent Application No. PCT/US2009/060692, naming Solazyme, Inc., International Patent Publication No. 2010/045368, dated Apr. 22, 2010. • Exhibit MB-20, Pabst, W., "Nutritional evaluation of nonsewage microalgae by the rat balance method," Arch. HyrobioL Beih, (Dec. 1978), pp. 65-70 • Exhibit MB-21,

(56) References Cited

OTHER PUBLICATIONS

Urano, et al., "Effect of Osmotic Stabilizers on Protoplast Generation on Chlorella ellipsoidea Yellow/White Color Mutants", Journal of Bioscience and Bioengineering, vol. 90, No. 5, 567-569, (2000). • Exhibit MB-22, Kamiya, "Effects of Blue Light and Ammonia on Nitrogen Metabolism in a Colorless Mutant of Chlorella", Plant Cell Phyiol., 30(4):513-521 (1989) • Exhibit MB-23, Biello et al., "Biofuel of the Future: Oil from Algae," Scientific American, 2 pages, (Jan. 9, 2008).
Evidence in Support, In the matter of Australian Patent Application No. 2009303354 in the name of Solazyme, Inc. and Opposition by Roquette Frères, S.A. v. Solazyme, Inc., Commonwealth of Australia, Jun. 3, 2016, (1 page).
Declaration of Young J. Suh In the matter of Australian Patent Application No. 2009303354 in the name of Solazyme, Inc. and Opposition by Roquette Frères, S.A. v. Solazyme, Inc., Commonwealth of Australia, Aug. 31, 2016, (94 pages) • Exhibit YS1, Arbitration Award, Solazyme Inc. vs. Roquette Frères, Case 1:14-cv-01442-SLR, Document 153, Filed Dec. 21, 2015 • Exhibit YS2, French Patent Publication No. FR 2 924 126, filed Nov. 28, 2007. • Exhibit YS3, Memorandum Opinion, Document 153, Roquette Frères, S.A. vs. Solazyme Inc., Case 1:14-cv-01442-SLR, filed Dec. 21, 2015.
Declaration of Craig Patch In the matter of Australian Patent Application No. 2009303354 in the name of Solazyme, Inc. and Opposition by Roquette Frères, S.A. v. Solazyme, Inc., Commonwealth of Australia, Sep. 5, 2016, (22 pages) • Exhibit CP-1, Federal Court of Australia, Practice Note CM7, Expert Witnesses in Proceedings on the Federal Court of Australia, commenes Jun. 4, 2013. • Exhibit CP-2, Craig Patch Curriculum Vitae.
Declaration of Craig Patch In the matter of Australian Patent Application No. 2009303354 in the name of Solazyme, Inc. and Opposition by Roquette Frères, S.A. v. Solazyme, Inc., Commonwealth of Australia, Sep. 28, 2016, (42 pages). • Exhibit CP3, Record of Views Formed in Response to Inquires, updated Mar. 2015 (20 pages) • Exhibit CP4, Huss, V.A.R., et al., "Biochemical Taxonomy and Molecular Phylogeny of the Genus Chlorella Sensu Lato (Chlorophyta)1", J. Phycol. 35, 587-598 (Jan. 15, 1999).
Evidence in Answer, In the matter of Australian Patent Application No. 2009303354 in the name of Solazyme, Inc. and Opposition by Roquette Frères, S.A. v. Solazyme, Inc., Commonwealth of Australia, Sep. 29, 2016, (1 page).
Declaration of Michael Armin Borowitzka In the matter of Australian Patent Application No. 2009303354 in the name of Solazyme, Inc. and Opposition by Roquette Frères, S.A. v. Solazyme, Inc., Commonwealth of Australia, Dec. 21, 2016, (14 pages).
Evidence in Reply, In the matter of Australian Patent Application No. 2009303354 in the name of Solazyme, Inc. and Opposition by Roquette Frères, S.A. v. Solazyme, Inc., Commonwealth of Australia, Dec. 23, 2016, (1 page).
"Roquette's Microalgae High Lipid Algal Flour Wins Most Innovative Food Ingredient at the 2013 Fi Europe Excellence Award," www.PRnewswire.com/news-release/roquettes-migroalgae-high-lipid-algal-flour-wins-most-innovative-food-ingrediant-at-the-2013-fi-europe-excellence-awards, (Nov. 25, 2013), pp. 1-5.
Freshwater Algae Culture Collection at the Institute of Hydrobiology (FACHB-collection), certification letter by the Chinse Academy of Science, "Chlorella vulgaris", (No Date).
Zhou, Lian-ning et al. "Effects of Environmental Factors on Nitrogen and Phosphorus Removal by Chlorella vularis in Wastewater", Current Biotechnology, (Jan. 25, 2015), vol. 5, No. 1, Title page, Publication Page, Table of Contents (I Chinese and English), pp. 60-65, with English abstract.
Evidence 1, Explanation paper, filed with IP High Court Case No. H29 (gyo-ke) 10149 on Oct. 6, 2017 in Invalidation Appeal No. 2016-800012 against Japanese Patent No. 5731982, with English translation.
First Statement, Substantive Brief, filed with IP High Court Case No. H29 (gyo-ke) 10149 on Nov. 17, 2017 in Invalidation Appeal No. 2016-800012 against Japanese Patent No. 5731982, with English translation.
"Chlorella—Chlorella Powder—Nuts.com", [Retreived from the Internet May 2, 2016: <URL: (https://nuts.com/cookingbaking/powders/chlorella/powder.html)].
Aoki, Shigeji and Eiji Hase, "De- and Re-Generation of Chloroplasts in the Cells of Chlorella protothecoides", Plant & Cell Physiol, (Sep. 5, 1964), vol. 5, pp. 473-484 [Retreived from the internet on Jun. 7, 2013 from http://pcp.oxfordjournals.org/ by Reprints Desk ].
Batista et al., "Novel foods with microalgal ingredients—Effect of gel setting conditions on the linear viscoclaaticity of Spirulina and Haematococcus gels," Journal of Food Engineering, vol. 110 (May 2012), pp. 182-189, http://www.sciencedirect.com/science/article/pii/S0260877411003001.
Biello et al., "Biofuel of the Future: Oil from Algae," Scientific American, 4 pages, (Jan. 9, 2008). [Retrieved from the Internet Mar. 9, 2015: <URL: http://www.scientificamerican.com/article/biofuel-of-the-future/>].
Borowitzka, Michael A., "Microalgae as sources of pharmaceuticals and other biologically active compounds", Journal of Applied Phycology, (Feb. 1995), vol. 7, Issue 1, pp. 3-15.
De Cook, "Structure development in confectionery products: importance of triacylglycerol composition," Masters Thesis, Masters in Biosience Engineering, Ghent University, 73 pages, (2011).
Fradique et al., "Incorporation of Chlorella vulgaris and Spirulinamaxima biomass in pasta products. Part 1: Preparation and evaluation", Journal of the Science of Food and Agriculture, (May 13, 2010), vol. 90., Iss. 10, pp. 1656-1664.
Fukuda et al., "Biodiesel Fuel Production by Transesterrification of Oils," J. Biosci. Bioeng., 92(5):405-416, (2001).
Gouveia et al., "Microalgal biomass as a sustainable alternative raw material," Argo Food Industry Hi-Tech, Teknoscience, 7(3):29-34, (Jan. 1, 1996).
Guil-Guerrero et al., "Functional properties of the biomass of three microalgal," Journal of Food Engineering, 65(4):511-517, (Dec. 1, 2004).
Haas et al., "The General Applicability of in Situ Transesterification for the Production of Fatty Acid Esters from a Variety of Feedstocks," J Am Oil Chem Soc, 84:963-970, (2007).
Hai, "Isolation and heterotrophic culture of Chlorella sp", Journal of University of Science and Technology Beijing, vol. 27, No. 4, pp. 408-412 (with English translation of the abstract).
Hidaka et al., "A Hot Water Extract of Chlorella pyrenoidosa Reduces Body Weight and Serum Lipids in Ovariectomized Rats," Phytotherapy Research, 18:164-168, (2004).
Hörtensteiner et al., "Chlorophyll breakdown in Chlorella protothecoides: characterization of degreening and cloning of degreening-related genes," Plant Molecular Biology, 42:439-450, (2000).
Huber et al., "Production of Liquid Alkanes by Aqueous-Phase Processing of Biomass-Derived Carbohydrates," Science, 308:1446-1450, (2005).
Huber et al., "Synthesis of Transportation Fuels from Biomass: Chemistry, Catalysts, and Engineering," Chem. Rev., 106: 4044-4098, (2006).
Huss, V. A. R., et al., Biochemical Taxonomy and Molecular Phylogeny of the Genus Chlorella Sensu Lato (Chlorophyta). Journal of Phycology, (Jan. 15, 1999), 35: 587-598. doi:10.1046/j.1529-8817.1999.3530587.x.
Jong-Yuh et al., "Potential hypoglycemic effects of Chlorella in streptozotocin-induced diabetic mice," Life Sciences, 77:980-990 (2005).
Kanellos, "Algae: Another way to grow edible oils," CNET News, 6 pages, (Jan. 25, 2008). [Retrieved from the Internet Mar. 9, 2015: <URL: http://news.cnet.com/Algae-Another-way-to-grow-edible-oils/2100-11395_3-6227572.html?tag=nefd.lede>].
Kingman, Mariah, "Algal Flour Chocolate Chip Coconut Cookies", (Sep. 18, 2011), http://www.algaecompetition.com/PDF.cfm/3food/3133.pdf.

(56) References Cited

OTHER PUBLICATIONS

Krauss, Robert W., "Mass Culture of Algae for Food and Other Organic Compounds," American Journal of Botany, vol. 49, No. 4 (Apr. 1962), pp. 425-435.
Kyle, David, "Production and Use of Lipids from Microalgae", Microalgal Lipids, Lipid Technology, (May-Jun. 1992), pp. 59-64.
Lane, Jim, "The Great Algae Robbery", Biofuels Digest, (Feb. 27, 2015), dowloaded from the internet Jun. 13, 2016, 13 Pages. http://www.biofuelsdigest.com/bdigest/2015/02/27/the-great-algae-robbery/.
Marshall et al., "Ice Cream", (Aug. 31, 2000), Aspen Publishers, Gaithersburg, MD, USA, pp. 22-31, 24-35, 46-47, 58 and 262-267.
Matsuka et al., "Changes in Contents of Carbohydrate and Fatty Acid in the Cells of Chlorella protothecoidesduring the process of De- and Re-Generation of Chloroplasts," Plant and Cell Physiol., 7:651-662 (Sep. 24, 1966).
Mizoguchi et al., "Nutrigenomic Studies of Effects of Chlorella on Subjects with High-Risk Factors for Lifestyles-Related Disease," Journal of Medicinal Food, 11(3):395-404, (2008).
Neish et al., "Carbohydrate Nutrition of Cholorella Vulgaris," Canadian Journal of Botany, 29:68-78, (1951).
Pandey, Ashok, Duu-Jong Lee, Yusuf Chisti and Carlos Soccol (eds.), "Factors Affecting Heterotrophic Production of Algal Oils", *Biofuels from Algae*, 1st Edition, eds. (Oct. 7, 2013), pp. 119-123.
Radmer et al., "Commercial applications of algae: opportunities and constraints," Journal of Applied Phycology, 6:93-98, (Apr. 1, 1994).
Rasmussen, R and Michael T. Morrissey, "Marine Biotechnology for Production of Food Ingredients", Advances in Food and Nutition Reseach, vol. 52, (2007), pp. 237-292.
Rodriguez-Lopez et al., "Plasma-glucose and plasma-insulin in normal and alloxanized rats treated with Chlorella," Life Sciences, Part II, 10:57-60, (1971).
Ruiz et al., "Lipids accumulation in Chlorella protothecoides through mixotrophic and heterotrophic cultures for biodiesel production," New Biotechnology, 25S:S266- S266, (Sep. 1, 2009).
Running et al., "Heterotrophic production of ascorbic acid by microalgae", Journal of Applied Phycology, (Apr. 1994), vol. 6, Issue 2, pp. 99-104.
Samarasinghe, Nalin, et al., "Algal cell rupture using high pressure homogenization as a prelude to oil extraction", Renewable Energy, vol. 48, Dec. 2012, pp. 300-308.
Shihira-Ishikawa et al., "Nutritional Control of Cell Pigmentation In Chlorella Protothecoides With Special Reference to The Degeneration of Chloroplast Induced by Glucose," Plant and Cell Physiology, 5(2):227-240 (Jan. 1, 1964), [online abstract], Retrieved on Jun. 3, 2010 from http://pcp.oxfordjounals.org/cgi/content/abstract/5/2/227.
Szabo et al., "Saftey evaluation of a high lipid Whole Algalin Flour (WAF) from Chlorella protothecoides," RegulatoryToxicology and Pharmacology, 63:155-165 (2012).

Szabo et al., "Saftey evaluation Whole Algalin Protein (WAP) from Chlorella protothecoides," Food and Chemical Toxicology, 59:34-45 (2013).
Takashima et al., "Further Notes on the Growth and Chlorophyll Formation of Chlorella Protothecoides," Plant & Cell Physiol., 5:321-332, (1964).
Tsutsui, Tomomi, et al., "Effect of Seaweed Substitution on Breadmaking (I) Chlorella," Proceedings of Seitoku Junior College of Nutrition, 2004, (35), pp. 1-7.
Associated Press, "30 percent of the world is now overweight or obese, no country immune," *Fox News Health*, accessed online at <foxnews.com/health/2014/05/29/30-30-percent-world-is-now-overweight-or-obese-no-country-immune.html> on Sep. 21, 2016 (Published May 29, 2014).
"Algae: Another way to grow edible oils—CNET News", published on Jan. 25, 2008, retrieved from the Internet: URL: http://news.cnet.com/Algae-Another-way-to-grow-edible-oils/2100-11395_3-6227572.html?tag=nefd.lede.
European Patent Office, Examination Report in counterpart European Patent Application No. 09821204.6, issued on Jul. 30, 2021.
Tan et al., "Fatty acid production by heterotrophic Chlorella saccharophila", *Hydrobiologia*, vol. 215, pp. 13-19 (1991).
TerraVia, "Solazyme Roquette Nutritionals Golden Chlorella® Omega to be key ingredient in Natural Vitality Release of new 30oz Bottle for Energy28," accessed online at <investors.terravia.com/releasedetail.cfm?releaseid=588870> on Sep. 19, 2016 (Mar. 10, 2011).
U.S. Appl. No. 12/579,091, filed Oct. 14, 2009.
U.S. Appl. No. 12/684,884, filed Jan. 8, 2010.
U.S. Appl. No. 12/684,885, filed Jan. 8, 2010.
U.S. Appl. No. 12/684,886, filed Jan. 8, 2010.
U.S. Appl. No. 12/684,887, filed Jan. 8, 2010.
U.S. Appl. No. 12/684,888, filed Jan. 8, 2010.
U.S. Appl. No. 12/684,889, filed Jan. 8, 2010.
U.S. Appl. No. 12/684,891, filed Jan. 8, 2010.
U.S. Appl. No. 12/684,892, filed Jan. 8, 2010.
U.S. Appl. No. 12/684,893, filed Jan. 8, 2010.
U.S. Appl. No. 12/684,894, filed Jan. 8, 2010.
U.S. Appl. No. 13/260,546, filed Oct. 26, 2011.
U.S. Appl. No. 13/263,724, filed Nov. 2, 2011.
U.S. Appl. No. 13/264,379, filed Nov. 16, 2011.
U.S. Appl. No. 13/667,784, filed Nov. 2, 2012.
U.S. Appl. No. 14/553,138, filed Nov. 25, 2014.
U.S. Appl. No. 15/158,469, filed May 18, 2016.
U.S. Appl. No. 15/851,568, filed Dec. 21, 2017.
U.S. Appl. No. 16/289,354, filed Feb. 28, 2019.
U.S. Appl. No. 16/289,366, filed Feb. 28, 2019.
U.S. Appl. No. 17/236,460, filed Apr. 21, 2021.
Chen et al., "Effect of C/N ratio and aeration on the fatty acid composition of heterotropic Chlorella sorokiniana", *Journal of Applied Phycology*, vol. 3, pp. 203-209 (1991).

* cited by examiner

| Strain # | C14:0 | C16:0 | C16:1 | C18:0 | C18:1 | C18:2 | C18:3 | C20:0 | C20:1 |
|---|---|---|---|---|---|---|---|---|---|
| 1 | 0.57 | 10.30 | 0.00 | 3.77 | 70.52 | 14.24 | 1.45 | 0.27 | 0 |
| 2 | 0.61 | 8.70 | 0.30 | 2.42 | 71.98 | 14.21 | 1.15 | 0.20 | 0.24 |
| 4 | 0.68 | 9.82 | 0 | 2.83 | 65.78 | 12.94 | 1.46 | 0 | 0 |
| 5 | 1.47 | 21.96 | 0 | 4.35 | 22.64 | 9.58 | 5.2 | 3.88 | 3.3 |
| 10 | 0 | 12.01 | 0 | 0 | 50.33 | 17.14 | 0 | 0 | 0 |
| 11 | 1.41 | 29.44 | 0.70 | 3.05 | 57.72 | 12.37 | 0.97 | 0.33 | 0 |
| 12 | 1.09 | 25.77 | 0 | 2.75 | 54.01 | 11.90 | 2.44 | 0 | 0 |

Fig. 1

MICROALGAL FLOUR

CROSS-REFERENCE TO RELATED APPLICATIONS

This application is a continuation of U.S. application Ser. No. 12/684,884, filed Jan. 8, 2010, which is a continuation-in-part of U.S. application Ser. No. 12/579,091, filed Oct. 14, 2009, which claims the benefit under 35 U.S.C. 119(e) of U.S. Provisional Patent Application No. 61/105,121, filed Oct. 14, 2008, U.S. Provisional Patent Application No. 61/157,187, filed Mar. 3, 2009, U.S. Provisional Patent Application No. 61/173,166, filed Apr. 27, 2009, and U.S. Provisional Patent Application No. 61/246,070, filed Sep. 25, 2009. Each of these applications is incorporated herein by reference in its entirety for all purposes.

REFERENCE TO A SEQUENCE LISTING

The instant application contains a Sequence Listing which has been submitted via EFS-Web and is hereby incorporated by reference in its entirety. Said ASCII copy, created on Feb. 28, 2019, is named 12684884.txt and is 22,413 bytes in size.

FIELD OF THE INVENTION

The invention resides in the fields of microbiology, food preparation, and human and animal nutrition.

BACKGROUND OF THE INVENTION

As the human population continues to increase, there's a growing need for additional food sources, particularly food sources that are inexpensive to produce but nutritious. Moreover, the current reliance on meat as the staple of many diets, at least in the most developed countries, contributes significantly to the release of greenhouse gases, and there's a need for new foodstuffs that are equally tasty and nutritious yet less harmful to the environment to produce.

Requiring only "water and sunlight" to grow, algae have long been looked to as a potential source of food. While certain types of algae, primarily seaweed, do indeed provide important foodstuffs for human consumption, the promise of algae as a foodstuff has not been realized. Algal powders made with algae grown photosynthetically in outdoor ponds or photobioreactors are commercially available but have a deep green color (from the chlorophyll) and a strong, unpleasant taste. When formulated into food products or as nutritional supplements, these algal powders impart a visually unappealing green color to the food product or nutritional supplement and have an unpleasant fishy or seaweed flavor.

There are several species of algae that are used in foodstuffs today, most being macroalgae such as kelp, purple layer (*Porphyra*, used in nori), dulse (*Palmaria palmate*) and sea lettuce (*Ulva lactuca*). Microalgae, such as *Spirulina* (*Arthrospira platensis*) are grown commercially in open ponds (photosynthetically) for use as a nutritional supplement or incorporated in small amounts in smoothies or juice drinks (usually less than 0.5% w/w). Other microalgae, including some species of *Chlorella* are popular in Asian countries as a nutritional supplement.

In addition to these products, algal oil with high docosahexanoic acid (DHA) content is used as an ingredient in infant formulas. DHA is a highly polyunsaturated oil. DHA has anti-inflammatory properties and is a well known supplement as well as an additive used in the preparation of foodstuffs. However, DHA is not suitable for cooked foods because it oxidizes with heat treatment. Also, DHA is unstable when exposed to oxygen even at room temperature in the presence of antioxidants. The oxidation of DHA results in a fishy taste and unpleasant aroma.

There remains a need for methods to produce foodstuffs from algae cheaply and efficiently, at large scale, particularly foodstuffs that are tasty and nutritious. The present invention meets these and other needs.

SUMMARY OF THE INVENTION

Compositions of microalgae-derived flour are disclosed from multiple genera, species, and strains of edible microalgae. Microalgae used in the invention are free of algal toxins and contain varying levels of primarily monounsaturated triglyceride oil. Flours disclosed herein are formulated as free flowing blendable powders, mixed food ingredients, oxidation stabilized, homogenized and micronized, and combinations therein. Flours disclosed herein also form self stabilizing emulsions in slurries with manageable viscosities. Innovative methods of formulating flours and incorporating them into food compositions are also disclosed. The invention also comprises flours with significant digestible protein and unique dietary fiber content and associated water binding, texturizing, and healthy oil delivery attributes. Novel methods of oil and fat replacement using flours of the invention are also disclosed. Flours of the invention can be manufactured from edible and inedible heterotrophic fermentation feedstocks, including corn starch, sugar cane, glycerol, and depolymerized cellulose.

In a first aspect, the present invention provides a microalgal flour comprising a homogenate of microalgal biomass containing predominantly or completely lysed cells in the form of a powder comprising at least 16% by dry weight triglyceride oil. In some embodiments, the average size of particles in the powder is less than 100 μm. In some embodiments, the average size of particles in the powder is 1-15 μm. In one embodiment, the powder is formed by micronizing microalgal biomass to form an emulsion and drying the emulsion. In some cases, the microalgal flour has a moisture content of 10% or less or 5% or less by weight. In some cases, the biomass comprises between 45% and 70% by dry weight triglyceride oil. In some embodiments, 60%-75% of the triglyceride oil is an 18:1 lipid in a glycerolipid form. In one embodiment, the triglyceride oil is less than 2% 14:0, 13-16% 16:0, 1-4% 18:0, 64-70% 18:1, 10-16% 18:2, 0.5-2.5% 18:3, and less than 2% oil of a carbon chain length 20 or longer. In some embodiments, the biomass is between 25%-40% carbohydrates by dry weight. In some cases, the carbohydrate component of the biomass is between 25%-35% dietary fiber and 2%-8% free sugar including sucrose, by dry weight. In one embodiment, the monosaccharide composition of the dietary fiber component of the biomass is 0.1-4% arabinose, 5-15% mannose, 15-35% galactose, and 50-70% glucose. In some cases, the biomass has between 20-115 μg/g of total carotenoids, including 20-70 μg/g lutein. In some cases, the chlorophyll content of the biomass is less than 2 ppm. In some cases, the biomass has 1-8 mg/100 g total tocopherols, including 2-6 mg/100 g alpha tocopherol. In one embodiment, the biomass has 0.05-0.30 mg/g total tocotrienols, including 0.10-0.25 mg/g alpha tocotrienol.

In some embodiments, the microalgal flour is in the form of a food ingredient composition, wherein the microalgal flour is combined with one or more additional edible ingredients that is a grain, fruit, vegetable, protein, herbs, spices, or one or more ingredients for preparation of a salad dressing, egg product, baked good, bread, pasta, sauce, soup, beverage, frozen dessert, butter or spread. In some cases, the microalgal flour is lacking visible oil. In some cases, the microalgal flour further comprises a flow agent. In one embodiment, the microalgal flour further comprises an antioxidant.

In various embodiments of the invention, the biomass is derived from a single strain of microalgae. In some embodiments, the biomass is derived from an algae that is a species of the genus *Chlorella*. In one embodiment, the algae is *Chlorella protothecoides*. In some cases, the biomass is derived from an algae that is a color mutant with reduced color pigmentation compared to the strain from which it was derived. In some embodiments, the algal biomass is derived from algae cultured heterotrophically. In some embodiments, the algal biomass is derived from algae cultured and processed under good manufacturing practice (GMP) conditions.

In a second aspect, the present invention provides a food ingredient composition comprising or formed by combining (a) at least 0.5% w/w microalgal flour, wherein the microalgal flour is a homogenate containing predominantly or completely lysed microalgal cells in the form of a powder comprising at least 16% by weight triglyceride oil, and (b) at least one other edible ingredient, wherein the food ingredient composition can be converted into a reconstituted food product by addition of a liquid to the food ingredient composition. In one embodiment, the food ingredient composition is a dry pasta. In some cases, the food ingredient composition can be converted into a reconstituted food product by the addition of liquid followed by baking. In one embodiment, the reconstituted food product is a liquid food product. In some cases, the food ingredient composition can be converted into the reconstituted food product by a process including subjecting the product of reconstitution to shear forces. In some embodiments, the average size of particles of microalgal biomass in the liquid food product is between 1 and 15 μm. In one embodiment, the reconstituted food product is an emulsion. In some embodiments, the reconstituted food product is a salad dressing, soup, sauce, beverage, butter or spread.

In some cases, the reconstituted food products of the present invention contain no oil or fat other than oil from the microalgal biomass. In some embodiments, the amount of microalgal flour in the reconstituted food product is 0.25-1 times the weight of oil and/or fat in a conventional food product of the same type as the reconstituted food product. In some cases, the average size of particles of microalgal biomass is less than 100 μm. In one embodiment, the average size of particles of microalgal biomass is 1-15 μm. In some embodiments, the food ingredient composition has a moisture content of 10% or less or 5% or less by weight. In some cases, the microalgal biomass comprises between 45% and 65% by dry weight triglyceride oil. In some embodiments, 60%-75% of the triglyceride oil is an 18:1 lipid in a glycerolipid form. In one embodiment, the triglyceride oil of the food ingredient composition is less than 2% 14:0, 13-16% 16:0, 1-4% 18:0, 64-70% 18:1, 10-16% 18:2, 0.5-2.5% 18:3; and less than 2% oil of a carbon chain length 20 or longer. In some cases, the microalgal biomass is between 25% to 40% carbohydrates by dry weight. In some cases, the carbohydrate component of the microalgal biomass is between 25%-35% dietary fiber and 2% to 8% free sugar including sucrose, by dry weight. In one embodiment, the dietary fiber component of the microalgal biomass is 0.1-4% arabinose, 5-15% mannose, 15-35% galactose, and 50-70% glucose. In some cases, the microalgal biomass comprises between 20-115 μg/g of total carotenoids, including 20-70 μg/g lutein. In some cases, the microalgal biomass comprises less than 2 ppm chlorophyll. In some embodiments, the microalgal biomass comprises 1-8 mg/100 g total tocopherols, including 2-6 mg/100 g alpha tocopherol. In one embodiment, the microalgal biomass comprises 0.05-0.30 mg/g total tocotrienols, including 0.10-0.25 mg/g alpha tocotrienol.

In a third aspect, the present invention provides a method of making a microalgal flour comprising (a) providing microalgal cells containing at least 16% by dry weight triglyceride oil, (b) disrupting the cells and reducing the particle size to produced an aqueous homogenate, and (c) drying the homogenate to produce microalgal flour comprising at least 16% by dry weight triglyceride oil. In one embodiment, the method further comprises separating the microalgal cells from culture media before disrupting the cells. In some cases, the disruption is performed using a pressure disrupter, French press, or ball mill. In some cases, the drying is performed using a lyophilizer, drum dryer, flash dryer, spray dryer, or box dryer.

In some embodiments, the method is performed using microalgal cells containing between 50% and 65% by dry weight oil. In some cases, the method further comprises adding a flow agent at any point during the process. In one embodiment, the average size of particles in the flour is less than 100 μm. In one embodiment, the average size of particles of flour are between 1 and 15 μm. In some cases, the flour has a moisture content of 10% or less or 5% or less by weight. In some cases, 50%-75% of the oil is an 18:1 lipid in a glycerolipid form. In one embodiment, the oil is less than 2% 14:0, 13-16% 16:0, 1-4% 18:0, 64-70% 18:1, 10-16% 18:2, 0.5-2.5% 18:3, and less than 2% oil of a carbon chain length 20 or longer.

In some cases, the method is performed using microalgal cells of a single strain of microalgae. In some embodiments, the cells are a species of the genus *Chlorella*. In one embodiment, the cells are *Chlorella protothecoides*. In some cases, the cells are of a color mutant strain with reduced color pigmentation compared to the strain from which it was derived. In some cases, the cells are from a heterotrophic culture. In some embodiments, the cells are disrupted and dried under good manufacturing practice (GMP) conditions.

In a fourth aspect, the present invention provides a method of making a food product from microalgal flour, comprising (a) determining an amount of microalgal flour to include in the food product based an amount of oil, fat or eggs in a conventional form of the food product, wherein the microalgal flour is a homogenate of microalgal biomass containing predominantly or completely lysed cells in the form of a powder comprising at least 16% by dry weight triglyceride oil, and (b) combining the amount of microalgal flour with one or more edible ingredients and less than the amount of oil, fat or eggs present in the conventional form of the food product to form the food product from the microalgal flour. In some cases, the food product contains less than 25% oil or fat by weight, excluding microalgal oil contributed by the biomass. In some cases, the food product from microalgal flour contains less than 10% oil or fat by weight, excluding microalgal oil contributed by the biomass. In one embodiment, the food product from microalgal flour is free of oil or fat excluding microalgal oil contributed by the biomass. In some cases, the food product from microalgal flour is free of eggs. In some cases, the food product is free of oil other than microalgal oil contributed by the biomass.

These and other aspects and embodiments of the invention are described in the accompanying drawings, a brief description of which immediately follows, and the detailed description of the invention below, and exemplified in the examples below. Any or all of the features discussed above and throughout the application can be combined in various embodiments of the present invention.

BRIEF DESCRIPTION OF THE DRAWINGS

FIG. 1 shows the lipid profile of selected strains of microalgae as a percentage of total lipid content. The species/strain corresponding to each strain number is shown in Table 1 of Example 1.

DETAILED DESCRIPTION OF THE INVENTION

Figure 2:
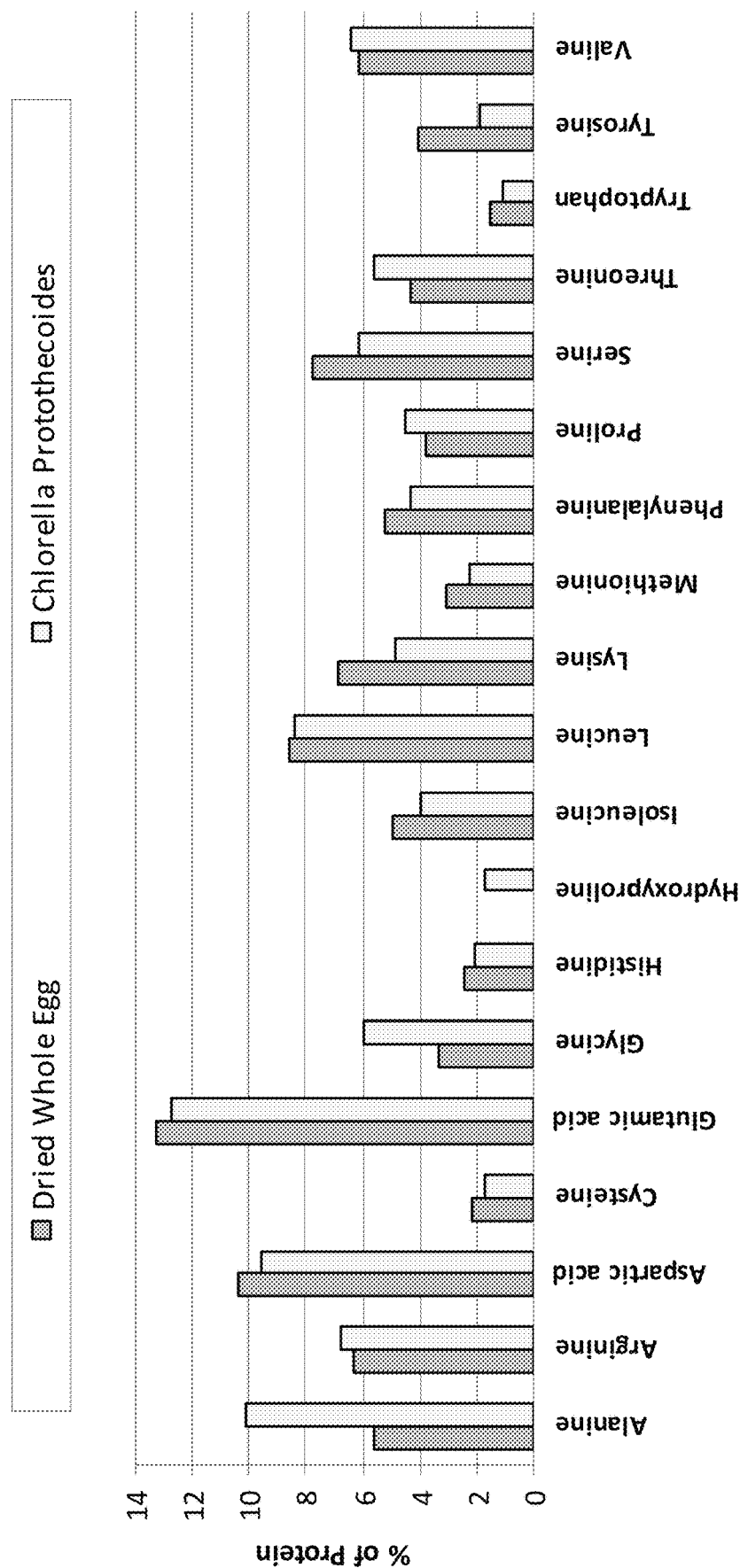
FIG. 2 shows the amino acid profile of *Chlorella protothecoides* biomass compared to the amino acid profile of whole egg protein.

This detailed description of the invention is divided into sections and subsections for the convenience of the reader. Section I provides definitions for various terms used herein. Section II, in parts A-E, describes methods for preparing microalgal biomass, including suitable organisms (A), methods of generating a microalgae strain lacking in or has significantly reduced pigmentation (B) culture conditions (C), concentration conditions (D), and chemical composition of the biomass produced in accordance with the invention (E). Section III, in parts A-D, describes methods for processing the microalgal biomass into algal flake (A), algal powder (B), algal flour (C); and algal oil (D) of the invention. Section IV describes various foods of the invention and methods of combining microalgal biomass with other food ingredients.

All of the processes described herein can be performed in accordance with GMP or equivalent regulations. In the United States, GMP regulations for manufacturing, packing, or holding human food are codified at 21 C.F.R. 110. These provisions, as well as ancillary provisions referenced therein, are hereby incorporated by reference in their entirety for all purposes. GMP conditions in the Unites States, and equivalent conditions in other jurisdictions, apply in determining whether a food is adulterated (the food has been manufactured under such conditions that it is unfit for food) or has been prepared, packed, or held under unsanitary conditions such that it may have become contaminated or otherwise may have been rendered injurious to health. GMP conditions can include adhering to regulations governing: disease control; cleanliness and training of personnel; maintenance and sanitary operation of buildings and facilities; provision of adequate sanitary facilities and accommodations; design, construction, maintenance, and cleanliness of equipment and utensils; provision of appropriate quality control procedures to ensure all reasonable precautions are taken in receiving, inspecting, transporting, segregating, preparing, manufacturing, packaging, and storing food products according to adequate sanitation principles to prevent contamination from any source; and storage and transportation of finished food under conditions that will protect food against physical, chemical, or undesirable microbial contamination, as well as against deterioration of the food and the container.

I. DEFINITIONS

Unless defined otherwise below, all technical and scientific terms used herein have the meaning commonly understood by a person skilled in the art to which this invention belongs. General definitions of many of the terms used herein may be found in Singleton et al., *Dictionary of Microbiology and Molecular Biology* (2nd ed. 1994); *The Cambridge Dictionary of Science and Technology* (Walker ed., 1988); *The Glossary of Genetics*, 5th Ed., R. Rieger et al. (eds.), Springer Verlag (1991); and Hale & Marham, *The Harper Collins Dictionary of Biology* (1991).

"Area Percent" refers to the area of peaks observed using FAME GC/FID detection methods in which every fatty acid in the sample is converted into a fatty acid methyl ester (FAME) prior to detection. For example, a separate peak is observed for a fatty acid of 14 carbon atoms with no unsaturation (C14:0) compared to any other fatty acid such as C14:1. The peak area for each class of FAME is directly proportional to its percent composition in the mixture and is calculated based on the sum of all peaks present in the sample (i.e. [area under specific peak/total area of all measured peaks]×100). When referring to lipid profiles of oils and cells of the invention, "at least 4% C8-C14" means that at least 4% of the total fatty acids in the cell or in the extracted glycerolipid composition have a chain length that includes 8, 10, 12 or 14 carbon atoms.

"Axenic" means a culture of an organism that is not contaminated by other living organisms.

"Baked good" means a food item, typically found in a bakery, that is prepared by using an oven and usually contain a leavening agent. Baked goods include, but are not limited to brownies, cookies, pies, cakes and pastries.

"Bioreactor" and "fermentor" mean an enclosure or partial enclosure, such as a fermentation tank or vessel, in which cells are cultured typically in suspension.

"Bread" means a food item that contains flour, liquid, and usually a leavening agent. Breads are usually prepared by baking in an oven, although other methods of cooking are also acceptable. The leavening agent can be chemical or organic/biological in nature. Typically, the organic leavening agent is yeast. In the case where the leavening agent is chemical in nature (such as baking powder and/or baking soda), these food products are referred to as "quick breads". Crackers and other cracker-like products are examples of breads that do not contain a leavening agent.

"Cellulosic material" means the products of digestion of cellulose, particularly glucose and xylose. Cellulose digestion typically produces additional compounds such as disaccharides, oligosaccharides, lignin, furfurals and other compounds. Sources of cellulosic material include, for example and without limitation, sugar cane bagasse, sugar beet pulp, corn stover, wood chips, sawdust, and switchgrass.

"Co-culture" and variants thereof such as "co-cultivate" and "co-ferment" mean that two or more types of cells are present in the same bioreactor under culture conditions. The two or more types of cells are, for purposes of the present invention, typically both microorganisms, typically both microalgae, but may in some instances include one non-microalgal cell type. Culture conditions suitable for co-culture include, in some instances, those that foster growth and/or propagation of the two or more cell types, and, in other instances, those that facilitate growth and/or proliferation of only one, or only a subset, of the two or more cells while maintaining cellular growth for the remainder.

"Cofactor" means a molecule, other than the substrate, required for an enzyme to carry out its enzymatic activity.

"Conventional food product" means a composition intended for consumption, e.g., by a human, that lacks algal biomass or other algal components and includes ingredients ordinarily associated with the food product, particularly a vegetable oil, animal fat, and/or egg(s), together with other edible ingredients. Conventional food products include food products sold in shops and restaurants and those made in the home. Conventional food products are often made by following conventional recipes that specify inclusion of an oil or fat from a non-algal source and/or egg(s) together with other edible ingredient(s).

"Cooked product" means a food that has been heated, e.g., in an oven, for a period of time.

"Creamy salad dressing" means a salad dressing that is a stable dispersion with high viscosity and a slow pour-rate. Generally, creamy salad dressings are opaque.

"Cultivate," "culture," and "ferment", and variants thereof, mean the intentional fostering of growth and/or propagation of one or more cells, typically microalgae, by use of culture conditions. Intended conditions exclude the growth and/or propagation of microorganisms in nature (without direct human intervention).

"Cytolysis" means the lysis of cells in a hypotonic environment. Cytolysis results from osmosis, or movement of water, to the inside of a cell to a state of hyperhydration, such that the cell cannot withstand the osmotic pressure of the water inside, and so bursts.

"Dietary fiber" means non-starch carbohydrates found in plants and other organisms containing cell walls, including microalgae. Dietary fiber can be soluble (dissolved in water) or insoluble (not able to be dissolved in water). Soluble and insoluble fiber makes up total dietary fiber.

"Delipidated meal" means algal biomass that has undergone an oil extraction process and so contains less oil, relative to the biomass prior to oil extraction. Cells in delipidated meal are predominantly lysed. Delipidated meal include algal biomass that has been solvent (hexane) extracted.

"Digestible crude protein" is the portion of protein that is available or can be converted into free nitrogen (amino acids) after digesting with gastric enzymes. In vitro measurement of digestible crude protein is accomplished by using gastric enzymes such as pepsin and digesting a sample and measuring the free amino acid after digestion. In vivo measurement of digestible crude protein is accomplished by measuring the protein levels in a feed/food sample and feeding the sample to an animal and measuring the amount of nitrogen collected in the animal's feces.

"Dry weight" and "dry cell weight" mean weight determined in the relative absence of water. For example, reference to microalgal biomass as comprising a specified percentage of a particular component by dry weight means that the percentage is calculated based on the weight of the biomass after substantially all water has been removed.

"Edible ingredient" means any substance or composition which is fit to be eaten. "Edible ingredients" include, without limitation, grains, fruits, vegetables, proteins, herbs, spices, carbohydrates, and fats.

"Exogenously provided" means a molecule provided to a cell (including provided to the media of a cell in culture).

"Fat" means a lipid or mixture of lipids that is generally solid at ordinary room temperatures and pressures. "Fat" includes, without limitation, lard and butter.

"Fiber" means non-starch carbohydrates in the form of polysaccharide. Fiber can be soluble in water or insoluble in water. Many microalgae produce both soluble and insoluble fiber, typically residing in the cell wall.

"Finished food product" and "finished food ingredient" mean a food composition that is ready for packaging, use, or consumption. For example, a "finished food product" may have been cooked or the ingredients comprising the "finished food product" may have been mixed or otherwise integrated with one another. A "finished food ingredient" is typically used in combination with other ingredients to form a food product.

"Fixed carbon source" means molecule(s) containing carbon, typically organic molecules, that are present at ambient temperature and pressure in solid or liquid form.

"Food", "food composition", "food product" and "foodstuff" mean any composition intended to be or expected to be ingested by humans as a source of nutrition and/or calories. Food compositions are composed primarily of carbohydrates, fats, water and/or proteins and make up substantially all of a person's daily caloric intake. A "food composition" can have a weight minimum that is at least ten times the weight of a typical tablet or capsule (typical tablet/capsule weight ranges are from less than or equal to 100 mg up to 1500 mg). A "food composition" is not encapsulated or in tablet form.

"Glycerolipid profile" means the distribution of different carbon chain lengths and saturation levels of glycerolipids in a particular sample of biomass or oil. For example, a sample could have a glycerolipid profile in which approximately 60% of the glycerolipid is C18:1, 20% is C18:0, 15% is C16:0, and 5% is C14:0. When a carbon length is referenced generically, such as "C:18", such reference can include any amount of saturation; for example, microalgal biomass that contains 20% (by weight/mass) lipid as C:18 can include C18:0, C18:1, C18:2, and the like, in equal or varying amounts, the sum of which constitute 20% of the biomass. Reference to percentages of a certain saturation type, such as "at least 50% monounsaturated in an 18:1 glycerolipid form" means the aliphatic side chains of the glycerolipids are at least 50% 18:1, but does not necessarily mean that at least 50% of the triglycerides are triolein (three 18:1 chains attached to a single glycerol backbone); such a profile can include glycerolipids with a mixture of 18:1 and other side chains, provided at least 50% of the total side chains are 18:1.

"Good manufacturing practice" and "GMP" mean those conditions established by regulations set forth at 21 C.F.R. 110 (for human food) and 111 (for dietary supplements), or comparable regulatory schemes established in locales outside the United States. The U.S. regulations are promulgated by the U.S. Food and Drug Administration under the authority of the Federal Food, Drug, and Cosmetic Act to regulate manufacturers, processors, and packagers of food products and dietary supplements for human consumption.

"Growth" means an increase in cell size, total cellular contents, and/or cell mass or weight of an individual cell, including increases in cell weight due to conversion of a fixed carbon source into intracellular oil.

"Homogenate" means biomass that has been physically disrupted. Homogenization is a fluid mechanical process that involves the subdivision of particles into smaller and more uniform sizes, forming a dispersion that may be subjected to further processing. Homogenization is used in treatment of several foods and dairy products to improve stability, shelf-life, digestion, and taste.

"Increased lipid yield" means an increase in the lipid/oil productivity of a microbial culture that can achieved by, for example, increasing the dry weight of cells per liter of culture, increasing the percentage of cells that contain lipid, and/or increasing the overall amount of lipid per liter of culture volume per unit time.

"In situ" means "in place" or "in its original position". For example, a culture may contain a first microalgal cell type secreting a catalyst and a second microorganism cell type secreting a substrate, wherein the first and second cell types produce the components necessary for a particular chemical reaction to occur in situ in the co-culture without requiring further separation or processing of the materials.

"Lipid" means any of a class of molecules that are soluble in nonpolar solvents (such as ether and hexane) and relatively or completely insoluble in water. Lipid molecules have these properties, because they are largely composed of long hydrocarbon tails that are hydrophobic in nature. Examples of lipids include fatty acids (saturated and unsaturated); glycerides or glycerolipids (such as monoglycerides, diglycerides, triglycerides or neutral fats, and phosphoglycerides or glycerophospholipids); and nonglycerides (sphingolipids, tocopherols, tocotrienols, sterol lipids including cholesterol and steroid hormones, prenol lipids including terpenoids, fatty alcohols, waxes, and polyketides).

"Lysate" means a solution containing the contents of lysed cells.

"Lysis" means the breakage of the plasma membrane and optionally the cell wall of a microorganism sufficient to release at least some intracellular content, which is often achieved by mechanical or osmotic mechanisms that compromise its integrity.

"Lysing" means disrupting the cellular membrane and optionally the cell wall of a biological organism or cell sufficient to release at least some intracellular content.

"Microalgae" means a eukaryotic microbial organism that contains a chloroplast, and which may or may not be capable of performing photosynthesis. Microalgae include obligate photoautotrophs, which cannot metabolize a fixed carbon source as energy, as well as heterotrophs, which can live solely off of a fixed carbon source, including obligate heterotrophs, which cannot perform photosynthesis. Microalgae include unicellular organisms that separate from sister cells shortly after cell division, such as *Chlamydomonas*, as well as microbes such as, for example, Volvox, which is a simple multicellular photosynthetic microbe of two distinct cell types. "Microalgae" also include cells such as *Chlorella, Parachlorella* and *Dunaliella*.

"Microalgal biomass," "algal biomass," and "biomass" mean a material produced by growth and/or propagation of microalgal cells. Biomass may contain cells and/or intracellular contents as well as extracellular material. Extracellular material includes, but is not limited to, compounds secreted by a cell.

"Microalgal oil" and "algal oil" mean any of the lipid components produced by microalgal cells, including triacylglycerols.

"Micronized" means biomass that has been homogenized under high pressure (or an equivalent process) so that at least 50% of the particle size (median particle size) is no more 10 µm in their longest dimension or diameter of a sphere of equivalent volume. Typically, at least 50% to 90% or more of such particles are less than 5 µm in their longest dimension or diameter of a sphere of equivalent volume. In any case, the average particle size of micronized biomass is smaller than the intact microalgal cell. The particle sizes referred to are those resulting from the homogenization and are preferably measured as soon as practical after homogenization has occurred and before drying to avoid possible distortions caused by clumping of particles as may occur in the course of drying. Some techniques of measuring particle size, such as laser diffraction, detect the size of clumped particles rather individual particles and may show a larger apparent particle size (e.g., average particle size of 1-100 µm) after drying. Because the particles are typically approximately spherical in shape, the diameter of a sphere of equivalent volume and the longest dimension of a particle are approximately the same.

"Microorganism" and "microbe" mean any microscopic unicellular organism.

"Nutritional supplement" means a composition intended to supplement the diet by providing specific nutrients as opposed to bulk calories. A nutritional supplement may contain any one or more of the following ingredients: a vitamin, a mineral, an herb, an amino acid, an essential fatty acid, and other substances. Nutritional supplements are typically tableted or encapsulated. A single tableted or encapsulated nutritional supplement is typically ingested at a level no greater than 15 grams per day. Nutritional supplements can be provided in ready-to-mix sachets that can be mixed with food compositions, such as yogurt or a "smoothie", to supplement the diet, and are typically ingested at a level of no more than 25 grams per day.

"Oil" means any triacylglyceride (or triglyceride oil), produced by organisms, including microalgae, other plants, and/or animals. "Oil," as distinguished from "fat", refers, unless otherwise indicated, to lipids that are generally liquid at ordinary room temperatures and pressures. For example, "oil" includes vegetable or seed oils derived from plants, including without limitation, an oil derived from soy, rapeseed, canola, palm, palm kernel, coconut, corn, olive, sunflower, cotton seed, cuphea, peanut, camelina sativa, mustard seed, cashew nut, oats, lupine, kenaf, calendula, hemp, coffee, linseed, hazelnut, euphorbia, pumpkin seed, coriander, camellia, sesame, safflower, rice, tung oil tree, cocoa, copra, pium poppy, castor beans, pecan, jojoba, jatropha, macadamia, Brazil nuts, and avocado, as well as combinations thereof.

"Osmotic shock" means the rupture of cells in a solution following a sudden reduction in osmotic pressure and can be used to induce the release of cellular components of cells into a solution.

"Pasteurization" means a process of heating which is intended to slow microbial growth in food products. Typically pasteurization is performed at a high temperature (but below boiling) for a short amount of time. As described herein, pasteurization can not only reduce the number of undesired microbes in food products, but can also inactivate certain enzymes present in the food product.

"Polysaccharide" and "glycan" means any carbohydrate made of monosaccharides joined together by glycosidic linkages. Cellulose is an example of a polysaccharide that makes up certain plant cell walls.

"Port" means an opening in a bioreactor that allows influx or efflux of materials such as gases, liquids, and cells; a port is usually connected to tubing.

"Predominantly encapsulated" means that more than 50% and typically more than 75% to 90% of a referenced component, e.g., algal oil, is sequestered in a referenced container, which can include, e.g., a microalgal cell.

"Predominantly intact cells" and "predominantly intact biomass" mean a population of cells that comprise more than 50, and often more than 75, 90, and 98% intact cells. "Intact", in this context, means that the physical continuity of the cellular membrane and/or cell wall enclosing the intracellular components of the cell has not been disrupted in any manner that would release the intracellular components of the cell to an extent that exceeds the permeability of the cellular membrane in culture.

"Predominantly lysed" means a population of cells in which more than 50%, and typically more than 75 to 90%, of the cells have been disrupted such that the intracellular components of the cell are no longer completely enclosed within the cell membrane.

"Proliferation" means a combination of both growth and propagation.

"Propagation" means an increase in cell number via mitosis or other cell division.

"Proximate analysis" means analysis of foodstuffs for fat, nitrogen/protein, crude fiber (cellulose and lignin as main components), moisture and ash. Soluble carbohydrate (total dietary fiber and free sugars) can be calculated by subtracting the total of the known values of the proximate analysis from 100 (carbohydrate by difference).

"Sonication" means disrupting biological materials, such as a cell, by sound wave energy.

"Species of furfural" means 2-furancarboxaldehyde and derivatives thereof that retain the same basic structural characteristics.

"Stover" means the dried stalks and leaves of a crop remaining after a grain has been harvested from that crop.

"Suitable for human consumption" means a composition can be consumed by humans as dietary intake without ill health effects and can provide significant caloric intake due to uptake of digested material in the gastrointestinal tract.

"Uncooked product" means a composition that has not been subjected to heating but may include one or more components previously subjected to heating.

"V/V" or "v/v", in reference to proportions by volume, means the ratio of the volume of one substance in a composition to the volume of the composition. For example, reference to a composition that comprises 5% v/v microalgal oil means that 5% of the composition's volume is composed of microalgal oil (e.g., such a composition having a volume of 100 mm$^3$ would contain 5 mm$^3$ of microalgal oil), and the remainder of the volume of the composition (e.g., 95 mm$^3$ in the example) is composed of other ingredients.

"W/W" or "w/w", in reference to proportions by weight, means the ratio of the weight of one substance in a composition to the weight of the composition. For example, reference to a composition that comprises 5% w/w microalgal biomass means that 5% of the composition's weight is composed of microalgal biomass (e.g., such a composition having a weight of 100 mg would contain 5 mg of microalgal biomass) and the remainder of the weight of the composition (e.g., 95 mg in the example) is composed of other ingredients.

II. METHODS FOR PREPARING MICROALGAL BIOMASS

The present invention provides algal biomass suitable for human consumption that is rich in nutrients, including lipid and/or protein constituents, methods of combining the same with edible ingredients and food compositions containing the same. The invention arose in part from the discoveries that algal biomass can be prepared with a high oil content and/or with excellent functionality, and the resulting biomass incorporated into food products in which the oil and/or protein content of the biomass can substitute in whole or in part for oils and/or fats and/or proteins present in conventional food products. Algal oil, which can comprise predominantly monosaturated oil, provides health benefits compared with saturated, hydrogenated (trans fats) and polyunsaturated fats often found in conventional food products. Algal oil also can be used as a healthy stable cooking oil free of trans fats. The remainder of the algal biomass can encapsulate the oil at least until a food product is cooked, thereby increasing shelf-life of the oil. In uncooked products, in which cells remain intact, the biomass, along with natural antioxidants found in the oil, also protects the oil from oxidation, which would otherwise create unpleasant odors, tastes, and textures. The biomass also provides several beneficial micro-nutrients in addition to the oil and/or protein, such as algal-derived dietary fibers (both soluble and insoluble carbohydrates), phospholipids, glycoprotein, phytosterols, tocopherols, tocotrienols, and selenium.

This section first reviews the types of microalgae suitable for use in the methods of the invention (part A), methods of generating a microalgae strain lacking or has significantly reduced pigmentation (part B), then the culture conditions (part C) that are used to propagate the biomass, then the concentration steps that are used to prepare the biomass for further processing (part D), and concludes with a description of the chemical composition of the biomass prepared in accordance with the methods of the invention (part E).

A. Microalgae for Use in the Methods of the Invention

A variety species of microalgae that produce suitable oils and/or lipids and/or protein can be used in accordance with the methods of the present invention, although microalgae that naturally produce high levels of suitable oils and/or lipids and/or protein are preferred. Considerations affecting the selection of microalgae for use in the invention include, in addition to production of suitable oils, lipids, or protein for production of food products: (1) high lipid (or protein) content as a percentage of cell weight; (2) ease of growth; (3) ease of propagation; (4) ease of biomass processing; (5) glycerolipid profile; and (6) absence of algal toxins (Example 5 below demonstrates dried microalgal biomass and oils or lipids extracted from the biomass lacks algal toxins).

In some embodiments, the cell wall of the microalgae must be disrupted during food processing (e.g., cooking) to release the active components or for digestion, and, in these embodiments, strains of microalgae with cell walls susceptible to digestion in the gastrointestinal tract of an animal, e.g., a human or other monogastrics, are preferred, especially if the algal biomass is to be used in uncooked food products. Digestibility is generally decreased for microalgal strains which have a high content of cellulose/hemicellulose in the cell walls. Digestibility can be evaluated using a standard pepsin digestibility assay.

In particular embodiments, the microalgae comprise cells that are at least 10% or more oil by dry weight. In other embodiments, the microalgae contain at least 25-35% or more oil by dry weight. Generally, in these embodiments, the more oil contained in the microalgae, the more nutritious the biomass, so microalgae that can be cultured to contain at least 40%, at least 50%, 75%, or more oil by dry weight are especially preferred. Preferred microalgae for use in the methods of the invention can grow heterotrophically (on sugars in the absence of light) or are obligate heterotrophs. Not all types of lipids are desirable for use in foods and/or nutraceuticals, as they may have an undesirable taste or unpleasant odor, as well as exhibit poor stability or provide a poor mouth feel, and these considerations also influence the selection of microalgae for use in the methods of the invention.

Microalgae from the genus *Chlorella* are generally useful in the methods of the invention. *Chlorella* is a genus of single-celled green algae, belonging to the phylum Chlorophyta. *Chlorella* cells are generally spherical in shape, about 2 to 10 μm in diameter, and lack flagella. Some species of *Chlorella* are naturally heterotrophic. In preferred embodiments, the microalgae used in the methods of the invention is *Chlorella protothecoides, Chlorella ellipsoidea, Chlorella minutissima, Chlorella zofinienesi, Chlorella luteoviridis, Chlorella kessleri, Chlorella sorokiniana, Chlorella fusca* var. *vacuolata Chlorella* sp., *Chlorella* cf. *minutissima* or *Chlorella emersonii*. *Chlorella*, particularly *Chlorella protothecoides*, is a preferred microorganism for use in the methods of the invention because of its high composition of lipid. Particularly preferred species of *Chlorella protothecoides* for use in the methods of the invention include those exemplified in the examples below.

Other species of *Chlorella* suitable for use in the methods of the invention include the species selected from the group consisting of *anitrata, Antarctica, aureoviridis, candida, capsulate, desiccate, ellipsoidea* (including strain CCAP 211/42), *emersonii, fusca* (including var. *vacuolata*), *glucotropha, infusionum* (including var. *actophila* and var. *auxenophila*), *kessleri* (including any of UTEX strains 397, 2229, 398), *lobophora* (including strain SAG 37.88), *luteoviridis* (including strain SAG 2203 and var. *aureoviridis* and *lutescens*), *miniata,* cf. *minutissima, minutissima* (including UTEX strain 2341), *mutabilis, nocturna, ovalis, parva, photophila, pringsheimii, protothecoides* (including any of UTEX strains 1806, 411, 264, 256, 255, 250, 249, 31, 29, 25 or CCAP 211/8D, or CCAP 211/17 and var. *acidicola*), *regularis* (including var. *minima,* and *umbricata*), *reisiglii* (including strain CCP 11/8), *saccharophila* (including strain CCAP 211/31, CCAP 211/32 and var. *ellipsoidea*), *salina, simplex, sorokiniana* (including strain SAG 211.40B), sp. (including UTEX strain 2068 and CCAP 211/92), *sphaerica, stigmatophora, trebouxioides, vanniellii, vulgaris* (including strains CCAP 211/11K, CCAP 211/80 and *F. tertia* and var. *autotrophica, viridis, vulgaris, vulgaris F. tertia, vulgaris F. viridis*), *xanthella,* and *zofingiensis.*

Species of *Chlorella* (and species from other microalgae genera) for use in the invention can be identified by comparison of certain target regions of their genome with those same regions of species identified herein; preferred species are those that exhibit identity or at least a very high level of homology with the species identified herein. For example, identification of a specific *Chlorella* species or strain can be achieved through amplification and sequencing of nuclear and/or chloroplast DNA using primers and methodology using appropriate regions of the genome, for example using the methods described in Wu et al., *Bot. Bull. Acad. Sin.* 42:115-121 (2001), Identification of *Chlorella* spp. isolates using ribosomal DNA sequences. Well established methods of phylogenetic analysis, such as amplification and sequencing of ribosomal internal transcribed spacer (ITS1 and ITS2 rDNA), 23S RNA, 18S rRNA, and other conserved genomic regions can be used by those skilled in the art to identify species of not only *Chlorella*, but other oil and lipid producing microalgae suitable for use in the methods disclosed herein. For examples of methods of identification and classification of algae see *Genetics*, 170(4):1601-10 (2005) and RNA, 11(4):361-4 (2005).

Thus, genomic DNA comparison can be used to identify suitable species of microalgae to be used in the present invention. Regions of conserved genomic DNA, such as and not limited to DNA encoding for 23S rRNA, can be amplified from microalgal species that may be, for example, taxonomically related to the preferred microalgae used in the present invention and compared to the corresponding regions of those preferred species. Species that exhibit a high level of similarity are then selected for use in the methods of the invention. Illustrative examples of such DNA sequence comparison among species within the *Chlorella* genus are presented below. In some cases, the microalgae that are preferred for use in the present invention have genomic DNA sequences encoding for 23S rRNA that have at least 65% nucleotide identity to at least one of the sequences listed in SEQ ID NOs: 1-23 and 26-27. In other cases, microalgae that are preferred for use in the present invention have genomic DNA sequences encoding for 23S rRNA that have at least 75%, 85%, 90%, 95%, 96%, 97%, 98%, 99% or greater nucleotide identity to at least one or more of the sequences listed in SEQ ID NOs: 1-23 and 26-27. Genotyping of a food composition and/or of algal biomass before it is combined with other ingredients to formulate a food composition is also a reliable method for determining if algal biomass is from more than a single strain of microalgae.

For sequence comparison to determine percent nucleotide or amino acid identity, typically one sequence acts as a reference sequence, to which test sequences are compared. In applying a sequence comparison algorithm, test and reference sequences are input into a computer, subsequence coordinates are designated, if necessary, and sequence algorithm program parameters are designated. The sequence comparison algorithm then calculates the percent sequence identity for the test sequence(s) relative to the reference sequence, based on the designated program parameters. Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol. Biol. 48:443 (1970), by the search for similarity method of Pearson & Lipman, Proc. Nat'l. Acad. Sci. USA 85:2444 (1988), by computerized implementations of these algorithms (GAP, BESTFIT, FASTA, and TFASTA in the Wisconsin Genetics Software Package, Genetics Computer Group, 575 Science Dr., Madison, WI), or by visual inspection (see generally Ausubel et al., supra). Another example algorithm that is suitable for determining percent sequence identity and sequence similarity is the BLAST algorithm, which is described in Altschul et al., *J. Mol. Biol.* 215:403-410 (1990). Software for performing BLAST analyses is publicly available through the National Center for Biotechnology Information (at the web address www.ncbi.nlm.nih.gov).

In addition to *Chlorella*, other genera of microalgae can also be used in the methods of the present invention. In preferred embodiments, the microalgae is a species selected from the group consisting *Parachlorella kessleri, Parachlorella beijerinckii, Neochloris oleabundans, Bracteacoccus,* including *B. grandis, B. cinnabarinas,* and *B. aerius, Brac-* teococcus sp. or *Scenedesmus rebescens*. Other nonlimiting examples of microalgae species include those species from the group of species and genera consisting of *Achnanthes orientalis*; *Agmenellum*; *Amphiprora hyaline*; *Amphora*, including *A. coffeiformis* including *A. c. linea*, *A. c. punctata*, *A. c. taylori*, *A. c. tenuis*, *A. c. delicatissima*, *A. c. delicatissima capitata*; *Anabaena*; *Ankistrodesmus*, including *A. falcatus*; *Boekelovia hooglandii*; *Borodinella*; *Botryococcus braunii*, including *B. sudeticus*; *Bracteococcus*, including *B. aerius*, *B. grandis*, *B. cinnabarinas*, *B. minor*, and *B. medionucleatus*; *Carteria*; *Chaetoceros*, including *C. gracilis*, *C. muelleri*, and *C. muelleri subsalsum*; *Chlorococcum*, including *C. infusionum*; *Chlorogonium*; *Chroomonas*; *Chrysosphaera*; *Cricosphaera*; *Crypthecodinium cohnii*; *Cryptomonas*; *Cyclotella*, including *C. cryptica* and *C. meneghiniana*; *Dunaliella*, including *D. bardawil*, *D. bioculata*, *D. granulate*, *D. maritime*, *D. minuta*, *D. parva*, *D. peircei*, *D. primolecta*, *D. salina*, *D. terricola*, *D. tertiolecta*, and *D. viridis*; *Eremosphaera*, including *E. viridis*; *Elhpsoidon*; *Euglena*; *Franceia*; *Fragilaria*, including *F. crotonensis*; *Gleocapsa*; *Gloeothamnion*; *Hymenomonas*; *Isochrysis*, including *I. aff galbana* and *I. galbana*; *Lepocinclis*; *Micractinium* (including UTEX LB 2614); *Monoraphidium*, including *M. minutum*; *Monoraphidium*; *Nannochloris*; *Nannochloropsis*, including *N. salina*; *Navicula*, including *N. acceptata*, *N. biskanterae*, *N. pseudotenelloides*, *N. pelliculosa*, and *N. saprophila*; *Neochloris oleabundans*; *Nephrochloris*; *Nephroselmis*; *Nitschia communis*; *Nitzschia*, including *N. alexandrina*, *N. communis*, *N. dissipata*, *N. frustulum*, *N. hantzschiana*, *N. inconspicua*, *N. intermedia*, *N. microcephala*, *N. pusilla*, *N. pusilla elliptica*, *N. pusilla monoensis*, and *N. quadrangular*; *Ochromonas*; *Oocystis*, including *O. parva* and *O. pusilla*; *Oscillatoria*, including *O. limnetica* and *O. subbrevis*; *Parachlorella*, including *P. beijerinckii* (including strain SAG 2046) and *P. kessleri* (including any of SAG strains 11.80, 14.82, 21.11H9); *Pascheria*, including *P. acidophila*; *Pavlova*; *Phagus*; *Phormidium*; *Platymonas*; *Pleurochrysis*, including *P. carterae* and *P. dentate*; *Prototheca*, including *P. stagnora* (including UTEX 327), *P. portoricensis*, and *P. moriformis* (including UTEX strains 1441, 1435, 1436, 1437, 1439); *Pseudochlorella aquatica*; *Pyramimonas*; *Pyrobotrys*; *Rhodococcus opacus*; *Sarcinoid chrysophyte*; *Scenedesmus*, including *S. armatus* and *S. rubescens*; *Schizochytrium*; *Spirogyra*; *Spirulina platensis*; *Stichococcus*; *Synechococcus*; *Tetraedron*; *Tetraselmis*, including *T. suecica*; *Thalassiosira weissflogii*; and *Viridiella fridericiana*.

In some embodiments, food compositions and food ingredients such as algal flour is derived from algae having at least 90% 23S rRNA genomic sequence identity to one or more sequences selected from the group consisting of SEQ ID NO:1, SEQ ID NO:2, SEQ ID NO:3, SEQ ID NO:4, SEQ ID NO:5, SEQ ID NO:6, SEQ ID NO:7, SEQ ID NO:8, SEQ ID NO:9, SEQ ID NO:10, SEQ ID NO:11, SEQ ID NO:12, SEQ ID NO:13, SEQ ID NO:14, SEQ ID NO:15, SEQ ID NO:16, SEQ ID NO:17, SEQ ID NO:18, SEQ ID NO:19, SEQ ID NO:20, SEQ ID NO:21, SEQ ID NO:22, SEQ ID NO:23, SEQ ID NO:26 and SEQ ID NO:27.

B. Methods of Generating a Microalgae Strain Lacking or that has Significantly Reduced Pigmentation Microalgae, such as *Chlorella*, can be capable of either photosynthetic or heterotrophic growth. When grown in heterotrophic conditions where the carbon source is a fixed carbon source and in the absence of light, the normally green colored microalgae has a yellow color, lacking or is significantly reduced in green pigmentation. Microalgae of reduced (or lacking in) green pigmentation can be advantageous as a food ingredient. One advantage of microalgae of reduced (or is lacking) in green pigmentation is that the microalgae has a reduced chlorophyll flavor. Another advantage of microalgae of reduced (or is lacking in) green pigmentation is that as a food ingredient, the addition of the microalgae to foodstuffs will not impart a green color that can be unappealing to the consumer. The reduced green pigmentation of microalgae grown under heterotrophic conditions is transient. When switched back to phototrophic growth, microalgae capable of both phototrophic and heterotrophic growth will regain the green pigmentation. Additionally, even with reduced green pigments, heterotrophically grown microalgae is a yellow color and this may be unsuitable for some food applications where the consumer expects the color of the foodstuff to be white or light in color. Thus, it is advantageous to generate a microalgae strain that is capable of heterotrophic growth (so it is reduced or lacking in green pigmentation) and is also reduced in yellow pigmentation (so that it is a neutral color for food applications).

One method for generating such microalgae strain lacking in or has significantly reduced pigmentation is through mutagenesis and then screening for the desired phenotype. Several methods of mutagenesis are known and practiced in the art. For example, Urano et al., (Urano et al., *J Bioscience Bioengineering* (2000) v. 90(5): pp. 567-569) describes yellow and white color mutants of *Chlorella ellipsoidea* generated using UV irradiation. Kamiya (Kamiya, *Plant Cell Physiol*. (1989) v. 30(4): 513-521) describes a colorless strain of *Chlorella vulgaris*, 11 h (M125).

In addition to mutagenesis by UV irradiation, chemical mutagenesis can also be employed in order to generate microalgae with reduced (or lacking in) pigmentation. Chemical mutagens such as ethyl methanesulfonate (EMS) or N-methyl-N'nitro-N-nitroguanidine (NTG) have been shown to be effective chemical mutagens on a variety of microbes including yeast, fungi, mycobacterium and microalgae. Mutagenesis can also be carried out in several rounds, where the microalgae is exposed to the mutagen (either UV or chemical or both) and then screened for the desired reduced pigmentation phenotype. Colonies with the desired phenotype are then streaked out on plates and reisolated to ensure that the mutation is stable from one generation to the next and that the colony is pure and not of a mixed population.

In a particular example, *Chlorella protothecoides* was used to generate strains lacking in or with reduced pigmentation using a combination of UV and chemical mutagenesis. *Chlorella protothecoides* was exposed to a round of chemical mutagenesis with NTG and colonies were screened for color mutants. Colonies not exhibiting color mutations were then subjected to a round of UV irradiation and were again screened for color mutants. In one embodiment, a *Chlorella protothecoides* strain lacking in pigmentation was isolated and is *Chlorella protothecoides* 33-55, deposited on Oct. 13, 2009 at the American Type Culture Collection at 10801 University Boulevard, Manassas, VA 20110-2209, in accordance with the Budapest Treaty, with a Patent Deposit Designation of PTA-10397. In another embodiment, a *Chlorella protothecoides* strain with reduced pigmentation was isolated and is *Chlorella protothecoides* 25-32, deposited on Oct. 13, 2009 at the American Type Culture Collection at 10801 University Boulevard, Manassas, VA 20110-2209, in accordance with the Budapest Treaty, with a Patent Deposit Designation of PTA-10396.

C. Media and Culture Conditions for Microalgae

Microalgae are cultured in liquid media to propagate biomass in accordance with the methods of the invention. In the methods of the invention, microalgal species are grown in a medium containing a fixed carbon and/or fixed nitrogen source in the absence of light. Such growth is known as heterotrophic growth. For some species of microalgae, for example, heterotrophic growth for extended periods of time such as 10 to 15 or more days under limited nitrogen conditions results accumulation of high lipid content in cells.

Microalgal culture media typically contains components such as a fixed carbon source (discussed below), a fixed nitrogen source (such as protein, soybean meal, yeast extract, cornsteep liquor, ammonia (pure or in salt form), nitrate, or nitrate salt), trace elements (for example, zinc, boron, cobalt, copper, manganese, and molybdenum in, e.g., the respective forms of $ZnCl_2$, $H_3BO_3$, $CoCl_2 \cdot 6H_2O$, $CuCl_2 \cdot 2H_2O$, $MnCl_2 \cdot 4H_2O$ and $(NH_4)_6Mo_7O_{24} \cdot 4H_2O$), optionally a buffer for pH maintenance, and phosphate (a source of phosphorous; other phosphate salts can be used). Other components include salts such as sodium chloride, particularly for seawater microalgae.

In a particular example, a medium suitable for culturing *Chlorella protothecoides* comprises Proteose Medium. This medium is suitable for axenic cultures, and a 1 L volume of the medium (pH~6.8) can be prepared by addition of 1 g of proteose peptone to 1 liter of Bristol Medium. Bristol medium comprises 2.94 mM $NaNO_3$, 0.17 mM $CaCl_2.2H_2O$, 0.3 mM $MgSO_4.7H_2O$, 0.43 mM, 1.29 mM $KH_2PO_4$, and 1.43 mM NaCl in an aqueous solution. For 1.5% agar medium, 15 g of agar can be added to 1 L of the solution. The solution is covered and autoclaved, and then stored at a refrigerated temperature prior to use. Other methods for the growth and propagation of *Chlorella protothecoides* to high oil levels as a percentage of dry weight have been described (see for example Miao and Wu, *J. Biotechnology,* 2004, 11:85-93 and Miao and Wu, Biosource Technology (2006) 97:841-846 (demonstrating fermentation methods for obtaining 55% oil dry cell weight)). High oil algae can typically be generated by increasing the length of a fermentation while providing an excess of carbon source under nitrogen limitation.

Solid and liquid growth media are generally available from a wide variety of sources, and instructions for the preparation of particular media that is suitable for a wide variety of strains of microorganisms can be found, for example, online at http://www.utex.org/, a site maintained by the University of Texas at Austin for its culture collection of algae (UTEX). For example, various fresh water media include ½, ⅓, ⅕, 1×, ⅔, 2×CHEV Diatom Medium; 1:1 DYIII/PEA+Gr+; Ag Diatom Medium; Allen Medium; BG11-1 Medium; Bold 1NV and 3N Medium; *Botryococcus* Medium; Bristol Medium; Chu's Medium; CR1, CR1-S, and CR1+ Diatom Medium; Cyanidium Medium; Cyanophycean Medium; Desmid Medium; DYIII Medium; Euglena Medium; HEPES Medium; J Medium; Malt Medium; MES Medium; Modified Bold 3N Medium; Modified COMBO Medium; N/20 Medium; Ochromonas Medium; P49 Medium; Polytomella Medium; Proteose Medium; Snow Algae Media; Soil Extract Medium; Soilwater: BAR, GR−, GR−/NH4, GR+, GR+/NH4, PEA, Peat, and VT Medium; *Spirulina* Medium; Tap Medium; Trebouxia Medium; Volvocacean Medium; Volvocacean-3N Medium; Volvox Medium; Volvox-Dextrose Medium; Waris Medium; and Waris+Soil Extract Medium. Various Salt Water Media include: 1%, 5%, and 1×F/2 Medium; ½, 1×, and 2× Erdschreiber's Medium; ½, ⅓, ¼, ⅕, 1×, 5/3, and 2× Soil+Seawater Medium; ¼ ERD; ⅔ Enriched Seawater Medium; 20% Allen+80% ERD; Artificial Seawater Medium; BG11-1+0.36% NaCl Medium; BG11-1+1% NaCl Medium; Bold 1NV:Erdshreiber (1:1) and (4:1); Bristol-NaCl Medium; Dasycladales Seawater Medium; ½ and 1× Enriched Seawater Medium, including ES/10, ES/2, and ES/4; F/2+NH4; LDM Medium; Modified 1× and 2×CHEV; Modified 2×CHEV+Soil; Modified Artificial Seawater Medium; Porphridium Medium; and SS Diatom Medium.

Other suitable media for use with the methods of the invention can be readily identified by consulting the URL identified above, or by consulting other organizations that maintain cultures of microorganisms, such as SAG, CCAP, or CCALA. SAG refers to the Culture Collection of Algae at the University of Gottingen (Gottingen, Germany), CCAP refers to the culture collection of algae and protozoa managed by the Scottish Association for Marine Science (Scotland, United Kingdom), and CCALA refers to the culture collection of algal laboratory at the Institute of Botany (Třeboň, Czech Republic).

Microorganisms useful in accordance with the methods of the present invention are found in various locations and environments throughout the world. As a consequence of their isolation from other species and their resulting evolutionary divergence, the particular growth medium for optimal growth and generation of oil and/or lipid and/or protein from any particular species of microbe can be difficult or impossible to predict, but those of skill in the art can readily find appropriate media by routine testing in view of the disclosure herein. In some cases, certain strains of microorganisms may be unable to grow on a particular growth medium because of the presence of some inhibitory component or the absence of some essential nutritional requirement required by the particular strain of microorganism. The examples below provide exemplary methods of culturing various species of microalgae to accumulate high levels of lipid as a percentage of dry cell weight.

The fixed carbon source is a key component of the medium. Suitable fixed carbon sources for purposes of the present invention, include, for example, glucose, fructose, sucrose, galactose, xylose, mannose, rhamnose, arabinose, N-acetylglucosamine, glycerol, floridoside, glucuronic acid, and/or acetate. Other carbon sources for culturing microalgae in accordance with the present invention include mixtures, such as mixtures of glycerol and glucose, mixtures of glucose and xylose, mixtures of fructose and glucose, and mixtures of sucrose and depolymerized sugar beet pulp. Other carbon sources suitable for use in culturing microalgae include, black liquor, corn starch, depolymerized cellulosic material (derived from, for example, corn stover, sugar beet pulp, and switchgrass, for example), lactose, milk whey, molasses, potato, rice, sorghum, sucrose, sugar beet, sugar cane, and wheat. The one or more carbon source(s) can be supplied at a concentration of at least about 50 µM, at least about 100 µM, at least about 500 µM, at least about 5 mM, at least about 50 mM, and at least about 500 mM.

Thus, in various embodiments, the fixed carbon energy source used in the growth medium comprises glycerol and/or 5- and/or 6-carbon sugars, such as glucose, fructose, and/or xylose, which can be derived from sucrose and/or cellulosic material, including depolymerized cellulosic material. Multiple species of *Chlorella* and multiple strains within a species can be grown in the presence of sucrose, depolymerized cellulosic material, and glycerol, as described in US Patent Application Publication Nos. 20090035842, 20090011480, 20090148918, respectively, and see also, PCT Patent Application Publication No. 2008/151149, each of which is incorporated herein by reference.

Thus, in one embodiment of the present invention, microorganisms are cultured using depolymerized cellulosic biomass as a feedstock. As opposed to other feedstocks, such as corn starch or sucrose from sugar cane or sugar beets, cellulosic biomass (depolymerized or otherwise) is not suitable for human consumption and could potentially be available at low cost, which makes it especially advantageous for purposes of the present invention. Microalgae can proliferate on depolymerized cellulosic material. Cellulosic materials generally include cellulose at 40-60% dry weight; hemicellulose at 20-40% dry weight; and lignin at 10-30% dry weight. Suitable cellulosic materials include residues from herbaceous and woody energy crops, as well as agricultural crops, i.e., the plant parts, primarily stalks and leaves, not removed from the fields with the primary food or fiber product. Examples include agricultural wastes such as sugarcane bagasse, rice hulls, corn fiber (including stalks, leaves, husks, and cobs), wheat straw, rice straw, sugar beet pulp, citrus pulp, citrus peels; forestry wastes such as hardwood and softwood thinnings, and hardwood and softwood residues from timber operations; wood wastes such as saw mill wastes (wood chips, sawdust) and pulp mill waste; urban wastes such as paper fractions of municipal solid waste, urban wood waste and urban green waste such as municipal grass clippings; and wood construction waste. Additional cellulosics include dedicated cellulosic crops such as switchgrass, hybrid poplar wood, and *miscanthus*, fiber cane, and fiber sorghum. Five-carbon sugars that are produced from such materials include xylose. Example 20 describes *Chlorella protothecoides* successfully being cultivated under heterotrophic conditions using cellulosic-derived sugars from cornstover and sugar beet pulp.

Some microbes are able to process cellulosic material and directly utilize cellulosic materials as a carbon source. However, cellulosic material typically needs to be treated to increase the accessible surface area or for the cellulose to be first broken down as a preparation for microbial utilization as a carbon source. Ways of preparing or pretreating cellulosic material for enzyme digestion are well known in the art. The methods are divided into two main categories: (1) breaking apart the cellulosic material into smaller particles in order to increase the accessible surface area; and (2) chemically treating the cellulosic material to create a useable substrate for enzyme digestion.

Methods for increasing the accessible surface area include steam explosion, which involves the use of steam at high temperatures to break apart cellulosic materials. Because of the high temperature requirement of this process, some of the sugars in the cellulosic material may be lost, thus reducing the available carbon source for enzyme digestion (see for example, Chahal, D. S. et al., *Proceedings of the 2$^{nd}$ World Congress of Chemical Engineering*; (1981) and Kaar et al., *Biomass and Bioenergy* (1998) 14(3): 277-87). Ammonia explosion allows for explosion of cellulosic material at a lower temperature, but is more costly to perform, and the ammonia might interfere with subsequent enzyme digestion processes (see for example, Dale, B. E. et al., *Biotechnology and Bioengineering* (1982); 12: 31-43). Another explosion technique involves the use of supercritical carbon dioxide explosion in order to break the cellulosic material into smaller fragments (see for example, Zheng et al., *Biotechnology Letters* (1995); 17(8): 845-850).

Methods for chemically treating the cellulosic material to create useable substrates for enzyme digestion are also known in the art. U.S. Pat. No. 7,413,882 describes the use of genetically engineered microbes that secrete beta-glucosidase into the fermentation broth and treating cellulosic material with the fermentation broth to enhance the hydrolysis of cellulosic material into glucose. Cellulosic material can also be treated with strong acids and bases to aid subsequent enzyme digestion. U.S. Pat. No. 3,617,431 describes the use of alkaline digestion to break down cellulosic materials.

*Chlorella* can proliferate on media containing combinations of xylose and glucose, such as depolymerized cellulosic material, and surprisingly, some species even exhibit higher levels of productivity when cultured on a combination of glucose and xylose than when cultured on either glucose or xylose alone. Thus, certain microalgae can both utilize an otherwise inedible feedstock, such as cellulosic material (or a pre-treated cellulosic material) or glycerol, as a carbon source and produce edible oils. This allows conversion of inedible cellulose and glycerol, which are normally not part of the human food chain (as opposed to corn glucose and sucrose from sugar cane and sugar beet) into high nutrition, edible oils, which can provide nutrients and calories as part of the daily human diet. Thus, the invention provides methods for turning inedible feedstock into high nutrition edible oils, food products, and food compositions.

Microalgae co-cultured with an organism expressing a secretable sucrose invertase or cultured in media containing a sucrose invertase or expressing an exogenous sucrose invertase gene (where the invertase is either secreted or the organism also expresses a sucrose transporter) can proliferate on waste molasses from sugar cane or other sources of sucrose. The use of such low-value, sucrose-containing waste products can provide significant cost savings in the production of edible oils. Thus, the methods of cultivating microalgae on a sucrose feedstock and formulating food compositions and nutritional supplements, as described herein, provide a means to convert low-nutrition sucrose into high nutrition oils (oleic acid, DHA, ARA, etc.) and biomass containing such oils.

As detailed in the above-referenced patent publications, multiple distinct *Chlorella* species and strains proliferate very well on not only purified reagent-grade glycerol, but also on acidulated and non-acidulated glycerol byproducts from biodiesel transesterification. Surprisingly, some *Chlorella* strains undergo cell division faster in the presence of glycerol than in the presence of glucose. Two-stage growth processes, in which cells are first fed glycerol to increase cell density rapidly and then fed glucose to accumulate lipids, can improve the efficiency with which lipids are produced.

Another method to increase lipid as a percentage of dry cell weight involves the use of acetate as the feedstock for the microalgae. Acetate feeds directly into the point of metabolism that initiates fatty acid synthesis (i.e., acetyl-CoA); thus providing acetate in the culture can increase fatty acid production. Generally, the microbe is cultured in the presence of a sufficient amount of acetate to increase microbial lipid and/or fatty acid yield, specifically, relative to the yield in the absence of acetate. Acetate feeding is a useful component of the methods provided herein for generating microalgal biomass that has a high percentage of dry cell weight as lipid.

In another embodiment, lipid yield is increased by culturing a lipid-producing microalgae in the presence of one or more cofactor(s) for a lipid pathway enzyme (e.g., a fatty acid synthetic enzyme). Generally, the concentration of the cofactor(s) is sufficient to increase microbial lipid (e.g., fatty acid) yield over microbial lipid yield in the absence of the cofactor(s). In particular embodiments, the cofactor(s) is provided to the culture by including in the culture a microbe secreting the cofactor(s) or by adding the cofactor(s) to the culture medium. Alternatively, the microalgae can be engineered to express an exogenous gene that encodes a protein that participates in the synthesis of the cofactor. In certain embodiments, suitable cofactors include any vitamin required by a lipid pathway enzyme, such as, for example, biotin or pantothenate.

High lipid biomass from microalgae is an advantageous material for inclusion in food products compared to low lipid biomass, because it allows for the addition of less microalgal biomass to incorporate the same amount of lipid into a food composition. This is advantageous, because healthy oils from high lipid microalgae can be added to food products without altering other attributes such as texture and taste compared with low lipid biomass. The lipid-rich biomass provided by the methods of the invention typically has at least 25% lipid by dry cell weight. Process conditions can be adjusted to increase the percentage weight of cells that is lipid. For example, in certain embodiments, a microalgae is cultured in the presence of a limiting concentration of one or more nutrients, such as, for example, nitrogen, phosphorous, or sulfur, while providing an excess of a fixed carbon source, such as glucose. Nitrogen limitation tends to increase microbial lipid yield over microbial lipid yield in a culture in which nitrogen is provided in excess. In particular embodiments, the increase in lipid yield is at least about 10%, 50%, 100%, 200%, or 500%. The microbe can be cultured in the presence of a limiting amount of a nutrient for a portion of the total culture period or for the entire period. In some embodiments, the nutrient concentration is cycled between a limiting concentration and a non-limiting concentration at least twice during the total culture period.

In a steady growth state, the cells accumulate oil but do not undergo cell division. In one embodiment of the invention, the growth state is maintained by continuing to provide all components of the original growth media to the cells with the exception of a fixed nitrogen source. Cultivating microalgal cells by feeding all nutrients originally provided to the cells except a fixed nitrogen source, such as through feeding the cells for an extended period of time, results in a higher percentage of lipid by dry cell weight.

In other embodiments, high lipid biomass is generated by feeding a fixed carbon source to the cells after all fixed nitrogen has been consumed for extended periods of time, such as at least one or two weeks. In some embodiments, cells are allowed to accumulate oil in the presence of a fixed carbon source and in the absence of a fixed nitrogen source for over 20 days. Microalgae grown using conditions described herein or otherwise known in the art can comprise at least about 20% lipid by dry weight, and often comprise 35%, 45%, 55%, 65%, and even 75% or more lipid by dry weight. Percentage of dry cell weight as lipid in microbial lipid production can therefore be improved by holding cells in a heterotrophic growth state in which they consume carbon and accumulate oil but do not undergo cell division.

High protein biomass from algae is another advantageous material for inclusion in food products. The methods of the invention can also provide biomass that has at least 30% of its dry cell weight as protein. Growth conditions can be adjusted to increase the percentage weight of cells that is protein. In a preferred embodiment, a microalgae is cultured in a nitrogen rich environment and an excess of fixed carbon energy such as glucose or any of the other carbon sources discussed above. Conditions in which nitrogen is in excess tends to increase microbial protein yield over microbial protein yield in a culture in which nitrogen is not provided in excess. For maximal protein production, the microbe is preferably cultured in the presence of excess nitrogen for the total culture period. Suitable nitrogen sources for microalgae may come from organic nitrogen sources and/or inorganic nitrogen sources.

Organic nitrogen sources have been used in microbial cultures since the early 1900s. The use of organic nitrogen sources, such as corn steep liquor was popularized with the production of penicillin from mold. Researchers found that the inclusion of corn steep liquor in the culture medium increased the growth of the microoranism and resulted in an increased yield in products (such as penicillin). An analysis of corn steep liquor determined that it was a rich source of nitrogen and also vitamins such as B-complex vitamins, riboflavin panthothenic acid, niacin, inositol and nutrient minerals such as calcium, iron, magnesium, phosphorus and potassium (Ligget and Koffler, *Bacteriological Reviews* (1948); 12(4): 297-311). Organic nitrogen sources, such as corn steep liquor, have been used in fermentation media for yeasts, bacteria, fungi and other microorganisms. Non-limiting examples of organic nitrogen sources are yeast extract, peptone, corn steep liquor and corn steep powder. Non-limiting examples of preferred inorganic nitrogen sources include, for example, and without limitation, $(NH_4)_2SO_4$ and $NH_4OH$. In one embodiment, the culture media for carrying out the invention contains only inorganic nitrogen sources. In another embodiment, the culture media for carrying out the invention contains only organic nitrogen sources. In yet another embodiment, the culture media for carrying out the invention contains a mixture of organic and inorganic nitrogen sources.

In the methods of the invention, a bioreactor or fermentor is used to culture microalgal cells through the various phases of their physiological cycle. As an example, an inoculum of lipid-producing microalgal cells is introduced into the medium; there is a lag period (lag phase) before the cells begin to propagate. Following the lag period, the propagation rate increases steadily and enters the log, or exponential, phase. The exponential phase is in turn followed by a slowing of propagation due to decreases in nutrients such as nitrogen, increases in toxic substances, and quorum sensing mechanisms. After this slowing, propagation stops, and the cells enter a stationary phase or steady growth state, depending on the particular environment provided to the cells. For obtaining protein rich biomass, the culture is typically harvested during or shortly after then end of the exponential phase. For obtaining lipid rich biomass, the culture is typically harvested well after then end of the exponential phase, which may be terminated early by allowing nitrogen or another key nutrient (other than carbon) to become depleted, forcing the cells to convert the carbon sources, present in excess, to lipid. Culture condition parameters can be manipulated to optimize total oil production, the combination of lipid species produced, and/or production of a specific oil.

Bioreactors offer many advantages for use in heterotrophic growth and propagation methods. As will be appreciated, provisions made to make light available to the cells in photosynthetic growth methods are unnecessary when using a fixed-carbon source in the heterotrophic growth and propagation methods described herein. To produce biomass for use in food, microalgae are preferably fermented in large quantities in liquid, such as in suspension cultures as an example. Bioreactors such as steel fermentors (5000 liter, 10,000 liter, 40,000 liter, and higher are used in various embodiments of the invention) can accommodate very large culture volumes. Bioreactors also typically allow for the control of culture conditions such as temperature, pH, oxygen tension, and carbon dioxide levels. For example, bioreactors are typically configurable, for example, using ports attached to tubing, to allow gaseous components, like oxygen or nitrogen, to be bubbled through a liquid culture.

Bioreactors can be configured to flow culture media though the bioreactor throughout the time period during which the microalgae reproduce and increase in number. In some embodiments, for example, media can be infused into the bioreactor after inoculation but before the cells reach a desired density. In other instances, a bioreactor is filled with culture media at the beginning of a culture, and no more culture media is infused after the culture is inoculated. In other words, the microalgal biomass is cultured in an aqueous medium for a period of time during which the microalgae reproduce and increase in number; however, quantities of aqueous culture medium are not flowed through the bioreactor throughout the time period. Thus in some embodiments, aqueous culture medium is not flowed through the bioreactor after inoculation.

Bioreactors equipped with devices such as spinning blades and impellers, rocking mechanisms, stir bars, means for pressurized gas infusion can be used to subject microalgal cultures to mixing. Mixing may be continuous or intermittent. For example, in some embodiments, a turbulent flow regime of gas entry and media entry is not maintained for reproduction of microalgae until a desired increase in number of said microalgae has been achieved.

As briefly mentioned above, bioreactors are often equipped with various ports that, for example, allow the gas content of the culture of microalgae to be manipulated. To illustrate, part of the volume of a bioreactor can be gas rather than liquid, and the gas inlets of the bioreactor to allow pumping of gases into the bioreactor. Gases that can be beneficially pumped into a bioreactor include air, air/$CO_2$ mixtures, noble gases, such as argon, and other gases. Bioreactors are typically equipped to enable the user to control the rate of entry of a gas into the bioreactor. As noted above, increasing gas flow into a bioreactor can be used to increase mixing of the culture.

Increased gas flow affects the turbidity of the culture as well. Turbulence can be achieved by placing a gas entry port below the level of the aqueous culture media so that gas entering the bioreactor bubbles to the surface of the culture. One or more gas exit ports allow gas to escape, thereby preventing pressure buildup in the bioreactor. Preferably a gas exit port leads to a "one-way" valve that prevents contaminating microorganisms from entering the bioreactor.

The specific examples of bioreactors, culture conditions, and heterotrophic growth and propagation methods described herein can be combined in any suitable manner to improve efficiencies of microbial growth and lipid and/or protein production.

D. Concentration of Microalgae after Fermentation

Microalgal cultures generated according to the methods described above yield microalgal biomass in fermentation media. To prepare the biomass for use as a food composition, the biomass is concentrated, or harvested, from the fermentation medium. At the point of harvesting the microalgal biomass from the fermentation medium, the biomass comprises predominantly intact cells suspended in an aqueous culture medium. To concentrate the biomass, a dewatering step is performed. Dewatering or concentrating refers to the separation of the biomass from fermentation broth or other liquid medium and so is solid-liquid separation. Thus, during dewatering, the culture medium is removed from the biomass (for example, by draining the fermentation broth through a filter that retains the biomass), or the biomass is otherwise removed from the culture medium. Common processes for dewatering include centrifugation, filtration, and the use of mechanical pressure. These processes can be used individually or in any combination.

Centrifugation involves the use of centrifugal force to separate mixtures. During centrifugation, the more dense components of the mixture migrate away from the axis of the centrifuge, while the less dense components of the mixture migrate towards the axis. By increasing the effective gravitational force (i.e., by increasing the centrifugation speed), more dense material, such as solids, separate from the less dense material, such as liquids, and so separate out according to density. Centrifugation of biomass and broth or other aqueous solution forms a concentrated paste comprising the microalgal cells. Centrifugation does not remove significant amounts of intracellular water. In fact, after centrifugation, there may still be a substantial amount of surface or free moisture in the biomass (e.g., upwards of 70%), so centrifugation is not considered to be a drying step.

Filtration can also be used for dewatering. One example of filtration that is suitable for the present invention is tangential flow filtration (TFF), also known as cross-flow filtration. Tangential flow filtration is a separation technique that uses membrane systems and flow force to separate solids from liquids. For an illustrative suitable filtration method, see Geresh, Carb. Polym. 50; 183-189 (2002), which describes the use of a MaxCell A/G Technologies 0.45 uM hollow fiber filter. Also see, for example, Millipore Pellicon® devices, used with 100 kD, 300 kD, 1000 kD (catalog number P2C01MC01), 0.1 uM (catalog number P2HVMPV01), 0.22 uM (catalog number P2GVPPV01), and 0.45 uM membranes (catalog number P2HVMPV01). The retentate preferably does not pass through the filter at a significant level, and the product in the retentate preferably does not adhere to the filter material. TFF can also be performed using hollow fiber filtration systems. Filters with a pore size of at least about 0.1 micrometer, for example about 0.12, 0.14, 0.16, 0.18, 0.2, 0.22, 0.45, or at least about 0.65 micrometers, are suitable. Preferred pore sizes of TFF allow solutes and debris in the fermentation broth to flow through, but not microbial cells.

Dewatering can also be effected with mechanical pressure directly applied to the biomass to separate the liquid fermentation broth from the microbial biomass sufficient to dewater the biomass but not to cause predominant lysis of cells. Mechanical pressure to dewater microbial biomass can be applied using, for example, a belt filter press. A belt filter press is a dewatering device that applies mechanical pressure to a slurry (e.g., microbial biomass taken directly from the fermentor or bioreactor) that is passed between the two tensioned belts through a serpentine of decreasing diameter rolls. The belt filter press can actually be divided into three zones: the gravity zone, where free draining water/liquid is drained by gravity through a porous belt; a wedge zone, where the solids are prepared for pressure application; and a pressure zone, where adjustable pressure is applied to the gravity drained solids.

After concentration, microalgal biomass can be processed, as described hereinbelow, to produce vacuum-packed cake, algal flakes, algal homogenate, algal powder, algal flour, or algal oil.

E. Chemical Composition of Microalgal Biomass

The microalgal biomass generated by the culture methods described herein comprises microalgal oil and/or protein as well as other constituents generated by the microorganisms or incorporated by the microorganisms from the culture medium during fermentation.

Microalgal biomass with a high percentage of oil/lipid accumulation by dry weight has been generated using different methods of culture, including methods known in the art. Microalgal biomass with a higher percentage of accumulated oil/lipid is useful in accordance with the present invention. *Chlorella vulgaris* cultures with up to 56.6% lipid by dry cell weight (DCW) in stationary cultures grown under autotrophic conditions using high iron (Fe) concentrations have been described (Li et al., *Bioresource Technology* 99(11):4717-22 (2008). *Nanochloropsis* sp. and *Chaetoceros calcitrans* cultures with 60% lipid by DCW and 39.8% lipid by DCW, respectively, grown in a photobioreactor under nitrogen starvation conditions have also been described (Rodolfi et al., *Biotechnology & Bioengineering* (2008)). Parietochloris incise cultures with approximately 30% lipid by DCW when grown phototropically and under low nitrogen conditions have been described (Solovchenko et al., *Journal of Applied Phycology* 20:245-251 (2008). *Chlorella protothecoides* can produce up to 55% lipid by DCW when grown under certain heterotrophic conditions with nitrogen starvation (Miao and Wu, *Bioresource Technology* 97:841-846 (2006)). Other *Chlorella* species, including *Chlorella emersonii*, *Chlorella sorokiniana* and *Chlorella minutissima* have been described to have accumulated up to 63% oil by DCW when grown in stirred tank bioreactors under low-nitrogen media conditions (Illman et al., *Enzyme and Microbial Technology* 27:631-635 (2000). Still higher percent lipid by DCW has been reported, including 70% lipid in *Dumaliella tertiolecta* cultures grown in increased NaCl conditions (Takagi et al., *Journal of Bioscience and Bioengineering* 101(3): 223-226 (2006)) and 75% lipid in *Botryococcus braunii* cultures (Banerjee et al., *Critical Reviews in Biotechnology* 22(3): 245-279 (2002)).

Heterotrophic growth results in relatively low chlorophyll content (as compared to phototrophic systems such as open ponds or closed photobioreactor systems). Reduced chlorophyll content generally improves organoleptic properties of microalgae and therefore allows more algal biomass (or oil prepared therefrom) to be incorporated into a food product. The reduced chlorophyll content found in heterotrophically grown microalgae (e.g., *Chlorella*) also reduces the green color in the biomass as compared to phototrophically grown microalgae. Thus, the reduced chlorophyll content avoids an often undesired green coloring associated with food products containing phototrophically grown microalgae and allows for the incorporation or an increased incorporation of algal biomass into a food product. In at least one embodiment, the food product contains heterotrophically grown microalgae of reduced chlorophyll content compared to phototrophically grown microalgae. In some embodiments the chlorophyll content of microalgal flour is less than 5 ppm, less than 2 ppm, or less than 1 ppm.

Oil rich microalgal biomass generated by the culture methods described herein and useful in accordance with the present invention comprises at least 10% microalgal oil by DCW. In some embodiments, the microalgal biomass comprises at least 15%, 25-35%, 30-50%, 50-55%, 50-65%, 54-62%, 56-60%, at least 75% or at least 90% microalgal oil by DCW.

The microalgal oil of the biomass described herein (or extracted from the biomass) can comprise glycerolipids with one or more distinct fatty acid ester side chains. Glycerolipids are comprised of a glycerol molecule esterified to one, two, or three fatty acid molecules, which can be of varying lengths and have varying degrees of saturation. Specific blends of algal oil can be prepared either within a single species of algae, or by mixing together the biomass (or algal oil) from two or more species of microalgae.

Thus, the oil composition, i.e., the properties and proportions of the fatty acid constituents of the glycerolipids, can also be manipulated by combining biomass (or oil) from at least two distinct species of microalgae. In some embodiments, at least two of the distinct species of microalgae have different glycerolipid profiles. The distinct species of microalgae can be cultured together or separately as described herein, preferably under heterotrophic conditions, to generate the respective oils. Different species of microalgae can contain different percentages of distinct fatty acid constituents in the cell's glycerolipids.

In some embodiments, the microalgal oil is primarily comprised of monounsaturated oil such as 18:1 (oleic) oil, particularly in triglyceride form. In some cases, the algal oil is at least 20% monounsaturated oil by weight. In various embodiments, the algal oil is at least 25%, 50%, 75% or more monounsaturated oil such as 18:1 by weight or by volume. In some embodiments, the monounsaturated oil is 18:1, 16:1, 14:1 or 12:1. In some cases, the algal oil is 60-75%, 64-70%, or 65-69% 18:1 oil. In some embodiments, the microalgal oil comprises at least 10%, 20%, 25%, or 50% or more esterified oleic acid or esterified alpha-linolenic acid by weight of by volume (particularly in triglyceride form). In at least one embodiment, the algal oil comprises less than 10%, less than 5%, less than 3%, less than 2%, or less than 1% by weight or by volume, or is substantially free of, esterified docosahexanoic acid (DHA (22:6)) (particularly in triglyceride form). For examples of production of high DHA-containing microalgae, such as in *Crypthecodinium cohnii*, see U.S. Pat. Nos. 7,252,979, 6,812,009 and 6,372,460. In some embodiments, the lipid profile of extracted oil or oil in microalgal flour is less than 2% 14:0; 13-16% 16:0; 1-4% 18:0; 64-70% 18:1; 10-16% 18:2; 0.5-2.5% 18:3; and less than 2% oil of a carbon chain length 20 or longer.

High protein microalgal biomass has been generated using different methods of culture. Microalgal biomass with a higher percentage of protein content is useful in accordance with the present invention. For example, the protein content of various species of microalgae has been reported (see Table 1 of Becker, *Biotechnology Advances* (2007) 25:207-210). Controlling the renewal rate in a semi-continuous photoautotrophic culture of *Tetraselmis suecica* has been reported to affect the protein content per cell, the highest being approximately 22.8% protein (Fabregas, et al., *Marine Biotechnology* (2001) 3:256-263).

Microalgal biomass generated by culture methods described herein and useful in accordance to those embodiments of the present invention relating to high protein typically comprises at least 30% protein by dry cell weight. In some embodiments, the microalgal biomass comprises at least 40%, 50%, 75% or more protein by dry cell weight. In some embodiments, the microalgal biomass comprises from 30-75% protein by dry cell weight or from 40-60% protein by dry cell weight. In some embodiments, the protein in the microalgal biomass comprises at least 40% digestible crude protein. In other embodiments, the protein in the microalgal biomass comprises at least 50%, 60%, 70%, 80%, or at least 90% digestible crude protein. In some embodiments, the protein in the microalgal biomass comprises from 40-90% digestible crude protein, from 50-80% digestible crude protein, or from 60-75% digestible crude protein.

Microalgal biomass (and oil extracted therefrom), can also include other constituents produced by the microalgae, or incorporated into the biomass from the culture medium. These other constituents can be present in varying amounts depending on the culture conditions used and the species of microalgae (and, if applicable, the extraction method used to recover microalgal oil from the biomass). In general, the chlorophyll content in the high protein microalgal biomass is higher than the chlorophyll content in the high lipid microalgal biomass. In some embodiments, the chlorophyll content in the microalgal biomass is less than 200 ppm or less than 100 ppm. The other constituents can include, without limitation, phospholipids (e.g., algal lecithin), carbohydrates, soluble and insoluble fiber, glycoproteins, phytosterols (e.g., β-sitosterol, campesterol, stigmasterol, ergosterol, and brassicasterol), tocopherols, tocotrienols, carotenoids (e.g., α-carotene, β-carotene, and lycopene), xanthophylls (e.g., lutein, zeaxanthin, α-cryptoxanthin, and β-cryptoxanthin), proteins, polysaccharides (e.g., arabinose, mannose, galactose, 6-methyl galactose and glucose) and various organic or inorganic compounds (e.g., selenium).

In some cases, the biomass comprises at least 10 ppm selenium. In some cases, the biomass comprises at least 25% w/w algal polysaccharide. In some cases, the biomass comprises at least 15% w/w algal glycoprotein. In some cases, the biomass or oil derived from the biomass comprises between 0-200, 0-115, or 50-115 mcg/g total carotenoids, and in specific embodiments 20-70 or 50-60 mcg/g of the total carotenoid content is lutein. In some cases, the biomass comprises at least 0.5% algal phospholipids. In some cases, the biomass or oil derived from the algal biomass contains at least 0.10, 0.02-0.5, or 0.05-0.3 mg/g total tocotrienols, and in specific embodiments 0.05-0.25 mg/g is alpha tocotrienol. In some cases, the biomass or oil derived from the algal biomass contains between 0.125 mg/g to 0.35 mg/g total tocotrienols. In some cases, the oil derived from the algal biomass contains at least 5.0, 1-8, 2-6 or 3-5 mg/100 g total tocopherols, and in specific embodiments 2-6 mg/100 g is alpha tocopherol. In some cases, the oil derived from the algal biomass contains between 5.0 mg/100 g to 10 mg/100 g tocopherols.

In some cases the composition of other components of microalgal biomass is different for high protein biomass as compared to high lipid biomass. In specific embodiments, the high protein biomass contains between 0.18-0.79 mg/100 g of total tocopherol and in specific embodiments, the high protein biomass contains about 0.01-0.03 mg/g tocotrienols. In some cases, the high protein biomass also contains between 1-3 g/100 g total sterols, and in specific embodiments, 1.299-2.46 g/100 g total sterols. Detailed descriptions of tocotrienols and tocopherols composition in *Chlorella protothecoides* is included in the Examples below.

In some embodiments, the microalgal biomass comprises 20-45% carbohydrate by dry weight. In other embodiments, the biomass comprises 25-40% or 30-35% carbohydrate by dry weight. Carbohydrate can be dietary fiber as well as free sugars such as sucrose and glucose. In some embodiments the free sugar in microalgal biomass is 1-10%, 2-8%, or 3-6% by dry weight. In certain embodiments the free sugar component comprises sucrose.

In some cases, the microalgal biomass comprises at least 10% soluble fiber. In other embodiments, the microalgal biomass comprises at least 20% to 25% soluble fiber. In some embodiments, the microalgal biomass comprises at least 30% insoluble fiber. In other embodiments, the microalgal biomass comprises at least 50% to at least 70% insoluble fiber. Total dietary fiber is the sum of soluble fiber and insoluble fiber. In some embodiments, the microalgal biomass comprises at least 40% total dietary fiber. In other embodiments, the microalgal biomass comprises at least 50%, 55%, 60%, 75%, 80%, 90%, to 95% total dietary fiber.

In one embodiment the monosaccharide content of the total fiber (total carbohydrate minus free sugars) is 0.1-3% arabinose; 5-15% mannose; 15-35% galactose; and 50-70% glucose. In other embodiments the monosaccharide content of the total fiber is about 1-1.5% arabinose; about 10-12% mannose; about 22-28% galactose; and 55-65% glucose.

III. PROCESSING MICROALGAL BIOMASS INTO FINISHED FOOD INGREDIENTS

The concentrated microalgal biomass produced in accordance with the methods of the invention is itself a finished food ingredient and may be used in foodstuffs without further, or with only minimal, modification. For example, the cake can be vacuum-packed or frozen. Alternatively, the biomass may be dried via lyophilization, a "freeze-drying" process, in which the biomass is frozen in a freeze-drying chamber to which a vacuum is applied. The application of a vacuum to the freeze-drying chamber results in sublimation (primary drying) and desorption (secondary drying) of the water from the biomass. However, the present invention provides a variety of microalgal derived finished food ingredients with enhanced properties resulting from processing methods of the invention that can be applied to the concentrated microalgal biomass.

Drying the microalgal biomass, either predominantly intact or in homogenate form, is advantageous to facilitate further processing or for use of the biomass in the methods and compositions described herein. Drying refers to the removal of free or surface moisture/water from predominantly intact biomass or the removal of surface water from a slurry of homogenized (e.g., by micronization) biomass. Different textures and flavors can be conferred on food products depending on whether the algal biomass is dried, and if so, the drying method. Drying the biomass generated from the cultured microalgae described herein removes water that may be an undesirable component of finished food products or food ingredients. In some cases, drying the biomass may facilitate a more efficient microalgal oil extraction process.

In one embodiment, the concentrated microalgal biomass is drum dried to a flake form to produce algal flake, as described in part A of this section. In another embodiment, the concentrated microalgal biomass is spray or flash dried (i.e., subjected to a pneumatic drying process) to form a powder containing predominantly intact cells to produce algal powder, as described in part B of this section. In another embodiment, the concentrated microalgal biomass is micronized (homogenized) to form a homogenate of predominantly lysed cells that is then spray or flash dried to produce algal flour, as described in part C of this section. In another embodiment, oil is extracted from the concentrated microalgal biomass to form algal oil, as described in part D of this section.

In some embodiments, the flour, flake or powder is 15% or less, 10% or less, 5% or less, 2-6%, or 3-5% moisture by weight after drying.

A. Algal Flake

Algal flake of the invention is prepared from concentrated microalgal biomass that is applied as a film to the surface of a rolling, heated drum. The dried solids are then scraped off with a knife or blade, resulting in a small flakes. U.S. Pat. No. 6,607,900 describes drying microalgal biomass using a drum dryer without a prior centrifugation (concentration) step, and such a process may be used in accordance with the methods of the invention.

Because the biomass may be exposed to high heat during the drying process, it may be advantageous to add an antioxidant to the biomass prior to drying. The addition of an antioxidant will not only protect the biomass during drying, but also extend the shelf-life of the dried microalgal biomass when stored. In a preferred embodiment, an antioxidant is added to the microalgal biomass prior to subsequent processing such as drying or homogenization. Antioxidants that are suitable for use are discussed in detail below.

Additionally, if there is significant time between the production of the dewatered microalgal biomass and subsequent processing steps, it may be advantageous to pasteurize the biomass prior to drying. Free fatty acids from lipases may form if there is significant time between producing and drying the biomass. Pasteurization of the biomass inactivates these lipases and prevents the formation of a "soapy" flavor in the resulting dried biomass product. Thus, in one embodiment, the invention provides pasteurized microalgal biomass. In another embodiment, the pasteurized microalgal biomass is an algal flake.

B. Algal Powder

Algal powder (or microalgal powder) of the invention is prepared from concentrated microalgal biomass using a pneumatic or spray dryer (see for example U.S. Pat. No. 6,372,460). In a spray dryer, material in a liquid suspension is sprayed in a fine droplet dispersion into a current of heated air. The entrained material is rapidly dried and forms a dry powder. In some cases, a pulse combustion dryer can also be used to achieve a powdery texture in the final dried material. In other cases, a combination of spray drying followed by the use of a fluid bed dryer is used to achieve the optimal conditions for dried microbial biomass (see, for example, U.S. Pat. No. 6,255,505). As an alternative, pneumatic dryers can also be used in the production of algal powder. Pneumatic dryers draw or entrain the material that is to be dried in a stream of hot air. While the material is entrained in the hot air, the moisture is rapidly removed. The dried material is then separated from the moist air and the moist air is then recirculated for further drying.

C. Algal Flour

Algal flour of the invention is prepared from concentrated microalgal biomass that has been mechanically lysed and homogenized and the homogenate spray or flash dried into a powder form (or dried using another pneumatic drying system). The production of algal flour requires that cells be lysed to release their oil and that cell wall and intracellular components be micronized or at least reduced in particle size. The average size of particles measured immediately after homogenation or as soon is practical thereafter is preferably no more than 10, no more than 25, or no more than 100 µm. In some embodiments, the average particle size is 1-10, 1-15, 10-100 or 1-40 µm. In some embodiments, the average particle size is greater than 10 µm and up to 100 µm. In some embodiments, the average particle size is 0.1-100 µm.

As noted in discussion of micronization, and particularly if measured by a technique, such as laser diffraction, which measures clumps rather than individual particles, average size of particles are preferably measured immediately after homogenization has occurred or as soon as practical thereafter (e.g., within 2 weeks) to avoid or minimize potential distortions of measurement of particle size due to clumping. In practice, the emulsions resulting from homogenization can usually be stored at least two weeks in a refrigerator without material change in particle size. Some techniques for measuring particle size, such as laser diffraction, measure the size of clumps of particles rather than individual particles. The clumps of particles measured have a larger average size than individual particles (e.g., 1-100 microns). Light microscopy of microalgal flour dispersed in water shows both individual particles and clusters of particles (see FIG. 4). On dispersion of algal flour in water with sufficient blending (e.g., with a hand blender) but without repeating the original homogenization, the clumps can be broken down and laser diffraction can again usually detect an average particle size of no more than 10 µm. Software for automated size analysis of particles from electron micrographs is commercially available and can also be used for measuring particle size. Here as elsewhere, average particle size can refer to any art-recognized measure of an average, such as mean, geometric mean, median or mode. Particle size can be measured by any art-recognized measure including the longest dimension of a particle or the diameter of a particle of equivalent volume. Because particles are typically approximately spherical in shape, these measurements can be essentially the same.

Following homogenization, the resulting oil, water, and micronized particles are emulsified such that the oil does not separate from the dispersion prior to drying. For example, a pressure disrupter can be used to pump a cell containing slurry through a restricted orifice valve to lyse the cells. High pressure (up to 1500 bar) is applied, followed by an instant expansion through an exiting nozzle. Cell disruption is accomplished by three different mechanisms: impingement on the valve, high liquid shear in the orifice, and sudden pressure drop upon discharge, causing an explosion of the cell. The method releases intracellular molecules. A Niro (Niro Soavi GEA) homogenizer (or any other high pressure homogenizer) can be used to process cells to particles predominantly 0.2 to 5 microns in length. Processing of algal biomass under high pressure (approximately 1000 bar) typically lyses over 90% of the cells and reduces particle size to less than 5 microns.

Alternatively, a ball mill can be used. In a ball mill, cells are agitated in suspension with small abrasive particles, such as beads. Cells break because of shear forces, grinding between beads, and collisions with beads. The beads disrupt the cells to release cellular contents. In one embodiment, algal biomass is disrupted and formed into a stable emulsion using a Dyno-mill ECM Ultra (CB Mills) ball mill. Cells can also be disrupted by shear forces, such as with the use of blending (such as with a high speed or Waring blender as examples), the french press, or even centrifugation in case of weak cell walls, to disrupt cells. A suitable ball mill including specifics of ball size and blade is described in U.S. Pat. No. 5,330,913.

The immediate product of homogenization is a slurry of particles smaller in size than the original cells that is suspended in in oil and water. The particles represent cellular debris. The oil and water are released by the cells. Additional water may be contributed by aqueous media containing the cells before homogenization. The particles are preferably in the form of a micronized homogenate. If left to stand, some of the smaller particles may coalesce. However, an even dispersion of small particles can be preserved by seeding with a microcrystalline stabilizer, such as microcrystalline cellulose.

To form the algal flour, the slurry is spray or flash dried, removing water and leaving a dry powder-like material containing cellular debris and oil. Although the oil content of the flour (ie: disrupted cells as a powder-like material) can be at least 10, 25 or 50% by weight of the dry powder, the powder can have a dry rather than greasy feel and appearance (e.g., lacking visible oil) and can also flow freely when shaken. Various flow agents (including silica-derived products such as precipitated silica, fumed silica, calcium silicate, and sodium aluminum silicates) can also be added. Application of these materials to high fat, hygroscopic or sticky powders prevents caking post drying and in package, promotes free-flow of dry powders and can reduce sticking, build up and oxidation of materials on dryer surfaces. All are approved for food use at FDA designated maximum levels. After drying, the water or moisture content of the powder is typically less than 10%, 5%, 3% or 1% by weight. Other dryers such as pneumatic dryers or pulse combustion dryers can also be used to produce algal flour.

The oil content of algal flour can vary depending on the percent oil of the algal biomass. Algal flour can be produced from algal biomass of varying oil content. In certain embodiments, the algal flour is produced from algal biomass of the same oil content. In other embodiments, the algal flour is produced from algal biomass of different oil content. In the latter case, algal biomass of varying oil content can be combined and then the homogenization step performed. In other embodiments, algal flour of varying oil content is produced first and then blended together in various proportions in order to achieve an algal flour product that contains the final desired oil content. In a further embodiment, algal biomass of different lipid profiles can be combined together and then homogenized to produce algal flour. In another embodiment, algal flour of different lipid profiles is produced first and then blended together in various proportions in order to achieve an algal flour product that contains the final desired lipid profile.

The algal flour of the invention is useful for a wide range of food preparations. Because of the oil content, fiber content and the micronized particles, algal flour is a multi-functional food ingredient. Algal flour can be used in baked goods, quick breads, yeast dough products, egg products, dressing, sauces, nutritional beverages, algal milk, pasta and gluten free products. Gluten-free products can be made using algal flour and another gluten-free product such as amaranth flour, arrow root flour, buckwheat flour, rice flour, chickpea flour, cornmeal, maize flour, millet flour, potato flour, potato starch flour, quinoa flour, sorghum flour, soy flour, bean flour, legume flour, tapioca (cassava) flour, teff flour, artichoke flour, almond flour, acorn flour, coconut flour, chestnut flour, corn flour and taro flour. Algal flour, in combination with other gluten-free ingredients is useful in making gluten-free food products such as baked goods (cakes, cookie, brownies and cake-like products (e.g., muffins)), breads, cereal, crackers and pastas. Additional details of formulating these food products and more with algal flour is described in the Examples below.

Algal flour can be used in baked goods in place of convention fat sources (e.g., oil, butter or margarine) and eggs. Baked goods and gluten free products have superior moisture content and a cumb structure that is indistinguishable from conventional baked goods made with butter and eggs. Because of the superior moisture content, these baked goods have a longer shelf life and retain their original texture longer than conventional baked goods that are produced without algal flour.

The water activity (Aw) of a food can be an indicator of shelf-life retention in a prepared food product. Water activity (ranging from 0 to 1) is a measure of how efficiently the water present in a food product can take part in a chemical or physical reaction. The water activity of some common foods representing the spectrum of Aw are: fresh fruit/meat/milk (1.0-0.95); cheese (0.95-0.90); margarine (0.9-0.85); nuts (0.75-0.65); honey (0.65-0.60); salted meats (0.85-0.80); jam (0.8-7.5); pasta (0.5); cookies (0.3); and dried vegetables/crackers (0.2). Most bacteria will not grow at water activities below 0.91. Below 0.80 most molds cannot be grown and below 0.60 no microbiological growth is possible. By measuring water activity, it is possible to predict the potential sources of spoilage. Water activity can also play a significant role in determining the activity of enzymes and vitamins in foods, which can have a major impact in the food's color, taste and aroma.

Figure 6:
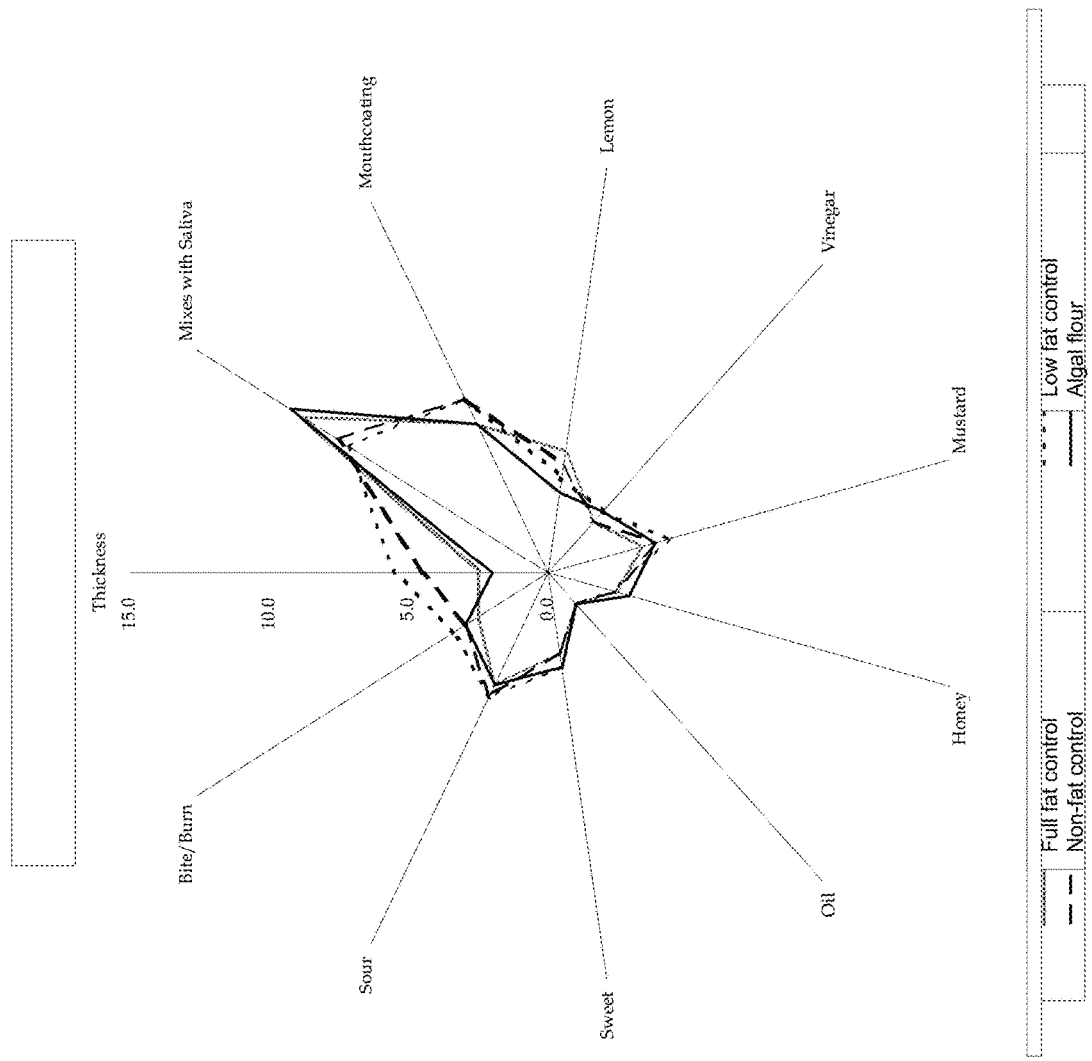
FIG. 6 shows the results of a sensory panel evaluation of a food product contains algal flour, a full-fat control, low-fat control and a non-fat control.

Algal flour can also act as a fat extender with used in smoothies, sauces, or dressings. The composition of algal flour is unique in its ability to convey organoleptic qualities and mouth-feel comparable to a food product with a higher fat content. This also demonstrates the ability of the algal flour to act as texture modifier. Dressings, sauces and beverages made with algal flour have a rheology and opacity that is close to conventional higher fat recipes although these food products contains about half the fat/oil levels. Algal flour is also a superior emulsifier and is suitable in use in food preparation that requires thickness, opacity and viscosity, such as, sauces, dressings and soups. Additionally the lipid profile found in algal flour of the inventions described herein does not contain trans-fat and have a higher level of healthy, unsaturated fats as compared to butter or margarine (or other animal fats). Thus, products made with algal flour can have a lower fat content (with healthier fats) without sacrificing the mouthfeel and organoleptic qualities of the same food product that is made using a conventional recipe using a conventional fat source. A sensory panel evaluated a food product made with algal flour that had the same fat content as a low fat control. A non-fat control and full-fat control was also tested. FIG. 6 demonstrates fat extending qualities of the algal flour. The algal flour product tracked similarly to the full-fat control, especially in the thickness, mouthcoating and how it mixes with saliva sensory categories.

Algal flour can also be added to powdered or liquid eggs, which are typically served in a food service setting. The combination of a powdered egg product and algal flour is itself a powder, which can be combined with an edible liquid or other edible ingredient, typically followed by cooking to form a food product. In some embodiments, the algal flour can be combined with a liquid product that will then be sprayed dried to form a powdered food ingredient (e.g., powdered eggs, powdered sauce mix, powdered soup mix, etc). In such instances, it is advantageous to combine the algal flour after homogenization, but before drying so that is a slurry or dispersion, with the liquid product and then spray dry the combination, forming the powdered food ingredient. This co-drying process will increase the homogeneity of the powdered food ingredient as compared to mixing the dried forms of the two components together. The addition of algal flour improves the appearance, texture and mouthfeel of powdered and liquid eggs and also extends improved appearance, texture and mouthfeel over time, even when the prepared eggs are held on a steam table. Specific formulations and sensory panel results are described below in the Examples.

Algal flour can be used to formulate reconstituted food products by combining flour with one or more edible ingredients and liquid, such as water. The reconstituted food product can be a beverage, dressing (such as salad dressing), sauce (such as a cheese sauce), or an intermediate such as a dough that can then be baked. In some embodiments, the reconstituted food product is then subjected to shear forces such as pressure disruption or homogenization. This has the effect of reducing particle size of the algal flour in the finished product because the high oil content of the flour can cause agglomeration during the reconstitution process. A preferred algal flour particle size in a reconstituted food product is an average of 1 to 15 micrometers.

D. Algal Oil

In one aspect, the present invention is directed to a method of preparing algal oil by harvesting algal oil from an algal biomass comprising at least 15% oil by dry weight under GMP conditions, in which the algal oil is greater than 50% 18:1 lipid. In some cases, the algal biomass comprises a mixture of at least two distinct species of microalgae. In some cases, at least two of the distinct species of microalgae have been separately cultured. In at least one embodiment, at least two of the distinct species of microalgae have different glycerolipid profiles. In some cases, the algal biomass is derived from algae grown heterotrophically. In some cases, all of the at least two distinct species of microalgae contain at least 15% oil by dry weight.

In one aspect, the present invention is directed to a method of making a food composition comprising combining algal oil obtained from algal cells containing at least 10%, or at least 15% oil by dry weight with one or more other edible ingredients to form the food composition. In some cases, the method further comprises preparing the algal oil under GMP conditions.

Algal oil can be separated from lysed biomass for use in food product (among other applications). The algal biomass remaining after oil extraction is referred to as delipidated meal. Delipidated meal contains less oil by dry weight or volume than the microalgae contained before extraction. Typically 50-90% of oil is extracted so that delipidated meal contains, for example, 10-50% of the oil content of biomass before extraction. However, the biomass still has a high nutrient value in content of protein and other constituents discussed above. Thus, the delipidated meal can be used in animal feed or in human food applications.

In some embodiments of the method, the algal oil is at least 50% w/w oleic acid and contains less than 5% DHA. In some embodiments of the method, the algal oil is at least 50% w/w oleic acid and contains less than 0.5% DHA. In some embodiments of the method, the algal oil is at least 50% w/w oleic acid and contains less than 5% glycerolipid containing carbon chain length greater than 18. In some cases, the algal cells from which the algal oil is obtained comprise a mixture of cells from at least two distinct species of microalgae. In some cases, at least two of the distinct species of microalgae have been separately cultured. In at least one embodiment, at least two of the distinct species of microalgae have different glycerolipid profiles. In some cases, the algal cells are cultured under heterotrophic conditions. In some cases, all of the at least two distinct species of microalgae contain at least 10%, or at least 15% oil by dry weight.

In one aspect, the present invention is directed to algal oil containing at least 50% monounsaturated oil and containing less than 1% DHA prepared under GMP conditions. In some cases, the monounsaturated oil is 18:1 lipid. In some cases, the algal oil is packaged in a capsule for delivery of a unit dose of oil. In some cases, the algal oil is derived from a mixture of at least two distinct species of microalgae. In some cases, at least two of the distinct species of microalgae have been separately cultured. In at least one embodiment, at least two of the distinct species of microalgae have different glycerolipid profiles. In some cases, the algal oil is derived from algal cells cultured under heterotrophic conditions. In some embodiments, the algal oil contains the same components as discussed in the preceding section entitled "Chemical Composition of Microalgal Biomass".

In one aspect, the present invention is directed to oil comprising greater than 60% 18:1, and at least 0.20 mg/g tocotrienol.

In one aspect, the present invention is directed to a fatty acid alkyl ester composition comprising greater than 60% 18:1 ester (preferably as triglyceride), and at least 0.20 mg/g tocotrienol.

Algal oil of the invention is prepared from concentrated, washed microalgal biomass by extraction. The cells in the biomass are lysed prior to extraction. Optionally, the microbial biomass may also be dried (oven dried, lyophilized, etc.) prior to lysis (cell disruption). Alternatively, cells can be lysed without separation from some or all of the fermentation broth when the fermentation is complete. For example, the cells can be at a ratio of less than 1:1 v:v cells to extracellular liquid when the cells are lysed.

Microalgae containing lipids can be lysed to produce a lysate. As detailed herein, the step of lysing a microorganism (also referred to as cell lysis) can be achieved by any convenient means, including heat-induced lysis, adding a base, adding an acid, using enzymes such as proteases and polysaccharide degradation enzymes such as amylases, using ultrasound, mechanical pressure-based lysis, and lysis using osmotic shock. Each of these methods for lysing a microorganism can be used as a single method or in combination simultaneously or sequentially. The extent of cell disruption can be observed by microscopic analysis. Using one or more of the methods above, typically more than 70% cell breakage is observed. Preferably, cell breakage is more than 80%, more preferably more than 90% and most preferred about 100%.

Lipids and oils generated by the microalgae in accordance with the present invention can be recovered by extraction. In some cases, extraction can be performed using an organic solvent or an oil, or can be performed using a solventless-extraction procedure.

For organic solvent extraction of the microalgal oil, the preferred organic solvent is hexane. Typically, the organic solvent is added directly to the lysate without prior separation of the lysate components. In one embodiment, the lysate generated by one or more of the methods described above is contacted with an organic solvent for a period of time sufficient to allow the lipid components to form a solution with the organic solvent. In some cases, the solution can then be further refined to recover specific desired lipid components. The mixture can then be filtered and the hexane removed by, for example, rotoevaporation. Hexane extraction methods are well known in the art. See, e.g., Frenz et al., *Enzyme Microb. Technol.*, 11:717 (1989).

Miao and Wu describe a protocol of the recovery of microalgal lipid from a culture of *Chlorella protothecoides* in which the cells were harvested by centrifugation, washed with distilled water and dried by freeze drying. The resulting cell powder was pulverized in a mortar and then extracted with n-hexane. Miao and Wu, Biosource Technology 97:841-846 (2006).

In some cases, microalgal oils can be extracted using liquefaction (see for example Sawayama et al., *Biomass and Bioenergy* 17:33-39 (1999) and Inoue et al., *Biomass Bioenergy* 6(4):269-274 (1993)); oil liquefaction (see for example Minowa et al., Fuel 74(12):1735-1738 (1995)); or supercritical $CO_2$ extraction (see for example Mendes et al., *Inorganica Chimica Acta* 356:328-334 (2003)). An Example of oil extracted by supercritical $CO_2$ extraction is described below. Algal oil extracted via supercritical CO2 extraction contains all of the sterols and carotenoids from the algal biomass and naturally do not contain phospholipids as a function of the extraction process. The residual from the processes essentially comprises delipidated algal biomass devoid of oil, but still retains the protein and carbohydrates of the pre-extraction algal biomass. Thus, the residual delipidated algal biomass is suitable feedstock for the production of algal protein concentrate/isolate and also as a source of dietary fiber.

Oil extraction includes the addition of an oil directly to a lysate without prior separation of the lysate components. After addition of the oil, the lysate separates either of its own accord or as a result of centrifugation or the like into different layers. The layers can include in order of decreasing density: a pellet of heavy solids, an aqueous phase, an emulsion phase, and an oil phase. The emulsion phase is an emulsion of lipids and aqueous phase. Depending on the percentage of oil added with respect to the lysate (w/w or v/v), the force of centrifugation if any, volume of aqueous media and other factors, either or both of the emulsion and oil phases can be present. Incubation or treatment of the cell lysate or the emulsion phase with the oil is performed for a time sufficient to allow the lipid produced by the microorganism to become solubilized in the oil to form a heterogeneous mixture.

In various embodiments, the oil used in the extraction process is selected from the group consisting of oil from soy, rapeseed, canola, palm, palm kernel, coconut, corn, waste vegetable oil, Chinese tallow, olive, sunflower, cotton seed, chicken fat, beef tallow, porcine tallow, microalgae, macroalgae, Cuphea, flax, peanut, choice white grease (lard), Camelina sativa mustard seedcashew nut, oats, lupine, kenaf, calendula, hemp, coffee, linseed, hazelnut, euphorbia, pumpkin seed, coriander, camellia, sesame, safflower, rice, tung oil tree, cocoa, copra, pium poppy, castor beans, pecan, jojoba, jatropha, macadamia, Brazil nuts, and avocado. The amount of oil added to the lysate is typically greater than 5% (measured by v/v and/or w/w) of the lysate with which the oil is being combined. Thus, a preferred v/v or w/w of the oil is greater than 5%, 10%, 20%, 25%, 50%, 70%, 90%, or at least 95% of the cell lysate.

Lipids can also be extracted from a lysate via a solventless extraction procedure without substantial or any use of organic solvents or oils by cooling the lysate. Sonication can also be used, particularly if the temperature is between room temperature and 65° C. Such a lysate on centrifugation or settling can be separated into layers, one of which is an aqueous:lipid layer. Other layers can include a solid pellet, an aqueous layer, and a lipid layer. Lipid can be extracted from the emulsion layer by freeze thawing or otherwise cooling the emulsion. In such methods, it is not necessary to add any organic solvent or oil. If any solvent or oil is added, it can be below 5% v/v or w/w of the lysate.

IV. COMBINING MICROALGAL BIOMASS OR MATERIALS DERIVED THEREFROM WITH OTHER FOOD INGREDIENTS

In one aspect, the present invention is directed to a food composition comprising at least 0.1% w/w algal biomass and one or more other edible ingredients, wherein the algal biomass comprises at least 10% oil by dry weight, optionally wherein at least 90% of the oil is glycerolipid. In some embodiments, the algal biomass contains at least 25%, 40%, 50% or 60% oil by dry weight. In some cases, the algal biomass contains 10-90%, 25-75%, 40-75% or 50-70% oil by dry weight, optionally wherein at least 90% of the oil is glycerolipid. In at least one embodiment, at least 50% by weight of the oil is monounsaturated glycerolipid oil. In some cases, at least 50% by weight of the oil is an 18:1 lipid in glycerolipid form. In some cases, less than 5% by weight of the oil is docosahexanoic acid (DHA) (22:6). In at least one embodiment, less than 1% by weight of the oil is DHA. An algal lipid content with low levels of polyunsaturated fatty acids (PUFA) is preferred to ensure chemical stability of the biomass. In preferred embodiments, the algal biomass is grown under heterotrophic conditions and has reduced green pigmentation. In other embodiments, the microalgae is a color mutant that lacks or is reduced in pigmentation.

In another aspect, the present invention is directed to a food composition comprising at least 0.1% w/w algal biomass and one or more other edible ingredients, wherein the algal biomass comprises at least 30% protein by dry weight, at least 40% protein by dry weight, at least 45% protein by dry weight, at least 50% protein by dry weight, at least 55% protein by dry weight, at least 60% protein by dry weight or at least 75% protein by dry weight. In some cases, the algal biomass contains 30-75% or 40-60% protein by dry weight. In some embodiments, at least 40% of the crude protein is digestible, at least 50% of the crude protein is digestible, at least 60% of the crude protein is digestible, at least 70% of the crude protein is digestible, at least 80% of the crude protein is digestible, or at least 90% of the crude protein is digestible. In some cases, the algal biomass is grown under heterotrophic conditions. In at least one embodiment, the algal biomass is grown under nitrogen-replete conditions. In other embodiments, the microalgae is a color mutant that lacks or is reduced in pigmentation.

In some cases, the algal biomass comprises predominantly intact cells. In some embodiments, the food composition comprises oil which is predominantly or completely encapsulated inside cells of the biomass. In some cases, the food composition comprises predominantly intact microalgal cells. In some cases, the algal oil is predominantly encapsulated in cells of the biomass. In other cases, the biomass comprises predominantly lysed cells (e.g., a homogenate). As discussed above, such a homogenate can be provided as a slurry, flake, powder, or flour.

In some embodiments of the food composition, the algal biomass further comprises at least 10 ppm selenium. In some cases, the biomass further comprises at least 15% w/w algal polysaccharide. In some cases, the biomass further comprises at least 5% w/w algal glycoprotein. In some cases, the biomass comprises between 0 and 115 mcg/g total carotenoids. In some cases, the biomass comprises at least 0.5% w/w algal phospholipids. In all cases, as just noted, these components are true cellular components and not extracellular.

In some cases, the algal biomass of the food composition contains components that have antioxidant qualities. The strong antioxidant qualities can be attributed to the multiple antioxidants present in the algal biomass, which include, but are not limited to carotenoids, essential minerals such as zinc, copper, magnesium, calcium, and manganese. Algal biomass has also been shown to contain other antioxidants such as tocotrienols and tocopherols. These members of the vitamin E family are important antioxidants and have other health benefits such as protective effects against stroke-induced injuries, reversal of arterial blockage, growth inhibition of breast and prostate cancer cells, reduction in cholesterol levels, a reduced-risk of type II diabetes and protective effects against glaucomatous damage. Natural sources of tocotrienols and tocopherols can be found in oils produced from palm, sunflower, corn, soybean and olive oil, however compositions provided herein have significantly greater levels of tocotrienols than heretofore known materials.

In some cases, food compositions of the present invention contain algal oil comprising at least 5 mg/100 g, at least 7 mg/100 g or at least 8 mg/100 g total tocopherol. In some cases, food compositions of the present invention contain algal oil comprising at least 0.15 mg/g, at least 0.20 mg/g or at least 0.25 mg/g total tocotrienol.

In particular embodiments of the compositions and/or methods described above, the microalgae can produce carotenoids. In some embodiments, the carotenoids produced by the microalgae can be co-extracted with the lipids or oil produced by the microalgae (i.e., the oil or lipid will contain the carotenoids). In some embodiments, the carotenoids produced by the microalgae are xanthophylls. In some embodiments, the carotenoids produced by the microalgae are carotenes. In some embodiments, the carotenoids produced by the microalgae are a mixture of carotenes and xanthophylls. In various embodiments, the carotenoids produced by the microalgae comprise at least one carotenoid selected from the group consisting of astaxanthin, lutein, zeaxanthin, alpha-carotene, trans-beta carotene, cis-beta carotene, lycopene and any combination thereof. A non-limiting example of a carotenoid profile of oil from *Chlorella protothecoides* is included below in the Examples.

In some embodiments of the food composition, the algal biomass is derived from algae cultured and dried under good manufacturing practice (GMP) conditions. In some cases, the algal biomass is combined with one or more other edible ingredients, including without limitation, grain, fruit, vegetable, protein, lipid, herb and/or spice ingredients. In some cases, the food composition is a salad dressing, egg product, baked good, bread, bar, pasta, sauce, soup drink, beverage, frozen dessert, butter or spread. In particular embodiments, the food composition is not a pill or powder. In some cases, the food composition in accordance with the present invention weighs at least 50 g, or at least 100 g.

Biomass can be combined with one or more other edible ingredients to make a food product. The biomass can be from a single algal source (e.g., strain) or algal biomass from multiple sources (e.g., different strains). The biomass can also be from a single algal species, but with different composition profile. For example, a manufacturer can blend microalgae that is high in oil content with microalgae that is high in protein content to the exact oil and protein content that is desired in the finished food product. The combination can be performed by a food manufacturer to make a finished product for retail sale or food service use. Alternatively, a manufacturer can sell algal biomass as a product, and a consumer can incorporate the algal biomass into a food product, for example, by modification of a conventional recipe. In either case, the algal biomass is typically used to replace all or part of the oil, fat, eggs, or the like used in many conventional food products.

In one aspect, the present invention is directed to a food composition comprising at least 0.1% w/w algal biomass and one or more other edible ingredients, wherein the algal biomass is formulated through blending of algal biomass that contains at least 40% protein by dry weight with algal biomass that contains 40% lipid by dry weight to obtain a blend of a desired percent protein and lipid by dry weight. In some embodiments, the biomass is from the same strain of algae. Alternatively, algal biomass that contains at least 40% lipid by dry weight containing less than 1% of its lipid as DHA is blended with algal biomass that contains at least 20% lipid by dry weight containing at least 5% of its lipid as DHA to obtain a blend of dry biomass that contains in the aggregate at least 10% lipid and 1% DHA by dry weight.

In one aspect, the present invention is directed to a method of preparing algal biomass by drying an algal culture to provide algal biomass comprising at least 15% oil by dry weight under GMP conditions, in which the algal oil is greater than 50% monounsaturated lipid.

In one aspect, the present invention is directed to algal biomass containing at least 15% oil by dry weight manufactured under GMP conditions, in which the algal oil is greater than 50% 18:1 lipid. In one aspect, the present invention is directed to algal biomass containing at least 40% oil by dry weight manufactured under GMP conditions. In one aspect, the present invention is directed to algal biomass containing at least 55% oil by dry weight manufactured under GMP conditions. In some cases, the algal biomass is packaged as a tablet for delivery of a unit dose of biomass. In some cases, the algal biomass is packaged with or otherwise bears a label providing directions for combining the algal biomass with other edible ingredients.

In one aspect, the present invention is directed to methods of combining microalgal biomass and/or materials derived therefrom, as described above, with at least one other finished food ingredient, as described below, to form a food composition or foodstuff. In various embodiments, the food composition formed by the methods of the invention comprises an egg product (powdered or liquid), a pasta product, a dressing product, a mayonnaise product, a cake product, a bread product, an energy bar, a milk product, a juice product, a spread, or a smoothie. In some cases, the food composition is not a pill or powder. In various embodiments, the food composition weighs at least 10 g, at least 25 g, at least 50 g, at least 100 g, at least 250 g, or at least 500 g or more. In some embodiments, the food composition formed by the combination of microalgal biomass and/or product derived therefrom is an uncooked product. In other cases, the food composition is a cooked product.

In other cases, the food composition is a cooked product. In some cases, the food composition contains less than 25% oil or fat by weight excluding oil contributed by the algal biomass. Fat, in the form of saturated triglycerides (TAGs or trans fats), is made when hydrogenating vegetable oils, as is practiced when making spreads such as margarines. The fat contained in algal biomass has no trans fats present. In some cases, the food composition contains less than 10% oil or fat by weight excluding oil contributed by the biomass. In at least one embodiment, the food composition is free of oil or fat excluding oil contributed by the biomass. In some cases, the food composition is free of oil other than oil contributed by the biomass. In some cases, the food composition is free of egg or egg products.

In one aspect, the present invention is directed to a method of making a food composition in which the fat or oil in a conventional food product is fully or partially substituted with algal biomass containing at least 10% by weight oil. In one embodiment, the method comprises determining an amount of the algal biomass for substitution using the proportion of algal oil in the biomass and the amount of oil or fat in the conventional food product, and combining the algal biomass with at least one other edible ingredient and less than the amount of oil or fat contained in the conventional food product to form a food composition. In some cases, the amount of algal biomass combined with the at least one other ingredient is 1-4 times the mass or volume of oil and/or fat in the conventional food product.

In some embodiments, the method described above further includes providing a recipe for a conventional food product containing the at least one other edible ingredient combined with an oil or fat, and combining 1-4 times the mass or volume of the algal biomass with the at least one other edible ingredient as the mass or volume of fat or oil in the conventional food product. In some cases, the method further includes preparing the algal biomass under GMP conditions.

In some cases, the food composition formed by the combination of microalgal biomass and/or product derived therefrom comprises at least 0.1%, at least 0.5%, at least 1%, at least 5%, at least 10%, at least 25%, or at least 50% w/w or v/v microalgal biomass or microalgal oil. In some embodiments, food compositions formed as described herein comprise at least 2%, at least 5%, at least 10%, at least 25%, at least 50%, at least 75%, at least 90%, or at least 95% w/w microalgal biomass or product derived therefrom. In some cases, the food composition comprises 5-50%, 10-40%, or 15-35% algal biomass or product derived therefrom by weight or by volume.

As described above, microalgal biomass can be substituted for other components that would otherwise be conventionally included in a food product. In some embodiments, the food composition contains less than 50%, less than 40%, or less than 30% oil or fat by weight excluding microalgal oil contributed by the biomass or from microalgal sources. In some cases, the food composition contains less than 25%, less than 20%, less than 15%, less than 10%, or less than 5% oil or fat by weight excluding microalgal oil contributed by the biomass or from microalgal sources. In at least one embodiment, the food composition is free of oil or fat excluding microalgal oil contributed by the biomass or from microalgal sources. In some cases, the food composition is free of eggs, butter, or other fats/oils or at least one other ingredient that would ordinarily be included in a comparable conventional food product. Some food products are free of dairy products (e.g., butter, cream and/or cheese).

The amount of algal biomass used to prepare a food composition depends on the amount of non-algal oil, fat, eggs, or the like to be replaced in a conventional food product and the percentage of oil in the algal biomass. Thus, in at least one embodiment, the methods of the invention include determining an amount of the algal biomass to combine with at least one other edible ingredient from a proportion of oil in the biomass and a proportion of oil and/or fat that is ordinarily combined with the at least one other edible ingredient in a conventional food product. For example, if the algal biomass is 50% w/w microalgal oil, and complete replacement of oil or fat in a conventional recipe is desired, then the oil can for example be replaced in a 2:1 ratio. The ratio can be measured by mass, but for practical purposes, it is often easier to measure volume using a measuring cup or spoon, and the replacement can be by volume. In a general case, the volume or mass of oil or fat to be replaced is replaced by (100/100-X) volume or mass of algal biomass, where X is the percentage of microalgal oil in the biomass. In general, oil and fats to be replaced in conventional recipes can be replaced in total by algal biomass, although total replacement is not necessary and any desired proportion of oil and/or fats can be retained and the remainder replaced according to taste and nutritional needs. Because the algal biomass contains proteins and phospholipids, which function as emulsifiers, items such as eggs can be replaced in total or in part with algal biomass. If an egg is replaced in total with biomass, it is sometimes desirable or necessary to augment the emulsifying properties in the food composition with an additional emulsifying agent(s) and/or add additional water or other liquid(s) to compensate for the loss of these components that would otherwise be provided by the egg. Because an egg is not all fat, the amount of biomass used to replace an egg may be less than that used to replace pure oil or fat. An average egg weighs about 58 g and comprises about 11.2% fat. Thus, about 13 g of algal biomass comprising 50% microalgal oil by weight can be used to replace the total fat portion of an egg in total. Replacing all or part of the eggs in a food product has the additional benefit of reducing cholesterol.

For simplicity, substitution ratios can also be provided in terms of mass or volume of oil, fat and/or eggs replaced with mass or volume of biomass. In some methods, the mass or volume of oil, fat and/or eggs in a conventional recipe is replaced with 5-150%, 25-100% or 25-75% of the mass or volume of oil, fat and/or eggs. The replacement ratio depends on factors such as the food product, desired nutritional profile of the food product, overall texture and appearance of the food product, and oil content of the biomass.

In cooked foods, the determination of percentages (i.e., weight or volume) can be made before or after cooking. The percentage of algal biomass can increase during the cooking process because of loss of liquids. Because some algal biomass cells may lyse in the course of the cooking process, it can be difficult to measure the content of algal biomass directly in a cooked product. However, the content can be determined indirectly from the mass or volume of biomass that went into the raw product as a percentage of the weight or volume of the finished product (on a biomass dry solids basis), as well as by methods of analyzing components that are unique to the algal biomass such as genomic sequences or compounds that are delivered solely by the algal biomass, such as certain carotenoids.

In some cases, it may be desirable to combine algal biomass with the at least one other edible ingredient in an amount that exceeds the proportional amount of oil, fat, eggs, or the like that is present in a conventional food product. For example, one may replace the mass or volume of oil and/or fat in a conventional food product with 1, 2, 3, 4, or more times that amount of algal biomass. Some embodiments of the methods of the invention include providing a recipe for a conventional food product containing the at least one other edible ingredient combined with an oil or fat, and combining 1-4 times the mass or volume of algal biomass with the at least one other edible ingredient as the mass or volume of fat or oil in the conventional food product.

Algal biomass (predominantly intact or homogenized or micronized) and/or algal oil are combined with at least one other edible ingredient to form a food product. In some food products, the algal biomass and/or algal oil is combined with 1-20, 2-10, or 4-8 other edible ingredients. The edible ingredients can be selected from all the major food groups, including without limitation, fruits, vegetables, legumes, meats, fish, grains (e.g., wheat, rice, oats, cornmeal, barley), herbs, spices, water, vegetable broth, juice, wine, and vinegar. In some food compositions, at least 2, 3, 4, or 5 food groups are represented as well as the algal biomass or algal oil.

Oils, fats, eggs and the like can also be combined into food compositions, but, as has been discussed above, are usually present in reduced amounts (e.g., less than 50%, 25%, or 10% of the mass or volume of oil, fat or eggs compared with conventional food products. Some food products of the invention are free of oil other than that provided by algal biomass and/or algal oil. Some food products are free of oil other than that provided by algal biomass. Some food products are free of fats other than that provided by algal biomass or algal oil. Some food products are free of fats other than that provided by algal biomass. Some food products are free of both oil and fats other than that provided by algal biomass or algal oil. Some food products are free of both oil and fats other than that provided by algal biomass. Some food products are free of eggs. In some embodiments, the oils produced by the microalgae can be tailored by culture conditions or strain selection to comprise a particular fatty acid component(s) or levels.

In some cases, the algal biomass used in making the food composition comprises a mixture of at least two distinct species of microalgae. In some cases, at least two of the distinct species of microalgae have been separately cultured. In at least one embodiment, at least two of the distinct species of microalgae have different glycerolipid profiles. In some cases, the method described above further comprises culturing algae under heterotrophic conditions and preparing the biomass from the algae. In some cases, all of the at least two distinct species of microalgae contain at least 10%, or at least 15% oil by dry weight. In some cases, a food composition contains a blend of two distinct preparations of biomass of the same species, wherein one of the preparations contains at least 30% oil by dry weight and the second contains less than 15% oil by dry weight. In some cases, a food composition contains a blend of two distinct preparations of biomass of the same species, wherein one of the preparations contains at least 50% oil by dry weight and the second contains less than 15% oil by dry weight, and further wherein the species is *Chlorella protothecoides*.

As well as using algal biomass as an oil, fat or egg replacement in otherwise conventional foods, algal biomass can be used as a supplement in foods that do not normally contain oil, such as a smoothie. The combination of oil with products that are mainly carbohydrate can have benefits associated with the oil, and from the combination of oil and carbohydrate by reducing the glycemic index of the carbohydrate. The provision of oil encapsulated in biomass is advantageous in protecting the oil from oxidation and can also improve the taste and texture of the smoothie.

Oil extracted from algal biomass can be used in the same way as the biomass itself, that is, as a replacement for oil, fat, eggs, or the like in conventional recipes. The oil can be used to replace conventional oil and/or fat on about a 1:1 weight/weight or volume/volume basis. The oil can be used to replace eggs by substitution of about 1 teaspoon of algal oil per egg optionally in combination with additional water and/or an emulsifier (an average 58 g egg is about 11.2% fat, algal oil has a density of about 0.915 g/ml, and a teaspoon has a volume of about 5 ml=1.2 teaspoons of algal oil/egg). The oil can also be incorporated into dressings, sauces, soups, margarines, creamers, shortenings and the like. The oil is particularly useful for food products in which combination of the oil with other food ingredients is needed to give a desired taste, texture and/or appearance. The content of oil by weight or volume in food products can be at least 5, 10, 25, 40 or 50%.

In at least one embodiment, oil extracted from algal biomass can also be used as a cooking oil by food manufacturers, restaurants and/or consumers. In such cases, algal oil can replace conventional cooking oils such as safflower oil, canola oil, olive oil, grape seed oil, corn oil, sunflower oil, coconut oil, palm oil, or any other conventionally used cooking oil. The oil obtained from algal biomass as with other types of oil can be subjected to further refinement to increase its suitability for cooking (e.g., increased smoke point). Oil can be neutralized with caustic soda to remove free fatty acids. The free fatty acids form a removable soap stock. The color of oil can be removed by bleaching with chemicals such as carbon black and bleaching earth. The bleaching earth and chemicals can be separated from the oil by filtration. Oil can also be deodorized by treating with steam.

Predominantly intact biomass, homogenized or micronized biomass (as a slurry, flake, powder or flour) and purified algal oil can all be combined with other food ingredients to form food products. All are a source of oil with a favorable nutritional profile (relatively high monounsaturated content). Predominantly intact, homogenized, and micronized biomass also supply high quality protein (balanced amino acid composition), carbohydrates, fiber and other nutrients as discussed above. Foods incorporating any of these products can be made in vegan or vegetarian form. Another advantage in using microalgal biomass (either predominantly intact or homogenized (or micronized) or both) as a protein source is that it is a vegan/vegetarian protein source that is not from a major allergen source, such as soy, eggs or dairy.

Other edible ingredients with which algal biomass and/or algal oil can be combined in accordance with the present invention include, without limitation, grains, fruits, vegetables, proteins, meats, herbs, spices, carbohydrates, and fats. The other edible ingredients with which the algal biomass and/or algal oil is combined to form food compositions depend on the food product to be produced and the desired taste, texture and other properties of the food product.

Although in general any of these sources of algal oil can be used in any food product, the preferred source depends in part whether the oil is primarily present for nutritional or caloric purposes rather than for texture, appearance or taste of food, or alternatively whether the oil in combination with other food ingredients is intended to contribute a desired taste, texture or appearance of the food as well as or instead of improving its nutritional or caloric profile.

The food products can be cooked by conventional procedures as desired. Depending on the length and temperature, the cooking process may break down some cell walls, releasing oil such that it combines with other ingredients in the mixture. However, at least some algal cells often survive cooking intact. Alternatively, food products can be used without cooking. In this case, the algal wall remains intact, protecting the oil from oxidation.

The algal biomass, if provided in a form with cells predominantly intact, or as a homogenate powder, differs from oil, fat or eggs in that it can be provided as a dry ingredient, facilitating mixing with other dry ingredients, such as flour. In one embodiment the algal biomass is provided as a dry homogenate that contains between 25 and 40% oil by dry weight. A biomass homogenate can also be provided as slurry. After mixing of dry ingredients (and biomass homogenate slurry, if used), liquids such as water can be added. In some food products, the amount of liquid required is somewhat higher than in a conventional food product because of the non-oil component of the biomass and/or because water is not being supplied by other ingredients, such as eggs. However, the amount of water can readily be determined as in conventional cooking.

In one aspect, the present invention is directed to a food ingredient composition comprising at least 0.5% w/w algal biomass containing at least 10% algal oil by dry weight and at least one other edible ingredient, in which the food ingredient can be converted into a reconstituted food product by addition of a liquid to the food ingredient composition. In one embodiment, the liquid is water.

Homogenized or micronized high-oil biomass is particularly advantageous in liquid, and/or emulsified food products (water in oil and oil in water emulsions), such as sauces, soups, drinks, salad dressings, butters, spreads and the like in which oil contributed by the biomass forms an emulsion with other liquids. Products that benefit from improved rheology, such as dressings, sauces and spreads are described below in the Examples. Using homogenized biomass an emulsion with desired texture (e.g., mouth-feel), taste and appearance (e.g., opacity) can form at a lower oil content (by weight or volume of overall product) than is the case with conventional products employing conventional oils, thus can be used as a fat extender. Such is useful for low-calorie (i.e., diet) products. Purified algal oil is also advantageous for such liquid and/or emulsified products. Both homogenized or micronized high-oil biomass and purified algal oil combine well with other edible ingredients in baked goods achieving similar or better taste, appearance and texture to otherwise similar products made with conventional oils, fats and/or eggs but with improved nutritional profile (e.g., higher content of monosaturated oil, and/or higher content or quality of protein, and/or higher content of fiber and/or other nutrients).

Predominantly intact biomass is particularly useful in situations in which it is desired to change or increase the nutritional profile of a food (e.g., higher oil content, different oil content (e.g., more monounsaturated oil), higher protein content, higher calorie content, higher content of other nutrients). Such foods can be useful for example, for athletes or patients suffering from wasting disorders. Predominantly intact biomass can be used as a bulking agent. Bulking agents can be used, for example, to augment the amount of a more expensive food (e.g., meat helper and the like) or in simulated or imitation foods, such as vegetarian meat substitutes. Simulated or imitation foods differ from natural foods in that the flavor and bulk are usually provided by different sources. For example, flavors of natural foods, such as meat, can be imparted into a bulking agent holding the flavor. Predominantly intact biomass can be used as a bulking agent in such foods. Predominantly intact biomass is also particularly useful in dried food, such as pasta because it has good water binding properties, and can thus facilitate rehydration of such foods. Predominantly intact biomass is also useful as a preservative, for example, in baked goods. The predominantly intact biomass can improve water retention and thus shelf-life.

Disrupted or micronized algal biomass can also be useful as a binding agent, bulking agent or to change or increase the nutritional profile a food product. Disrupted algal biomass can be combined with another protein source such as meat, soy protein, whey protein, wheat protein, bean protein, rice protein, pea protein, milk protein, etc., where the algal biomass functions as a binding and/or bulking agent. Algal biomass that has been disrupted or micronized can also improve water retention and thus shelf-life. Increased moisture retention is especially desirable in gluten-free products, such as gluten-free baked goods. A detailed description of formulation of a gluten-free cookie using disrupted algal biomass and subsequent shelf-life study is described in the Examples below.

In some cases, the algal biomass can be used in egg preparations. In some embodiments, algal biomass (e.g., algal flour) added to a conventional dry powder egg preparation to create scrambled eggs that are creamier, have more moisture and a better texture than dry powdered eggs prepared without the algal biomass. In other embodiments, algal biomass is added to whole liquid eggs in order to improve the overall texture and moisture of eggs that are prepared and then held on a steam table. Specific examples of the foregoing preparations are described in the Examples below.

Algal biomass (predominantly intact and/or homogenized or micronized) and/or algal oil can be incorporated into virtually any food composition. Some examples include baked goods, such as cakes, brownies, yellow cake, bread including brioche, cookies including sugar cookies, biscuits, and pies. Other examples include products often provided in dried form, such as pastas or powdered dressing, dried creamers, commuted meats and meat substitutes. Incorporation of predominantly intact biomass into such products as a binding and/or bulking agent can improve hydration and increase yield due to the water binding capacity of predominantly intact biomass. Re-hydrated foods, such as scrambled eggs made from dried powdered eggs, may also have improved texture and nutritional profile. Other examples include liquid food products, such as sauces, soups, dressings (ready to eat), creamers, milk drinks, juice drinks, smoothies, creamers. Other liquid food products include nutritional beverages that serve as a meal replacement or algal milk. Other food products include butters or cheeses and the like including shortening, margarine/spreads, nut butters, and cheese products, such as nacho sauce. Other food products include energy bars, chocolate confections-lecithin replacement, meal replacement bars, granola bar-type products. Another type of food product is batters and coatings. By providing a layer of oil surrounding a food, predominantly intact biomass or a homogenate repel additional oil from a cooking medium from penetrating a food. Thus, the food can retain the benefits of high monounsaturated oil content of coating without picking up less desirable oils (e.g., trans fats, saturated fats, and by products from the cooking oil). The coating of biomass can also provide a desirable (e.g., crunchy) texture to the food and a cleaner flavor due to less absorption of cooking oil and its byproducts.

In uncooked foods, most algal cells in the biomass remain intact. This has the advantage of protecting the algal oil from oxidation, which confers a long shelf-life and minimizes adverse interaction with other ingredients. Depending on the nature of the food products, the protection conferred by the cells may reduce or avoid the need for refrigeration, vacuum packaging or the like. Retaining cells intact also prevents direct contact between the oil and the mouth of a consumer, which reduces the oily or fatty sensation that may be undesirable. In food products in which oil is used more as nutritional supplement, such can be an advantage in improving the organoleptic properties of the product. Thus, predominantly intact biomass is suitable for use in such products. However, in uncooked products, such as a salad dressing, in which oil imparts a desired mouth feeling (e.g., as an emulsion with an aqueous solution such as vinegar), use of purified algal oil or micronized biomass is preferred. In cooked foods, some algal cells of original intact biomass may be lysed but other algal cells may remain intact. The ratio of lysed to intact cells depends on the temperature and duration of the cooking process. In cooked foods in which dispersion of oil in a uniform way with other ingredients is desired for taste, texture and/or appearance (e.g., baked goods), use of micronized biomass or purified algal oil is preferred. In cooked foods, in which algal biomass is used to supply oil and/or protein and other nutrients, primarily for their nutritional or caloric value rather than texture.

Algal biomass can also be useful in increasing the satiety index of a food product (e.g., a meal-replacement drink or smoothie) relative to an otherwise similar conventional product made without the algal biomass. The satiety index is a measure of the extent to which the same number of calories of different foods satisfy appetite. Such an index can be measured by feeding a food being tested and measuring appetite for other foods at a fixed interval thereafter. The less appetite for other foods thereafter, the higher the satiety index. Values of satiety index can be expressed on a scale in which white bread is assigned a value of 100. Foods with a higher satiety index are useful for dieting. Although not dependent on an understanding of mechanism, algal biomass is believed to increase the satiety index of a food by increasing the protein and/or fiber content of the food for a given amount of calories.

Algal biomass (predominantly intact and homogenized or micronized) and/or algal oil can also be manufactured into nutritional or dietary supplements. For example, algal oil can be encapsulated into digestible capsules in a manner similar to fish oil. Such capsules can be packaged in a bottle and taken on a daily basis (e.g., 1-4 capsules or tablets per day). A capsule can contain a unit dose of algal biomass or algal oil. Likewise, biomass can be optionally compressed with pharmaceutical or other excipients into tablets. The tablets can be packaged, for example, in a bottle or blister pack, and taken daily at a dose of, e.g., 1-4 tablets per day. In some cases, the tablet or other dosage formulation comprises a unit dose of biomass or algal oil. Manufacturing of capsule and tablet products and other supplements is preferably performed under GMP conditions appropriate for nutritional supplements as codified at 21 C.F.R. 111, or comparable regulations established by foreign jurisdictions. The algal biomass can be mixed with other powders and be presented in sachets as a ready-to-mix material (e.g., with water, juice, milk or other liquids). The algal biomass can also be mixed into products such as yogurts.

Although algal biomass and/or algal oil can be incorporated into nutritional supplements, the functional food products discussed above have distinctions from typical nutritional supplements, which are in the form of pills, capsules, or powders. The serving size of such food products is typically much larger than a nutritional supplement both in terms of weight and in terms of calories supplied. For example, food products often have a weight of over 100 g and/or supply at least 100 calories when packaged or consumed at one time. Typically food products contain at least one ingredient that is either a protein, a carbohydrate or a liquid and often contain two or three such other ingredients. The protein or carbohydrate in a food product often supplies at least 30%, 50%, or 60% of the calories of the food product.

As discussed above, algal biomass can be made by a manufacturer and sold to a consumer, such as a restaurant or individual, for use in a commercial setting or in the home. Such algal biomass is preferably manufactured and packaged under Good Manufacturing Practice (GMP) conditions for food products. The algal biomass in predominantly intact form or homogenized or micronized form as a powder is often packaged dry in an airtight container, such as a sealed bag. Homogenized or micronized biomass in slurry form can be conveniently packaged in a tub among other containers. Optionally, the algal biomass can be packaged under vacuum to enhance shelf life. Refrigeration of packaged algal biomass is not required. The packaged algal biomass can contain instructions for use including directions for how much of the algal biomass to use to replace a given amount of oil, fat or eggs in a conventional recipe, as discussed above. For simplicity, the directions can state that oil or fat are to be replaced on a 2:1 ratio by mass or volume of biomass, and eggs on a ratio of 11 g biomass or 1 teaspoon of algal oil per egg. As discussed above, other ratios are possible, for example, using a ratio of 10-175% mass or volume of biomass to mass or volume of oil and/or fat and/or eggs in a conventional recipe. Upon opening a sealed package, the instructions may direct the user to keep the algal biomass in an airtight container, such as those widely commercially available (e.g., Glad), optionally with refrigeration.

Algal biomass (predominantly intact or homogenized or micronized powder) can also be packaged in a form combined with other dry ingredients (e.g., sugar, flour, dry fruits, flavorings) and portioned packed to ensure uniformity in the final product. The mixture can then be converted into a food product by a consumer or food service company simply by adding a liquid, such as water or milk, and optionally mixing, and/or cooking without adding oils or fats. In some cases, the liquid is added to reconstitute a dried algal biomass composition. Cooking can optionally be performed using a microwave oven, convection oven, conventional oven, or on a cooktop. Such mixtures can be used for making cakes, breads, pancakes, waffles, drinks, sauces and the like. Such mixtures have advantages of convenience for the consumer as well as long shelf life without refrigeration. Such mixtures are typically packaged in a sealed container bearing instructions for adding liquid to convert the mixture into a food product.

Algal oil for use as a food ingredient is likewise preferably manufactured and packaged under GMP conditions for a food. The algal oil is typically packaged in a bottle or other container in a similar fashion to conventionally used oils. The container can include an affixed label with directions for using the oil in replacement of conventional oils, fats or eggs in food products, and as a cooking oil. When packaged in a sealed container, the oil has a long shelf-life (at least one year) without substantial deterioration. After opening, algal oil comprised primarily of monounsaturated oils is not acutely sensitive to oxidation. However, unused portions of the oil can be kept longer and with less oxidation if kept cold and/or out of direct sunlight (e.g., within an enclosed space, such as a cupboard). The directions included with the oil can contain such preferred storage information.

Optionally, the algal biomass and/or the algal oil may contain a food approved preservative/antioxidant to maximize shelf-life, including but not limited to, carotenoids (e.g., astaxanthin, lutein, zeaxanthin, alpha-carotene, beta-carotene and lycopene), phospholipids (e.g., N-acylphosphatidylethanolamine, phosphatidic acid, phosphatidylethanolamine, phosphatidylcholine, phosphatidylinositol and lysophosphatidylcholine), tocopherols (e.g., alpha tocopherol, beta tocopherol, gamma tocopherol and delta tocopherol), tocotrienols (e.g., alpha tocotrienol, beta tocotrienol, gamma tocotrienol and delta tocotrienol), Butylated hydroxytoluene, Butylated hydroxyanisole, polyphenols, rosmarinic acid, propyl gallate, ascorbic acid, sodium ascorbate, sorbic acid, benzoic acid, methyl parabens, levulinic acid, anisic acid, acetic acid, citric acid, and bioflavonoids.

The description of incorporation of predominantly intact biomass, homogenized, or micronized biomass (slurry, flake, powder, or flour) or algal oil into food for human nutrition is in general also applicable to food products for non-human animals.

The biomass imparts high quality oil or proteins or both in such foods. The content of algal oil is preferably at least 10 or 20% by weight as is the content of algal protein. Obtaining at least some of the algal oil and/or protein from predominantly intact biomass is sometimes advantageous for food for high performance animals, such as sport dogs or horses. Predominantly intact biomass is also useful as a preservative. Algal biomass or oil is combined with other ingredients typically found in animal foods (e.g., a meat, meat flavor, fatty acid, vegetable, fruit, starch, vitamin, mineral, antioxidant, probiotic) and any combination thereof. Such foods are also suitable for companion animals, particularly those having an active life style. Inclusion of taurine is recommended for cat foods. As with conventional animal foods, the food can be provided in bite-size particles appropriate for the intended animal.

Delipidated meal is useful as a feedstock for the production of an algal protein concentrate and/or isolate, especially delipidated meal from high protein-containing algal biomass. The algal protein concentrate and/or isolate can be produced using standard processes used to produce soy protein concentrate/isolate. An algal protein concentrate would be prepared by removing soluble sugars from delipidated algal biomass or meal. The remaining components would mainly be proteins and insoluble polysaccharides. By removing the soluble sugars from the delipidated meal, the protein content is increased, thus creating an algal protein concentrate. An algal protein concentrate would contain at least 45% protein by dry weight. Preferably, an algal protein concentrate would contain at least 50%-75% protein by dry weight. Algal protein isolate can also be prepared using standard processes used to produce soy protein isolate. This process usually involves a temperature and basic pH extraction step using NaOH. After the extraction step, the liquids and solids are separated and the proteins are precipitated out of the liquid fraction using HCl. The solid fraction can be re-extracted and the resulting liquid fractions can be pooled prior to precipitation with HCl. The protein is then neutralized and spray dried to produce a protein isolate. An algal protein isolate would typically contain at least 90% protein by dry weight.

Delipidated meal is useful as animal feed for farm animals, e.g., ruminants, poultry, swine, and aquaculture. Delipidated meal is a byproduct of preparing purified algal oil either for food or other purposes. The resulting meal although of reduced oil content still contains high quality proteins, carbohydrates, fiber, ash and other nutrients appropriate for an animal feed. Because the cells are predominantly lysed, delipidated meal is easily digestible by such animals. Delipidated meal can optionally be combined with other ingredients, such as grain, in an animal feed. Because delipidated meal has a powdery consistency, it can be pressed into pellets using an extruder or expanders, which are commercially available.

The following examples are offered to illustrate, but not to limit, the claimed invention.

V. EXAMPLES

Example 1

Cultivation of Microalgae to Achieve High Oil Content

Microalgae strains were cultivated in shake flasks with a goal to achieve over 20% of oil by dry cell weight. The flask media used was as follows: $K_2HPO_4$: 4.2 g/L, $NaH_2PO_4$: 3.1 g/L, $MgSO_4·7H_2O$: 0.24 g/L, Citric Acid monohydrate: 0.25 g/L, $CaCl_2$ $2H_2O$: 0.025 g/L, yeast extract: 2 g/L, and 2% glucose. Cryopreserved cells were thawed at room temperature and 500 ul of cells were added to 4.5 ml of medium and grown for 7 days at 28° C. with agitation (200 rpm) in a 6-well plate. Dry cell weights were determined by centrifuging 1 ml of culture at 14,000 rpm for 5 min in a pre-weighed Eppendorf tube. The culture supernatant was discarded and the resulting cell pellet washed with 1 ml of deionized water. The culture was again centrifuged, the supernatant discarded, and the cell pellets placed at −80° C. until frozen. Samples were then lyophilized for 24 hrs and dry cell weights calculated. For determination of total lipid in cultures, 3 ml of culture was removed and subjected to analysis using an Ankom system (Ankom Inc., Macedon, NY) according to the manufacturer's protocol. Samples were subjected to solvent extraction with an Amkom XT10 extractor according to the manufacturer's protocol. Total lipid was determined as the difference in mass between acid hydrolyzed dried samples and solvent extracted, dried samples. Percent oil dry cell weight measurements are shown in Table 1.

TABLE 1

Percent oil by dry cell weight

| Species | Strain | % oil | FIG. 1 strain # |
|---|---|---|---|
| Chlorella protothecoides | UTEX 250 | 34.24 | 1 |
| Chlorella protothecoides | UTEX 25 | 40.00 | 2 |
| Chlorella protothecoides | CCAP 211/8D | 47.56 | 3 |
| Chlorella kessleri | UTEX 397 | 39.42 | 4 |
| Chlorella kessleri | UTEX 2229 | 54.07 | 5 |
| Chlorella kessleri | UTEX 398 | 41.67 | 6 |
| Parachlorella kessleri | SAG 11.80 | 37.78 | 7 |
| Parachlorella kessleri | SAG 14.82 | 50.70 | 8 |
| Parachlorella kessleri | SAG 21.11 H9 | 37.92 | 9 |
| Prototheca stagnora | UTEX 327 | 13.14 | 10 |
| Prototheca moriformis | UTEX 1441 | 18.02 | 11 |
| Prototheca moriformis | UTEX 1435 | 27.17 | 12 |
| Chlorella minutissima | UTEX 2341 | 31.39 | 13 |
| Chlorella sp. | UTEX 2068 | 45.32 | 14 |
| Chlorella sp. | CCAP 211/92 | 46.51 | 15 |
| Chlorella sorokiniana | SAG 211.40B | 46.67 | 16 |
| Parachlorella beijerinkii | SAG 2046 | 30.98 | 17 |
| Chlorella luteoviridis | SAG 2203 | 37.88 | 18 |
| Chlorella vulgaris | CCAP 211/11K | 35.85 | 19 |
| Chlorella reisiglii | CCAP 11/8 | 31.17 | 20 |
| Chlorella ellipsoidea | CCAP 211/42 | 32.93 | 21 |
| Chlorella saccharophila | CCAP 211/31 | 34.84 | 22 |
| Chlorella saccharophila | CCAP 211/32 | 30.51 | 23 |

Additional strains of Chlorella protothecoides were also grown using the conditions described above and the lipid profile was determined for each of these Chlorella protothecoides strains using standard gas chromatography (GC/FID) procedures described briefly in Example 2. A summary of the lipid profile is included below. Values are expressed as area percent of total lipids. The collection numbers with UTEX are algae strains from the UTEX Algae Collection at the University of Texas, Austin (1 University Station A6700, Austin, Texas 78712-0183). The collections numbers with CCAP are algae strains from the Culture Collection of Algae and Protozoa (SAMS Research Services, Ltd. Scottish Marine Institute, OBAN, Argull PA37 1QA, Scotland, United Kingdom). The collection number with SAG are algae strains from the Culture Collection of Algae at Goettingen University (Nikolausberger Weg 18, 37073 Gottingen, Germany).

| Collection Number | C12:0 | C14:0 | C16:0 | C16:1 | C18:0 | C18:1 | C18:2 | C18:3 | C20:0 | C20:1 |
|---|---|---|---|---|---|---|---|---|---|---|
| UTEX 25 | 0.0 | 0.6 | 8.7 | 0.3 | 2.4 | 72.1 | 14.2 | 1.2 | 0.2 | 0.2 |
| UTEX 249 | 0.0 | 0.0 | 9.7 | 0.0 | 2.3 | 72.4 | 13.7 | 1.9 | 0.0 | 0.0 |
| UTEX 250 | 0.0 | 0.6 | 10.2 | 0.0 | 3.7 | 69.7 | 14.1 | 1.4 | 0.3 | 0.0 |
| UTEX 256 | 0.0 | 0.9 | 10.1 | 0.3 | 5.6 | 64.4 | 17.4 | 1.3 | 0.0 | 0.0 |
| UTEX 264 | 0.0 | 0.0 | 13.3 | 0.0 | 5.7 | 68.3 | 12.7 | 0.0 | 0.0 | 0.0 |
| UTEX 411 | 0.0 | 0.5 | 9.6 | 0.2 | 2.8 | 71.3 | 13.5 | 1.5 | 0.2 | 0.2 |
| CCAP 211/17 | 0.0 | 0.8 | 10.5 | 0.4 | 3.3 | 68.4 | 15.0 | 1.6 | 0.0 | 0.0 |
| CCAP 221/8d | 0.0 | 0.8 | 11.5 | 0.1 | 3.0 | 70.3 | 12.9 | 1.2 | 0.2 | 0.0 |
| SAG 221 10d | 0.0 | 1.4 | 17.9 | 0.1 | 2.4 | 55.3 | 20.2 | 2.7 | 0.0 | 0.0 |

These data show that although all of the above strains are *Chlorella protothecoides*, there are differences in the lipid profile between some of the strains.

Example 2

Three fermentation processes were performed with three different media formulations with the goal of generating algal biomass with high oil content. The first formulation (Media 1) was based on medium described in Wu et al. (1994 Science in China, vol. 37, No. 3, pp. 326-335) and consisted of per liter: $KH_2PO_4$, 0.7 g; $K_2HPO_4$, 0.3 g; $MgSO_4$-$7H_2O$, 0.3 g; $FeSO_4$-$7H_2O$, 3 mg; thiamine hydrochloride, 10 µg; glucose, 20 g; glycine, 0.1 g; $H_3BO_3$, 2.9 mg; $MnCl_2$-$4H_2O$, 1.8 mg; $ZnSO_4$-$7H_2O$, 220 µg; $CuSO_4$-$5H_2O$, 80 µg; and $NaMoO_4$-$2H_2O$, 22.9 mg. The second medium (Media 2) was derived from the flask media described in Example 1 and consisted of per liter: $K_2HPO_4$, 4.2 g; $NaH_2PO_4$, 3.1 g; $MgSO_4$-$7H_2O$, 0.24 g; citric acid monohydrate, 0.25 g; calcium chloride dehydrate, 25 mg; glucose, 20 g; yeast extract, 2 g. The third medium (Media 3) was a hybrid and consisted of per liter: $K_2HPO_4$, 4.2 g; $NaH_2PO_4$, 3.1 g; $MgSO_4$-$7H_2O$, 0.24 g; citric acid monohydrate, 0.25 g; calcium chloride dehydrate, 25 mg; glucose, 20 g; yeast extract, 2 g; $H_3BO_3$, 2.9 mg; $MnCl_2$-$4H_2O$, 1.8 mg; $ZnSO_4$-$7H_2O$, 220 µg; $CuSO_4$-$5H_2O$, 80 µg; and $NaMoO_4$-$2H_2O$, 22.9 mg. All three media formulations were prepared and autoclave sterilized in lab scale fermentor vessels for 30 minutes at 121° C. Sterile glucose was added to each vessel following cool down post autoclave sterilization.

Inoculum for each fermentor was *Chlorella protothecoides* (UTEX 250), prepared in two flask stages using the medium and temperature conditions of the fermentor inoculated. Each fermentor was inoculated with 10% (v/v) mid-log culture. The three lab scale fermentors were held at 28° C. for the duration of the experiment. The microalgal cell growth in Media 1 was also evaluated at a temperature of 23° C. For all fermentor evaluations, pH was maintained at 6.6-6.8, agitations at 500 rpm, and airflow at 1 vvm. Fermentation cultures were cultivated for 11 days. Biomass accumulation was measured by optical density at 750 nm and dry cell weight.

Lipid/oil concentration was determined using direct transesterification with standard gas chromatography methods. Briefly, samples of fermentation broth with biomass was blotted onto blotting paper and transferred to centrifuge tubes and dried in a vacuum oven at 65-70° C. for 1 hour. When the samples were dried, 2 mL of 5% $H_2SO_4$ in methanol was added to the tubes. The tubes were then heated on a heat block at 65-70° C. for 3.5 hours, while being vortexed and sonicated intermittently. 2 ml of heptane was then added and the tubes were shaken vigorously. 2M1 of 6% $K_2CO_3$ was added and the tubes were shaken vigorously to mix and then centrifuged at 800 rpm for 2 minutes. The supernatant was then transferred to GC vials containing $Na_2SO_4$ drying agent and ran using standard gas chromatography methods. Percent oil/lipid was based on a dry cell weight basis. The dry cell weights for cells grown using: Media 1 at 23° C. was 9.4 g/L; Media 1 at 28° C. was 1.0 g/L, Media 2 at 28° C. was 21.2 g/L; and Media 3 at 28° C. was 21.5 g/L. The lipid/oil concentration for cells grown using: Media 1 at 23° C. was 3 g/L; Media 1 at 28° C. was 0.4 g/L; Media 2 at 28° C. was 18 g/L; and Media 3 at 28° C. was 19 g/L. The percent oil based on dry cell weight for cells grown using: Media 1 at 23° C. was 32%; Media 1 at 28° C. was 40%; Media 2 at 28° C. was 85%; and Media 3 at 28° C. was 88%. The lipid profiles (in area %, after normalizing to the internal standard) for algal biomass generated using the three different media formulations at 28° C. are summarized below in Table 2.

TABLE 2

Lipid profiles for *Chlorella protothecoides* grown under different media conditions.

|  | Media 1 28° C. (in Area %) | Media 2 28° C. (in Area %) | Media 3 28° C. (in Area %) |
|---|---|---|---|
| C14:0 | 1.40 | 0.85 | 0.72 |
| C16:0 | 8.71 | 7.75 | 7.43 |
| C16:1 | — | 0.18 | 0.17 |
| C17:0 | — | 0.16 | 0.15 |
| C17:1 | — | 0.15 | 0.15 |
| C18:0 | 3.77 | 3.66 | 4.25 |
| C18:1 | 73.39 | 72.72 | 73.83 |
| C18:2 | 11.23 | 12.82 | 11.41 |
| C18:3 alpha | 1.50 | 0.90 | 1.02 |
| C20:0 | — | 0.33 | 0.37 |
| C20:1 | — | 0.10 | 0.39 |
| C20:1 | — | 0.25 | — |
| C22:0 | — | 0.13 | 0.11 |

Example 3

Preparation of Biomass for Food Products

Microalgal biomass is generated by culturing microalgae as described in any one of Examples 1-2. The microalgal biomass is harvested from the fermentor, flask, or other bioreactor.

GMP procedures are followed. Any person who, by medical examination or supervisory observation, is shown to have, or appears to have, an illness, open lesion, including boils, sores, or infected wounds, or any other abnormal source of microbial contamination by which there is a reasonable possibility of food, food-contact surfaces, or food packaging materials becoming contaminated, is to be excluded from any operations which may be expected to result in such contamination until the condition is corrected. Personnel are instructed to report such health conditions to their supervisors. All persons working in direct contact with the microalgal biomass, biomass-contact surfaces, and biomass-packaging materials conform to hygienic practices while on duty to the extent necessary to protect against contamination of the microalgal biomass. The methods for maintaining cleanliness include, but are not limited to: (1) Wearing outer garments suitable to the operation in a manner that protects against the contamination of biomass, biomass-contact surfaces, or biomass packaging materials. (2) Maintaining adequate personal cleanliness. (3) Washing hands thoroughly (and sanitizing if necessary to protect against contamination with undesirable microorganisms) in an adequate hand-washing facility before starting work, after each absence from the work station, and at any other time when the hands may have become soiled or contaminated. (4) Removing all unsecured jewelry and other objects that might fall into biomass, equipment, or containers, and removing hand jewelry that cannot be adequately sanitized during periods in which biomass is manipulated by hand. If such hand jewelry cannot be removed, it may be covered by material which can be maintained in an intact, clean, and sanitary condition and which effectively protects against the contamination by these objects of the biomass, biomass-contact surfaces, or biomass-packaging materials. (5) Maintaining gloves, if they are used in biomass handling, in an intact, clean, and sanitary condition. The gloves should be of an impermeable material. (6) Wearing, where appropriate, in an effective manner, hair nets, headbands, caps, beard covers, or other effective hair restraints. (7) Storing clothing or other personal belongings in areas other than where biomass is exposed or where equipment or utensils are washed. (8) Confining the following to areas other than where biomass may be exposed or where equipment or utensils are washed: eating biomass, chewing gum, drinking beverages, or using tobacco. (9) Taking any other necessary precautions to protect against contamination of biomass, biomass-contact surfaces, or biomass-packaging materials with microorganisms or foreign substances including, but not limited to, perspiration, hair, cosmetics, tobacco, chemicals, and medicines applied to the skin. The microalgal biomass can optionally be subjected to a cell disruption procedure to generate a lysate and/or optionally dried to form a microalgal biomass composition.

Example 4

Culture of *Chlorella protothecoides* to Generate High Oil Algal Flakes

*Chlorella protothecoides* (UTEX 250) biomass was produced using 5,000 L fermentation tanks using processes described in Examples 2 and 3. Glucose (corn syrup) concentration was between was monitored throughout the run. When the glucose concentration was low, more glucose was added to the fermentation tank. After all nitrogen was consumed, the cells began accumulating lipid. Samples of biomass were taken throughout the run to monitor lipid levels and the run was stopped when the biomass reached the desired lipid content (over 40% lipid by dry cell weight). In this case, the biomass was harvested when it reached approximately 50% lipid by dry cell weight.

To process the microalgal biomass into algal flakes, the harvested *Chlorella protothecoides* biomass was separated from the culture medium using centrifugation and dried on a drum dryer using standard methods at approximately 150-170° C. The resulting drum-dried *Chlorella protothecoides* biomass with approximately 50% lipid by dry cell weight (high lipid) was packaged and stored for use as algal flakes.

Example 5

Absence of Algal Toxins in Dried *Chlorella protothecoides* Biomass

A sample of *Chlorella protothecoides* (UTEX 250) biomass was grown and prepared using the methods described in Example 4. The dried biomass was analyzed using liquid chromatography-mass spectrometry/mass spectrometry (LC-MS/MS) analysis for the presence of contaminating algal and cyanobacterial toxins. The analyses covered all groups of algal and cyanobacterial toxins published in the literature and mentioned in international food regulations. The results show that the biomass sample did not contain any detectable levels of any of the algal or cyanobacterial toxins that were tested. The results are summarized in Table 3.

TABLE 3

LC-MS/MS analytical results for algal and cyanobacterial toxins.

| Toxin Category | Toxin | Result | Limit of detection (LC/MS) |
|---|---|---|---|
| Amnesic Shellfish Poisoning (ASP) Toxins | Domoic Acid | Not detectable | 1 µg/g |
| Diarrhetic Shellfish Poisoning (DSP) Toxins | Okadaic acid and Dinophysistoxins | Not detectable | 0.1 µg/g |
| | Pectenotoxins | Not detectable | 0.1 µg/g |
| | Yessotoxins | Not detectable | 0.1 µg/g |
| | Azaspiracides | Not detectable | 0.1 µg/g |
| | Gymnodimines | Not detectable | 0.1 µg/g |
| Paralytic Shellfish Poisoning (PSP) Toxins | Saxitoxin | Not detectable | (HPLC/FD) 0.3 µg/g |
| | Neosaxitoxin | Not detectable | (HPLC/FD) 0.3 µg/g |
| | Decarbamoyl-saxitoxin | Not detectable | (HPLC/FD)) 0.3 µg/g |
| | Gonyautoxins | Not detectable | (HPLC/FD) 0.3 µg/g |
| Neurotoxic Shellfish Poisoning (NSP) Toxins | Brevetoxins | Not detectable | 0.1 µg/g |
| Cyanobacterial toxins | Microsystins MC-RR, MC-LR, MC-YR, MC-LA, MC-LW and MC-LF | Not detectable | 0.1 µg/g |
| | Nodularin | Not detectable | 0.1 µg/g |
| | Anatoxin-a | Not detectable | 0.5 µg/g |
| | Cylindro-spermopsins | Not detectable | 0.2 µg/g |
| | Beta-Methylamino-L-Alanine | Not detectable | 2.5 µg/g |

Example 6

Fiber Content in *Chlorella protothecoides* Biomass

Proximate analysis was performed on samples of dried *Chlorella protothecoides* (UTEX 250) biomass grown and prepared using the methods described in Example 4 and Example 17 in accordance with Official Methods of ACOC International (AOAC Method 991.43). Acid hydrolysis for total fat content (lipid/oil) was performed on both samples and the fat content for the high lipid algal biomass was approximately 50% and for high protein algal biomass was approximately 15%. The crude fiber content was 2% for both high lipid and high protein algal biomass. The moisture (determined gravimetrically) was 5% for both high lipid and high protein algal biomass. The ash content, determined by crucible burning and analysis of the inorganic ash, was 2% for the high lipid algal biomass and 4% for the high protein biomass. The crude protein, determined by the amount of nitrogen released from burning each biomass, was 5% for the high lipid biomass and 50% for the high protein biomass. Carbohydrate content was calculated by difference, taking the above known values for fat, crude fiber, moisture, ash and crude protein and subtracting that total from 100. The calculated carbohydrate content for the high lipid biomass was 36% and the carbohydrate content for the high protein biomass as 24%.

Further analysis of the carbohydrate content of both algal biomass showed approximately 4-8% (w/w) free sugars (predominantly sucrose) in the samples. Multiple lots of high lipid-containing algal biomass were tested for free sugars (assays for fructose, glucose, sucrose maltose and lactose) and the amount of sucrose ranged from 2.83%-to 5.77%; maltose ranged from undetected to 0.6%; and glucose ranged from undetected to 0.6%. The other sugars, namely fructose, maltose and lactose, were undetected in any of the assayed lots. Multiple lots of high protein-containing algal biomass were also tested for free sugars and only sucrose was detected in any of the lots at a range of 6.93% to 7.95%.

The analysis of the total dietary fiber content (within the carbohydrate fraction of the algal biomass) of both algal biomass was performed using methods in accordance with Official Methods of ACOC International (AOAC Method 991.43). The high lipid biomass contained 19.58% soluble fiber and 9.86% insoluble fiber, for a total dietary fiber of 29.44%. The high protein biomass contained 10.31% soluble fiber and 4.28% insoluble fiber, for a total dietary fiber of 14.59%.

Monosaccharide Analysis of Algal Biomass

A sample of dried *Chlorella protothecoides* (UTEX 250) biomass with approximately 50% lipid by dry cell weight, grown and prepared using the methods described in Example 4 was analyzed for monosaccharide (glycosyl) composition using combined gas chromatography/mass spectrometry (GC/MS) of the per-O-trimethylsilyl (TMS) derivatives of the monosaccharide methyl glycosides produced from the sample by acidic methanolysis. Briefly, the methyl glycosides were first prepared from the dried *Chlorella protothecoides* sample by methanolysis in 1M HCl in methanol at 80° C. for 18-22° C., followed by re-N-acetylation with pyridine and acetic anhydride in methanol (for detection of amino sugars). The samples were then per-O-trimethylsilylated by treatment with Tri-Sil (Pierce) at 80° C. for 30 minutes. These procedures were previously described in Merkle and Poppe (1994) Methods Enzymol. 230:1-15 and York et al. (1985) Methods Enzymol. 118:3-40. GC/MS analysis of the TMS methyl glycosides was performed on an HP 6890 GC interfaced to a 5975b MSD, using a All Tech EC-1 fused silica capillary column (30 m×0.25 mm ID). The monosaccharides were identified by their retention times in comparison to standards, and the carbohydrate character of these were authenticated by their mass spectra. The monosaccharide (glycosyl) composition of *Chlorella protothecoides* was: 1.2 mole % arabinose, 11.9 mole % mannose, 25.2 mole % galactose and 61.7 mole % glucose. These results are expressed as mole percent of total carbohydrate.

Example 7

Amino Acid Profile of Algal Biomass

A sample of dried *Chlorella protothecoides* (UTEX 250) biomass with approximately 50% lipid by dry cell weight, grown and prepared using the methods described in Example 4 was analyzed for amino acid content in accordance with Official Methods of AOAC International (tryptophan analysis: AOAC method 988.15; methionine and cystine analysis: AOAC method 985.28 and the other amino acids: AOAC method 994.12). The amino acid profile from the dried algal biomass (expressed in percentage of total protein) was compared to the amino acid profile of dried whole egg (profile from product specification sheet for Whole Egg, Protein Factory Inc., New Jersey), and the results show that the two sources have comparable protein nutritional values. Results of the relative amino acid profile (to total protein) of a sample of *Chlorella protothecoides* show the biomass contains methionine (2.25%), cysteine (1.69%), lysine (4.87%), phenylalanine (4.31%), leucine (8.43%), isoleucine (3.93%), threonine (5.62%), valine (6.37%), histidine (2.06%), arginine (6.74%), glycine (5.99%), aspartic acid (9.55%), serine (6.18%), glutamic acid (12.73%), praline (4.49%) hydroxyproline (1.69%), alanine (10.11%), tyrosine (1.87%), and tryptophan (1.12%). The comparison of the algal biomass and whole egg amino acid profiles are shown in FIG. 2.

Example 8

Carotenoid, Phospholipid, Tocotrienol and Tocopherol Composition of *Chlorella protothecoides* UTEX 250 Biomass A sample of algal biomass produced using methods described in Example 4 was analyzed for tocotrienol and tocopherol content using normal phase HPLC, AOCS Method Ce 8-89. The tocotrienol and tocopherol-containing fraction of the biomass was extracted using hexane or another non-polar solvent. The complete tocotrienol and tocopherol composition results are summarized in Table 4.

TABLE 4

Tocotrienol and tocopherol content in algal biomass.
Tocotrienol and tocopherol composition of
*Chlorella protothecoides* UTEX 250

| Tocopherols | |
| --- | --- |
| Alpha tocopherol | 6.29 mg/100 g |
| Delta tocopherol | 0.47 mg/100 g |
| Gamma tocopherol | 0.54 mg/100 g |
| Total tocopherols | 7.3 mg/100 g |
| Tocotrienols | |
| Alpha tocotrienol | 0.13 mg/g |
| Beta tocotrienol | 0 |
| Gamma tocotrienol | 0.09 mg/g |
| Delta tocotrienol | 0 |
| Total tocotrienols | 0.22 mg/g |

The carotenoid-containing fraction of the biomass was isolated and analyzed for carotenoids using HPLC methods. The carotenoid-containing fraction was prepared by mixing lyophilized algal biomass (produced using methods described in Example 3) with silicon carbide in an aluminum mortar and ground four times for 1 minute each time, with a mortar and pestle. The ground biomass and silicon mixture was then rinsed with tetrahydrofuran (THF) and the supernatant was collected. Extraction of the biomass was repeated until the supernatant was colorless and the THF supernatant from all of the extractions were pooled and analyzed for carotenoid content using standard HPLC methods. The carotenoid content for algal biomass that was dried using a drum dryer was also analyzed using the methods described above.

The carotenoid content of freeze dried algal biomass was: total lutein (66.9-68.9 mcg/g: with cis-lutein ranging from 12.4-12.7 mcg/g and trans-lutein ranging from 54.5-56.2 mcg/g); trans-zeaxanthin (31.427-33.451 mcg/g); cis-zeaxanthin (1.201-1.315 mcg/g); t-alpha cryptoxanthin (3.092-3.773 mcg/g); t-beta cryptoxanthin (1.061-1.354 mcg/g); 15-cis-beta carotene (0.625-0.0675 mcg/g); 13-cis-beta carotene (0.0269-0.0376 mcg/g); t-alpha carotene (0.269-0.0376 mcg/g); c-alpha carotene (0.043-0.010 mcg/g); t-beta carotene (0.664-0.741 mcg/g); and 9-cis-beta carotene (0.241-0.263 mcg/g). The total reported carotenoids ranged from 105.819 mcg/g to 110.815 mcg/g.

The carotenoid content of the drum-dried algal biomass was significantly lower: total lutein (0.709 mcg/g: with trans-lutein being 0.091 mcg/g and cis-lutein being 0.618 mcg/g); trans-zeaxanthin (0.252 mcg/g); cis-zeaxanthin (0.037 mcg/g); alpha-cryptoxanthin (0.010 mcg/g); beta-cryptoxanthin (0.010 mcg/g) and t-beta-carotene (0.008 mcg/g). The total reported carotenoids were 1.03 mcg/g. These data suggest that the method used for drying the algal biomass can significantly affect the carotenoid content.

Phospholipid analysis was also performed on the algal biomass. The phospholipid containing fraction was extracted using the Folch extraction method (chloroform, methanol and water mixture) and the oil sample was analyzed using AOCS Official Method Ja 7b-91, HPLC determination of hydrolysed lecithins (International Lecithin and Phospholipid Society 1999), and HPLC analysis of phospholipids with light scatting detection (International Lecithin and Phospholipid Society 1995) methods for phospholipid content. The total phospholipids by percent w/w was 1.18%. The phospholipid profile of algal oil was phosphatidylcholine (62.7%), phosphatidylethanolamine (24.5%), lysophosphatidiylcholine (1.7%) and phosphatidylinositol (11%). Similar analysis using hexane extraction of the phospholipid-containing fraction from the algal biomass was also performed. The total phospholipids by percent w/w was 0.5%. The phospholipid profile was phosphatidylethanolamine (44%), phosphatidylcholine (42%) and phosphatidylinositol (14%).

Example 9

Algal Flake (High Oil) Containing Food Products
Cardio/Metabolic Health Bar

The ingredients of the cardio/metabolic health bar consisted of quick oats (30.725%), crisp rice (9.855%), fine granular sugar (sucrose) (14.590%), light brown sugar (6.080%), salt (0.550%), canola oil (10.940%), corn syrup 42 DE (7.700%), honey (3.650%), water (7.700%), lecithin (0.180%), baking soda (0.180%), dried algal biomass (*Chlorella protothecoides* UTEX 250, 48% lipid) (1.540%), corowise plant sterol (1.060%), inulin (soluble fiber) (4.280%), and *psyllium* (insoluble fiber) (0.970%).
Instructions:

(1) Preheat oven at 325 degrees Fahrenheit with convection. (2) Weigh out the first 5 ingredients in a bowl. (3) Mix water, lecithin and baking soda in a Hobart mixer. (4) Mix together honey, corn syrup and canola oil; heat in microwave for 30-40 seconds. Hand mix with a spatula and pour the mixture into the Hobart mixer. (5) Add desired standard food flavor. (6) Add the dry nutraceuticals (algal biomass, plant sterol, fiber) into the Hobart mixer. (7) Add the remaining dry ingredients. (8) Form and bake at 325 degrees Fahrenheit for 20-25 minutes with convection.

Cardio Daily Shot (a Liquid Food Containing Intact High Oil Algal Biomass)

The ingredients of the orange flavored cardio shot consisted of distilled water (869.858 g), sodium benzoate (0.100 g), Ticaloid 5415 powder (1.000 g), evaporated cane juice sugar (88.500 g), dried algal biomass (over 40% oil) (16.930 g), fibersol—2 ADM (47.000 g), corowise ES-200 plant sterol (18.300 g), granular citric acid (1.312 g), orange extract (WONF, Flavor 884.0062U) (1.000 g). The ingredients were combined and blended until smooth.

Weight Management Smoothie (a Liquid Food Containing Intact High Oil Algal Biomass)

The ingredients of the fruit-based smoothie consisted of distilled water (815.365 g), stabilizer (4.5 g), apple juice concentrate (58 g), orange juice concentrate (46.376 g), lemon juice concentrate (1.913 g), mango puree concentrate (42.5 g), banana puree (40.656 g), passionfruit juice concentrate (8.4 g), ascorbic acid (0.320 g), algal flakes (46.41 g), orange flavor extract (1 g), pineapple flavor (0.4 g) and mango flavor (0.16 g). The ingredients were combined and blended until smooth.

Cardio/Metabolic Tablets (Encapsulated/Tablet-Form Intact High Oil Algal Biomass)

The ingredients of the metabolic health tablet (1.25-1.75 g size) consisted of *Chlorella protothecoides* dried microalgae biomass (UTEX 250, over 40% lipid dry cell weight) (1000 mg/tablet), betatene beta carotene (beta carotene 20% from *Dunaliella*) (15 mg/tablet), vitamin C as ascorbic acid (100 mg/tablet), and bioperine (piper nigrem bioavailability enhancer) (2.5 mg/tablet).

Algal Snack Chips

The ingredients of the algae snack chips consisted of unbleached white flour (1 cup), potato flour (½ cup), algal biomass (over 40% lipid dry cell weight) (3 tablespoons), salt (¾ teaspoon, adjust to taste), barley flour (2 tablespoons), water (⅓-1 cup), and seasonings (e.g., cumin, curry, ranch dressing) (to taste).
Preparation Procedure:

The dry ingredients were mixed and ⅓ cup of water was added to the dry ingredients. Additional water was added (up to 1 cup total) to form dough. The dough was kneaded into a uniformed product and then was allowed to rest for 30 minutes at room temperature. The rested dough was cut and formed into thin chips and baked at 275° F. for 20-30 minutes, or until crispy.

Algal Raisin Cookies

The ingredients of the algae raisin cookies consisted of butter or margarine (½ cup, conventional food recipe calls for ¾ cup), barley flakes or oatmeal (1¾ cup), nutmeg (¼ teaspoon), water or milk (2-3 tablespoons), brown sugar (1 cup), salt (½ teaspoon), baking powder (½ teaspoon), vanilla (1 teaspoon), cinnamon (1 teaspoon), raisins (optionally presoaked in brandy or orange juice) (¾ cup), and dried algal biomass (over 30% oil) (⅓ cup). This recipe made about 2 dozen cookies.

The conventional food recipe calls for 2 eggs and ¾ cup of butter or margarine. With the use of dried algal biomass, ¼ cup of butter or margarine and eggs are eliminated by substitution with algal biomass containing oil.

Preparation Procedure:

Cream the butter and sugar. Beat until fairly fluffy. Add the vanilla. Combine the flour and barley flakes and algae. Combine the butter mixture with the flour-flakes mixture. Add the raisins. Drop by teaspoonfuls, and flatten, slightly. Bake about 9-10 minutes at 375 degrees F.

Algal Barley Pasta

The ingredients of the barley pasta with algae consisted of barley flour (¾ cup), dried algal biomass with at least 20% lipid by dry cell weight (2 tablespoons), large egg (1), and salt (½ teaspoon).

Preparation Procedure:

Place flour in bowl and add algae and salt. Whisk together. Add egg in middle (make a well), and gradually stir in flour. If difficult to stir in, add 1 tablespoon water, sprinkling it around. When all the flour has been incorporated, begin to knead the dough to make it more uniform. This should be done for 5-8 minutes. When the dough is uniform, divide it into two small balls, and rub olive oil on the outside. Cover and let rest about 30 minutes. Flatten the dough, then roll it with a rolling pin to a thickness of about an eighth of an inch, for fettucine-like pasta. Slice the pasta into thin strips. Drop into boiling, salted water. Cook about 8-10 minutes. The pasta can be served with a small amount of grated parmesan cheese on top, and some cracked pepper.

Pasta

This example compares pasta made by a conventional recipe and a whole cell high-lipid biomass (*Chlorella protothecoides* (strain UTEX 250) with 48% lipid by dry cell weight) to replace the egg in the conventional recipe.

TABLE 5

Recipe for traditional pasta control.

| Component | Recipe Measures | Weight (g) | Percent | % Fat, Wet Wt. |
|---|---|---|---|---|
| Whole Egg (beaten) | 1 | 55.67 | 24.97% | 1.87% |
| Salt, Table | ½ tsp. | 3.74 | 1.68% | 0.00% |
| Flour, All-purpose | 1 cup | 133.18 | 59.74% | 0.00% |
| Water | 1-2 tbsp. | 30.35 | 13.61% | 0.00% |
| Yield: 3 | | 222.94 | 100.00% | 1.87% |

TABLE 6

Recipe for whole cell algal biomass replacing the whole egg.

| Component | Recipe Measures | Weight (g) | Percent | % Fat, Wet Wt |
|---|---|---|---|---|
| Whole cell biomass | | 7.55 | 3.16% | 1.52% |
| Salt, Table | ½ tsp. | 3.61 | 1.51% | 0.00% |
| Flour, All-purpose | 1 cup | 146.28 | 61.25% | 0.00% |
| Water | | 81.37 | 34.07% | 0.00% |
| Yield: 3 | | 238.81 | 100.00% | 1.52% |

In each case the cooking procedure was:
1. In a kitchen aid bowl using dough hook, combine flour and salt.
2. Lightly beat the egg. On a low speed (Speed #2), add the slightly beaten egg until forms a stiff dough.
3. If needed, stir in 1-2 Tbsp water.
4. Mix for 3-4 minutes, add a little extra flour if dough too sticky.
5. Portion dough into sheetable portions. Allow dough to rest 1 hour prior to sheeting.
6. Using a pasta sheeter, sheet dough to desired thickness.
7. Cut pasta into strips.
8. Place a pot of water on the stove to boil.
9. Cook pasta and toss with oil/butter to prevent sticking. Serve with sauce.

The whole cell biomass pasta had similar texture and appearance to the conventional recipe. No prominent algal flavor was evident. The whole cell algal biomass improved yield in the dry pasta, most likely due to a water binding function. These observations are consistent with the idea that the whole cell algal biomass can act as a good bulking agent in dried or processed foods.

Algal Milk

Algal milk contains about 8% solids, which is comprised of 4% heart healthy lipids, 2.5% of essential amino acid-rich proteins, 1.5% carbohydrates and 0.5% fiber, and is fortified with vitamins A and D. Algal milk is extremely healthy; it is vegan, and can be used as a substitute for cow's milk and soy milk. Unlike cow's milk, it is very low in saturated fat, and unlike soy milk, the fat is primarily a mono-unsaturate (over 50% C18:1). The algal milk has a bland taste; not "beany" as in soy milk. Flavors can be added, such as strawberry or raspberry.

The ingredients of the algal milk consisted of dried whole algal cells containing about 40% lipid (8%), vitamin D (200 units), vitamin A (200 units), xanthan gum (0.2%), and water (to 100%). The water was warmed the xanthan gum was dispersed. The whole, dried algal cells were then dispersed in the warm xanthan gum solution and vitamins were added. The solution was then homogenized using a high pressure homogenizer and pasteurized. An additional formulation is included below using algal flour.

Example 10

Production of Algal Homogenate (High Lipid)

High lipid containing *Chlorella protothecoides* grown using the methods and conditions described in Example 4 was processed into a high lipid algal homogenate. To process the microalgal biomass into an algal homogenate, the harvested *Chlorella protothecoides* biomass was first processed into algal flakes (see Example 4). The dried algal flakes were then rehydrated in deionized water at approximately 40% solids concentration. The resulting algal flake suspension was then micronized using a high pressure homogenizer (GEA model NS1001) operating at a pressure level of 1000-1200 Bar until the average particle size of the biomass was less than 10 The resulting algal homogenate was packaged and stored until use.

Example 11

Functional Food Products: High Lipid Algal Flakes and Algal Homogenate Used in Foods as a Fat Replacement The following examples describe the use of high lipid (above 40% by weight) algal flakes or algal homogenate as a fat replacement in conventional and low-fat recipes. High lipid algal flakes were prepared using the methods described in Example 4. High lipid algal homogenate was prepared using the methods described in Example 8.

Chocolate Brownies

This example compares chocolate brownies made using a conventional recipe, a low fat control recipe and with high lipid algal flakes (*Chlorella protothecoides* (strain UTEX 250) with 48% lipid by dry cell weight) replacing some of the fat in the conventional recipe.

TABLE 7

Recipe for the conventional chocolate brownie control.

| Component | Recipe Measures | Weight (g) | Percent | % Fat, Wet Wt. |
|---|---|---|---|---|
| Butter | 1 stick, ¼ lb | 114.00 | 19.05% | 15.88% |
| Cocoa powder | ¼ cup | 24.00 | 4.18% | 0.42% |
| Whole Eggs | 3 | 156.00 | 27.16% | 2.04% |
| Sugar, granulated | 1 cup | 140.92 | 24.54% | 0.00% |
| Flour, all-purpose | 1 cup | 130.40 | 22.70% | 0.00% |
| Baking Powder | 1 tsp. | 3.97 | 0.69% | 0.00% |
| Vanilla Extract | 1 tsp. | 5.07 | 0.88% | 0.00% |
| Yield: 1 pan | | 574.36 | 100.00% | 18.34% |

TABLE 8

Recipe for the low fat control.

| Component | Recipe Measures | Weight (g) | Percent | % Fat, Wet Wt. |
|---|---|---|---|---|
| Butter | | 0.00 | 0.00% | 0.00% |
| Cocoa powder | ¼ cup | 24.00 | 5.40% | 0.54% |
| Water | | 139.80 | 31.48% | 0.00% |
| Whole Eggs | 0.00 | 0.00 | 0.00% | 0.00% |
| Sugar, granulated | 1 cup | 140.92 | 31.72% | 0.00% |
| Flour, all-purpose | 1 cup | 130.40 | 29.36% | 0.00% |
| Baking Powder | 1 tsp. | 3.97 | 0.89% | 0.00% |
| Vanilla Extract | 1 tsp. | 5.07 | 1.14% | 0.00% |
| Yield: 1 pan | | 444.16 | 100.00% | 0.54% |

TABLE 9

Recipe for whole algal biomass brownies as replaced for butter and eggs.

| Component | Recipe Measures | Weight (g) | Percent | % Fat, Wet Wt. |
|---|---|---|---|---|
| Whole cell biomass | | 73.00 g | 12.59% | 6.5% |
| Cocoa powder | ¼ cup | 24.00 | 4.14% | 0.41% |
| Water | 3 | 148.00 | 25.52% | 0.00% |
| Sugar, granulated | 1 cup | 183.00 | 31.55% | 0.00% |
| Flour, all-purpose | 1 cup | 133.00 | 22.93% | 0.00% |
| Baking Powder | 1 tsp. | 4.00 | 0.69% | 0.00% |
| Pecans, chopped | 1 cup | 0.00 | 0.00% | 0.00% |
| Vanilla Extract | 1 tsp. | 15.00 | 2.59% | 0.00% |
| Yield: 1 pan | | 580.00 | 100.00% | 6.91% |

In each case, the cooking procedure was:
1. Preheat oven to 350° F. Grease and flour 8×8 baking pan.
2. In a small saucepan, melt butter with cocoa powder. Set aside to cool.
3. In a kitchen-aid bowl with paddle attachment, beat eggs until foamy. Gradually add in sugar.
4. Add room temp/sl warm butter/cocoa powder mixture to egg mixture.
5. Mix flour and baking powder together. Add ½ mixture slowly to batter.
6. Add pecans to remaining portion of flour. Add mixture to batter. Mix on low (Speed #2) until well blended. Add vanilla extract and mix.
7. Spread batter into pan. Bake for 20-25 mins.
8. Cool brownies and ice if desired.

The low fat control brownies (with the butter and eggs omitted) did not have the same crumb structure as compared to the brownies made with the algal flakes or the conventional brownies. The algal flakes brownies had a nice, visible crumb structure, but were a little denser and gummier than the full fat brownies. Overall, the brownies made with the algal flakes had about a 64% reduction in the fat content when compared to the conventional brownies.

Yellow Cake

This example compares yellow cake made by a conventional recipe, a low fat recipe, high-lipid algal homogenate (HL-AH) to replace the eggs and butter in the conventional recipe, and high lipid algal flakes to replace the eggs in the conventional recipe. Both the algal homogenate and the algal flakes were from *Chlorella protothecoides* (strain UTEX 250) with 48% lipid by dry cell weight.

TABLE 10

Conventional yellow cake recipe.

| Component | Recipe Measures | Weight (g) | Percent | % Fat, Wet Wt. |
|---|---|---|---|---|
| Butter | 1 cup | 222.20 | 11.38% | 9.11% |
| Sugar, granulated | 2½ cups | 476.16 | 24.40% | 0.00% |
| Eggs, Whole | 3 | 148.26 | 7.60% | 0.57% |
| *Vanilla* Extract | 1½ tsp. | 6.50 | 0.33% | 0.00% |
| Buttermilk. 1% MF | 2½ cups | 575.00 | 29.46% | 0.29% |
| Flour, All purpose | 3¾ cups | 502.96 | 25.77% | 0.00% |
| Baking powder | 2¼ tsp. | 8.35 | 0.43% | 0.00% |
| Baking soda | 2½ tsp. | 12.44 | 0.64% | 0.00% |
| Yield: 2 pans | | 1951.87 | 100.00% | 9.97% |

TABLE 11

Recipe for the low fat negative control.

| Component | Recipe Measures | Weight (g) | Percent | % Fat, Wet Wt. |
|---|---|---|---|---|
| Butter | 0.00 | 0.00 | 0.00% | 0.00% |
| Sugar, granulated | 2½ cups | 475.00 | 30.36% | 0.00% |
| Eggs, Whole | 0.00 | 0.00 | 0.00% | 0.00% |
| *Vanilla* Extract | 1½ tsp. | 6.50 | 0.42% | 0.00% |
| Buttermilk. 1% MF | 2½ cups | 575.00 | 36.75% | 0.37% |
| Flour, All purpose | 3¾ cups | 487.69 | 31.17% | 0.00% |
| Baking powder | 2¼ tsp. | 8.52 | 0.54% | 0.00% |
| Baking soda | 2½ tsp. | 11.90 | 0.76% | 0.00% |
| Yield: 2 pans | | 1564.61 | 100.00% | 0.37% |

TABLE 12

Recipe for micronized high lipid algal biomass as a replacement for egg and butter.

| Component | Recipe Measures | Weight (g) | Percent | % Fat, Wet Wt. |
|---|---|---|---|---|
| Butter | 0.00 | 0.00 | 0.00 | 0.00% |
| Sugar, granulated | 2½ cups | 457.00 | 22.98% | 0.00% |
| Micronized HL-AH | | 100.00% | 5.03% | 2.41% |
| Water (as from egg, butter) + additional | | 308.47 | 15.51% | 0.00% |
| *Vanilla* Extract | 1½ tsp. | 20.00 | 1.01% | 0.00% |
| Buttermilk | 2½ cups | 575.00 | 28.92% | 0.29% |
| Flour, All purpose | 3¾ cups | 505.00 | 25.40% | 0.00% |
| Baking powder | 2¼ tsp. | 9.80 | 0.49% | 0.00% |
| Baking soda | 2½ tsp. | 13.30 | 0.67% | 0.00% |
| | | 1988.57 | 100.00% | 2.70% |

TABLE 13

Recipe for high lipid algal flakes as egg replacer.

| Component | Recipe Measures | Weight (g) | Percent | % Fat, Wet Wt. |
|---|---|---|---|---|
| Butter | 1 Cup | 227.00 | 11.69% | 9.35% |
| Sugar, granulated | 2½ cups | 457.00 | 23.53% | 0.00% |
| Algal flakes |  | 22.50 | 1.16% | 0.56% |
| Water (as from egg) |  | 112.50 | 5.79% | 0.00% |
| *Vanilla* Extract | 1½ tsp. | 20.00 | 1.03% | 0.00% |
| Buttermilk | 2½ cups | 575.00 | 29.61% | 0.30% |
| Flour, All purpose | 3¾ cups | 505.00 | 26.00% | 0.00% |
| Baking powder | 2¼ tsp. | 9.80 | 0.50% | 0.00% |
| Baking soda | 2½ tsp | 13.30 | 0.68% | 0.00% |
| Yield: 2 pans |  | 1942.10 | 100.00% | 10.21% |

In each case the cooking procedure was:
1. Preheat oven to 350° F. Grease and flour two 9×13 in pans.
2. Sift together flour, baking powder and baking soda. Set aside.
3. In a kitchen aid bowl, cream butter and sugar together until light. Beat eggs in 1 at a time.
4. Add in vanilla extract.
5. Add flour mixture alternately with buttermilk to batter. Mix until just incorporated.
6. Pour batter into prepared pans.
7. Bake cakes for 35-40 minutes, or until toothpick comes out clean.
8. Cool.

The yellow cake made with the high lipid algal flakes (as an egg replacer) was very dense, with almost no crumb structure. However, the yellow cake made with high lipid algal flakes was moist when compared to the low fat negative control, which was very dense and dry. The cake made with high lipid algal homogenate (HL-AH) (replacing all the butter and eggs in the full fat cake) was very moist and buttery in texture and had very good crumb structure that was similar to the conventional recipe cake. In tasting, the cake made with HL-AH lacked a buttery flavor that was present in the conventional cake. Overall, the HL-AH was a good replacer of butter and eggs in a conventional yellow cake recipe. The cake with the HL-AH contained about 75% less fat than the conventional yellow cake, but produced a cake with good crumb structure, texture and moistness.

Biscuits

This example compares biscuits made by a conventional recipe, high-lipid algal flake to replace the eggs and shortening in the conventional recipe, and high-lipid algal homogenate (HL-AH) to replace the eggs and shortening in the conventional recipe. Both the algal flake and the algal homogenate biomass were from *Chlorella protothecoides* (strain UTEX 250) with 48% lipid by dry cell weight.

TABLE 14

Conventional recipe for biscuits.

| Component | Recipe Measures | Weight (g) | Percent | % Fat, Wet Wt. |
|---|---|---|---|---|
| Flour, All Purpose | 2 cups | 277.73 | 44.59% | 0.00% |
| Baking Powder | 4 tsp. | 20.28 | 3.26% | 0.00% |
| Sugar, granulated | 3 tsp. | 12.61 | 2.02% | 0.00% |
| Salt, Table | ½ tsp. | 3.40 | 0.55% | 0.00% |
| Shortening (Crisco) | ½ cup | 82.04 | 13.17% | 13.17% |
| Egg, Whole | 1 | 53.15 | 8.53% | 0.64% |
| Milk, 2% | ⅔ cup | 173.68 | 27.88% | 0.56% |
| Yield: 12 |  | 622.89 | 100.00% | 14.37% |

TABLE 15

Recipe for high lipid algal flakes to substitute egg and shortening.

| Component | Recipe Measures | Weight (g) | Percent | % Fat, Wet Wt. |
|---|---|---|---|---|
| Flour, All Purpose | 2 cups | 275.00 | 46.08% | 0.00% |
| Baking Powder | 4 tsp. | 17.20 | 2.88% | 0.00% |
| Sugar, granulated | 3 tsp. | 11.28 | 1.89% | 0.00% |
| Salt, Table | ½ tsp. | 3.30 | 0.55% | 0.00% |
| Algal flakes |  | 50.00 | 8.38% | 4.02% |
| Water |  | 56.00 | 9.38% | 0.00% |
| Milk, 2% | ⅔ cup | 184.00 | 30.83% | 0.62% |
| Yield: 12 |  | 596.78 | 100.00% | 4.64% |

TABLE 16

Biscuit recipe using high lipid algal homogenate (HL-AH).

| Component | Recipe Measures | Weight (g) | Percent | % Fat, Wet Wt. |
|---|---|---|---|---|
| Flour, All Purpose | 2 cups | 137.50 | 46.08% | 0.00% |
| Baking Powder | 4 tsp. | 8.60 | 2.88% | 0.00% |
| Sugar, granulated | 3 tsp. | 5.65 | 1.89% | 0.00% |
| Salt, Table | ½ tsp. | 1.65 | 0.55% | 0.00% |
| HL-AH |  | 25.00 | 8.38% | 4.02% |
| Water |  | 28.00 | 9.38% | 0.00% |
| Milk, 2% | ⅔ cup | 92.00 | 30.83% | 0.62% |
| Yield: 12 |  | 298.40 | 100.00% | 4.64% |

In each case the cooking procedure was:
1. Preheat oven to 450° F.
2. In a kitchen aid bowl, combine flour, baking powder, sugar and salt.
3. Add shortening into mixture until forms coarse crumbs. (Speed #2).
4. Beat egg with milk. Add wets to dry ingredients and mix just until dry ingredients are moistened.
5. Mix until forms a dough (Speed #2 for 15 seconds).
6. Roll to ¾" thickness (or sheet if desired). Cut with a floured 2½" biscuit cutter.
7. Place on a lightly greased sheet pan. Bake for 8-10 mins, or until golden.
8. Serve warm.

The sample made with HL-AH appeared similar to the full fat control in texture and appearance. Overall, the HL-AH biscuits were the closest to the conventional recipe biscuits, producing a biscuit with 65% less fat, but still retained the texture and rise of a conventional recipe biscuit.

Creamy Salad Dressing

This example compares mayonnaise/salad dressing using a conventional recipe with 40% fat control, a low fat recipe with 20% fat control, and a recipe with high-lipid algal homogenate (HL-AH) (with ~20% fat by weight) from *Chlorella protothecoides* (strain UTEX 250) with 48% lipid by dry cell weight.

TABLE 17

Recipe for 40% fat control.

| Component | Recipe Measures | Weight (g) | Percent | % Fat, Wet Wt. |
|---|---|---|---|---|
| Oil, Canola | | 200.00 | 40.00% | 40.00% |
| Liquid Egg Yolk | | 15.00 | 3.00% | 0.80% |
| Vinegar, distilled, 60 grain | | 200.00 | 40.00% | 0.00% |
| Salt, Table | | 0.00 | 0.00% | 0.00% |
| Water | | 85.00 | 17.00% | 0.00% |
| | | 500.00 | 100.00% | 40.80% |

TABLE 18

Recipe for 20% fat control.

| Component | Recipe Measures | Weight (g) | Percent | % Fat, Wet Wt. |
|---|---|---|---|---|
| Oil, Canola | | 100.00 | 20.00% | 20.00% |
| Liquid Egg Yolk | | 14.78 | 2.96% | 0.78% |
| Vinegar, distilled, 60 grain | | 200.00 | 40.00% | 0.00% |
| Salt, Table | | 0.00 | 0.00% | 0.00% |
| Water | | 185.22 | 37.04% | 0.00% |
| | | 500.00 | 100.00% | 20.78% |

TABLE 19

Recipe for HL-AH creamy salad dressing.

| Component | Recipe Measures | Weight (g) | Percent | % Fat, Wet Wt. |
|---|---|---|---|---|
| HL-AH | | 200.00 | 40.00% | 19.0% |
| Water | | 180.00 | 36.00% | 0.00% |
| Vinegar (5% acid) | | 120.00 | 24.00% | 0.00% |
| Salt, Table | | 0.00 | 0.00% | 0.00% |
| | | 500.00 | 100.00% | 19.0% |

In each case the cooking procedure was:
1. Using a food processor, combine egg yolk, acid, water and salt.
2. Slowly stream in oil, until a tight emulsion is formed.
3. If emulsion is too tight, add some additional water.
4. Scrape down sides and shear again for 10 seconds to incorporate any oil droplets.

The 20% fat control dressing (made with canola oil) did not have any viscosity and failed to form an emulsion. The surface was foamy and oil droplets formed after letting the dressing sit. The dressing made with the HL-AH had an algal biomass flavor, good opacity and viscosity, and a creamy mouthfeel. Overall, the HL-AH imparted a better opacity and viscosity to the dressing when compared to both the 20% and the 40% fat dressings. The HL-AH functioned as a great emulsifier and produced a dressing that had the properties of a 40% fat dressing with the proper mouthfeel at half the fat content. Similar results were obtained with the micronized HL-AH (at a 19% fat content) in a Hollandaise sauce recipe (conventional recipe control was at 80% fat). The Hollandaise sauce produced with the HL-AH was smooth and rich tasting, with a creamy mouthfeel and good viscosity. The color of the sauce was a little darker yellow than the full fat control. Overall, the Hollandaise sauce with the micronized HL-AH produced a product that was comparable to the full fat control with 75% less fat.

Model Chocolate Beverage

This example compares a model chocolate nutritional beverage made with a conventional recipe, with high lipid algal homogenate (HL-AH) to replace milk and oil in the conventional recipe, and one with high-lipid algal flake biomass to replace milk and oil in the conventional recipe. Both the algal flake biomass and the HL-AH were from *Chlorella protothecoides* (strain UTEX 250) with 48% lipid by dry cell weight.

TABLE 20

Recipe for the conventional chocolate beverage control.

| Component | Weight (g) | 1000.00 g | Percent | % Fat |
|---|---|---|---|---|
| Water | 278.60 g | 835.81 g | 83.581% | 0.00% |
| Nonfat Dry Milk | 17.88 g | 53.64 g | 5.364% | 0.00% |
| Alkalized Cocoa Powder | 11.38 g | 34.14 g | 3.414% | 0.376% |
| Soy Protein Isolate | 8.12 g | 24.36 g | 2.436% | 0.00% |
| Maltodextrin | 5.00 g | 15.00 g | 1.500% | 0.00% |
| Flavor, Choc | 1.62 g | 4.86 g | 0.486% | 0.00% |
| Lecithin | 1.14 g | 1 g | 0.1% | 0.00% |
| Gum Blend | 0.81 g | 2.43 g | 0.243% | 0.00% |
| Disodium Phosphate | 0.32 g | 0.96 g | 0.096% | 0.00% |
| Sucralose | 0.13 g | 0.39 g | 0.039% | 0.00% |
| Canola Oil | 8.33 g | 24.99 g | 2.499% | 2.499% |
| | 333.33 g | 1000.00 g | 100.000% | 2.875% |

TABLE 21

Recipe for the chocolate beverage using HL-AH to replace milk and oil.

| Component | Weight (g) | 1000.00 g | Percent | % Fat |
|---|---|---|---|---|
| Water | 278.60 g | 857.23 g | 85.723% | 0.00% |
| HL-AH | 17.88 g | 55.02 g | 5.502% | 2.641% |
| Alkalized Cocoa Powder | 11.38 g | 35.02 g | 3.502% | 0.385% |
| Soy Protein Isolate | 8.12 g | 24.98 g | 2.498% | 0.00% |
| Maltodextrin | 5.00 g | 15.38 g | 1.538% | 0.00% |
| Flavor, Choc | 1.62 g | 4.98 g | 0.498% | 0.00% |
| Gum Blend | 0.81 g | 2.49 g | 0.249% | 0.00% |
| Disodium Phosphate | 0.32 g | 0.98 g | 0.098% | 0.00% |
| Sucralose | 0.13 g | 0.40 g | 0.040% | 0.00% |
| | 325.00 g | 1000.00 g | 100.000% | 3.026% |

TABLE 22

Recipe for a chocolate beverage using algal flake biomass to replace milk and oil.

| Component | Weight (g) | 1000.00 g | Percent | % Fat |
|---|---|---|---|---|
| Water | 278.60 g | 857.23 g | 85.723% | 0.00% |
| Algal flake (48% lipid) | 17.88 g | 55.02 g | 5.502% | 2.641% |
| Alkalized Cocoa Powder | 11.38 g | 35.02 g | 3.502% | 0.385% |
| Soy Protein Isolate | 8.12 g | 24.98 g | 2.498% | 0.00% |
| Maltodextrin | 5.00 g | 15.38 g | 1.538% | 0.00% |
| Flavor, Choc | 1.62 g | 4.98 g | 0.498% | 0.00% |
| Gum Blend | 0.81 g | 2.49 g | 0.249% | 0.00% |
| Disodium Phosphate | 0.32 g | 0.98 g | 0.098% | 0.00% |
| Sucralose | 0.13 g | 0.40 g | 0.040% | 0.00% |
| | 325.00 g | 1000.00 g | 100.00% | 3.026% |

In each case the cooking procedure was:
1) Blend dry ingredients
2) Add wets (except flavor) to pot.
3) Whisk in dry ingredients.
4) Shear with stick blender for 1 minute
5) Heat on stove top to 200° F.
6) Homogenize at 2500/500 psi.
7) Chill to <40° F. and refrigerate.

The chocolate beverage containing the HL-AH had a thicker, richer appearance than the chocolate beverage containing the algal flakes, and was closer in appearance to the conventional chocolate beverage. Overall, the micronized HL-AH sample more closely resembled the conventional chocolate beverage control, imparting a good viscosity and with slightly more opacity than the conventional chocolate beverage control.

Example 12

Production of Algal Powder (High Lipid)

High lipid containing *Chlorella protothecoides* grown using the fermentation methods and conditions described in Example 4 was processed into a high lipid algal powder. To process the microalgal biomass into algal powder, the harvested *Chlorella protothecoides* biomass was separated from the culture medium and then concentrated using centrifugation and dried using a spray dryer according to standard methods. The resulting algal powder (whole algal cells that have been spray dried into a powder form) was packaged and stored until use.

Example 13

Production of Algal Flour (High Lipid)

High lipid containing *Chlorella protothecoides* grown using the fermentation methods and conditions described in Example 4 was processed into a high lipid algal flour. To process the microalgal biomass into algal flour, the harvested *Chlorella protothecoides* biomass was separated from the culture medium using centrifugation. The resulting concentrated biomass, containing over 40% moisture, was micronized using a high pressure homogenizer ((GEA model NS1001) operating at a pressure level of 1000-1200 Bar until the average particle size of the biomass was less than 10 The algal homogenate was then spray dried using standard methods. The resulting algal flour (micronized algal cell that have been spray dried into a powder form) was packaged and stored until use.

Figure 4:
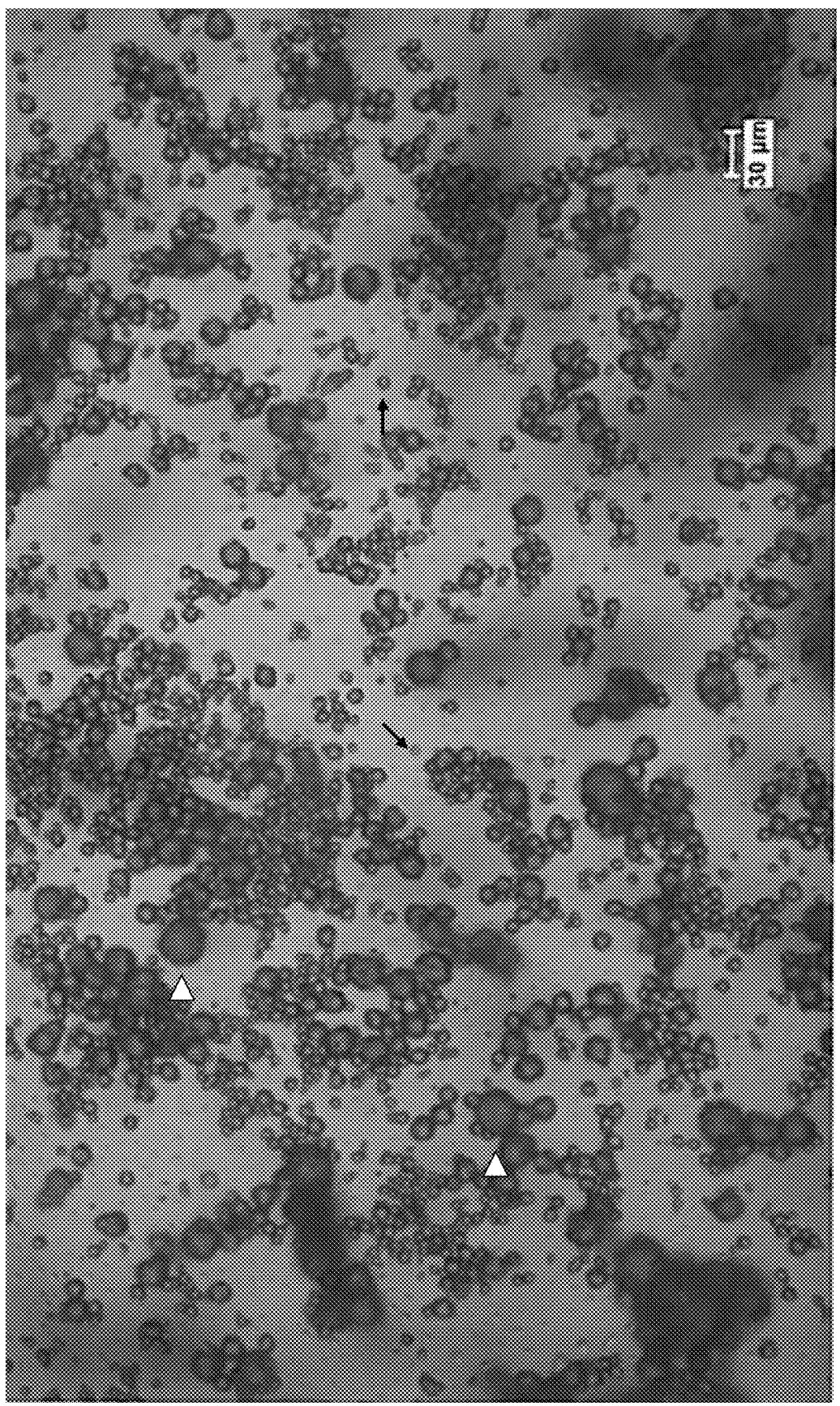
FIG. 4 shows algal flour (approximately 50% lipid by dry weight) in a water dispersion under light microscopy. The arrows point to average-sized, individual algal flour particles, while the larger arrowheads point to algal flour particles that have agglomerated or clumped together after the dispersion was formed.
Figure 5A:
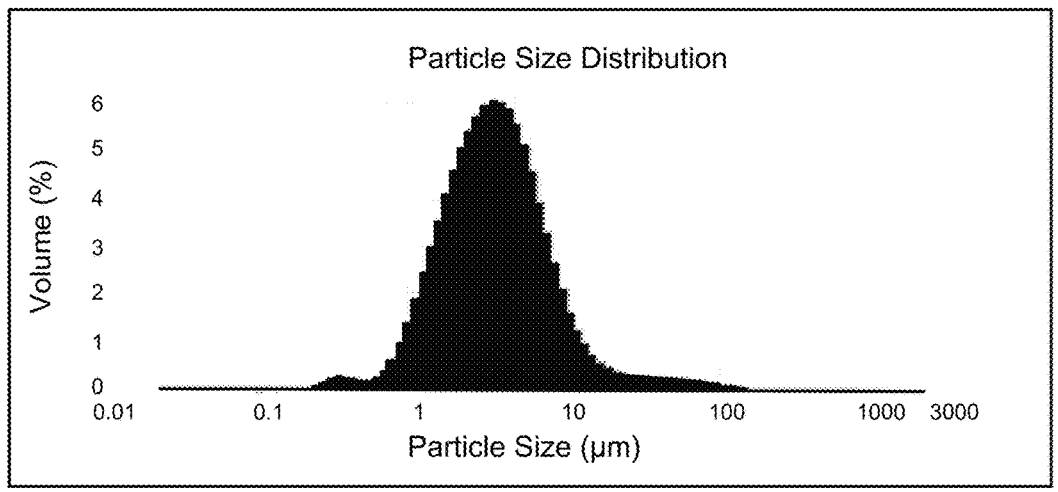
FIGS. 5A-C show size distribution of aqueous resuspended algal flour particles immediately after (5A) gentle mixing, (5B) homogenized under 300 bar pressure, and (5C) homogenized under 1000 bar pressure.
Figure 5B:
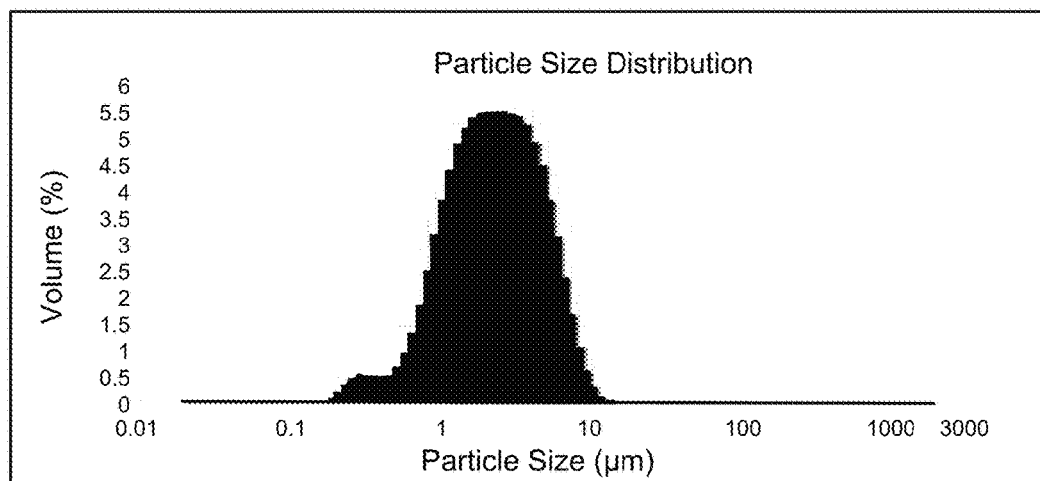
Figure 5C:
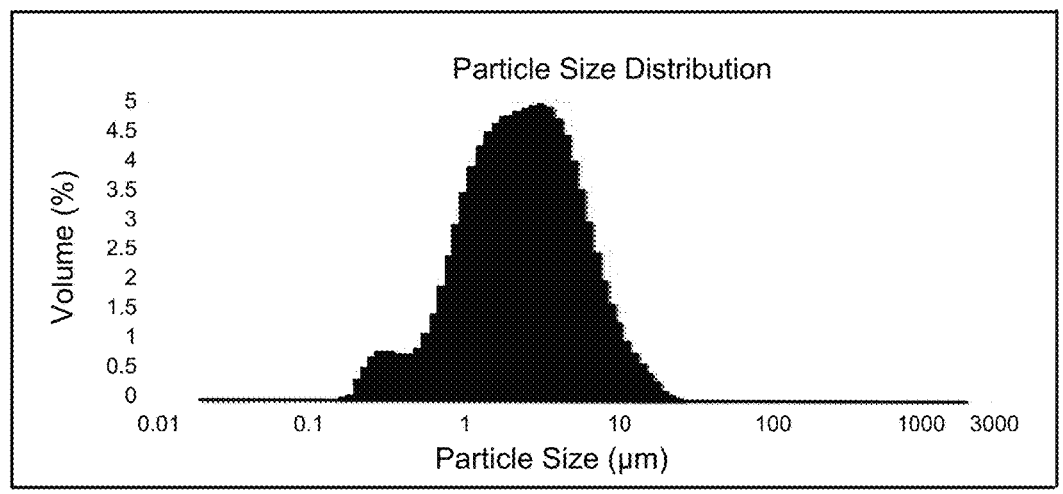

A sample of high lipid flour was analyzed for particle size. An algal flour in water dispersion was created and the algal flour particle size was determined using laser diffraction on a Malvern® Mastersizer 2000 machine using a Hydro 20005 attachment. A control dispersion was created by gentle mixing and other dispersions were created using 100 bar, 300 bar, 600 bar and 1000 bar of pressure. The results showed that the mean particle size of the algal flour is smaller in the condition with higher pressure (3.039 μm in the gentle mixing condition and 2.484 μm in the 1000 bar condition). The distribution of the particle sizes were shifted in the higher pressure conditions, with a decrease in larger sized particles (above 10 μm) and an increase in smaller particles (less than μm). Distribution graphs of the gentle mixing condition (FIG. 5A), the 300 bar condition (FIG. 5B), and the 1000 bar condition (FIG. 5C) are shown in FIG. 5. FIG. 4 shows a picture of algal flour in water dispersion under light microscopy immediately after homogenization. The arrows point to individual algal flour particles (less than 10 μm) and the arrow heads point to agglomerated or clumped algal flour particles (more than 10 μm).

Example 14

Algal Flour (High Oil) Containing Food Products

The following examples describe the use of high lipid (at least 20% by weight, typically 25-60% lipid by weight) algal flour as a fat replacement in conventional recipes. Additional examples also demonstrate unique functionality of the algal flour in increased moisture retention and improved texture when used in prepared foods such as powdered scrambled eggs. The high lipid algal flour used the examples below was prepared using the methods described in Example 13.

Chocolate Brownies

In an effort to evaluate functional and taste profile differences using high lipid algal flour, chocolate brownies made with a conventional recipe was compared to brownies made with brownies made with algal flour and a conventional reduced-fat brownie. High lipid (approximately 53% lipid by dry weight) algal flour was used in place of butter and eggs.

TABLE 23

Conventional brownie recipe.

| Component | Weight (g) | 650.00 g | Percent | % Fat |
|---|---|---|---|---|
| Butter, unsalted | 170.00 | 135.75 | 20.88 | 16.71 |
| Cocoa powder | 50.00 | 39.93 | 6.14 | 0.61 |
| Whole eggs | 200.00 | 159.71 | 24.57 | 1.84 |
| Sugar, granulated | 250.00 | 199.63 | 30.71 | 0.00 |
| Flour, all-purpose | 130.00 | 103.81 | 15.97 | 0.00 |
| Baking powder | 4.00 | 3.19 | 0.49 | 0.00 |
| Salt | 3.00 | 2.40 | 0.37 | 0.00 |
| *Vanilla* extract | 7.00 | 5.59 | 0.86 | 0.00 |
| | 814.00 | 650.00 | 100.00% | 19.16% |

TABLE 24

Reduced-fat brownie recipe.

| Component | Weight(g) | 650.00 g | Percent | % Fat |
|---|---|---|---|---|
| Butter, unsalted | 60.00 | 57.44 | 8.84 | 7.07 |
| Cocoa powder | 50.00 | 47.86 | 7.36 | 0.74 |
| Whole eggs | 100.00 | 95.73 | 14.73 | 1.10 |
| Sugar, granulated | 225.00 | 215.39 | 33.14 | 0.00 |
| Water | 50.00 | 47.86 | 7.36 | 0.00 |
| Corn syrup | 50.00 | 47.86 | 7.36 | 0.00 |
| Flour, all-purpose | 130.00 | 124.45 | 19.15 | 0.00 |
| Baking powder | 4.00 | 3.83 | 0.59 | 0.00 |
| Salt | 3.00 | 2.87 | 0.44 | 0.00 |
| Vanilla extract | 7.00 | 6.70 | 1.03 | 0.00 |
| | 679.00 | 650.00 | 100.00% | 8.91% |

TABLE 25

Algal flour brownie recipe.

| Component | Weight(g) | 600.00 g | Percent | % Fat |
|---|---|---|---|---|
| Algal flour | 195.00 | 206.72 | 34.45 | 7.30 |
| Cocoa powder | 48.00 | 50.88 | 8.48 | 0.85 |
| Water | 41.00 | 43.46 | 7.24 | 0.00 |
| Sugar, granulated | 140.92 | 149.39 | 24.90 | 0.00 |
| Flour, all-purpose | 130.40 | 138.24 | 23.04 | 0.00 |
| Baking powder | 4.00 | 4.24 | 0.71 | 0.00 |

TABLE 25-continued

Algal flour brownie recipe.

| Component | Weight(g) | 600.00 g | Percent | % Fat |
|---|---|---|---|---|
| Salt | 1.67 | 1.77 | 0.30 | 0.00 |
| Vanilla extract | 5.00 | 5.30 | 0.88 | 0.00 |
| | 565.99 | 600.00 | 100.00% | 8.15% |

In each case, the baking procedure was:
1. Preheat oven to 350° F. Grease and flour a 8"×8" baking pan.
2. In a small saucepan, melt butter with cocoa powder. Set aside to cool.
3. Beat eggs together with vanilla until slightly foamy. Gradually add in sugar and rest of the wet ingredients.
4. Add butter/cocoa mixture to egg mixture. Combine rest of dry ingredients and slowly add to wet mixture until blended.
5. Spread batter into pan and bake for 20-25 minutes, or until set.

For the brownies with algal flour, the dry ingredients were combined and the algal flour was then added to the dry ingredients. The wet ingredients (water and vanilla) were then slowly blended into the dry ingredients. Spread batter into pan and bake for 27-28 minutes.

The conventional reduced fat recipe produced a brownie that had a dry texture and was more cake-like than a brownie texture. The brownies made with algal flour (which had similar fat percentage as the reduced fat recipe brownies, approximately 8% fat) were very moist and had a brownie texture, but had a more fragile crumb structure when compared to the conventional brownie recipe (approximately 19% fat). When compared to the brownies made with algal flakes that were described in Example 11, the brownies made with algal flour were not as dense, had a softer crumb structure. Overall, the algal flour was an effective replacement for butter and eggs in a baked good recipe, and produced a product similar in texture, taste and appearance to the conventional recipe product. The algal flour exhibit unique functionality (e.g., finer crumb structure, not as gummy, and light texture) not seen with the use of algal flakes.

Individual-Sized Gluten-Free Chocolate Cake

A gluten-free, flourless chocolate cake was prepared using algal flour (8% algal flour in water to make a slurry) in place of egg yolks and butter. The following ingredients with the quantity in parenthesis were used: granulated sugar (130 grams); semi-sweet chocolate (150 grams); water (20 grams); 8% algal flour slurry (100 grams); salt (2.45 grams); baking powder (4.5 grams); vanilla extract (4 grams); and egg whites (91.5 grams). The chocolate was combined with the water and melted slowly over barely simmering water. The algal slurry was then whisked into the chocolate mixture at room temperature. The sugar (reserve 5 grams sugar for egg whites) and vanilla were then added to the chocolate mixture and then the baking powder and salt (reserve 0.15 grams salt for egg whites) were added. The egg whites were beaten at medium speed until foamy and then the reserved salt was added. The egg whites were then beaten until soft peaks were formed and then the reserved sugar was added. The egg whites were then beaten until stiff peaks were formed. The egg whites were then folded into the chocolate mixture until completely blended. The batter was then poured into individual sized ramekins and baked at 375° F. for 14-15 minutes (rotated at 8 minutes). This gluten-free flourless chocolate cake had the texture and appearance of a conventional flourless chocolate cake made with butter and egg yolks. The algal flour was a successful replacement for butter and egg yolks in this formulation for a gluten-free flourless chocolate cake.

Mayonnaise

In order to evaluate the emulsifying abilities of algal flour, mayonnaise made with algal flour that has been reconstituted in water (40% by w/v) and homogenized at low pressure (100-200 bar) to produce a slurry was compared to mayonnaise made with a conventional recipe and a reduced fat mayonnaise. The algal flour slurry was made with high lipid algal flour having approximately 53% lipid by dry weight and completely replaced the oil and egg yolks in the conventional recipes.

TABLE 26

Conventional mayonnaise recipe.

| Component | Weight(g) | 1000.00 g | Percent | % Fat |
|---|---|---|---|---|
| Oil, soybean | 344.00 | 573.33 | 57.33 | 57.33 |
| Liquid egg yolk | 60.00 | 100.00 | 10.00 | 2.65 |
| Vinegar, distilled | 47.50 | 79.17 | 7.92 | 0.00 |
| Sugar, granulated | 12.00 | 20.00 | 2.00 | 0.00 |
| Salt | 11.00 | 18.33 | 1.83 | 0.00 |
| Lemon juice concentrate | 1.25 | 2.08 | 0.21 | 0.00 |
| Xanthan gum | 1.20 | 2.00 | 0.20 | 0.00 |
| Garlic powder | 0.50 | 0.83 | 0.08 | 0.00 |
| Onion powder | 0.75 | 1.25 | 0.13 | 0.00 |
| Water | 121.80 | 203.00 | 20.30 | 0.00 |
| | 600.00 | 1000.00 | 100.00% | 59.98% |

TABLE 27

Conventional reduced fat mayonnaise recipe.

| Component | Weight(g) | 1000.00 g | Percent | % Fat |
|---|---|---|---|---|
| Oil, soybean | 152.00 | 253.33 | 25.33 | 25.33 |
| Liquid egg yolk | 15.00 | 25.00 | 2.50 | 0.66 |
| Vinegar, distilled | 47.50 | 79.07 | 7.91 | 0.00 |
| Instant Food Starch | 15.00 | 24.97 | 2.50 | 0.00 |
| Sugar, granulated | 15.50 | 25.80 | 2.58 | 0.00 |
| Salt | 11.00 | 18.31 | 1.83 | 0.00 |
| Lemon juice concentrate | 1.25 | 2.08 | 0.21 | 0.00 |
| Phosphoric acid | 5.70 | 9.49 | 0.95 | 0.00 |
| Xanthan gum | 1.80 | 3.00 | 0.30 | 0.00 |
| Garlic powder | 0.50 | 0.83 | 0.08 | 0.00 |
| Onion powder | 0.75 | 1.25 | 0.13 | 0.00 |
| Water | 333.00 | 555.00 | 55.50 | 0.00 |
| | 600.00 | 1000.00 | 100.00% | 26.00% |

TABLE 28

Recipe for mayonnaise made with algal flour slurry.

| Component | Weight(g) | 1000.00 g | Percent | % Fat |
|---|---|---|---|---|
| Algal flour, slurry | 344.00 | 499.38 | 49.94 | 26.47 |
| Liquid egg yolk | 0.00 | 0.00 | 0.00 | 0.00 |
| Vinegar, distilled | 47.50 | 79.07 | 7.91 | 0.00 |
| Instant food starch | 15.00 | 24.97 | 2.50 | 0.00 |
| Sugar, granulated | 15.50 | 25.80 | 2.58 | 0.00 |
| Salt | 11.00 | 18.31 | 1.83 | 0.00 |
| Lemon juice concentrate | 1.25 | 2.08 | 0.21 | 0.00 |
| Phosphoric Acid | 5.70 | 9.49 | 0.95 | 0.00 |
| Xanthan gum | 1.80 | 3.00 | 0.30 | 0.00 |
| Garlic powder | 1.50 | 2.50 | 0.25 | 0.00 |

TABLE 28-continued

Recipe for mayonnaise made with algal flour slurry.

| Component | Weight(g) | 1000.00 g | Percent | % Fat |
|---|---|---|---|---|
| Onion powder | 1.50 | 2.50 | 0.25 | 0.00 |
| Water | 200.00 | 332.92 | 33.29 | 0.00 |
|  | 600.75 | 1000.00 | 100.00% | 26.47% |

In each case, the procedure was:
1. Using a food processor, combine acids, water, and dry ingredients.
2. Add egg yolks and slowly stream in oil or algal flour slurry. A tight emulsion should form. If the emulsion is too tight, add additional water until the emulsion reaches desired consistency.
3. Scrape down sides and shear again for 10 seconds to incorporate any oil/slurry droplets.

The mayonnaise made with the algal flour slurry had the viscosity of between the conventional and the reduced fat mayonnaise. The mouthfeel of the algal flour slurry mayonnaise was comparable to that of the conventional mayonnaise (but contains less than 50% of total fat). Instant food starch was needed in both the reduced fat mayonnaise and the algal flour slurry mayonnaise in order to bind more water and tighten the product to be more "spreadable". Overall, using the algal flour slurry to replace all of the fat sources (e.g., oil and egg yolks) in a conventional mayonnaise recipe produced a mayonnaise with good viscosity and a mouthfeel that was indistinguishable from conventional mayonnaise. The algal flour slurry functioned as an effective emulsifier, successfully replacing the functionality of oil and egg yolks found in conventional mayonnaise.

In an additional application, high lipid algal flour slurry was used to make a reduced fat honey mustard dipping sauce/dressing. Honey, mustard, white vinegar, lemon juice flavor and sea salt was added to the prepared mayonnaise (modified slightly to achieve the proper consistency of a dipping sauce/dressing) described above. All ingredients were combined and mixed in a food processor until homogenous and smooth. The end product contained approximately 14% algal flour by weight, and had approximately 8% total fat. The honey mustard dipping sauce/dressing containing algal flour had a creamy mouthfeel comparable to a conventional (full fat) honey mustard dipping sauce.

Miso Salad Dressing

In order to evaluate algal flour in a creamy salad dressing application, miso salad dressing was prepared using a conventional recipe and a recipe containing high lipid algal flour reconstituted as a slurry (40% solids), produced using methods as described in the preceeding mayonnaise formulation.

TABLE 29

Recipe for the conventional miso salad dressing.

| Component | Weight(g) | Percent (by weight) |
|---|---|---|
| Oil Phase: | | |
| Canola oil | 294.00 | 98.00 |
| Sesame oil | 6.00 | 2.00 |
|  | 300.00 | 100% |
| Aqueous Phase: | | |
| Vinegar, rice wine | 143.50 | 20.50 |
| Miso paste, red | 166.25 | 23.70 |

TABLE 29-continued

Recipe for the conventional miso salad dressing.

| Component | Weight(g) | Percent (by weight) |
|---|---|---|
| Sugar, granulated | 78.75 | 11.250 |
| Garlic powder | 3.5 | 0.50 |
| Mustard flour | 5.25 | 0.75 |
| Ginger powder | 5.25 | 0.75 |
| Xanthan gum | 1.50 | 0.214 |
| Potassium sorbate | 0.88 | 0.125 |
| Calcium disodium EDTA | 0.18 | 0.025 |
| Water | 294.95 | 42.136 |
|  | 700.00 | 100.00% |

TABLE 30

Recipe for miso salad dressing made with algal flour slurry.

| Component | Weight(g) | Percent (by weight) |
|---|---|---|
| Oil Phase: | | |
| Canola oil | 94.0 | 94.00 |
| Sesame oil | 6.00 | 6.00 |
|  | 100.00 | 100% |
| Aqueous Phase: | | |
| Algal flour, slurry | 125.00 | 13.889 |
| Vinegar, rice wine | 80.00 | 8.889 |
| Vinegar, distilled | 60.00 | 6.667 |
| Miso paste, red | 225.00 | 25.00 |
| Sugar, granulated | 85.00 | 9.444 |
| Garlic powder | 3.5 | 0.389 |
| Mustard flour | 5.25 | 0.583 |
| Ginger powder | 5.25 | 0.583 |
| Xanthan gum | 2.70 | 0.300 |
| Potassium sorbate | 0.88 | 0.097 |
| Calcium disodium EDTA | 0.18 | 0.019 |
| Titanium dioxide | 4.20 | 0.467 |
| Water | 300.00 | 33.344 |
|  | 900.00 | 100.00% |

In each case, the dry ingredients were blended together set aside. The water, vinegar and acid were blended together and set aside. The miso paste was measured out separately. For the conventional recipe, the oils were combined together and set aside. For the algal flour-containing recipe, the algal flour slurry, oil, and titanium dioxide was weighed out separately and combined. The water/vinegar mixture was then blended with a high shear blender. After blending, the dry ingredients were added into the water/vinegar mixture. The oils mixture was then streamed in slowly while the water/vinegar and dry ingredients were being blended with a high shear blender. The dressing was then heated to 190° F. for 2 minutes and then the dressing was run through a colloid mill on the tightest setting. The finished dressing was then bottled and refrigerated until use.

Both the conventional and the algal flour containing recipes produced a thick and opaque creamy salad dressing. Visually, the two dressings were comparable in color and texture. The miso salad dressing made with the convention recipe contained approximately 30% fat, while the miso salad dressing made with the algal flour slurry contained approximately 12.65% fat. Overall, the miso dressing made with the algal flour slurry contained less than half the fat of the miso dressing made with the conventional recipe, while preserving the creamy mouthfeel and opacity.

Pizza Dough/Breadsticks

The ability of the algal flour to function in a yeast dough application was tested using a conventional pizza dough/breadstick recipe and a pizzadough/breadstick recipe containing 5% or 10% by weight algal flour. The pizzadough/breadsticks containing algal flour was made with high lipid algal flour slurry (40% solids), produced using the methods as described in the preceeding mayonnaise formulation.

In each case, 7.3 grams of yeast was combined with 9.3 grams of all-purpose flour and mixed with 58 grams of warm water. The yeast mixture was allowed to sit at room temperature for at least 10 minutes. In the samples containing algal flour slurry, the slurry was mixed with 167 grams of water and combined with 217 grams of all-purpose flour and 4.9 grams of salt in a mixer. In the conventional recipe, the water was just combined with the flour and salt in the mixer. After being combined, the yeast mixture was added to the dough and an additional 90 grams of all-purpose flour was added. The dough was then kneaded by hand, adding additional flour as needed if the dough was too wet. The dough was covered and allowed to rise for 1 hour in a warm location. After allowing it to rise, the dough was portioned and either rolled out as pizza dough or shaped into breadsticks. The dough was then baked in a 450° F. oven for 8-12 minutes or until done.

The conventional recipe pizza dough and breadsticks were chewy with a traditional crust. The pizza dough containing 5% algal flour slurry had a more cracker-like texture and was crisper than the conventional recipe pizza dough. The pizza dough containing 10% algal flour slurry was crisper than the pizza dough containing 5% algal flour slurry. In the breadsticks made with algal flour slurry, the 5% algal breadsticks had a moist, chewy center when compared to the conventional recipe breadsticks. The breadsticks containing 10% algal flour slurry was even more moist than the 5% algal breadsticks. The baking time was increased with both breadsticks containing algal flour. Again, there was minimal algal flavor in the breadsticks containing algal flour slurry, which did not interfere with the overall taste. Overall, the algal flour slurry increased the crispness of the pizza dough and gave it a more cracker-like texture, and increased the moistness of the breadsticks when compared to the conventional recipe breadsticks. In another application, high lipid algal flour slurry (40% solids) were used in a corn tortilla recipe and compared to corn tortillas made from a conventional recipe. Similar to the pizza dough results, the corn tortillas containing algal flour slurry were more cracker-like in texture and crunchier than the conventional recipe tortillas.

Brioche

A brioche using algal flour in place of egg yolks and butter was prepared using the following ingredients with the quantities in parenthesis: warm water, approx. 110° F. (54.77 grams); rapid-rise yeast (3.5 grams); scalded whole milk (58.47 grams); algal flour (45.5 grams); granulated sugar (10 grams); all purpose flour (237 grams); Vital gluten flour (15 grams); salt (3.5 grams); and egg whites (42 grams). The yeast was sprinkled over the warm water and let sit for 5 minutes. The scalded milk was added to the yeast solution when the temperature of the milk reached 110-115° F. and mixed to combine. The sugar was added and mixed to dissolve. The algal flour was then added and mixed until thoroughly combined. The remaining dry ingredients were combined and the yeast/milk mixture was added to the remaining dry ingredients. The egg whites were then immediately added to the mixture and mixed using a food processor (10 times, pulsing the dough 1-2 each time). The dough was then pulsed five more times for 3-5 seconds, adding more water if needed. The finished dough was soft and slightly sticky. The dough was covered with a cloth and let rest in a warm place for one hour and had doubled in size about 2-3 times its original size. The dough was then pulsed again with the food processor 2-3 times for 1-2 seconds, to deflate and allowed to rest until it had doubled in size again. The dough was then turned out onto a surface and flattened to remove air. The dough was then rolled out into a rectangle and rolled up and the edges were sealed. Then the dough was placed into a pan and allowed to rise again until it was double in size and then it was placed in a pre-heated 400° F. oven and baked for approximately 35 minutes. The brioche had the appearance and texture of a conventional brioche and represented a successful formulation of a brioche recipe using algal flour and no butter or egg yolks.

Gluten-Free Bread

The ability of the algal flour to function in a gluten-free, yeast dough condition was tested by preparing a gluten-free bread containing algal flour. Being gluten-free and not a wheat, algal flour is suitable for incorporation into the diets of people with gluten and/or wheat allergies/intolerance. The following ingredients with the quantities in parenthesis: all-purpose gluten-free flour mix (3 cups) consisting of: 2 cups sorghum flour, 2 cups brown rice rice flour, 1.5 cups potato starch, 0.5 cup white rice flour, 0.5 cup sweet rice flour, 0.5 cup tapioca flour, 0.5 cup amaranth flour and 0.5 cup quinoa flour; dry milk powder (⅓ cup); guar gum (2 teaspoons); xanthan gum (1¼ teaspoons); unflavored gelatin or agar powder (1½ teaspoons); sugar (3 teaspoons); salt (1 teaspoon); egg substitute (1½ teaspoons); Baker's yeast (1 package or 2½ teaspoon); whole eggs (2); butter (5 tablespoon, cut in small pieces); water or plain club soda (1½ cups); honey (1 tablespoon); and apple cider vinegar (1 teaspoon). A bread loaf pan was lightly greased and dusted with sweet rice flour. The dry ingredients were wished in a mixing bowl until thoroughly blended. The eggs, butter, vinegar and honey were blended in a large bowl and then 1 cup of water or club soda was added to the egg mixture. The mixed dry ingredients were slowly combined with the egg mixture. The remaining water was added slowly and the rest of dry ingredients were then added and mixed until the batter was the consistency of a thick cake batter. This batter was then mixed at high speed for approximately 5 minutes. The batter was then poured into the bread loaf pan and covered and let rise in a warm location for 1 hour. The dough was then baked for 55-60 minutes in a pre-heated 375° F. oven, tenting with foil after 15 minutes to prevent over-browning of crust. The bread was then removed immediately from the oven and cooled completely on a wire rack before cutting. The gluten-free bread had the appearance and texture of a conventional bread loaf. This demonstrates the successful use of the algal flour in a gluten-free yeast dough application.

Soft-Baked Chocolate Chip Cookie

The ability of the algal flour to function in a cookie application was tested using a conventional soft-baked chocolate chip cookie recipe, a reduced fat soft-baked chocolate chip cookie recipe and a chocolate chip cookie made with high lipid algal flour slurry (produced using the same methods as described in the preceding mayonnaise formulation). The algal flour slurry also replaced all of the butter and eggs in both the conventional and reduced fat cookie recipes.

TABLE 31

Recipe for conventional soft-baked chocolate chip cookie.

| Component | Weight (g) | | Percent | % Fat |
|---|---|---|---|---|
| Flour, all purpose | 2 cups | 284.00 | 24.88 | 0.00 |
| Baking soda | ½ tsp | 2.50 | 0.22 | 0.00 |
| Baking powder | ¼ tsp | 1.23 | 0.11 | 0.00 |
| Salt | ½ tsp | 3.35 | 0.29 | 0.00 |
| Light brown sugar | 1 cup | 239.00 | 20.94 | 0.00 |
| Unsalted butter, softened | 1½ sticks | 170.25 | 14.92 | 11.93 |
| Corn syrup | ¼ cup | 82.00 | 7.18 | 0.00 |
| Egg, whole | 2 | 100.00 | 8.76 | 0.66 |
| Vanilla extract | 1 tsp | 4.00 | 0.35 | 0.00 |
| Semi-sweet chocolate chips | 1½ cups | 255.00 | 22.34 | 6.37 |
| | | 1141.33 | 100.00% | 18.96% |

TABLE 32

Recipe for the reduced fat soft-baked chocolate chip cookie.

| Component | Weight (g) | | Percent | % Fat |
|---|---|---|---|---|
| Flour, all purpose | 2½ cups | 355.00 | 33.58 | 0.00 |
| Baking soda | ½ tsp | 2.50 | 0.24 | 0.00 |
| Baking powder | ¼ tsp | 1.23 | 0.12 | 0.00 |
| Salt | ½ tsp | 3.35 | 0.32 | 0.00 |
| Light brown sugar | 1 cup | 239.00 | 22.61 | 0.00 |
| Unsalted butter, softened | ½ stick | 40.00 | 3.78 | 3.03 |
| Corn syrup | ¼ cup | 82.00 | 7.76 | 0.00 |
| Egg, whole | 1 | 50.00 | 4.73 | 0.35 |
| Egg, white | 1 | 25.00 | 2.37 | 0.00 |
| Vanilla extract | 1 tsp | 4.00 | 0.38 | 0.00 |
| Semi-sweet chocolate chips | 1½ cups | 255.00 | 24.12 | 6.88 |
| | | 1057.08 | 100.0% | 10.26% |

TABLE 33

Recipe for soft-baked chocolate chip cookies with algal flour slurry.

| Component | Weight (g) | | Percent | % Fat |
|---|---|---|---|---|
| Flour, all purpose | 2½ cups | 355.00 | 31.08 | 0.00 |
| Baking soda | ½ tsp | 2.50 | 0.22 | 0.00 |
| Baking powder | ¼ tsp | 1.23 | 0.11 | 0.00 |
| Salt | ½ tsp | 3.35 | 0.29 | 0.00 |
| Light brown sugar | 1 cup | 239.00 | 20.93 | 0.00 |
| Algal flour slurry | | 200.00 | 17.51 | 3.71 |
| Corn syrup | ¼ cup | 82.00 | 7.18 | 0.00 |
| Vanilla extract | 1 tsp | 4.00 | 0.35 | 0.00 |
| Semi-sweet chocolate chips | 1½ cups | 255.00 | 22.33 | 6.36 |
| | | 1142.08 | 100.00% | 10.08% |

In each case, the procedure was:
1. Preheat oven to 350° F. In a bowl, combine flour, baking soda, baking powder and salt. Set aside.
2. Cream butter/algal flour slurry with sugar and corn syrup until smooth. Beat in egg (if any) and vanilla.
3. Gradually add in dry ingredients and mix until it just forms a dough. Fold in chocolate chips.
4. Take tablespoons of dough; drop onto cookie sheet or roll into balls and place onto cookie sheet.
5. Bake for 16-18 minutes or until golden brown, rotate cookie sheet half-way through baking.

The conventional recipe cookie had good spreading during baking and was soft and fluffy out of the oven. In the reduced fat cookie, the dough did not spread in the first batch, so in subsequent batches, the dough was flattened prior to baking. The reduced fat cookie was soft out of the oven, and firmed into a dense cookie upon cooling. The reduced fat cookie also had pronounced upfront corn syrup flavor. The algal flour cookie had similar spreading during baking as the conventional recipe cookie and was texturally better than the reduced fat cookie. After three days at ambient temperature, the algal flour cookie was more moist than both the conventional recipe cookie and the reduced fat cookie. Overall, the algal biomass slurry was effective as a replacement for butter and eggs in a cookie application. Functionally, the algal biomass slurry extended the shelf-life of the cookie, in that the cookie retained more moisture after three days in ambient temperature.

Gluten-Free Oatmeal Raisin Cookie Shelf-Life Study

With the extended shelf-life results from the chocolate chip cookie experiments above, a gluten-free oatmeal raisin cookie was made using high lipid algal flour (approximately 53% lipid by dry weight), produced using methods described in Example 13. The cookies were baked and then held at ambient temperature for seven days. Initial sensory tests and water activity were performed on the cookies immediately after baking and cooling. Additional sensory tests and water activity tests were performed on day 1, 3 and 7. On each test day, one cookie was chopped into small pieces so the raisins and oats were evenly distributed in the sample. At least two samples per cookie were assayed in the water activity test to ensure accuracy of the measurement. Water activity (Aw) tests were performed according to manufacturer's protocols using an Aqua Lab, Model Series 3 TE (Decagon Devices, Inc.) instrument. Briefly, water activity measures the water vapor pressure which quantifies the available, non-chemically bound water in a product; the higher the Aw value, the more moist the product. In this cookie application, the higher the Aw value correlates with a longer shelf-life. An Aw level of 0.65 was the desired target.

TABLE 34

Recipe for gluten-free oatmeal raisin cookies made with algal flour slurry.

| Component | Weight(g) | 1000.00 g | Percent |
|---|---|---|---|
| Gluten-free flour | 225.00 | 174.69 | 17.47 |
| Brown rice flour | 25.00 | 19.41 | 1.94 |
| Baking soda | 4.00 | 3.11 | 0.31 |
| Baking powder | 2.00 | 1.55 | 0.16 |
| Salt | 3.50 | 2.72 | 0.27 |
| Ground cinnamon | 1.30 | 1.01 | 0.10 |
| Ground nutmeg | 1.20 | 0.93 | 0.09 |
| Xanthan gum | 2.50 | 1.94 | 0.19 |
| Water, filtered | 215.00 | 166.93 | 16.69 |
| Algal flour | 110.00 | 85.40 | 8.54 |
| Light brown sugar | 270.00 | 209.63 | 20.96 |
| Sugar, granulated | 45.00 | 34.94 | 3.49 |
| Vanilla extract | 8.50 | 6.60 | 0.66 |
| Raisins | 125.00 | 97.05 | 9.70 |
| Rolled oats | 250.00 | 194.10 | 19.41 |
| | 600.75 | 1000.00 | 100.00% |

The procedure was:
1. Preheat oven to 375° F.
2. Blend dry ingredients together except for oats and algal flour. Hydrate oats in ¼ the water. Hydrate the algal flour in ¾ the water and blend well using a hand held mixer. Allow oats and algal flour to hydrate for 10 minutes.

3. Add the hydrated algal flour to the dry ingredients mix well. Add vanilla and mix well until blended and smooth.
4. Add oats and raisins and mix until just homogeneous.
5. Portion out cookies on a cookie sheet and lightly press down each one.
6. Bake cookies in the oven for 20 minutes, rotating the cookie sheet half-way through baking.

The results of the sensory and water activity tests are summarized below in Table 5. Samples for the sensory test were evaluated on a 10 point scale: 1-2=unacceptable; 3-4=poor; 5-6=fair; 7-8=good; and 9-10=excellent. Overall, cookies prepared with algal flour retained a good moisture level when held at ambient temperature for seven days, with little deterioration to taste and texture.

TABLE 35

Sensory scores and water activity results for oatmeal raisin cookies at ambient temperature.

| | Sensory Score | Sensory Comments | Aw | Other |
|---|---|---|---|---|
| Initial | 8 | Moist interior, crisp texture, good oatmeal raisin flavor with minimal algal biomass notes. Cookie structure was developed with light surface color. | 0.776 | Aw higher than desired target of 0.65. |
| Day 1 | 7.5 | Moist, soft, not crisp exterior, slightly chewy, not as firm as initial. Slightly less buttery flavor, but flavor is still good with minimal algal biomass notes | 0.717 | Aw continues to be higher than target of 0.65. |
| Day 3 | 7 | Very moist and chewy; still has typical oatmeal raisin flavor with minimal algal biomass notes. Not crisp | 0.735 | Aw continues to be higher than target of 0.65. |
| Day 7 | 7.5 | Slightly drier, not "fresh baked crisp"; cookie slightly drier in the interior; more chewy, sweet oatmeal flavor; moisture is even throughout product. Product still very good. | 0.719 | Aw continues to be higher than target of 0.65. |

Scrambled Eggs (from Powdered Eggs)

The ability of the algal flour to retain moisture and offer textural improvement was tested in a reconstituted powdered eggs application. Powdered eggs were prepared using a conventional recipe, and with varying levels (5%, 10% and 20%) of high lipid algal flour as a replacement for the corresponding percentage (w/w) of powdered eggs. The algal flour used in the formulations below was prepared using the methods described in Example 13 and contained approximately 53% lipid by dry weight.

TABLE 36

Conventional recipe for scrambled eggs from powdered eggs.

| Component | Weight(g) | 200.00 g | Percent | % Fat |
|---|---|---|---|---|
| Powdered eggs, whole | 25.00 | 49.83 | 24.91 | 9.77 |
| Salt | 0.25 | 0.50 | 0.25 | 0.00 |
| Black pepper, ground | 0.10 | 0.20 | 0.10 | 0.00 |
| Water | 75.00 | 149.48 | 74.74 | 0.00 |
| | 100.35 | 200.00 | 100.00% | 9.77% |

TABLE 37

Recipe for scrambled eggs from powdered eggs with 1.25% algal flour.

| Component | Weight(g) | 200.00 g | Percent | % Fat |
|---|---|---|---|---|
| Powdered eggs, whole | 23.75 | 47.33 | 23.67 | 9.28 |
| Algal flour | 1.25 | 2.49 | 1.25 | 0.66 |
| Salt | 0.25 | 0.50 | 0.25 | 0.00 |
| Black pepper, ground | 0.10 | 0.20 | 0.10 | 0.00 |
| Water | 75.00 | 149.48 | 74.74 | 0.00 |
| | 100.35 | 200.00 | 100.00% | 9.94% |

TABLE 38

Recipe for scrambled eggs from powdered eggs with 2.5% algal flour.

| Component | Weight(g) | 200.00 g | Percent | % Fat |
|---|---|---|---|---|
| Powdered eggs, whole | 22.50 | 44.84 | 22.42 | 8.79 |
| Algal flour | 2.50 | 4.98 | 2.49 | 1.32 |
| Salt | 0.25 | 0.50 | 0.25 | 0.00 |
| Black pepper, ground | 0.10 | 0.20 | 0.10 | 0.00 |
| Water | 75.00 | 149.48 | 74.74 | 0.00 |
| | 100.35 | 200.00 | 100.00% | 10.11% |

TABLE 39

Recipe for scrambled eggs from powdered eggs with 5% algal flour.

| Component | Weight (g) | 200.00 g | Percent | % Fat |
|---|---|---|---|---|
| Powdered eggs, whole | 20.00 | 39.86 | 19.93 | 7.81 |
| Algal flour | 5.00 | 9.97 | 4.98 | 2.64 |
| Salt | 0.25 | 0.50 | 0.25 | 0.00 |
| Black pepper, ground | 0.10 | 0.20 | 0.10 | 0.00 |
| Water | 75.00 | 149.48 | 74.74 | 0.00 |
| | 100.35 | 200.00 | 100.00% | 10.45% |

In all cases, the eggs were prepared as follows:
1. Mix algal flour (if any) with powdered eggs. Mix eggs with water. Whisk until smooth. If needed, use hand-held blender to shear in any clumps.
2. In a preheated, non-stick pan, pour egg mixture.
3. Cook egg mixture until set and season as desired.

All preparations were similar in color and there were no noticeable color differences between the conventional recipe eggs and the eggs containing algal flour. The conventional recipe eggs were dry, overly aerated, spongy in texture and were missing a creamy mouthfeel. The eggs prepared with 1.25% algal biomass were more moist and were more firm in texture than the conventional recipe eggs. The mouthfeel was more creamy than the conventional recipe eggs. The eggs prepared with 5% algal flour were even more moist than the conventional recipe eggs and had the texture and mouthfeel of scrambled eggs prepared from fresh eggs. The eggs prepared with 5% algal flour were too wet and had the texture of undercooked, runny eggs. Overall, the inclusion of algal flour improved the mouthfeel, texture and moisture of prepared powdered eggs as compared to conventional prepared powdered eggs. At 1.25% and 2.5%, the algal flour worked well in the egg application without significantly increasing the fat content. At 5%, the algal flour imparted too much moisture, making the texture of the prepared powdered eggs unacceptable.

Powdered Eggs Holding Test

Because the algal flour was able to add significant moisture and improve the texture of powdered eggs, the following holding test was performed in order to evaluate how the cooked eggs would perform when held in a steam table. Scrambled eggs made with a conventional recipe using powdered eggs, 1.25% algal flour and 2.5% algal flour (all made using methods described above) were hydrated 10-15 minutes prior to being stove top cooked. After cooking, samples were immediately transferred to a steam table, where they were held covered for 30 minutes at a temperature between 160-200° F. Every 10 minutes, fresh samples were made to compare against the held samples. Samples were evaluated on a 10 point scale: 1-2=unacceptable; 3-4=poor; 5-6=fair; 7-8=good; and 9-10=excellent. The results of the test are summarized below in Table 40.

cooked up more like scrambled eggs made with fresh eggs. The 10% algal flour slurry sample also had more of a scrambled eggs texture and had a full mouthfeel, similar to that of scrambled eggs made with fresh eggs. Overall, the addition of the algal flour slurry was very successful in improving the texture and mouthfeel of scrambled egg whites, making the egg whites taste more like scrambled eggs made with fresh whole eggs.

Liquid Whole Eggs

The ability of algal flour to improve texture and moisture of scrambled eggs using liquid whole eggs was testing in a holding study and using a sensory panel. Liquid whole eggs was prepared according to manufacturer's directions as a control and compared to prepared liquid whole eggs with 10% algal flour slurry (2.5% algal flour with 7.5% water). Both control and 10% algal flour eggs were cooked up as scrambled eggs and held on a steam table for 60 minutes total. Samples of each scrambled egg product were taken and tested in a sensory panel every 10 minutes. The sensory panel judged the overall appearance, moisture level, texture and mouthfeel of the scrambled egg product on a scale of 1 to 9, with 1 being unacceptable, 3 being moderately unacceptable, 5 being fair, 7 being acceptable and 9 being excellent.

Overall, the addition of 10% algal flour slurry (2.5% algal flour solids) improved the texture, moisture level, and mouthfeel of the prepared eggs. After 60 minutes on the steam table, the scrambled egg product with 10% algal flour

TABLE 40

Sensory results from powdered eggs holding test.

| Variable | Initial | 10 minutes | 20 minutes | 30 minutes |
|---|---|---|---|---|
| Conventional recipe | 6: rubbery in texture and tough; but egg-like | 5: slightly drier/tougher, but still acceptable | 4: drier, more tough; chewy texture | 3: brighter yellow in color, hard edges, dry, tough and rubbery; unacceptable |
| 5% Algal flour | 8: moist, tender | 7: slightly tougher than initial 5% algal flour sample, but still acceptable | 6: drier than initial 5% algal flour sample, but still moister than conventional recipe initial sample | 5: not as yellow in color with slightly dull undertone; dry and tough but still better than conventional recipe after 30 minutes (no hard edges) |
| 10% Algal flour | 7: slightly too wet/moist; tender | 8: moist, tender, not tough | 7: slightly tougher, but interior still moist. Moister than initial conventional recipe sample, but drier than initial 10% algal flour sample | 6.5: drier and slightly tougher than initial sample, but still moister than conventional sample and 5% algal flour sample after 30 min.; no dry edges, interior is still moist |

Egg Beaters®

The ability of the algal flour to improve texture and mouthfeel of scrambled egg whites was tested using Egg Beaters®. 100 grams of Egg Beaters® was scrambled using a small non-stick frying pan for approximately 1-2 minutes until the eggs were set. No butter or seasonings were used. A sample with 10% w/w substitution of high lipid algal flour slurry (prepared using methods described above in the mayonnaise application with algal flour containing approximately 53% lipid by dry weight). The Egg Beaters® with the algal flour was prepared in a manner identical to the control.

Figure 3:
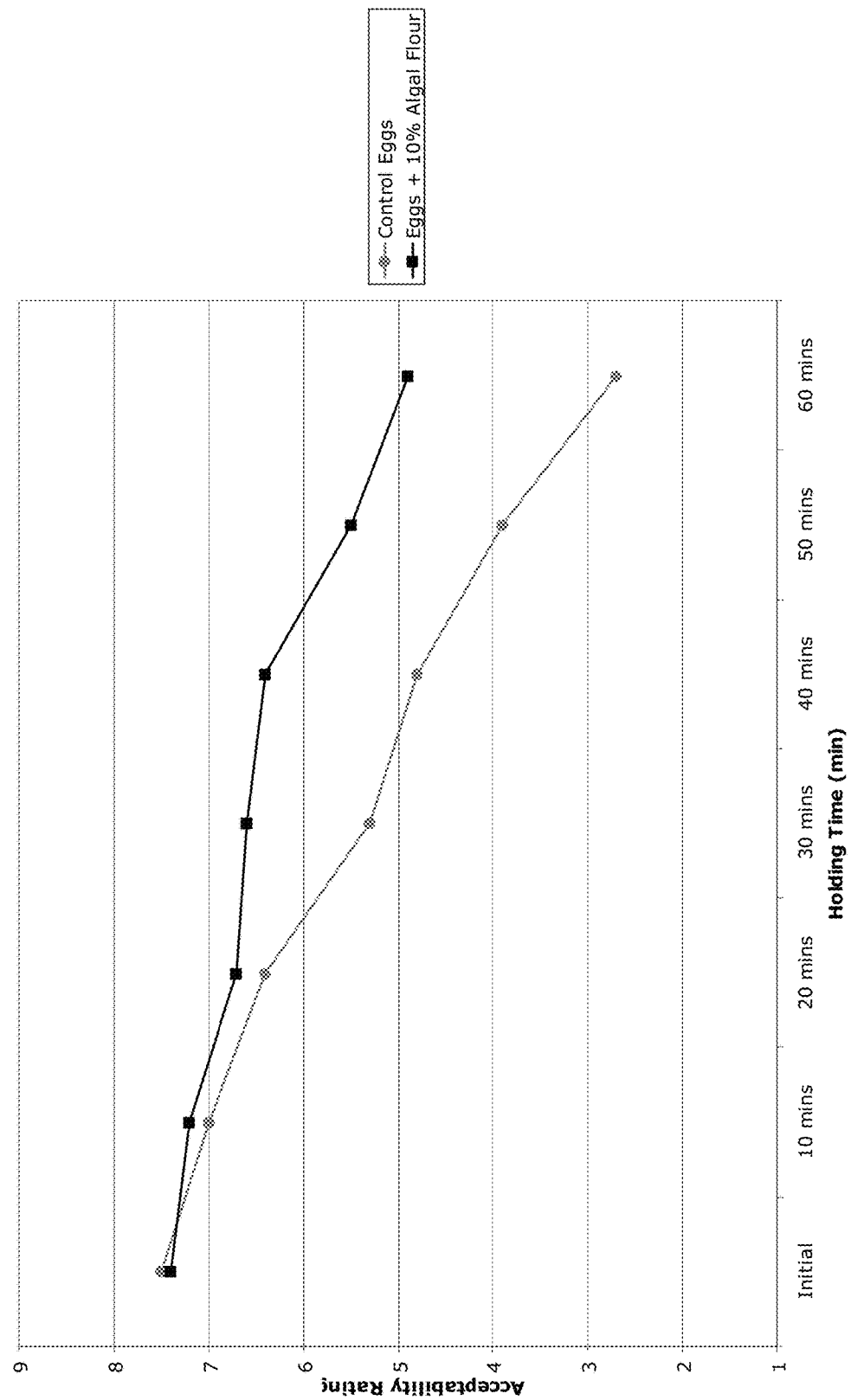
FIG. 3 shows the sensory scores of liquid whole egg with and without algal flour held on a steam table for 60 minutes. The appearance, texture and mouthfeel of the eggs were evaluated every 10 minutes.

The control sample had a more watery consistency and dissolved in the mouth more like water, with relatively little or no texture. The sample containing 10% algal flour slurry slurry was still acceptable (5 on the sensory scale) as compared to the control scrambled eggs, which was in the unacceptable to moderately unacceptable range (2.7 on the sensory scale). Results from all time points are summarized in FIG. 3.

Pancakes with Powdered Eggs

Pancake/waffle mixes found in retail stores contain whole powdered eggs as an ingredient. As show above in the powdered eggs formulation, the addition of high lipid algal flour improved the texture and mouthfeel of the prepared egg product. The ability of high lipid algal flour to improve the texture and mouthfeel of pancakes made with ready-mixed pancake mixes was tested.

TABLE 41

Recipe for the control pancakes.

| Component | Weight (g) | Percent |
|---|---|---|
| Whole powdered eggs | 10.1 | 4.6 |
| Non-fat milk solids | 10.9 | 5 |
| All purpose wheat flour | 65.5 | 29.8 |
| Canola oil | 7.3 | 3.3 |
| Baking powder | 3.6 | 1.6 |
| Salt | 0.9 | 0.41 |
| Sugar | 1.8 | 0.82 |
| Water | 120 | 54.5 |
| Total | 220.1 | 100% |

TABLE 42

Recipe for pancakes containing high lipid algal flour.

| Component | Weight (g) | Percent |
|---|---|---|
| Whole powdered eggs | 5.05 | 2.3 |
| Algal flour | 5.05 | 2.3 |
| Non-fat milk solids | 10.9 | 5 |
| All purpose wheat flour | 65.5 | 29.8 |
| Canola oil | 7.3 | 3.3 |
| Baking powder | 3.6 | 1.6 |
| Salt | 0.9 | 0.41 |
| Sugar | 1.8 | 0.82 |
| Water | 120 | 54.5 |
| Total | 220.1 | 100% |

In both cases, the water was used to rehydrate the powdered eggs, algal flour, and non-fat milk solids. The remaining ingredients were then added and whisked until the batter was smooth. The batter was poured into a hot ungreased non-stick pan in pancake-sized portions. The pancakes were cooked until the bubbles on top burst and were then flipped over and cooked until done.

Both batters were similar in appearance and both pancakes took approximately the same amount of time to cook. The pancakes containing algal flour were lighter, creamier and fluffier in texture and were less rubbery than the control pancakes. Overall, the substitution of 50% by weight of the powdered whole eggs with algal flour produced a texturally better pancake with a better mouthfeel.

Algal Milk/Frozen Dessert

An additional formulation for algal milk was produced using high lipid algal flour. The algal milk contained the following ingredients (by weight): 88.4% water, 6.0% algal flour, 3.0% whey protein concentrate, 1.7% sugar, 0.6% vanilla extract, 0.2% salt and 0.1% stabilizers. The ingredients were combined and homogenized on low pressure using a handheld homogenizer. The resulting algal milk was chilled before serving. The mouthfeel was comparable to that of whole milk and had good opacity. The algal flour used contained about 50% lipid, so the resulting algal milk contained about 3% fat. When compared to vanilla flavored soy milk (Silk), the algal milk had a comparable mouthfeel and opacity and lacked the beany flavor of soy milk.

The algal milk was then combined with additional sugar and vanilla extract and mixed until homogenous in a blender for 2-4 minutes. The mixture was placed in a pre-chilled ice cream maker (Cuisinart) for 1-2 hours until the desired consistency was reached. A conventional recipe ice cream made with 325 grams of half and half, 220 grams of 2% milk and 1 egg yolk was prepared as a comparison. The conventional recipe ice cream had the consistency comparable to that of soft served ice cream, and was a rich tasting, smooth-textured ice cream. Although the ice cream made from algal milk lacked the overall creaminess and mouthfeel of the conventional recipe ice cream, the consistency and mouthfeel was comparable to a rich tasting ice milk. Overall, the use of algal milk in a frozen dessert application was successful: the frozen dessert algal milk produced was a lower fat alternative to a conventional ice cream.

Orange Algal Beverage

An orange flavored algal beverage was prepared using the following ingredients with the quantities in parenthesis: distilled water (879.51 grams); granulated sugar (30 grams); salt (1.9 grams); algal flour (50 grams); carrageenan (0.14 grams); FMC Viscarin 359 Stabilizer (0.75 grams); vanilla extract (6 grams); whey protein (Eggstend) (30 grams); and orange flavor (1.7 grams). The ingredients were combined and homogenized with a batch homogenizer for 1 pass at 300 bar. The orange algal beverage was chilled and then served. The beverage tasted similar to a dreamcicle and was very smooth and had a creamy mouthfeel, similar to whole milk although it only contained 2.5% fat by wet weight.

Eggless Egg Nog

An eggless egg nog was prepared using the following ingredients with the quantities in parenthesis: distilled water (842.5 grams); granulated sugar (50 grams); salt (2.3 grams); algal flour (50 grams); carrageenan (0.2 grams); FMC Viscarin 359 Stabilizer (1.0 gram); vanilla extract (3 grams); whey protein (Eggstend) (50 grams); and nutmeg (1 gram). The ingredients were combined and homogenized with a batch homogenizer for 1 pass at 300 bar. The egg nog was chilled and then served cold. The egg nog had the appearance and mouthfeel of a conventional eggnog, but the fat content (2.5% fat by wet weight) has been significantly reduced due to the lack of egg yolks and heavy cream in the recipe.

Cheese Sauce

A cheese sauce was prepared using the following ingredients with the percent of total weight in parenthesis: 40% algal flour slurry (65.9%); xanthan gum (0.22%); Pure flow starch (0.81%); water (26.6%); sugar (0.25%); salt (0.54%); 50% acetic acid (0.5%); enzyme modified cheese powder (5%). The ingredients were mixed together until smooth. This was a successful demonstration of the use of algal flour in a savory cheese sauce application.

Algal Yogurts

A yogurt was prepared using the following ingredients with the percent of total weight (500 grams) in parenthesis: algal flour (1.25%); skim milk (50%); sugar (1%); salt (0.1%); deionized water (47.15%) and starter culture (0.5%). The starter culture used was Euro Cuisine Yogurt Starter Culture which contains skim milk powder, sucrose, ascorbic acid, lactic bacteria (*L. bulcaricus*, *S. thermophilus* and *L. acidophilus*). All ingredients except for the starter culture were combined and heated to 185° F. for 5-10 minutes then cooled to 105-110° F. using an ice bath. The starter culture was then added to the cooled yogurt mixture and incubated in a Waring Pro YM 350 home use yogurt maker for approximately 8 hours. The yogurt was sour tasting, indicating that the fermentation process using the live starter culture was successful. The consistency of the yogurt was soft and a little thicker than an yogurt beverage.

Additional experiments were performed on unflavored, non-fat yogurt and incorporating algal flour to determine the contributions to mouthfeel of the non-fat yogurt. Five percent (by weight) algal flour was blended into a unflavored, non-fat yogurt (Pavel) until smooth and well-incorporated. The yogurt was re-chilled and then served. The non-fat yogurt containing 5% algal flour, which now contains approximately 2.5% fat) had the mouthfeel that was as rich and creamy as a full fat unflavored yogurt (Pavel) control, which has a fat content of 3.5%.

Example 15

Algal Oil
Solvent Extraction of Oil from Biomass

Algal oil is extracted from microalgal biomass prepared as described in Examples 1-4 by drying the biomass using methods disclosed herein, disrupting the biomass using methods disclosed herein, and contacting the disrupted biomass with an organic solvent, e.g., hexane, for a period of time sufficient to allow the oil to form a solution with the hexane. The solution is then filtered and the hexane removed by rotoevaporation to recover the extracted oil.

Solventless Extraction of Oil from Biomass

Algal oil is extracted from the microalgal biomass prepared as described in Examples 1-4, drying the biomass, and physically disrupting the biomass in an oilseed press, wherein the algal oil becomes liberated from the biomass. The oil, thus separated from the disrupted biomass, is then recovered.

Supercritical Fluid Extraction of Oil from Algal Biomass

Microalgal oil was extracted from *Chlorella protothecoides* (UTEX 250) grown as described in Examples 1-4 using supercritical fluid extraction (SFE). A sample of the microalgal biomass (25.88 grams) was charged into an extraction vessel and $CO_2$ gas (at a selected pressure and temperature conditions) were passed through the vessel for a period of time until the desired total mass of gas has been passed through the vessel. The high pressure stream of gas and the extracted material was then passed through a pressure reduction valve into a collector containing the extractables (algal oil). After the desired amount of gas has flowed through the extraction vessel, the collector was removed. The material remaining in the vessel (or residual) was collected post extraction. 15.68 grams of algal oil was extracted and the residual weighed 10.2 grams. The residual comprised delipidated algal biomass and had a white, powdery appearance.

The algal oil produced using SFE was analyzed for antioxidants (12.7 ppm tert-butylhydroquinone (TBHQ)), chlorophyll (1 ppm), free fatty acids (1.34%), Karl Fischer moisture (0.05), monoglycerides (0.04%), diglycerides (2.52%), phospholipids (none—below detection levels), tocopherols and sterols and tocotrienols using standard HPLC methods and the methods described in Example 8. The algal oil contained the following tocopherols and sterols: delta tocopherol (0.13 mg/100 g); gamma tocopherol (0.20 mg/g), alpha tocopherol (5.58 mg/100 mg); ergosterol (164 mg/100 g); campesterol (6.97 mg/100 g), stigmasterol (6.97 mg/100 g); β-sitosterol (5.98 mg/100 g); and 176 mg/100 g of other sterols. The algal oil also contained 0.24 mg/g alpha tocotrienol.

Diversity of Lipid Chains in Algal Species

Lipid samples from a subset of strains grown in Example 1 were analyzed for lipid profile using HPLC. Results are shown in FIG. 1.

Example 16

Nutraceutical and Food Products Containing Algal Oil
Algal Oil Capsules (Encapsulated Oil that has been Extracted from Algae (a) Via Solvent Extraction or (b) Via Non-Solvent Extraction)

Complete protection system—Algal oil that provides naturally-occurring tocotrienols, tocopherols, carotenoids, Omega 3s and sterols. It offers a plant-based, non-animal alternative to fish oil use.

TABLE 43

Ingredients of exemplary nutraceutical composition.
Algal Oil Heart Health Capsules (Softgel)

| Ingredient (Trade name) | Description | Amount per Softgel (mg) |
| --- | --- | --- |
| DHA-S Oil | Algal Oil DHA 35% | 100 |
| | DHA | 35 |
| Phycosterols ™ - Heart Health Super Food Blend | | |
| | Pressed Algal Oil (from a *Chlorella* species listed in Table 12) | 100 |
| | Omega 9 (as oleic acid) | 70 |
| | Omega 6 (as linoleic and linolenic acid) | 17 |
| | lutein | 0.0075 |
| Plant Sterols | Plant Sterol esters | 400 |
| Coenzyme Q10 | Coenzyme Q10 | 15 |
| Vitamin E, oil USP | D-Alpha Tocopheryl | 10 |
| BASF Bioperine | *Piper nigrem* bioavailability enhancer | 2.5 |

Excipients: Beeswax, lecithin and purified water

Algal Oil (Oil that has been Extracted from Algae Either Via Solvent Extraction or Via Non-Solvent Extraction)

TABLE 44

Ingredients of exemplary nutraceutical composition.
Algal Oil (Softgel)

| Ingredient | Description | Amount per Softgel (mg) |
| --- | --- | --- |
| *Chlorella protothecoides* (UTEX 250) oil | Pressed Algal Oil | 400 |
| | Omega 9 (as oleic acid) | 280 |
| | Omega 6 (as linoleic and linolenic acid) | 68 |
| Vitamin E Acetate, oil USP BASF | D-Alpha Tocopheryl Acetate | 10 |

Excipients: Beeswax, lecithin, purified water

Brownies and Vanilla Cakes Containing Algal Oil

Oil extracted from *Chlorella protothecoides* (UTEX 250) grown using the fermentation methods described in Example 4 was used in baked good applications. Yellow cake (Moist Deluxe, Duncan Hines) and brownies (Chocolate Chunk, Pillsbury) were produced using ⅓ cup of oil extracted from *Chlorella protothecoides* according to manufacturer's suggested instructions. The results of both the yellow cake and brownies were indistinguishable from yellow cake and brownies produced using vegetable oil and the same box mix.

Example 17

Production of High Protein Algal Biomass
Heterotrophic Cultivation of Microalgae with High Protein Content Heterotrophically produced *Chlorella protothecoides* (UTEX 250) was grown under nitrogen-rich conditions supplied by one or more of the following: yeast extract (organic nitrogen source), $NH_4OH$ and $(NH_4)_2SO_4$, supplementing the medium described in Examples 2-4. Other than the culture media, the fermentation conditions were identical to the conditions described in Example 2. The high protein algal biomass was harvested after approximately 3-5 days of exponential growth, when it reached the desired culture density. Any of the above-described processing methods (algal flakes in Example 4, algal homogenate in Example 10, algal powder in Example 12 and algal flour in Example 13) can be applied to the high protein algal biomass.

Proximate Analysis of Microalgal Biomass

The high protein biomass was processed into algal flakes using methods described in Example 4. Both dried biomass, high lipid (Example 4) and high protein, were analyzed for moisture, fat, fiber, ash, crude protein and protein digestibility using methods in accordance with Official Methods of ACOC International. The results are summarized in Table 45 below.

TABLE 45

Proximate analysis of microalgae with high protein content.

| Analysis | ACOC method # | High lipid % by weight | High protein % by weight |
|---|---|---|---|
| Moisture | 930.15 | 5% | 5% |
| Fat | 954.02 | 50% | 15% |
| Ash | 942.05 | 2% | 4% |
| Crude protein | 990.03 | 5% | 50% |
| Pepsin digestible protein | 971.09 | ND | 37.5% (69.7% of crude protein is digestible) |
| Fiber (crude) | 991.43 | 2% | 2% |

ND = not done

Total carbohydrates were calculated by difference: 100% minus the known percentages from proximate analysis. Total carbohydrate by weight for the high lipid biomass was approximately 36% and total carbohydrate by weight for the high protein biomass was approximately 24%.

The above crude fiber represents the amount of cellulose and lignin (among other components) in the biomass samples. Both biomass were subjected to soluble and insoluble fiber (together is the total dietary fiber) measurements, which is part of the carbohydrate component of the biomass, using methods in accordance with Official Methods of ACOC International (AOAC method 991.43). For the high lipid biomass, the soluble fiber was 19.58% and the insoluble fiber was 9.86% (total dietary fiber of 29.44%). For the high protein biomass, the soluble fiber was 10.31% and the insoluble fiber was 4.28% (total dietary fiber of 14.59%.

Two samples (sample A and sample B) of the high protein biomass that were two lots of biomass grown as described above were also analyzed for chlorophyll, sterols, tocopherols and tocotrienols using the methods described in Example 8. The results for sample A were: chlorophyll (93.1 ppm); total sterols (1.299 g/100 g) including: cholesterol (1.05 mg/100 g); brassicasterol (301 mg/100 g); ergosterol (699 mg/100 g); campesterol (13.8 mg/100 g); stigmasterol (15.7 mg/100 g); and β-sitosterol (3.72 mg/100 g); other sterols (265 mg/100 g); alpha tocopherol (0.18 mg/g); and alpha tocotrienol (0.03 mg/g). The results for sample B were: chlorophyll (152 ppm); total sterols (2.460 g/100 g) including: cholesterol (1.01 mg/100 g); brassicasterol (549 mg/100 g); ergosterol (1.39 g/100 g); campesterol (22.6 mg/100 g); stigmasterol (26.1 mg/100 g); β-sitosterol (2.52 mg/100 g); and other sterols (466 mg/100 g); total tocopherols (0.79 mg/g) including: alpha tocopherol (0.35 mg/g), gamma tocopherol (0.35 mg/g) and delta tocopherol (0.09 mg/g); and alpha tocotrienol (0.01 mg/g).

Digestibility of Proteins in Algal Biomass

Multiple lots of high protein and high lipid biomass (produced using methods described in Example 4) and high protein biomass were analyzed for digestibility using an in vitro digestibility assay (0.2% pepsin digestibility assay, AOAC Method number 971.09). For the high lipid biomass, the percent total crude protein ranged from 5.4% to 10.3%, with percent total digestible protein ranging from 46.4% to 58.6%. For the high protein biomass, the percent total crude protein ranged from 40.8% to 53.3%, with the percent total digestible protein ranging from 71.6% to 85.3%. The same digestibility assay was also performed on hexane-extracted biomeal (high lipid algal biomass after hexane-extraction of the algal oil). The percent total crude protein was approximately 11-12% for all lots tested, with percent total digestible protein ranging from 76.72% to 80.2%.

When compared to whole bean soy flour that has a percent total crude protein of about 40.9% and 95.35% total digestible protein, the high protein algal biomass had a percent total digestible protein that was a little less than whole bean soy flour. Additional assays were performed on high protein algal biomass that had been processed so that the algal cells were predominantly lysed. These assays resulted in the percent total digestible protein to be comparable to that of whole bean soy flour (approximately 95% total digestible protein). Overall, the percent total crude protein and the percent total digestible protein levels of the high protein biomass are comparable to that of whole bean soy flour.

The digestibility assay results of the hexane-extracted biomeal indicated that the biomeal can be a viable additive for animal feed. The biomeal had both residual protein and oil and had a percent total digestible protein level of approximately 80%.

Example 18

Food Products Containing High Protein Algal Biomass
Food Compositions Using High Protein Algal Biomass (Algal Flakes and Algal Homogenate)

The high protein algal biomass used in the recipes below was produced with the methods described in Example 17 above. The algal biomass used in the recipes below came from *Chlorella protothecoides* UTEX 250, which contained approximately 51% protein by weight and is referred to below as high protein algal biomass and designated either as algal flakes or algal homogenate.

Vegetarian Burger Patty

This example compares vegetarian burger patties made by a conventional recipe, with high protein algal biomass, either algal flakes or algal homogenate (AH), replacing vegetarian protein sources (textured soy protein (TSP), wheat gluten and/or soy protein isolate (SPI)).

TABLE 46

Conventional vegetarian burger patty recipe.

| Component | Weight (g) | % | % Fiber | % Protein | % Fat |
|---|---|---|---|---|---|
| Water | 62.0 | 62.0 | 0 | 0 | 0 |
| TSP (Arcon T U272) | 11.0 | 11.0 | 2.09 | 7.59 | 0.22 |
| TSP (Arcon T U218) | 10.0 | 10.0 | 1.9 | 6.90 | 0.20 |
| Canola Oil | 4.0 | 4.0 | 0 | 0 | 4.0 |
| SPI | 5.5 | 5.5 | 0 | 4.95 | 0.22 |
| Wheat gluten | 3.0 | 3.0 | 0 | 2.46 | 0.03 |

TABLE 46-continued

Conventional vegetarian burger patty recipe.

| Component | Weight (g) | % | % Fiber | % Protein | % Fat |
|---|---|---|---|---|---|
| Nat. Veg. Hamburger Flavor | 2.0 | 2.0 | 0 | 0 | 0 |
| Sensirome Ultra Vegetable | 1.0 | 1.0 | 0 | 0 | 0 |
| Methylcellulose | 1.0 | 1.0 | 0.09 | 0 | 0 |
| Salt | 0.5 | 0.5 | 0 | 0 | 0 |
| Total | 100 grams | 100 | 4.08 | 21.90 | 4.67 |

TABLE 47

Recipe for a vegetarian burger patty made with high protein algal flakes replacing the soy protein isolate (SPI), methylcellulose, and wheat gluten.

| Component | Weight (g) | % | % Fiber | % Protein | % Fat |
|---|---|---|---|---|---|
| Water | 54.28 | 58.82 | 0 | 0 | 0 |
| TSP (Arcon T U272) | 11.0 | 11.92 | 2.26 | 8.22 | 0.24 |
| TSP (Arcon T U218) | 10.0 | 10.84 | 2.06 | 7.48 | 0.22 |
| Canola Oil | 4.0 | 4.33 | 0 | 0 | 4.33 |
| SPI | 0 | 0 | 0 | 0 | 0 |
| High protein algal flakes | 9.5 | 10.29 | 4.12 | 5.18 | 0.51 |
| Wheat gluten | 0 | 0 | 0 | 0 | 0 |
| Nat. Veg. Hamburger Flavor | 2.0 | 2.17 | 0 | 0 | 0 |
| Sensirome Ultra Vegetable | 1.0 | 1.08 | 0 | 0 | 0 |
| Methylcellulose | 0 | 0 | 0 | 0 | 0 |
| Salt | 0.5 | 0.54 | 0 | 0 | 0 |
| Total | 92.28 | 100 | 8.44 | 20.88 | 5.30 |

TABLE 48

Recipe for a vegetarian burger patty made with high protein algal flakes replacing textured soy protein concentrate (TSP) and soy protein isolate.

| Component | Weight (g) | % | % Fiber | % Protein | % Fat |
|---|---|---|---|---|---|
| Water | 57.5 | 49.57 | 0 | 0 | 0 |
| TSP (Arcon T U272) | 0 | 0 | 0 | 0 | 0 |
| TSP (Arcon T U218) | 0 | 0 | 0 | 0 | 0 |
| Canola Oil | 4.0 | 3.45 | 0 | 0 | 3.45 |
| Soy Protein Isolate | 0 | 0 | 0 | 0 | 0 |
| High protein algal flakes | 47.0 | 40.52 | 16.21 | 20.38 | 2.03 |
| Wheat Gluten | 3.0 | 2.59 | 0 | 2.12 | 0.03 |
| Nat. Veg. Hamburger Flavor | 2.0 | 1.72 | 0 | 0 | 0 |
| Sensirome Ultra Vegetable | 1.0 | 0.86 | 0 | 0 | 0 |
| Methylcellulose | 1.0 | 0.86 | 0.08 | 0 | 0 |
| Salt | 0.50 | 0.43 | 0 | 0 | 0 |
| Total | 116.0 | 100 | 16.29 | 22.50 | 5.50 |

TABLE 49

Recipe for a vegetarian burger patty made with high protein algal homogenate (AH) replacing the soy protein isolate (SPI), methylcellulose, and wheat gluten.

| Component | Weight (g) | % | % Fiber | % Protein | % Fat |
|---|---|---|---|---|---|
| Water | 62.0 | 62.0 | 0 | 0 | 0 |
| TSP (Arcon T U272) | 11.0 | 11.0 | 2.09 | 7.59 | 0.22 |
| TSP (Arcon T U218) | 10.0 | 10.0 | 1.90 | 6.90 | 0.20 |
| Canola Oil | 4.0 | 4.0 | 0 | 0 | 4.0 |
| SPI | 0 | 0 | 0 | 0 | 0 |
| High Protein AH | 9.5 | 9.5 | 3.80 | 4.78 | 0.48 |
| Wheat gluten | 0 | 0 | 0 | 0 | 0 |
| Nat. Veg. Hamburger Flavor | 2.0 | 2.0 | 0 | 0 | 0 |
| Sensirome Ultra Vegetable | 1.0 | 1. | 0 | 0 | 0 |
| Methylcellulose | 0 | 0 | 0 | 0 | 0 |
| Salt | 0.5 | 0.5 | 0 | 0 | 0 |
| Total | 100 | 100 | 7.79 | 19.27 | 4.90 |

TABLE 50

Recipe for a vegetarian burger patty made with high protein algal homogenate replacing textured soy protein concentrate (TSP) and soy protein isolate.

| Component | Weight (g) | % | % Fiber | % Protein | % Fat |
|---|---|---|---|---|---|
| Water | 52.570 | 47.33 | 0 | 0 | 0 |
| TSP (Arcon T U272) | 0 | 0 | 0 | 0 | 0 |
| TSP (Arcon T U218) | 0 | 0 | 0 | 0 | 0 |
| Canola Oil | 4.0 | 3.60 | 0 | 0 | 3.60 |
| Soy Protein Isolate | 0 | 0 | 0 | 0 | 0 |
| High protein AH | 47.0 | 42.32 | 16.93 | 21.28 | 2.12 |
| Wheat Gluten | 3.0 | 2.7 | 0 | 2.12 | 0.03 |
| Nat. Veg. Hamburger Flavor | 2.0 | 1.8 | 0 | 0 | 0 |
| Sensirome Ultra Vegetable | 1.0 | 0.90 | 0 | 0 | 0 |
| Methylcellulose | 1.0 | 0.90 | 0.08 | 0 | 0 |
| Salt | 0.50 | 0.43 | 0 | 0 | 0 |
| Total | 111.07 | 100 | 17.01 | 23.50 | 5.74 |

In each case the cooking procedure was:
1. Weigh together the two textured soy proteins (if applicable).
2. In a stand-mixer bowl, add first portion of water (2.5-3 times weight of TSP and mix for 10 minutes.
3. Weigh soy protein concentrate, methylcellulose, wheat gluten, and algae biomass and dry blend together.
4. Add dry ingredients to stand-mixer. Add remaining water and mix for 5-10 minutes.
5. Weigh salt and flavors. Weigh oil. Add to mixer and mix for 5 minutes.
6. Form patties using mold (65-75 g per patty), cover and freeze.

In samples where algal biomass (algal flakes and algal homogenate) replaced TSP, the patties were very sticky had relatively no structure when cooked. Addition of other binders such as oats, oat bran and brown rice flour produced a patty, when cooked, was firm in texture. Recipes where algal flakes replaced the soy protein isolate produced a patty that was softer, mushier and less textured than control. The patties containing algal homogenate that replaced soy protein isolate had a firmness and texture that was comparable to control. Overall, the vegetarian burger patty made with algal homogenate replacing soy protein isolate was the most successful of the recipes tested and produced a patty that was comparable to the vegetarian control patty, but with almost two times more dietary fiber.

Protein Bar

The following example compares a conventional protein bar, with high protein algal biomass, either algal flakes or algal homogenate (AH), replacing the conventional protein sources (soy protein isolate (SPI) and milk protein concentrate (MPC)).

TABLE 51

Conventional protein bar recipe.

| Component | Weight (g) | % | % Fiber | % Protein | % Fat |
|---|---|---|---|---|---|
| Corn syrup 63/43 | 53.0 | 53.7 | 0 | 0 | 0 |
| Brown Rice Flour | 8.3 | 8.41 | 3.15 | 0 | 0 |
| Soy Protein Isolate | 9.35 | 9.47 | 0 | 8.24 | 0 |
| Milk Protein Conc. | 9.35 | 9.47 | 0 | 7.67 | 0.14 |
| Cocoa Powder, Alkalized | 8.0 | 8.11 | 2.59 | 1.824 | 0.89 |
| Non-fat Dry Milk | 7.0 | 7.09 | 0 | 2.483 | 0 |
| Chocolate Flavor | 0.5 | 0.51 | 0 | 0 | 0 |
| *Vanilla* Flavor | 0.4 | 0.41 | 0 | 0 | 0 |
| Glycerine (99.5% USP) | 2.3 | 2.33 | 0 | 0 | 0 |
| Vitamin Blend | 0.49 | 0.5 | 0 | 0 | 0 |
| Total | 98.69 | 100 | 5.75 | 20.22 | 1.03 |

TABLE 52

Recipe for protein bars made with high protein algal flakes replacing SPI and MPC.

| Component | Weight (g) | % | % Fiber | % Protein | % Fat |
|---|---|---|---|---|---|
| Corn syrup 63/43 | 49.7 | 52.21 | 0 | 0 | 0 |
| High protein algal flakes | 34.0 | 35.72 | 14.29 | 17.97 | 1.79 |
| Cocoa Powder, Alkalized | 8.0 | 8.40 | 2.69 | 1.89 | 0.92 |
| Chocolate Flavor | 0.47 | 0.49 | 0 | 0 | 0 |
| *Vanilla* Flavor | 0.375 | 0.39 | 0 | 0 | 0 |
| Glycerine (99.5% USP) | 2.16 | 2.27 | 0 | 0 | 0 |
| Vitamin Blend | 0.49 | 0.51 | 0 | 0 | 0 |
| Total | 95.20 | 100 | 16.98 | 19.86 | 2.71 |

TABLE 53

Recipe for protein bars made with high protein algal homogenate (AH) replacing SPI and MPC.

| Component | Weight (g) | % | % Fiber | % Protein | % Fat |
|---|---|---|---|---|---|
| Corn syrup 63/43 | 48.0 | 51.4 | 0 | 0 | 0 |
| High Protein AH | 34.0 | 36.41 | 14.56 | 18.31 | 1.82 |
| Cocoa Powder, Alkalized | 8.0 | 8.57 | 2.741 | 1.928 | 0.942 |
| Chocolate Flavor | 0.47 | 0.48 | 0 | 0 | 0 |
| *Vanilla* Flavor | 0.36 | 0.39 | 0 | 0 | 0 |
| Glycerine (99.5% USP) | 2.080 | 2.23 | 0 | 0 | 0 |
| Vitamin Blend | 0.49 | 0.52 | 0 | 0 | 0 |
| Total | 93.38 | 100 | 17.31 | 20.24 | 2.76 |

In each case the cooking procedure was:
1. Blend all syrup ingredients.
2. Heat on stovetop to 190° F. and hole for 10 minutes with the lid on. Stir occasionally.
3. Hold off heat for 10 minutes. Cool to about 140° F.
4. Combine with dry ingredients.
5. Portion into slabs and let set up overnight.
6. Cut into bars, coat with compound coating as desired and package.

Overall, the protein bar made with the high protein algal homogenate showed slightly better binding compared to the protein bar made with the algal flakes. Also, the protein bar made with the algal homogenate required the least amount of corn syrup to bind the ingredients together. The protein bar made with the high protein algal homogenate was the more successful composition compared to the conventional protein bar: for comparable amount of protein and fat, it contained about 3 times more dietary fiber.

Chocolate Nutritional Beverage (Meal Replacement)

The following example compares a conventional chocolate flavored, nutritional beverage, with chocolate nutritional beverages made with either high protein algal flakes or high protein algal homogenate (AH), replacing the conventional protein sources (soy protein isolate (SPI) and milk protein concentrate (MPC)).

TABLE 54

Recipe for the conventional chocolate nutritional beverage.

| Component | Weight (g) | % | % Sugar | % Fiber | % Protein | % Fat |
|---|---|---|---|---|---|---|
| Water (filtered) | 908.0 | 72.99 | 0 | 0 | 0 | 0 |
| Sugar (granulated) | 95.0 | 7.637 | 7.64 | 0 | 0 | 0 |
| Corn Syrup | 70.0 | 5.627 | 1.24 | 0 | 0 | 0 |
| Maltodextrin | 60.0 | 4.823 | 0 | 0 | 0 | 0 |
| Milk Protein Isolate | 44.0 | 3.53 | 0 | 0 | 2.86 | 0 |
| Canola Oil | 29.0 | 2.33 | 0 | 0 | 0 | 2.33 |
| Cocoa Powder | 15.0 | 1.206 | 0 | 0.39 | 0.27 | 0.13 |
| Soy Protein Isolate | 11.5 | 0.924 | 0 | 0 | 0.8 | 0.04 |
| Disodium Phosphate | 2.0 | 0.161 | 0 | 0 | 0 | 0 |
| Lecithin | 1.7 | 0.137 | 0 | 0 | 0 | 0 |
| Stabilizer Blend | 2.0 | 0.161 | 0 | 0 | 0 | 0 |
| Flavor, vanilla | 2.0 | 0.161 | 0 | 0 | 0 | 0 |
| Flavor, chocolate | 2.0 | 0.161 | 0 | 0 | 0 | 0 |
| Vitamin blend | 1.8 | 0.145 | 0 | 0 | 0 | 0 |
| Total | 1244 | 100 | 8.88 | 0.39 | 3.93 | 2.5 |

TABLE 55

Recipe for the chocolate nutritional beverage made with algal flakes replacing SPI, maltodextrin and milk protein isolate.

| Component | Weight (g) | % | % Sugar | % Fiber | % Protein | % Fat |
|---|---|---|---|---|---|---|
| Water (filtered) | 910.0 | 74.959 | 0 | 0 | 0 | 0 |
| Sugar (granulated) | 92.5 | 7.619 | 7.62 | 0 | 0 | 0 |
| Corn Syrup | 70.0 | 5.766 | 1.27 | 0 | 0 | 0 |
| High protein algal flakes | 87.0 | 7.166 | 0 | 2.87 | 3.6 | 0 |
| Canola Oil | 28.0 | 2.306 | 0 | 0 | 0 | 2.31 |
| Cocoa Powder | 15.0 | 1.236 | 0 | 0.4 | 0.28 | 0.14 |
| Disodium Phosphate | 2.0 | 0.165 | 0 | 0 | 0 | 0 |
| Lecithin | 1.7 | 0.14 | 0 | 0 | 0 | 0 |
| Stabilizer Blend | 2.0 | 0.165 | 0 | 0 | 0 | 0 |
| Flavor, vanilla | 2.0 | 0.165 | 0 | 0 | 0 | 0 |
| Flavor, chocolate | 2.0 | 0.165 | 0 | 0 | 0 | 0 |
| Vitamin blend | 1.8 | 0.148 | 0 | 0 | 0 | 0 |
| Total | 1214 | 100 | 8.89 | 3.27 | 3.88 | 2.45 |

TABLE 56

Recipe for chocolate nutritional beverage made with high protein algal homogenate (AH) replacing SPI, maltodextrin and milk protein isolate.

| Component | Weight (g) | % | % Sugar | % Fiber | % Protein | % Fat |
|---|---|---|---|---|---|---|
| Water (filtered) | 910.0 | 74.959 | 0 | 0 | 0 | 0 |
| Sugar (granulated) | 92.5 | 7.619 | 7.62 | 0 | 0 | 0 |
| Corn Syrup | 70.0 | 5.766 | 1.27 | 0 | 0 | 0 |
| High protein AH | 87.0 | 7.166 | 0 | 2.87 | 3.6 | 0 |
| Canola Oil | 28.0 | 2.306 | 0 | 0 | 0 | 2.31 |
| Cocoa Powder | 15.0 | 1.236 | 0 | 0.4 | 0.28 | 0.14 |
| Disodium Phosphate | 2.0 | 0.165 | 0 | 0 | 0 | 0 |
| Lecithin | 1.7 | 0.14 | 0 | 0 | 0 | 0 |
| Stabilizer Blend | 2.0 | 0.165 | 0 | 0 | 0 | 0 |
| Flavor, vanilla | 2.0 | 0.165 | 0 | 0 | 0 | 0 |

TABLE 56-continued

Recipe for chocolate nutritional beverage made with high protein algal homogenate (AH) replacing SPI, maltodextrin and milk protein isolate.

| Component | Weight (g) | % | % Sugar | % Fiber | % Protein | % Fat |
|---|---|---|---|---|---|---|
| Flavor, chocolate | 2.0 | 0.165 | 0 | 0 | 0 | 0 |
| Vitamin blend | 1.8 | 0.148 | 0 | 0 | 0 | 0 |
| Total | 1214 | 100 | 8.89 | 3.27 | 3.88 | 2.45 |

The high protein algal homogenate produced a nutritional beverage that was thicker in body when compared to the conventional recipe beverage. The high protein algal flakes produced a nutritional beverage that was thinner than the control beverage. Overall, the beverage containing high protein algal homogenate was more successful in this application, producing a thick nutritional beverage with great opacity. The nutritional beverage made with algal homogenate was comparable to the conventional beverage in sugar, fat and protein levels, while containing almost ten times more fiber.

Example 19

Genotyping to Identify Other Microalgae Strains Suitable for Use as Food Genotyping of Algae Genomic DNA was isolated from algal biomass as follows. Cells (approximately 200 mg) were centrifuged from liquid cultures 5 minutes at 14,000×g. Cells were then resuspended in sterile distilled water, centrifuged 5 minutes at 14,000×g and the supernatant discarded. A single glass bead ~2 mm in diameter was added to the biomass and tubes were placed at −80° C. for at least 15 minutes. Samples were removed and 150 µl of grinding buffer (1% Sarkosyl, 0.25 M Sucrose, 50 mM NaCl, 20 mM EDTA, 100 mM Tris-HCl, pH 8.0, RNase A 0.5 ug/ul) was added. Pellets were resuspended by vortexing briefly, followed by the addition of 40 ul of 5M NaCl. Samples were vortexed briefly, followed by the addition of 66 µl of 5% CTAB (Cetyl trimethylammonium bromide) and a final brief vortex. Samples were next incubated at 65° C. for 10 minutes after which they were centrifuged at 14,000×g for 10 minutes. The supernatant was transferred to a fresh tube and extracted once with 300 µl of Phenol:Chloroform:Isoamyl alcohol 12:12:1, followed by centrifugation for 5 minutes at 14,000×g. The resulting aqueous phase was transferred to a fresh tube containing 0.7 vol of isopropanol (~190 µl), mixed by inversion and incubated at room temperature for 30 minutes or overnight at 4° C. DNA was recovered via centrifugation at 14,000×g for 10 minutes. The resulting pellet was then washed twice with 70% ethanol, followed by a final wash with 100% ethanol. Pellets were air dried for 20-30 minutes at room temperature followed by resuspension in 50 µl of 10 mM TrisCl, 1 mM EDTA (pH 8.0).

Five µl of total algal DNA, prepared as described above, was diluted 1:50 in 10 mM Tris, pH 8.0. PCR reactions, final volume 20 were set up as follows. Ten µl of 2×iProof HF master mix (BIO-RAD) was added to 0.4 µl primer SZ02613 (5'-TGTTGAAGAATGAGCCGGCGAC-3' (SEQ ID NO:24) at 10 mM stock concentration). This primer sequence runs from position 567-588 in Gen Bank accession no. L43357 and is highly conserved in higher plants and algal plastid genomes. This was followed by the addition of 0.4 µl primer SZ02615 (5'-CAGTGAGCTAT-TACGCACTC-3' (SEQ ID NO:25) at 10 mM stock concentration). This primer sequence is complementary to position 1112-1093 in Gen Bank accession no. L43357 and is highly conserved in higher plants and algal plastid genomes. Next, 5 µl of diluted total DNA and 3.2 µl dH$_2$O were added. PCR reactions were run as follows: 98° C., 45"; 98° C., 8"; 53° C., 12"; 72° C., 20" for 35 cycles followed by 72° C. for 1 min and holding at 25° C. For purification of PCR products, 20 µl of 10 mM Tris, pH 8.0, was added to each reaction, followed by extraction with 40 µl of Phenol:Chloroform: isoamyl alcohol 12:12:1, vortexing and centrifuging at 14,000×g for 5 minutes. PCR reactions were applied to S-400 columns (GE Healthcare) and centrifuged for 2 minutes at 3,000×g. Purified PCR products were subsequently TOPO cloned into PCR8/GW/TOPO and positive clones selected for on LB/Spec plates. Purified plasmid DNA was sequenced in both directions using M13 forward and reverse primers. Sequence alignments and unrooted trees were generated using Geneious DNA analysis software. Sequences from strains 1-23 (designated in Example 13) are listed as SEQ ID NOs: 1-23 in the attached Sequence Listing.

Genomic DNA Analysis of 23S rRNA from 9 Strains of *Chlorella protothecoides*

Genomic DNA from 8 strains of *Chlorella protothecoides* (UTEX 25, UTEX 249, UTEX 250, UTEX 256, UTEX 264, UTEX 411, SAG 211 10d, CCAP 211/17, and CCAP 211/8d) were isolated and genomic DNA analysis of 23S rRNA was performed. All strains of *Chlorella protothecoides* tested were identical in sequence except for UTEX 25. Sequences for all eight strains are listed as SEQ ID NOs: 26 and 27 in the attached Sequence Listing.

Genotyping Analysis of Commercially Purchased *Chlorella* Samples

Three commercially purchased *Chlorella* samples, *Chlorella regularis* (New Chapter, 390 mg/gelcap), Whole Foods Broken Cell Wall *Chlorella* (Whole Foods, 500 mg/pressed tablet) and NutriBiotic CGF *Chlorella* (NutriBiotic, 500 mg/pressed tablet), were genotyped. Approximately 200 mg of each commercially purchased *Chlorella* samples were resuspended and sterile distilled water for genomic DNA isolation.

The resulting PCR products were isolated and cloned into vectors and sequenced using M13 forward and reverse primers. The sequences were compared to known sequences using a BLAST search.

Comparison of 23s rRNA DNA sequences revealed that two out of the three commercially purchased *Chlorella* samples had DNA sequences matching *Lyngbya aestuarii* present (Whole Foods Broken Wall *Chlorella* and NutriBiotic CGF). *Lyngbya aestuarii* is a marine-species cynobacteria. These results show that some commercially available *Chlorella* contain other species of contaminating microorganisms, including organisms from genera such as *Lyngbya* that are known to produce toxins (see for example Teneva et. al, Environmental Toxicology, 18(1)1, pp. 9-20 (2003); Matthew et al., J Nat Prod., 71(6): pp. 1113-6 (2008); and Carmichael et al., Appl Environ Microbiol, 63(8): pp. 3104-3110 (1997).

Example 20

Color Mutants of Microalgal Biomass Suitable for Use as Food
Chemical Mutagenesis to Generate Color Mutants

*Chlorella protothecoides* (UTEX 250) was grown according to the methods and conditions described in Example 1. Chemical mutagenesis was performed on the algal strain using N-methyl-N'-nitro-N-nitroguanidine (NTG). The algal culture was subjected to the mutagen (NTG) and then selected through rounds of reisolation on 2.0% glucose agar plates. The colonies were screened for color mutants. *Chlorella prototheocides* (wildtype) appears to be a golden color when grown heterotophically. The screen produced one strain that appeared white in color on the agar plate. This color mutant was named 33-55 (deposited on Oct. 13, 2009 in accordance with the Budapest Treaty at the American Type Culture Collection at 10801 University Boulevard, Manassas, VA 20110-2209 with a Patent Deposit Designation of PTA-10397). Another colony was also isolated and went through three rounds of reisolation to confirm that this mutation was stable. This mutant appeared to be light yellow in color on the agar plate and was named 25-32 (deposited on Oct. 13, 2009 in accordance with the Budapest Treaty at the American Type Culture Collection at 10801 University Boulevard, Manassas, VA 20110-2209 with a Patent Deposit Designation of PTA-10396).

Lipid Profile of *Chlorella prototheocides* 33-55

*Chlorella prototheocides* 33-55 and the parental *Chlorella prototheocides* (UTEX 250) were grown according to the methods and conditions described in Example 1. The percent lipid (by dry cell weight) was determined for both strains: *Chlorella prototheocides* 33-55 was at 68% lipid and the parental strain was at 62% lipid. The lipid profiles were determined for both strains and were as follows (expressed as area %): *Chlorella prototheocides* 33-55, C14:0 (0.81); C16:0 (10.35); C16:1 (0.20); C18:0 (4.09); C18:1 (72.16); C18:2 (10.60); C18:3 (0.10); and others (1.69); for the parental strain, C14:0 (0.77); C16:0 (9.67); C16:1 (0.22); C18:0 (4.73); C18:1 (71.45); C18:2 (10.99); C18:3 (0.14); and others (2.05).

Example 21

Cellulosic Feedstock for the Cultivation of Microalgal Biomass Suitable for Use as Food In order to evaluate if *Chlorella prototheocides* (UTEX 250) was able to utilize a non-food carbon source, cellulosic materials (exploded corn stover) was prepared for use as a carbon source for heterotrophic cultivation of *Chlorella prototheocides* that is suitable for use in any of the food applications described above in the preceeding Examples.

Wet, exploded corn stover material was prepared by the National Renewable Energy Laboratory (Golden, CO) by cooking corn stover in a 1.4% sulfuric acid solution and dewatering the resultant slurry. Using a Mettler Toledo Moisture analyzer, the dry solids in the wet corn stover were determined to be 24%. A 100 g wet sample was resuspended in deionized water to a final volume of 420 ml and the pH was adjusted to 4.8 using 10 N NaOH. Celluclast™ (Novozymes) (a cellulase) was added to a final concentration of 4% and the resultant slurry incubated with shaking at 50° C. for 72 hours. The pH of this material was then adjusted to 7.5 with NaOH (negligible volume change), filter sterilized through a 0.22 um filter and stored at −20° C. A sample was reserved for determination of glucose concentration using a hexokinase based kit from Sigma, as described below.

Glucose concentrations were determined using Sigma Glucose Assay Reagent #G3293. Samples, treated as outlined above, were diluted 400 fold and 40 μl was added to the reaction. The corn stover cellulosic preparation was determined to contain approximately 23 g/L glucose.

After enzymatic treatment and saccharification of cellulose to glucose, xylose, and other monosaccharide sugars, the material prepared above was evaluated as a feedstock for the growth of *Chlorella prototheocides* (UTEX 250) using the medium described in Example 1. Varying concentrations of cellulosic sugars mixed with pure glucose were tested (0, 12.5, 25, 50 and 100% cellulosic sugars). Cells were incubated in the dark on the varying concentrations of cellulosic sugars at 28° C. with shaking (300 rpm). Growth was assessed by measurement of absorbance at 750 nm in a UV spectrophotometer. *Chlorella prototheocides* cultures grew on the corn stover material prepared with Celluclast, including media conditions in which 100% of fermentable sugar was cellulosic-derived. Similar experiments were also performed using sugarbeet pulp treated with Accellerase as the cellulosic feedstock. Like the results obtained with corn stover material, all of the *Chlorella prototheocides* cultures were able to utilize the cellulosic-derived sugar as a carbon source.

PCT Patent application No.: PCT/US2007/001319, filed Jan. 19, 2007, entitled "Nutraceutical Compositions from Microalgae and Related Methods of Production and Administration" is hereby incorporated in its entirety for all purposes. PCT Patent application No.: PCT/US2007/001653, filed Jan. 19, 2007, entitled "Microalgae-Derived Composition for Improving Health and Appearance of Skin" is hereby incorporated in its entirety for all purposes. PCT Patent application No.: PCT/US2008/065563, filed Jun. 2, 2008, entitled "Production of Oil in Microorganisms" is hereby incorporated in its entirety for all purposes. U.S. Provisional Patent application No. 61/043,318, filed Apr. 8, 2008, entitled "Fractionation of Oil-Bearing Microbial Biomass," and U.S. Provisional Patent application No. 61/043,620, filed Apr. 9, 2008, entitled "Direct Chemical Modification of Microbial Biomass" are each incorporated by reference in their entirety for all purposes.

All references cited herein, including patents, patent applications, and publications, are hereby incorporated by reference in their entireties, whether previously specifically incorporated or not. The publications mentioned herein are cited for the purpose of describing and disclosing reagents, methodologies and concepts that may be used in connection with the present invention. Nothing herein is to be construed as an admission that these references are prior art in relation to the inventions described herein.

Although this invention has been described in connection with specific embodiments thereof, it will be understood that it is capable of further modifications. This application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A method of making a microalgal flour as a food ingredient, comprising:
    (a) providing microalgal cells containing at least 10% by dry weight triglyceride oil, wherein the microalgal cells are of the genus *Chlorella*;
    (b) disrupting the cells to provide particles having a particle size and reducing the particle size to produce an aqueous homogenate; and
    (c) drying the homogenate to produce microalgal flour comprising at least 10% by dry weight triglyceride oil, wherein the triglyceride oil is 1-4% C18:0.

2. The method of claim 1, wherein the microalgal cells are *Chlorella protothecoides*.

3. A method of making a microalgal powder as a food ingredient, comprising:
    (a) providing microalgal cells containing at least 10% by dry weight triglyceride oil, wherein the microalgal cells are of the genus *Chlorella*, and
    (b) drying the cells to produce microalgal powder comprising at least 10% by dry weight triglyceride oil, wherein the triglyceride oil is 1-4% C18:0.

4. The method of claim 3, wherein the microalgal cells are *Chlorella protothecoides*.

5. The method of claim 2, further comprising separating the microalgal cells from culture media before disrupting the cells.

6. The method of claim 2, wherein the disruption is performed using a pressure disrupter, French press, or ball mill.

7. The method of claim 2, wherein the drying is performed using a flash dryer or a spray dryer.

8. The method of claim 2, wherein the microalgal cells contain from 50% to 70% by dry weight oil.

9. The method of claim 2, further comprising adding a flow agent prior to the drying step.

10. The method of claim 2, wherein the average particle size of the microalgal flour is less than 10 um.

11. The method of claim 2, wherein the microalgal flour of microalgal powder has a moisture content of 10% or less by weight.

12. The method of claim 2, wherein 50%-73.83% of the oil is an 18:1 lipid in a glycerolipid form.

13. The method of claim 2, wherein the microalgal cells are cultivated heterotrophically in the absence of light.

14. The method of claim 13, wherein the microalgal cells are cultivated in the presence of glucose.

15. The method of claim 13, wherein the microalgal cells are cultivated in the presence of a limiting amount of a nutrient for a portion of the culture period.

16. The method of claim 15, wherein the nutrient is nitrogen.

17. The method of claim 2, wherein the aqueous homogenate comprises more than 50% lysed cells.

18. The method of claim 17, wherein the aqueous homogenate comprises more than 90% lysed cells.

19. The method of claim 7, wherein the drying is performed using a spray dryer.

20. The method of claim 2, wherein the microalgal flour of microalgal powder has a moisture content of 5% or less by weight.

21. The method of claim 17, wherein the aqueous homogenate comprises more than 75% lysed cells.

22. The method of claim 10, wherein less than 10% by weight of the triglyceride oil is docosahexanoic acid (DHA) (C22:6).

23. The method of claim 3, wherein less than 10% by weight of the triglyceride oil is docosahexanoic acid (DHA) (C22:6).

24. The method of claim 1, wherein the triglyceride oil is 10-16% C18:2.

25. The method of claim 3, wherein the triglyceride oil is 10-16% C18:2.

* * * * *

UNITED STATES PATENT AND TRADEMARK OFFICE
CERTIFICATE OF CORRECTION

PATENT NO. : 12,059,006 B2
APPLICATION NO. : 16/289354
DATED : August 13, 2024
INVENTOR(S) : Geoffrey Brooks et al.

Page 1 of 1

It is certified that error appears in the above-identified patent and that said Letters Patent is hereby corrected as shown below:

In the Claims

In Column 111, Claim 10, Line 51, replace "10 um" with "10 μm".

In Column 112, Claim 11, Line 15, delete "of microalgal powder".

In Column 112, Claim 20, Line 36, delete "of microalgal powder".

Signed and Sealed this
Seventeenth Day of September, 2024

Katherine Kelly Vidal
*Director of the United States Patent and Trademark Office*

SEQUENCE LISTING

<160> NUMBER OF SEQ ID NOS: 27

<210> SEQ ID NO 1
<211> LENGTH: 565

```
<212> TYPE: DNA
<213> ORGANISM: Chlorella protothecoides

<400> SEQUENCE: 1
tgttgaagaa tgagccggcg acttagaaaa agtggcgtgg ttaaggaaaa attccgaagc     60
cttagcgaaa gcgagtctga atagggcgat caaatatttt aatatttaca atttagtcat    120
tttttctaga cccgaacccg ggtgatctaa ccatgaccag gatgaaactt gggtgatacc    180
aagtgaaggt ccgaaccgac cgatgttgaa aaatcggcgg atgagttgtg gttagcggtg    240
aaataccagt cgaacccgga gctagctggt tctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt gggggataag    420
ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
ttaaagagtg cgtaatagct cactg                                          565

<210> SEQ ID NO 2
<211> LENGTH: 546
<212> TYPE: DNA
<213> ORGANISM: Chlorella protothecoides

<400> SEQUENCE: 2
tgttgaagaa tgagccggcg acttagaaaa cgtggcaagg ttaaggaaac gtatccggag     60
ccgaagcgaa agcaagtctg aacagggcga ttaagtcatt ttttctagac ccgaacccgg    120
gtgatctaac catgaccagg atgaagcttg gtgacaccaa agtgaaggtc cgaaccgacc    180
gatgttgaaa aatcggcgga tgagttgtgg ttagcggtga ataccagtcg aactcggag    240 ctagctggtt ctccccgaaa tgcgttgagg cgcagcggtt cataaggctg tctagggta    300 aagcactgtt tcggtgcggg ctgcgaaagc ggtaccaaat cgtggcaaac tctgaatact    360
agatatgcta tttatgggcc agtgagacgg tgggggataa gcttcatcgt cgagagggaa    420
acagcccaga tcactagcta aggccccaaa atgatcgtta agtgacaaag gaggtgagaa    480
tgcagaaaca accaggaggt ttgcttagaa gcagccaccc tttaaagagt gcgtaatagc    540
tcactg                                                               546

<210> SEQ ID NO 3
<211> LENGTH: 565
<212> TYPE: DNA
<213> ORGANISM: Chlorella protothecoides

<400> SEQUENCE: 3
tgttgaagaa tgagccggcg acttagaaaa agtggcgtgg ttaaggaaaa attccgaagc     60
cttagcgaaa gcgagtctga atagggcgat caaatatttt aatatttaca atttagtcat    120
tttttctaga cccgaacccg ggtgatctaa ccatgaccag gatgaaactt gggtgatacc    180
aagtgaaggt ccgaaccgac cgatgttgaa aaatcggcgg atgagttgtg gttagcggtg    240
aaataccagt cgaacccgga gctagctggt tctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt gggggataag    420
ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
```
ttaaagagtg cgtaatagct cactg                                       565

<210> SEQ ID NO 4
<211> LENGTH: 565
<212> TYPE: DNA
<213> ORGANISM: Chlorella kessleri

<400> SEQUENCE: 4
tgttgaagaa tgagccggcg acttagaaaa agtggcgtgg ttaaggaaaa attccgaagc    60
cttagcgaaa gcgagtctga atagggcgat caaatatttt aatatttaca atttagtcat   120
tttttctaga cccgaacccg ggtgatctaa ccatgaccag gatgaaactt gggtgatacc   180
aagtgaaggt ccgaaccgac cgatgttgaa aaatcggcgg atgagttgtg gttagcggtg   240
aaataccagt cgaacccgga gctagctggt tctccccgaa atgcgttgag gcgcagcagt   300
acatctagtc tatctagggg taaagcactg tttcggtgcg ggctgtgaaa acggtaccaa   360
atcgtggcaa actctgaata ctagaaatga cggtgtagta gtgagactgt ggggataag   420
ctccattgtc aagagggaaa cagcccagac caccagctaa ggcccaaaaa tggtaatgta   480
gtgacaaagg aggtgaaaat gcaaacacaa ccaggaggtt ggcttagaag cagccatcct   540
ttaaagagtg cgtaatagct cactg                                        565

<210> SEQ ID NO 5
<211> LENGTH: 548
<212> TYPE: DNA
<213> ORGANISM: Chlorella kessleri

<400> SEQUENCE: 5
tgttgaagaa tgagccggcg acttagaaga agtggcttgg ttaaggataa ctatccggag    60
ccagagcgaa agcaagtctg aatagggcgc ttaaaggtca ctttttctag acccgaaccc   120
gggtgatcta accatgacca ggatgaagct tgggtaacac cacgtgaagg tccgaaccga   180
ccgatgttga aaaatcggcg gatgagttgt ggttagcggt gaaataccaa tcgaactcgg   240
agctagctgg ttctccccga aatgcgttga ggcgcagcgg tttatgaggc tgtctagggg   300
taaagcactg tttcggtgcg ggctgcgaaa gcggtaccaa atcgtggcaa actctgaata   360
ctagatatgc tattcatgag ccagtgagac ggtgggggat aagcttcatc gtcaagaggg   420
aaacagccca gatcaccagc taaggcccca aaatggtcgt taagtggcaa aggaggtgag   480
aatgctgaaa caaccaggag gtttgcttag aagcagccac cctttaaaga gtgcgtaata   540
gctcactg                                                          548

<210> SEQ ID NO 6
<211> LENGTH: 548
<212> TYPE: DNA
<213> ORGANISM: Chlorella kessleri

<400> SEQUENCE: 6
tgttgaagaa tgagccggcg acttagaaga agtggcttgg ttaaggataa ctatccggag    60
ccagagcgaa agcaagtctg aatagggcgc ttaaaggtca ctttttctag acccgaaccc   120
gggtgatcta accatgacca ggatgaagct tgggtaacac cacgtgaagg tccgaaccga   180
ccgatgttga aaaatcggcg gatgagttgt ggttagcggt gaaataccaa tcgaactcgg   240
agctagctgg ttctccccga aatgcgttga ggcgcagcgg tttatgaggc tgtctagggg   300
taaagcactg tttcggtgcg ggctgcgaaa gcggtaccaa atcgtggcaa actctgaata   360
ctagatatgc tattcatgag ccagtgagac ggtgggggat aagcttcatc gtcaagaggg   420

```
aaacagccca gatcaccagc taaggcccca aaatggtcgt taagtggcaa aggaggtgag      480
aatgctgaaa caaccaggag gtttgcttag aagcagccac cctttaaaga gtgcgtaata      540
gctcactg                                                              548

<210> SEQ ID NO 7
<211> LENGTH: 548
<212> TYPE: DNA
<213> ORGANISM: Parachlorella kessleri

<400> SEQUENCE: 7
tgttgaagaa tgagccggcg acttagaaga agtggcttgg ttaaggataa ctatccggag       60
ccagagcgaa agcaagtctg aatagggcgc ttaaaggtca cttttctag acccgaaccc      120 gggtgatcta accatgacca ggatgaagct tgggtaacac cacgtgaagg tccgaaccga      180
ccgatgttga aaaatcggcg gatgagttgt ggttagcggt gaaataccaa tcgaactcgg      240
agctagctgg ttctccccga aatgcgttga ggcgcagcgg tttatgaggc tgtctagggg      300
taaagcactg tttcggtgcg ggctgcgaaa gcggtaccaa atcgtggcaa actctgaata      360
ctagatatgc tattcatgag ccagtgagac ggtgggggat aagcttcatc gtcaagaggg      420
aaacagccca gatcaccagc taaggcccca aatggtcgt taagtggcaa aggaggtgag       480
aatgctgaaa caaccaggag gtttgcttag aagcagccac cctttaaaga gtgcgtaata      540
gctcactg                                                              548

<210> SEQ ID NO 8
<211> LENGTH: 548
<212> TYPE: DNA
<213> ORGANISM: Parachlorella kessleri

<400> SEQUENCE: 8
tgttgaagaa tgagccggcg acttagaaga agtggcttgg ttaaggataa ctatccggag       60
ccagagcgaa agcaagtctg aatagggcgc ttaaaggtca cttttctag acccgaaccc      120 gggtgatcta accatgacca ggatgaagct tgggtaacac cacgtgaagg tccgaaccga      180
ccgatgttga aaaatcggcg gatgagttgt ggttagcggt gaaataccaa tcgaactcgg      240
agctagctgg ttctccccga aatgcgttga ggcgcagcgg tttatgaggc tgtctagggg      300
taaagcactg tttcggtgcg ggctgcgaaa gcggtaccaa atcgtggcaa actctgaata      360
ctagatatgc tattcatgag ccagtgagac ggtgggggat aagcttcatc gtcaagaggg      420
aaacagccca gatcaccagc taaggcccca aatggtcgt taagtggcaa aggaggtgag       480
aatgctgaaa caaccaggag gtttgcttag aagcagccac cctttaaaga gtgcgtaata      540
gctcactg                                                              548

<210> SEQ ID NO 9
<211> LENGTH: 565
<212> TYPE: DNA
<213> ORGANISM: Parachlorella kessleri

<400> SEQUENCE: 9
tgttgaagaa tgagccggcg acttagaaaa agtggcgtgg ttaaggaaaa attccgaagc       60
cttagcgaaa gcgagtctga atagggcgat caaatatttt aatatttaca atttagtcat      120 ttttctaga cccgaacccg ggtgatctaa ccatgaccag gatgaaactt gggtgatacc       180
aagtgaaggt ccgaaccgac cgatgttgaa aaatcggcgg atgagttgtg gttagcggtg      240
```

```
aaataccagt cgaacccgga gctagctggt tctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt ggggataag    420 ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
ttaaagagtg cgtaatagct cactg                                          565

<210> SEQ ID NO 10
<211> LENGTH: 541
<212> TYPE: DNA
<213> ORGANISM: Prototheca stagnora

<400> SEQUENCE: 10
tgttgaagaa tgagccggcg agttaaaaaa aatggcatgg ttaaagatat ttctctgaag     60
ccatagcgaa agcaagtttt acaagctata gtcattttttt ttagacccga aaccgagtga   120
tctacccatg atcagggtga agtgttggtc aaataacatg gaggcccgaa ccgactaatg   180
gtgaaaaatt agcggatgaa ttgtgggtag gggcgaaaaa ccaatcgaac tcggagttag   240
ctggttctcc ccgaaatgcg tttaggcgca gcagtagcaa cacaaataga ggggtaaagc   300
actgtttctt ttgtgggctt cgaaagttgt acctcaaagt ggcaaactct gaatactcta   360
tttagatatc tactagtgag accttggggg ataagctcct tggtcaaaag ggaaacagcc   420
cagatcacca gttaaggccc caaaatgaaa atgatagtga ctaaggacgt gagtatgtca   480
aaacctccag caggttagct tagaagcagc aatcctttca agagtgcgta atagctcact   540
g                                                                    541

<210> SEQ ID NO 11
<211> LENGTH: 573
<212> TYPE: DNA
<213> ORGANISM: Prototheca moriformis

<400> SEQUENCE: 11
tgttgaagaa tgagccggcg acttaaaata aatggcaggc taagagaatt aataactcga     60
aacctaagcg aaagcaagtc ttaatagggc gctaatttaa caaaacatta ataaaatct    120 aaagtcatt attttagacc cgaacctgag tgatctaacc atggtcagga tgaaacttgg   180
gtgacaccaa gtggaagtcc gaaccgaccg atgttgaaaa atcggcggat gaactgtggt   240
tagtggtgaa ataccagtcg aactcagagc tagctggttc tccccgaaat gcgttgaggc   300
gcagcaatat atctcgtcta tctaggggta aagcactgtt tcggtgcggg ctatgaaaat   360
ggtaccaaat cgtggcaaac tctgaatact agaaatgacg atatattagt gagactatgg   420
gggataagct ccatagtcga gagggaaaca gcccagacca ccagttaagg ccccaaaatg   480
ataatgaagt ggtaaaggag gtgaaaatgc aaatacaacc aggaggttgg cttagaagca   540
gccatccttt aaagagtgcg taatagctca ctg                                 573

<210> SEQ ID NO 12
<211> LENGTH: 573
<212> TYPE: DNA
<213> ORGANISM: Prototheca moriformis

<400> SEQUENCE: 12
tgttgaagaa tgagccggcg acttaaaata aatggcaggc taagagaatt aataactcga     60
aacctaagcg aaagcaagtc ttaatagggc gctaatttaa caaaacatta ataaaatct    120
```

```
aaagtcattt attttagacc cgaacctgag tgatctaacc atggtcagga tgaaacttgg    180
gtgacaccaa gtggaagtcc gaaccgaccg atgttgaaaa atcggcggat gaactgtggt    240
tagtggtgaa ataccagtcg aactcagagc tagctggttc tccccgaaat gcgttgaggc    300
gcagcaatat atctcgtcta tctaggggta agcactgtt tcggtgcggg ctatgaaaat     360
ggtaccaaat cgtggcaaac tctgaatact agaaatgacg atatattagt gagactatgg    420
gggataagct ccatagtcga gagggaaaca gcccagacca ccagttaagg ccccaaaatg    480
ataatgaagt ggtaaaggag gtgaaaatgc aaatacaacc aggaggttgg cttagaagca    540
gccatccttt aaagagtgcg taatagctca ctg                                 573

<210> SEQ ID NO 13
<211> LENGTH: 565
<212> TYPE: DNA
<213> ORGANISM: Chlorella minutissima

<400> SEQUENCE: 13
tgttgaagaa tgagccggcg acttagaaaa agtggcgtgg ttaaggaaaa attccgaagc     60
cttagcgaaa gcgagtctga atagggcgat caaatatttt aatatttaca atttagtcat    120
tttttctaga cccgaacccg ggtgatctaa ccatgaccag gatgaaactt gggtgatacc    180
aagtgaaggt ccgaaccgac cgatgttgaa aaatcggcgg atgagttgtg gttagcggtg    240
aaataccagt cgaacccgga gctagctggt tctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt ggggataag    420 ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
ttaaagagtg cgtaatagct cactg                                          565

<210> SEQ ID NO 14
<211> LENGTH: 565
<212> TYPE: DNA
<213> ORGANISM: Chlorella sp.

<400> SEQUENCE: 14
tgttgaagaa tgagccggcg acttagaaaa agtggcgtgg ttaaggaaaa attccgaagc     60
cttagcgaaa gcgagtctga atagggcgat caaatatttt aatatttaca atttagtcat    120
tttttctaga cccgaacccg ggtgatctaa ccatgaccag gatgaaactt gggtgatacc    180
aagtgaaggt ccgaaccgac cgatgttgaa aaatcggcgg atgagttgtg gttagcggtg    240
aaataccagt cgaacccgga gctagctggt tctccccgaa atgcgttgag gcgcagcagt    300
acatctagtc tatctagggg taaagcactg tttcggtgcg ggctgtgaaa acggtaccaa    360
atcgtggcaa actctgaata ctagaaatga cggtgtagta gtgagactgt ggggataag    420 ctccattgtc aagagggaaa cagcccagac caccagctaa ggccccaaaa tggtaatgta    480
gtgacaaagg aggtgaaaat gcaaacacaa ccaggaggtt ggcttagaag cagccatcct    540
ttaaagagtg cgtaatagct cactg                                          565

<210> SEQ ID NO 15
<211> LENGTH: 546
<212> TYPE: DNA
<213> ORGANISM: Chlorella sp.
```

<400> SEQUENCE: 15

```
tgttgaagaa tgagccggcg acttagaaaa cgtggcaagg ttaaggacat gtatccggag    60
ccgaagcgaa agcaagtctg aatagggcgc ctaagtcatt ttttctagac ccgaacccgg   120
gtgatctaac catgaccagg atgaagcttg ggtgacacca agtgaaggtc cgaaccgacc   180
gatgttgaaa atcggcgga tgagttgtgg ttagcggtga ataccagtc gaactcggag    240
ctagctggtt ctccccgaaa tgcgttgagg cgcagcggtt cataaggctg tctagggta   300
aagcactgtt tcggtgcggg ctgcgaaagc ggtaccaaat cgtggcaaac tctgaatact  360
agatatgcta tttatgagcc agtgagacgg tggggataa gcttcatcgt cgagagggaa   420
acagcccaga tcactagcta aggcccctaa atgatcgtta agtgacaaag gaggtgagaa   480
tgcagaaaca accaggaggt ttgcttagaa gcagccaccc tttaaagagt gcgtaatagc   540
tcactg                                                             546
```

<210> SEQ ID NO 16
<211> LENGTH: 550
<212> TYPE: DNA
<213> ORGANISM: Chlorella sorokiniana

<400> SEQUENCE: 16

```
tgttgaagaa tgagccggcg acttatagga agtggcaggg ttaaggaaga atctccggag    60
cccaagcgaa agcgagtctg aaaagggcga tttggtcact tcttatggac ccgaacctgg   120
atgatctaat catggccaag ttgaagcatg ggtaacacta tgtcgaggac tgaacccacc   180
gatgttgaaa atcggggga tgagctgtga ttagcggtga aattccaatc gaattcagag    240
ctagctggat ctccccgaaa tgcgttgagg cgcagcggcg acgatgtcct gtctaagggt   300
agagcgactt tttcggtgcg ggctgcgaaa gcggtaccaa gtcgtggcaa actccgaata   360
ttaggcaaag gattccgtga gccagtgaga ctgtggggga taagcttcat agtcaagagg   420
gaaacagccc agaccatcag ctaaggcccc taaatggctg ctaagtgaa aaggatgtga    480
gaatgctgaa acaaccagga ggttcgctta gaagcagcta ttccttgaaa gagtgcgtaa   540
tagctcactg                                                          550
```

<210> SEQ ID NO 17
<211> LENGTH: 548
<212> TYPE: DNA
<213> ORGANISM: Parachlorella beijerinkii

<400> SEQUENCE: 17

```
tgttgaagaa tgagccggcg acttagaaga agtggcttgg ttaaggataa ctatccggag    60
ccagagcgaa agcaagtctg aatagggcgc ttaaaggtca cttttttctag acccgaaccc   120
gggtgatcta accatgacca ggatgaagct tgggtaacac cacgtgaagg tccgaaccga   180
ccgatgttga aaatcggcg gatgagttgt ggttagcggt gaaataccaa tcgaactcgg    240
agctagctgg ttctccccga atgcgttga ggcgcagcgg tttatgaggc tgtctagggg    300
taaagcactg tttcggtgcg ggctgcgaaa gcggtaccaa atcgtggcaa actctgaata   360
ctagatatgc tattcatgag ccagtgagac ggtgggggat aagcttcatc gtcaagaggg   420
aaacagccca gatcaccagc taaggcccca aaatggtcgt taagtggcaa aggaggtgag   480
aatgctgaaa caaccaggag gtttgcttag aagcagccac cctttaaaga gtgcgtaata   540
gctcactg                                                            548
```

<210> SEQ ID NO 18
<211> LENGTH: 556
<212> TYPE: DNA
<213> ORGANISM: Chlorella luteoviridis

<400> SEQUENCE: 18

```
tgttgaagaa tgagccggcg acttataggg ggtggcgtgg ttaaggaagt aatccgaagc    60
caaagcgaaa gcaagttttc aatagagcga ttttgtcacc ccttatggac ccgaacccgg   120
gtgatctaac cttgaccagg atgaagcttg ggtaacacca agtgaaggtc cgaactcatc   180
gatcttgaaa atcgtggga tgagttgggg ttagttggtt aaatgctaat cgaactcgga   240
gctagctggt tctccccgaa atgtgttgag gcgcagcgat taacgaaata ttttgtacgg   300
tttaggggta aagcactgtt tcggtgcggg ctgcgaaagc ggtaccaaat cgtggcaaac   360
tctgaatact aagcctgtat accgttagtc agtgagagta tagggataa gctctatact   420
caagagggaa acagcccaga tcaccagcta aggccccaaa atgacagcta agtggcaaag   480
gaggtgaaag tgcagaaaca accaggaggt tcgcttagaa gcagcaaccc tttaaagagt   540
gcgtaatagc tcactg                                                   556
```

<210> SEQ ID NO 19
<211> LENGTH: 548
<212> TYPE: DNA
<213> ORGANISM: Chlorella vulgaris

<400> SEQUENCE: 19

```
tgttgaagaa tgagccggcg acttagaaga agtggcttgg ttaaggataa ctatccggag    60
ccagagcgaa agcaagtctg aatagggcgc ttaaggtca cttttctag acccgaaccc    120
gggtgatcta accatgacca ggatgaagct tgggtaacac cacgtgaagg tccgaaccga   180
ccgatgttga aaaatcggcg gatgagttgt ggttagcggt gaaataccaa tcgaactcgg   240
agctagctgg ttctccccga aatgcgttga ggcgcagcgg tttatgaggc tgtctagggg   300
taaagcactg tttcggtgcg ggctgcgaaa gcggtaccaa atcgtggcaa actctgaata   360
ctagatatgc tattcatgag ccagtgagac ggtgggggat aagcttcatc gtcaagaggg   420
aaacagccca gatcaccagc taaggcccca aaatggtcgt taagtggcaa aggaggtgag   480
aatgctgaaa caaccaggag gtttgcttag aagcagccac cctttaaaga gtgcgtaata   540
gctcactg                                                            548
```

<210> SEQ ID NO 20
<211> LENGTH: 565
<212> TYPE: DNA
<213> ORGANISM: Chlorella reisiglii

<400> SEQUENCE: 20

```
tgttgaagaa tgagccggcg acttagaaaa agtggcgtgg ttaaggaaaa attccgaagc    60
cttagcgaaa gcgagtctga atagggcgat caaatatttt aatatttaca atttagtcat   120
tttttctaga cccgaacccg ggtgatctaa ccatgaccag gatgaaactt gggtgatacc   180
aagtgaaggt ccgaaccgac cgatgttgaa aaatcggcgg atgagttgtg gttagcggtg   240
aaataccagt cgaacccgga gctagctggt tctccccgaa atgcgttgag gcgcagcagt   300
acatctagtc tatctagggg taaagcactg tttcggtgcg ggctgtgaaa cggtaccaa   360
atcgtggcaa actctgaata ctagaaatga cggtgtagta gtgagactgt ggggataag   420
ctccattgtc aagagggaaa cagcccagac caccagctaa ggccccaaaa tggtaatgta   480
```

```
gtgacaaagg aggtgaaaat gcaaacacaa ccaggaggtt ggcttagaag cagccatcct    540
ttaaagagtg cgtaatagct cactg                                         565

<210> SEQ ID NO 21
<211> LENGTH: 573
<212> TYPE: DNA
<213> ORGANISM: Chlorella ellipsoidea

<400> SEQUENCE: 21
tgttgaagaa tgagccggcg acttataggg ggtggcttgg ttaaggacta caatccgaag     60
cccaagcgaa agcaagtttg aagtgtacac acattgtgtg tctagagcga ttttgtcact    120
ccttatggac ccgaacccgg gtgatctatt catggccagg atgaagcttg ggtaacacca    180
agtgaaggtc cgaactcatc gatgttgaaa atcgtgggaa tgagttgtga atagggggtga   240 aatgccaatc gaactcggag ctagctggtt ctccccgaaa tgtgttgagg cgcagcgatt    300
cacgatctaa agtacggttt aggggtaaag cactgtttcg gtgcgggctg ttaacgcggt    360
accaaatcgt ggcaaactaa gaatactaaa cttgtatgcc gtgaatcagt gagactaaga    420
gggataagct tcttagtcaa gagggaaaca gcccagatca ccagctaagg ccccaaaatg    480
acagctaagt ggcaaaggag gtgagagtgc agaaacaacc aggaggtttg cttagaagca    540
gccatccttt aaagagtgcg taatagctca ctg                                 573

<210> SEQ ID NO 22
<211> LENGTH: 573
<212> TYPE: DNA
<213> ORGANISM: Chlorella saccharophila

<400> SEQUENCE: 22
tgttgaagaa tgagccggcg acttataggg ggtggcttgg ttaaggacta caatccgaag     60
cccaagcgaa agcaagtttg aagtgtacac acgttgtgtg tctagagcga ttttgtcact    120
ccttatggac ccgaacccgg gtgatctatt catggccagg atgaagcttg ggtaacacca    180
agtgaaggtc cgaactcatc gatgttgaaa atcgtgggaa tgagttgtga atagggggtga   240 aatgccaatc gaactcggag ctagctggtt ctccccgaaa tgtgttgagg cgcagcgatt    300
cacgatctaa agtacggttt aggggtaaag cactgtttcg gtgcgggctg ttaacgcggt    360
accaaatcgt ggcaaactaa gaatactaaa cttgtatgcc gtgaatcagt gagactaaga    420
gggataagct tcttagtcaa gagggaaaca gcccagatca ccagctaagg ccccaaaatg    480
acagctaagt ggcaaaggag gtgagagtgc agaaacaacc aggaggtttg cttagaagca    540
gccatccttt aaagagtgcg taatagctca ctg                                 573

<210> SEQ ID NO 23
<211> LENGTH: 573
<212> TYPE: DNA
<213> ORGANISM: Chlorella saccharophila

<400> SEQUENCE: 23
tgttgaagaa tgagccggcg acttataggg ggtggcttgg ttaaggacta caatccgaag     60
cccaagcgaa agcaagtttg aagtgtacac acattgtgtg tctagagcga ttttgtcact    120
ccttatggac ccgaacccgg gtgatctatt catggccagg atgaagcttg ggtaacacca    180
agtgaaggtc cgaactcatc gatgttgaaa atcgtgggaa tgagttgtga atagggggtga   240 aatgccaatc gaactcggag ctagctggtt ctccccgaaa tgtgttgagg cgcagcgatt    300
cacgatctaa agtacggttt aggggtaaag cactgtttcg gtgcgggctg ttaacgcggt    360
```

```
accaaatcgt ggcaaactaa gaatactaaa cttgtatgcc gtgaatcagt gagactaaga    420
gggataagct tcttagtcaa gagggaaaca gcccagatca ccagctaagg ccccaaaatg    480
acagctaagt ggcaaaggag gtgagagtgc agaaacaacc aggaggtttg cttagaagca    540
gccatccttt aaagagtgcg taatagctca ctg                                 573
```

<210> SEQ ID NO 24
<211> LENGTH: 22
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 24

```
tgttgaagaa tgagccggcg ac                                              22
```

<210> SEQ ID NO 25
<211> LENGTH: 20
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 25

```
cagtgagcta ttacgcactc                                                 20
```

<210> SEQ ID NO 26
<211> LENGTH: 546
<212> TYPE: DNA
<213> ORGANISM: Chlorella protothecoides

<400> SEQUENCE: 26

```
tgttgaagaa tgagccggcg acttagaaaa cgtggcaagg ttaaggaaac gtatccggag    60
ccgaagcgaa agcaagtctg aacagggcga ttaagtcatt ttttctagac ccgaacccgg   120
gtgatctaac catgaccagg atgaagcttg ggtgacacca agtgaaggtc gaaccgacc    180 gatgttgaaa atcggcgga tgagttgtgg ttagcggtga ataccagtc gaactcggag    240 ctagctggtt ctccccgaaa tgcgttgagg cgcagcggtt cataaggctg tctagggta   300 aagcactgtt tcggtgcggg ctgcgaaagc ggtaccaaat cgtggcaaac tctgaatact   360
agatatgcta tttatgggcc agtgagacgg tgggggataa gcttcatcgt cgagagggaa   420
acagcccaga tcactagcta aggccccaaa atgatcgtta agtgacaaag gaggtgagaa   480
tgcagaaaca accaggaggt ttgcttagaa gcagccaccc tttaaagagt gcgtaatagc   540
tcactg                                                              546
```

<210> SEQ ID NO 27
<211> LENGTH: 565
<212> TYPE: DNA
<213> ORGANISM: Chlorella protothecoides

<400> SEQUENCE: 27

```
tgttgaagaa tgagccggcg acttagaaaa agtggcgtgg ttaaggaaaa attccgaagc    60
cttagcgaaa gcgagtctga atagggcgat caaatatttt aatatttaca atttagtcat   120 ttttctaga cccgaacccg ggtgatctaa ccatgaccag gatgaaactt gggtgatacc   180
aagtgaaggt ccgaaccgac cgatgttgaa aaatcggcgg atgagttgtg gttagcggtg   240
```

-continued

```
aaataccagt cgaacccgga gctagctggt tctccccgaa atgcgttgag gcgcagcagt       300
acatctagtc tatctagggg taaagcactg tttcggtgcg ggctgtgaaa acggtaccaa       360
atcgtggcaa actctgaata ctagaaatga cggtgtagta gtgagactgt gggggataag       420
ctccattgtc aagagggaaa cagcccagac caccagctaa ggcccaaaa tggtaatgta        480 gtgacaaagg aggtgaaaat gcaaacacaa ccaggaggtt ggcttagaag cagccatcct      540
ttaaagagtg cgtaatagct cactg                                            565
```